Aug. 17, 1948. K. E. FITCH ET AL Re. 23,027
SATELLITE TELEGRAPH EXCHANGE SYSTEM
Original Filed Nov. 11, 1937 39 Sheets-Sheet 1
FIG. 1A
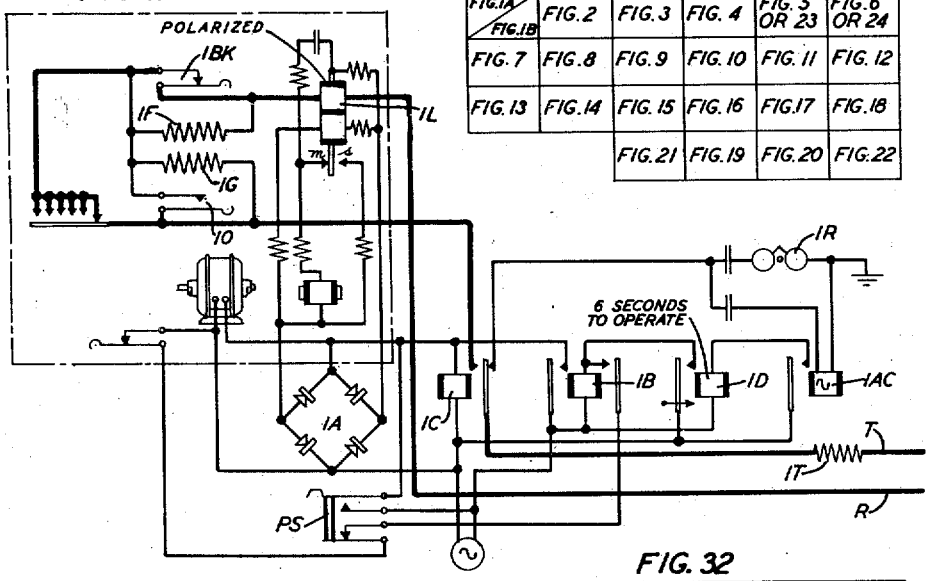
FIG. 25
| | | | | | |
|---|---|---|---|---|---|
| FIG. 1A / FIG. 1B | FIG. 2 | FIG. 3 | FIG. 4 | FIG. 5 OR 23 | FIG. 6 OR 24 |
| FIG. 7 | FIG. 8 | FIG. 9 | FIG. 10 | FIG. 11 | FIG. 12 |
| FIG. 13 | FIG. 14 | FIG. 15 | FIG. 16 | FIG. 17 | FIG. 18 |
| | | FIG. 21 | FIG. 19 | FIG. 20 | FIG. 22 |
FIG. 32
| | | | | | |
|---|---|---|---|---|---|
| FIG. 1A / FIG. 1B | FIG. 2 | FIG. 3 | FIG. 4 | FIG. 5 OR 23 | FIG. 6 OR 24 |
| FIG. 7 | FIG. 8 | FIG. 9 | FIG. 10 | FIG. 11 | FIG. 12 |
| FIG. 26 | FIG. 27 | FIG. 28 | FIG. 16 | FIG. 17 | FIG. 18 |
| FIG. 29 | FIG. 30 | FIG. 31 | FIG. 19 | FIG. 20 | FIG. 22 |
| | FIG. 21 | | | | |
FIG. 1B
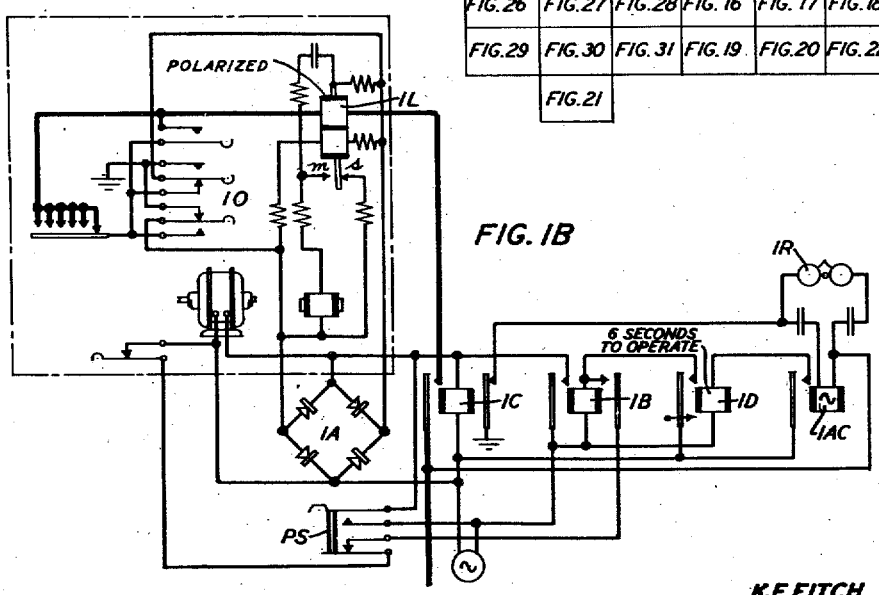
INVENTORS: K.E.FITCH
W.V.K.LARGE
C.W.LUCEK
BY J W Schmied
ATTORNEY

SATELLITE TELEGRAPH EXCHANGE SYSTEM

Original Filed Nov. 11, 1937 39 Sheets-Sheet 2

INVENTORS: K.E.FITCH
W.V.K.LARGE
C.W.LUCEK
BY J W Schmied
ATTORNEY

SATELLITE TELEGRAPH EXCHANGE SYSTEM

Original Filed Nov. 11, 1937 39 Sheets-Sheet 3

INVENTORS: K. E. FITCH
W. V. K. LARGE
C. W. LUCEK

BY J. W. Schmied

ATTORNEY

SATELLITE TELEGRAPH EXCHANGE SYSTEM

Original Filed Nov. 11, 1937 39 Sheets-Sheet 4

INVENTORS: K. E. FITCH
W. V. K. LARGE
C. W. LUCEK
BY J. W. Schmied
ATTORNEY

SATELLITE TELEGRAPH EXCHANGE SYSTEM

Original Filed Nov. 11, 1937 39 Sheets-Sheet 5

INVENTORS: K.E.FITCH
W.V.K.LARGE
C.W.LUCEK
BY J W Schmied
ATTORNEY

SATELLITE TELEGRAPH EXCHANGE SYSTEM

Original Filed Nov. 11, 1937 39 Sheets-Sheet 6

INVENTORS: K.E.FITCH
W.V.K.LARGE
C.W.LUCEK
BY J W Schmied
ATTORNEY

SATELLITE TELEGRAPH EXCHANGE SYSTEM

Original Filed Nov. 11, 1937 39 Sheets-Sheet 7

INVENTORS: K. E. FITCH
W. V. K. LARGE
C. W. LUCEK

BY J. W. Schmied

ATTORNEY

SATELLITE TELEGRAPH EXCHANGE SYSTEM

Original Filed Nov. 11, 1937 39 Sheets-Sheet 8

INVENTORS: K. E. FITCH
W. V. K. LARGE
C. W. LUCEK
BY
J. W. Schmied
ATTORNEY

SATELLITE TELEGRAPH EXCHANGE SYSTEM

Original Filed Nov. 11, 1937 39 Sheets-Sheet 9

INVENTORS: K.E.FITCH
W.V.K.LARGE
C.W.LUCEK
BY
J W Schmied
ATTORNEY

SATELLITE TELEGRAPH EXCHANGE SYSTEM

Original Filed Nov. 11, 1937 39 Sheets-Sheet 10

INVENTORS: K.E.FITCH
W.V.K.LARGE
C.W.LUCEK

BY J W Schmied

ATTORNEY

SATELLITE TELEGRAPH EXCHANGE SYSTEM

Original Filed Nov. 11, 1937 39 Sheets-Sheet 11

INVENTORS: K. E. FITCH
W. V. K. LARGE
C. W. LUCEK
BY J. W. Schmied
ATTORNEY

SATELLITE TELEGRAPH EXCHANGE SYSTEM

Original Filed Nov. 11, 1937 39 Sheets-Sheet 12

INVENTORS: K. E. FITCH
W. V. K. LARGE
C. W. LUCEK
BY J. W. Schmied
ATTORNEY

SATELLITE TELEGRAPH EXCHANGE SYSTEM

Original Filed Nov. 11, 1937 39 Sheets-Sheet 13

INVENTORS: K.E. FITCH
W.V.K. LARGE
C.W. LUCEK

BY J. H. Schmied

ATTORNEY

SATELLITE TELEGRAPH EXCHANGE SYSTEM

Original Filed Nov. 11, 1937 39 Sheets-Sheet 14

INVENTORS: K. E. FITCH
W. V. K. LARGE
C. W. LUCEK

BY J. W. Schmied

ATTORNEY

SATELLITE TELEGRAPH EXCHANGE SYSTEM
Original Filed Nov. 11, 1937 39 Sheets-Sheet 15
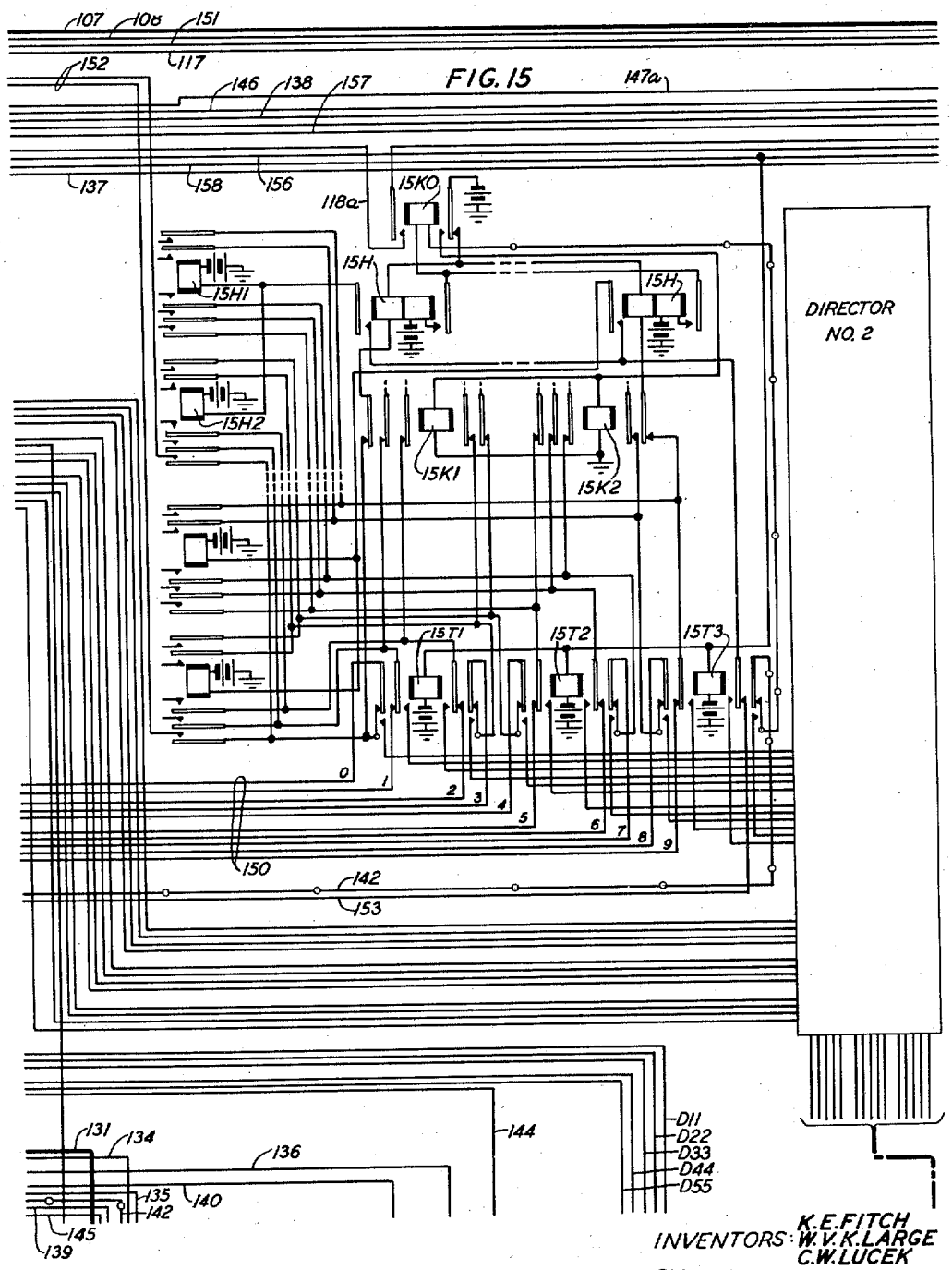
INVENTORS: K.E.FITCH
W.V.K.LARGE
C.W.LUCEK
BY J W Schmied
ATTORNEY.

SATELLITE TELEGRAPH EXCHANGE SYSTEM
Original Filed Nov. 11, 1937 39 Sheets-Sheet 16
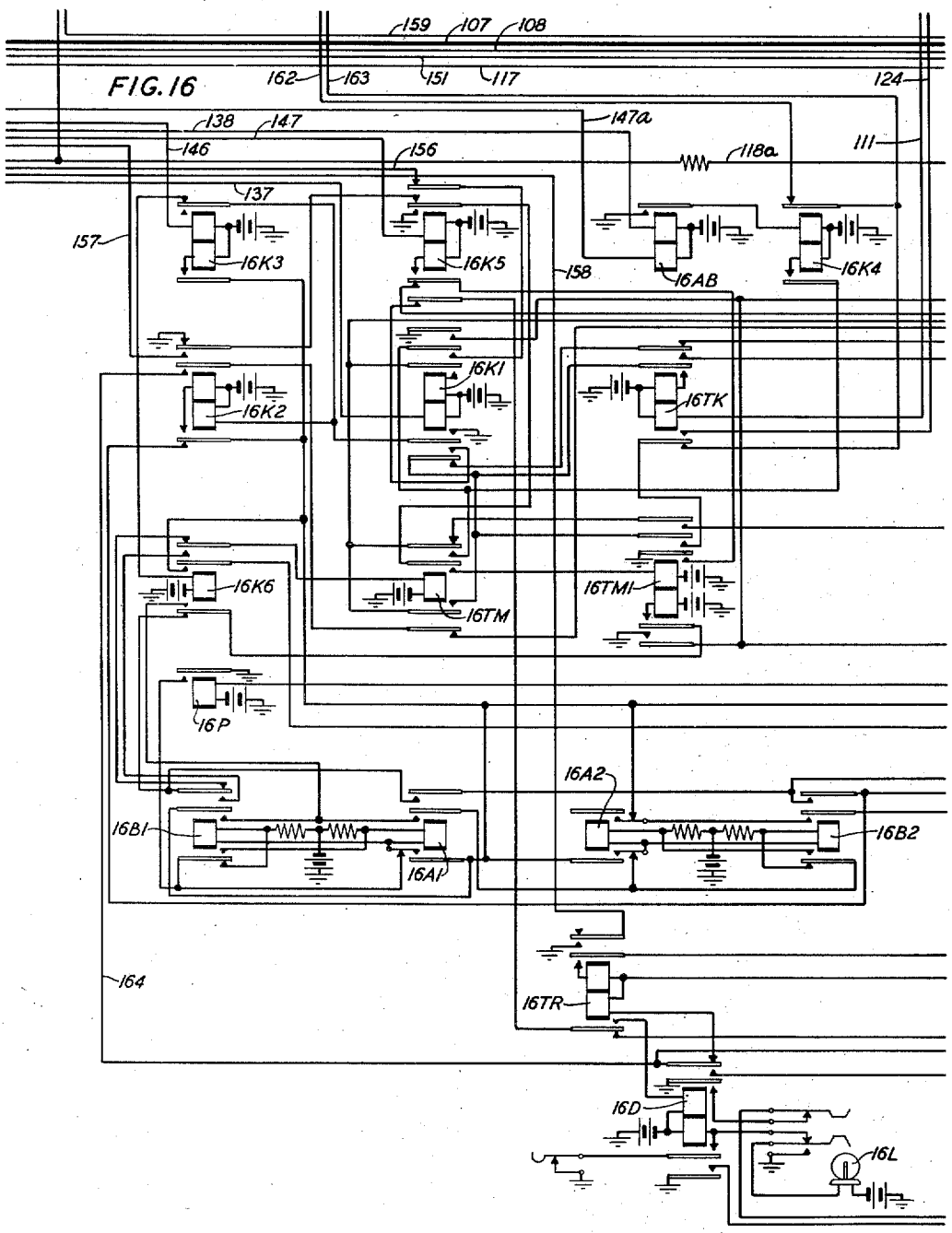
INVENTORS: K. E. FITCH
W. V. K. LARGE
C. W. LUCEK
BY J. W. Schmied
ATTORNEY SATELLITE TELEGRAPH EXCHANGE SYSTEM
Original Filed Nov. 11, 1937 39 Sheets-Sheet 17
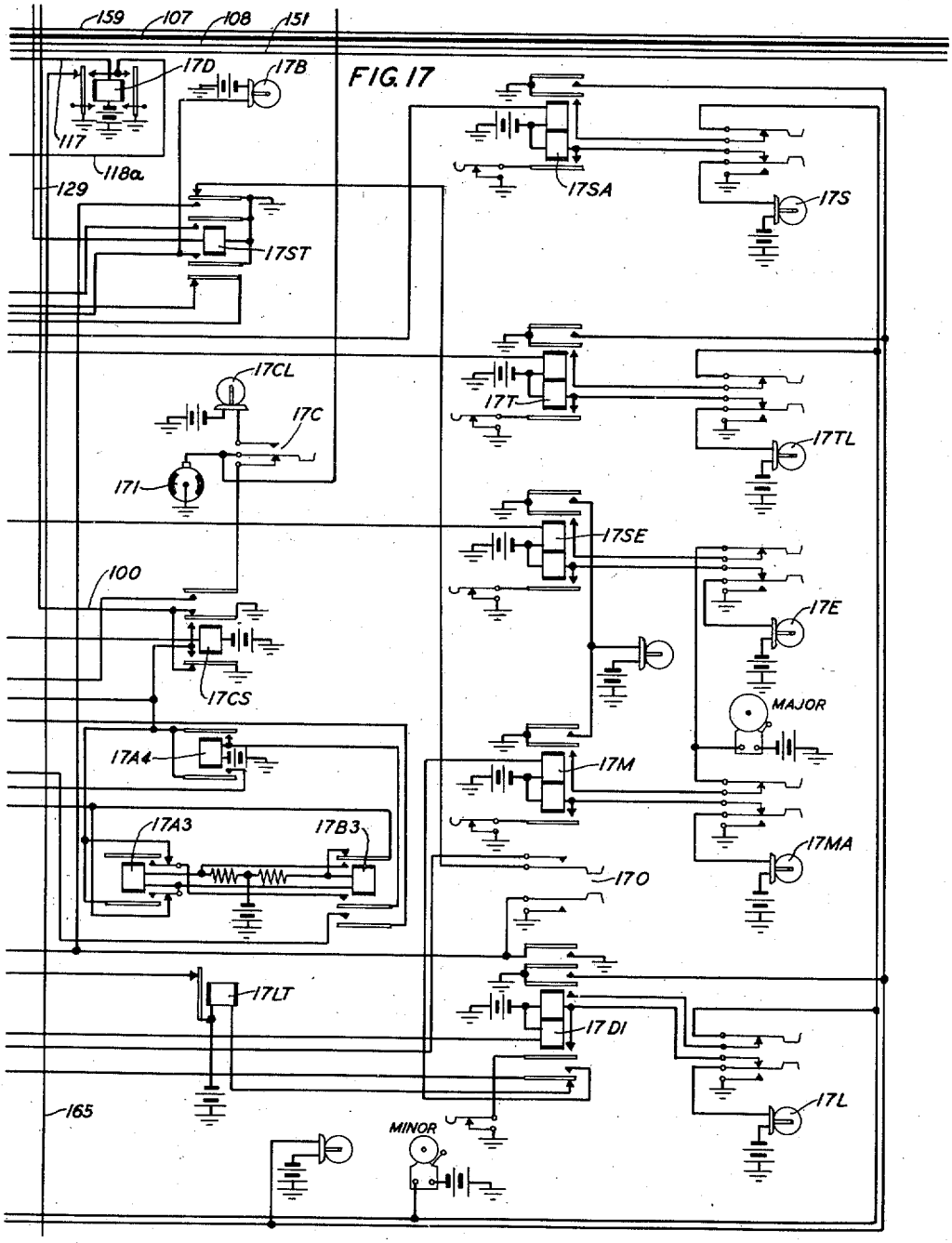
INVENTORS: K.E.FITCH
W.V.K.LARGE
C.W.LUCEK
BY
J W Schmied
ATTORNEY

SATELLITE TELEGRAPH EXCHANGE SYSTEM

Original Filed Nov. 11, 1937 39 Sheets-Sheet 18

INVENTORS: K.E.FITCH
W.V.K.LARGE
C.W.LUCEK
BY
J W Schmied
ATTORNEY

SATELLITE TELEGRAPH EXCHANGE SYSTEM

Original Filed Nov. 11, 1937 39 Sheets-Sheet 19

INVENTORS: K.E.FITCH
W.V.K.LARGE
C.W.LUCEK
BY
J.W.Schmied
ATTORNEY

SATELLITE TELEGRAPH EXCHANGE SYSTEM

Original Filed Nov. 11, 1937 39 Sheets-Sheet 20

INVENTORS: K.E.FITCH
W.V.K.LARGE
C.W.LUCEK

BY J W Schmied

ATTORNEY

SATELLITE TELEGRAPH EXCHANGE SYSTEM

Original Filed Nov. 11, 1937 39 Sheets-Sheet 21

INVENTORS: K. E. FITCH
W. V. K. LARGE
C. W. LUCEK
BY J. W. Schmied
ATTORNEY

SATELLITE TELEGRAPH EXCHANGE SYSTEM

Original Filed Nov. 11, 1937 39 Sheets-Sheet 22

INVENTORS: K. E. FITCH
W. V. K. LARGE
C. W. LUCEK
BY
J. W. Schmied
ATTORNEY

SATELLITE TELEGRAPH EXCHANGE SYSTEM

Original Filed Nov. 11, 1937 39 Sheets-Sheet 23

INVENTORS: K.E.FITCH
W.V.K.LARGE
C.W.LUCEK
BY
J W Schmied
ATTORNEY

SATELLITE TELEGRAPH EXCHANGE SYSTEM

Original Filed Nov. 11, 1937 39 Sheets-Sheet 24

INVENTORS: K.E.FITCH
W.V.K.LARGE
C.W.LUCEK
BY J. W. Schmied
ATTORNEY

SATELLITE TELEGRAPH EXCHANGE SYSTEM

Original Filed Nov. 11, 1937

INVENTORS: K.E.FITCH
W.V.K.LARGE
C.W.LUCEK
BY
J W Schmied
ATTORNEY

SATELLITE TELEGRAPH EXCHANGE SYSTEM

Original Filed Nov. 11, 1937 39 Sheets-Sheet 26

INVENTORS: K.E.FITCH
W.V.K.LARGE
C.W.LUCEK

BY J W Schmied

ATTORNEY

SATELLITE TELEGRAPH EXCHANGE SYSTEM

Original Filed Nov. 11, 1937 39 Sheets-Sheet 27

INVENTORS: K.E.FITCH
W.V.K.LARGE
C.W.LUCEK

BY J. W. Schmied

ATTORNEY

SATELLITE TELEGRAPH EXCHANGE SYSTEM

Original Filed Nov. 11, 1937 39 Sheets-Sheet 28

INVENTORS: K.E.FITCH
W.V.K.LARGE
C.W.LUCEK
BY
J W Schmied
ATTORNEY

SATELLITE TELEGRAPH EXCHANGE SYSTEM

Original Filed Nov. 11, 1937 39 Sheets-Sheet 29

INVENTORS: K.E.FITCH
W.V.K.LARGE
C.W.LUCEK
BY J W Schmied
ATTORNEY

SATELLITE TELEGRAPH EXCHANGE SYSTEM

Original Filed Nov. 11, 1937 39 Sheets-Sheet 30

INVENTORS: K.E.FITCH
W.V.K.LARGE
C.W.LUCEK
BY
J. W. Schmied
ATTORNEY

SATELLITE TELEGRAPH EXCHANGE SYSTEM

Original Filed Nov. 11, 1937 39 Sheets-Sheet 31

LINK CIRCUIT

SUBSCRIBER GROUP SEQUENCE CIRCUIT

INVENTORS: K.E.FITCH
W.V.K.LARGE
C.W.LUCEK
BY J. W. Schmied
ATTORNEY

SATELLITE TELEGRAPH EXCHANGE SYSTEM

Original Filed Nov. 11, 1937 39 Sheets-Sheet 32

TRUNK SEQUENCE CIRCUIT

DIRECTOR AND DISTRIBUTOR CIRCUIT

INVENTORS: K.E.FITCH
W.V.K.LARGE
C.W.LUCEK
BY J W Schmied
ATTORNEY

SATELLITE TELEGRAPH EXCHANGE SYSTEM

Original Filed Nov. 11, 1937 39 Sheets-Sheet 33

BUSY, OUT-OF-ORDER, AND UNASSIGNED NUMBER TEST CIRCUIT

LOCAL SUBSCRIBER LINE IDLE CONDITION

INVENTORS: K.E.FITCH
W.V.K.LARGE
C.W.LUCEK
BY
J. H. Schmied
ATTORNEY

SATELLITE TELEGRAPH EXCHANGE SYSTEM

Original Filed Nov. 11, 1937 39 Sheets-Sheet 34

TRUNK ASSIGNED AWAITING ANSWER BY OPERATOR

TRUNK CIRCUIT INCOMING CALL OPERATOR HAS NOT ANSWERED.

INVENTORS: K. E. FITCH
W. V. K. LARGE
C. W. LUCEK

BY J. W. Schmied
ATTORNEY

SATELLITE TELEGRAPH EXCHANGE SYSTEM

Original Filed Nov. 11, 1937 39 Sheets-Sheet 35

BREAK FROM CENTRAL OFFICE

BREAK BY SUBSCRIBER

INVENTORS: K. E. FITCH
W. V. K. LARGE
C. W. LUCEK
BY J. W. Schmied
ATTORNEY

SATELLITE TELEGRAPH EXCHANGE SYSTEM

Original Filed Nov. 11, 1937 39 Sheets-Sheet 36

COMPLETION OF BREAK AWAITING OPERATION OF TEST CIRCUIT AT CENTRAL OFFICE TO PREVENT DISCONNECT

DISCONNECT SUPPLEMENTARY SPACE BEING SENT TO CENTRAL OFFICE

INVENTORS: K.E.FITCH
W.V.K.LARGE
C.W.LUCEK
BY J W Schmied
ATTORNEY

SATELLITE TELEGRAPH EXCHANGE SYSTEM

Original Filed Nov. 11, 1937 39 Sheets-Sheet 37

DISCONNECT FIRST MARKING SIGNAL BEING SENT TO CENTRAL OFFICE

DISCONNECT RINGING CURRENT RECEIVED FROM CENTRAL OFFICE. SECOND MARKING SIGNAL BEING SENT TO CENTRAL OFFICE

INVENTORS: K.E.FITCH
W.V.K.LARGE
C.W.LUCEK
BY
J W Schmied
ATTORNEY

SATELLITE TELEGRAPH EXCHANGE SYSTEM

Original Filed Nov. 11, 1937 39 Sheets-Sheet 38

CENTRAL OFFICE TRUNK CIRCUIT BREAK SIGNAL

TWO WAY TRUNK CIRCUIT DISCONNECT FROM SATELLITE TRUNK

TWO WAY TRUNK CIRCUIT OPERATOR HAS REMOVED CORD PLUG

INVENTORS: K.E.FITCH
W.V.K.LARGE
C.W.LUCEK
BY J. W. Schmied
ATTORNEY

SATELLITE TELEGRAPH EXCHANGE SYSTEM

Original Filed Nov. 11, 1937 39 Sheets-Sheet 39

TWO WAY TRUNK CIRCUIT
OPERATOR CALLS SUBSCRIBER

TWO WAY TRUNK CIRCUIT
RINGING TO LOOP SUBSCRIBER
OF FIG. 1A

TWO WAY TRUNK CIRCUIT
CALLED SUBSCRIBER ANSWERS

INVENTORS: K.E.FITCH
W.V.K.LARGE
C.W.LUCEK

BY J. N. Schmied

ATTORNEY

Reissued Aug. 17, 1948

Re. 23,027

UNITED STATES PATENT OFFICE 23,027

SATELLITE TELEGRAPH EXCHANGE SYSTEM

Karl E. Fitch, Summit, N. J., and Wayne V. K. Large, Locust Valley, and Charles W. Lucek, Port Chester, N. Y., assignors to Bell Telephone Laboratories, Incorporated, New York, N. Y., a corporation of New York Original No. 2,390,656, dated December 11, 1945, Serial No. 173,958, November 11, 1937. Application for reissue April 5, 1946, Serial No. 659,710

243 Claims. (Cl. 178—2)

The present invention relates to a teletypewriter or printing telegraph exchange system of the type which may be designated an automatic line concentration system or satellite exchange.

The nature of the system in its operational aspects as a whole may be gathered from the operating problem which it is designed to solve. The problem is this: A number of teletypewriter subscribers' stations are located in a region in which the traffic and the number of subscribers does not justify a manual exchange for the reason that to keep the exchange manned with operating personnel for twenty-four hour service and sufficient operating personnel to meet load conditions would not be economically justifiable. The alternative method of extending individual trunks to the nearest central office would require long line equipment and would also not be economically justifiable.

In accordance with the present invention an unattended automatically functioning switching point is established to provide service to the subscribers in the region in question over a relatively small number of trunks extending to one or more of the nearest central offices. In this way a small number of trunks, for example, six, will provide adequate service to a large number of subscribers, for example fifty, on a twenty-four hour service basis with little or no delay for any call under normal traffic conditions. Any reasonable number of trunks may be used.

The system in question to be described, therefore, involves:

(1) A teletypewriter central office which will hereinafter for brevity be referred to as the central office, TWX board, or switchboard; (2) a satellite office; and (3) subscribers' stations. A required number of trunks connect the TWX board with the satellite office and individual lines connect the subscribers' stations with the satellite office. It is within the scope of the invention that some trunks from the satellite office extend to one TWX office and that other trunks extend to one or more other TWX switchboards, which feature is specifically disclosed herein. A particular subscriber may have his line circuit so arranged that upon making a call he will be connected over a trunk to a particular central office as a first preference and be connected to another central office over one of another group of trunks only in case all the trunks to the first central office are busy.

Provision is made whereby subscribers whose stations are too distant from the satellite exchange to be connected thereto by an ordinary subscriber's loop may be connected over a toll line. In making a call from the subscriber's station to the central office the equipment at the satellite office automatically seizes an idle trunk and gives an indication at the central office that a subscriber is calling on that trunk. The cord circuit at the central office employed to answer or to make calls over a trunk is or may be identical with the cord circuits used in the same type of exchange for interconnecting other lines and supervising calls thereover. A suitable cord circuit is that disclosed in the patent to Kinkead et al., 2,024,581, granted December 17, 1935. With slight modifications of equipment and of the trunk, similar and equivalent cord circuits such as are disclosed in the application of Locke and Kinkead Serial No. 459,684, filed June 7, 1930, now Patent 2,237,154, granted April 1, 1941, may be employed, the example shown herein being illustrative of the principles involved. In accordance with these patents and Lane Patent 1,965,383, hereinafter mentioned, the common practice in the art has been to use cord circuits of central offices of the kind disclosed in such patents to interconnect and supervise the calls of stations directly connected to such central offices, i. e. connected without the intervention of a satellite office.

In calling a subscriber from the TWX central office, the operator plugs into any idle trunk after determining that the same is idle by testing or checking a suitable idle line indicator. This causes the seizure and connection to that trunk at the satellite office of a distributor and a director circuit. Thereupon an indication is given to the operator that these circuits are prepared to function. Thereupon in order to cause the trunk to be connected to the proper subscriber's line for the subsequent transmission of messages the operator sends a predetermined sequence of permutation code combinations from her teletypewriter machine. The distributor circuit receives these and the director circuit responds by testing the required subscriber's line, giving an indication back if it is busy, and connecting it to the trunk if it is idle. After this operation has been performed the distributor and the director circuit drop out of the connection and are available to route subsequent calls during the time communication from one or more previous calls is proceeding. In a preferred embodiment the director circuit directs a call as a result of receipt by it of two successive selecting code combinations but the principle may be extended to the utilization of three or even more code combinations for selecting a particular subscriber's line, if desired.

In a complete organization of equipment embodying the various features of the invention as disclosed herein numerous traffic and operating features are incorporated to insure adequate supervision of calls, to insure, so far as practicable, that no part of the equipment becomes jammed or locked into any inoperative condition as a result of any number of simultaneous calls in either or both directions, as a result of abandonment of a call in either direction at any stage thereof before completion, or as a result of failure of some particular element of the system. Provision is also made for giving an alarm in the case of a variety of different possible failures of parts of the equipment which function improperly and to indicate the nature and cause of certain defective operation, if and when such defective operation occurs. Inasmuch as but a single distributor and director circuit function in the system, the failure of these vital portions of the equipment would tie up the entire satellite exchange for communication in one direction at least and provision is therefore made so that, if the director circuit fails to function in certain vital respects, it recognizes its inability to so function and replaces itself in the circuit with a substitute director circuit which continues to carry on the desired operations.

In short, therefore, the equipment at the satellite exchange is designed to accomplish all the essential functions of an operator provided with manual cord circuits for interconnecting lines in response to calls coming into the satellite exchange either from subscribers or from trunks to the central office, supervising such calls and disconnecting the lines after the desired communication has been had. The organization of parts herein disclosed for accomplishing these functions and other incidental and auxiliary functions are divided for convenience into several parts each of which is connected to certain of the others by one or more conductors. Each of these parts cooperates with the others to form an interrelated whole. Certain minor parts and their functions might be eliminated without impairing the operative functions of the remaining parts. The division of the apparatus for performing various functions into distinctive portions known as "circuits" is largely for the purpose of convenient description and it will be obvious to those skilled in the art that certain elements and their functions could be transferred into other divisions or circuits of the entire system merely by transferring the element or elements and extending suitable conductive leads thereto.

Fig. 1A represents an ordinary subscriber's circuit and subscriber's station circuit adapted for unattended service, the unattended features of which may be omitted or left unutilized;

Fig. 1B represents a subscriber's station located so remotely from the satellite office that it requires long line equipment and the line may be understood to include one or more telegraph repeaters; the unattended features of Fig. 1B may be omitted or left unutilized;

Figure 3:
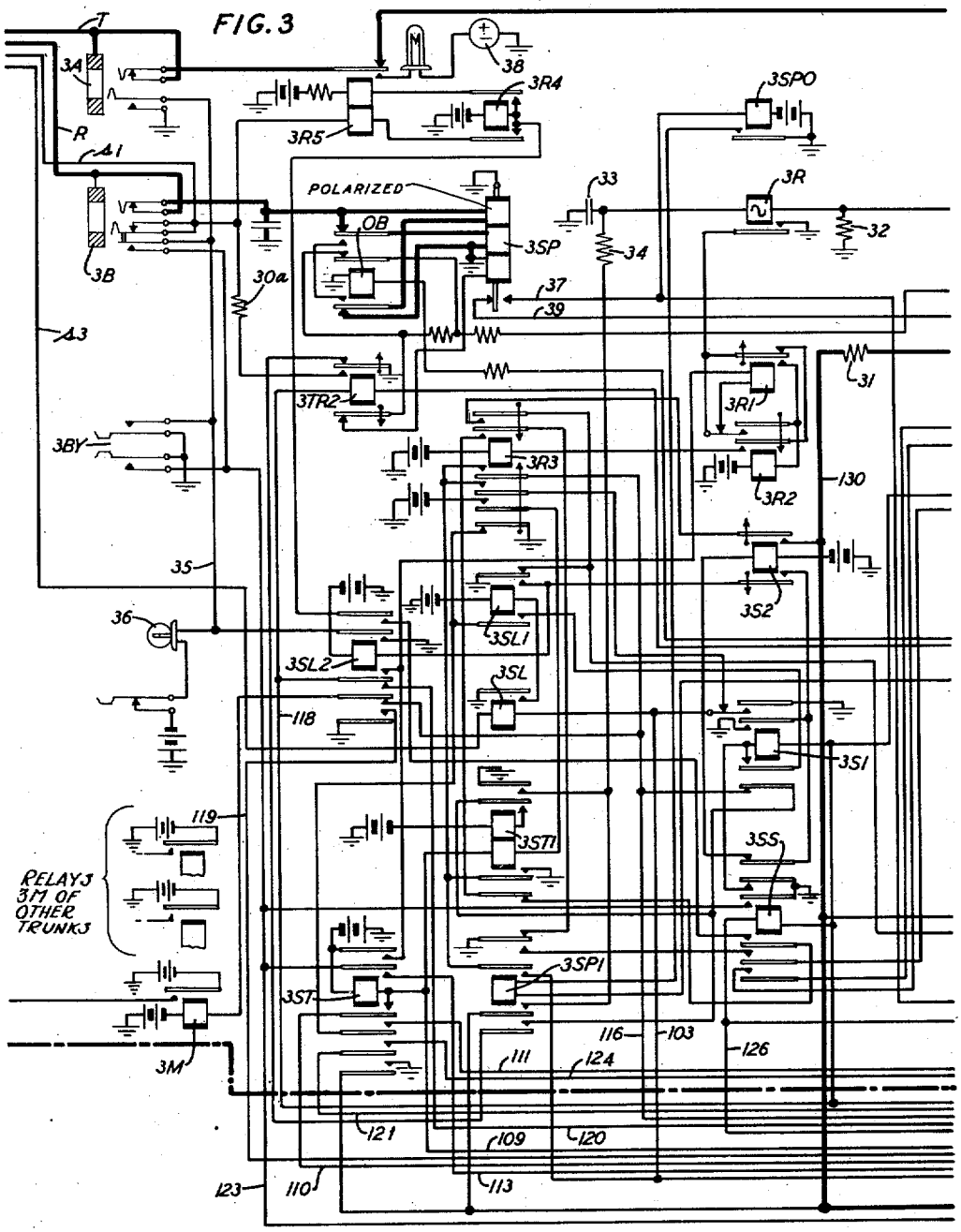
Figure 4:
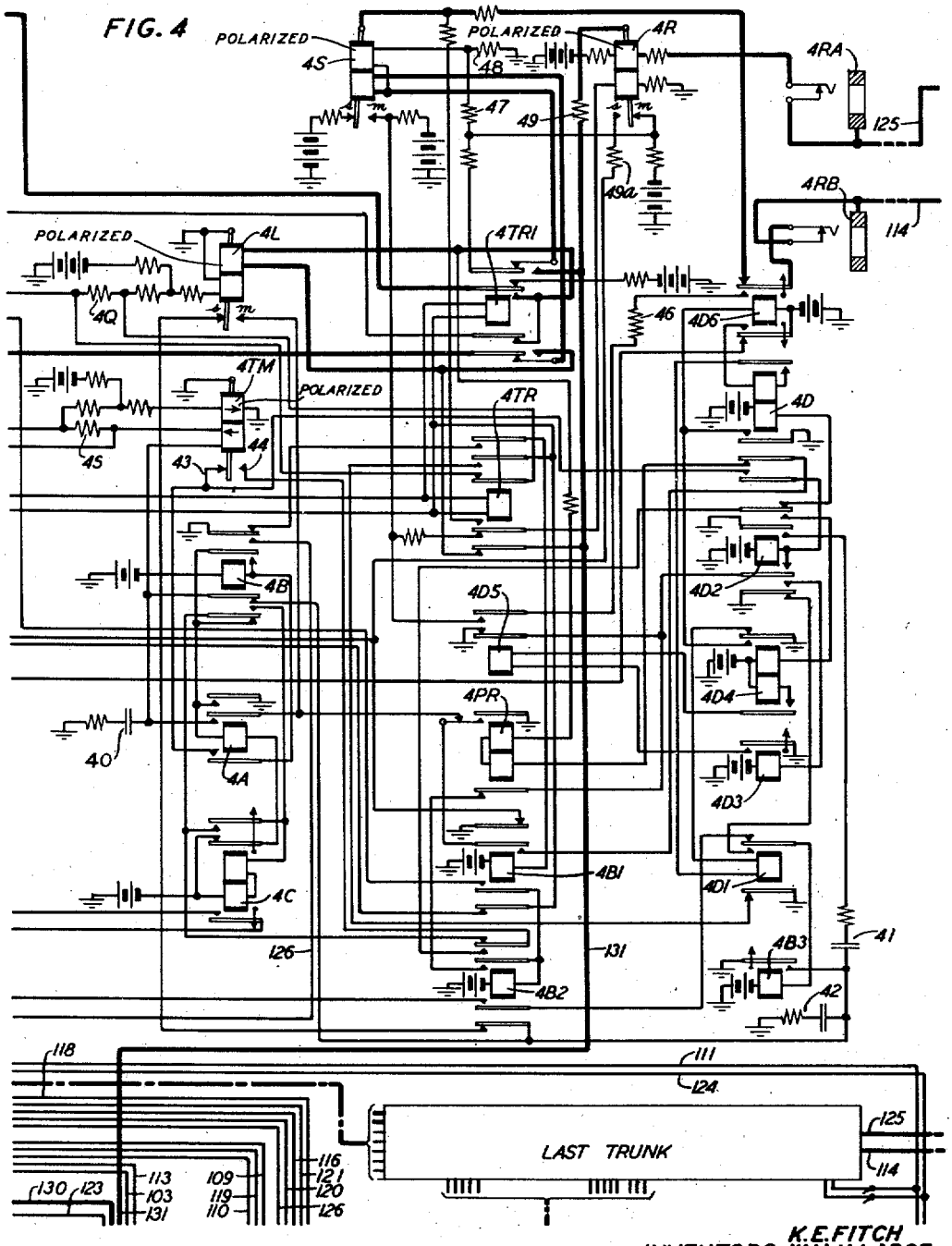
Figure 5:
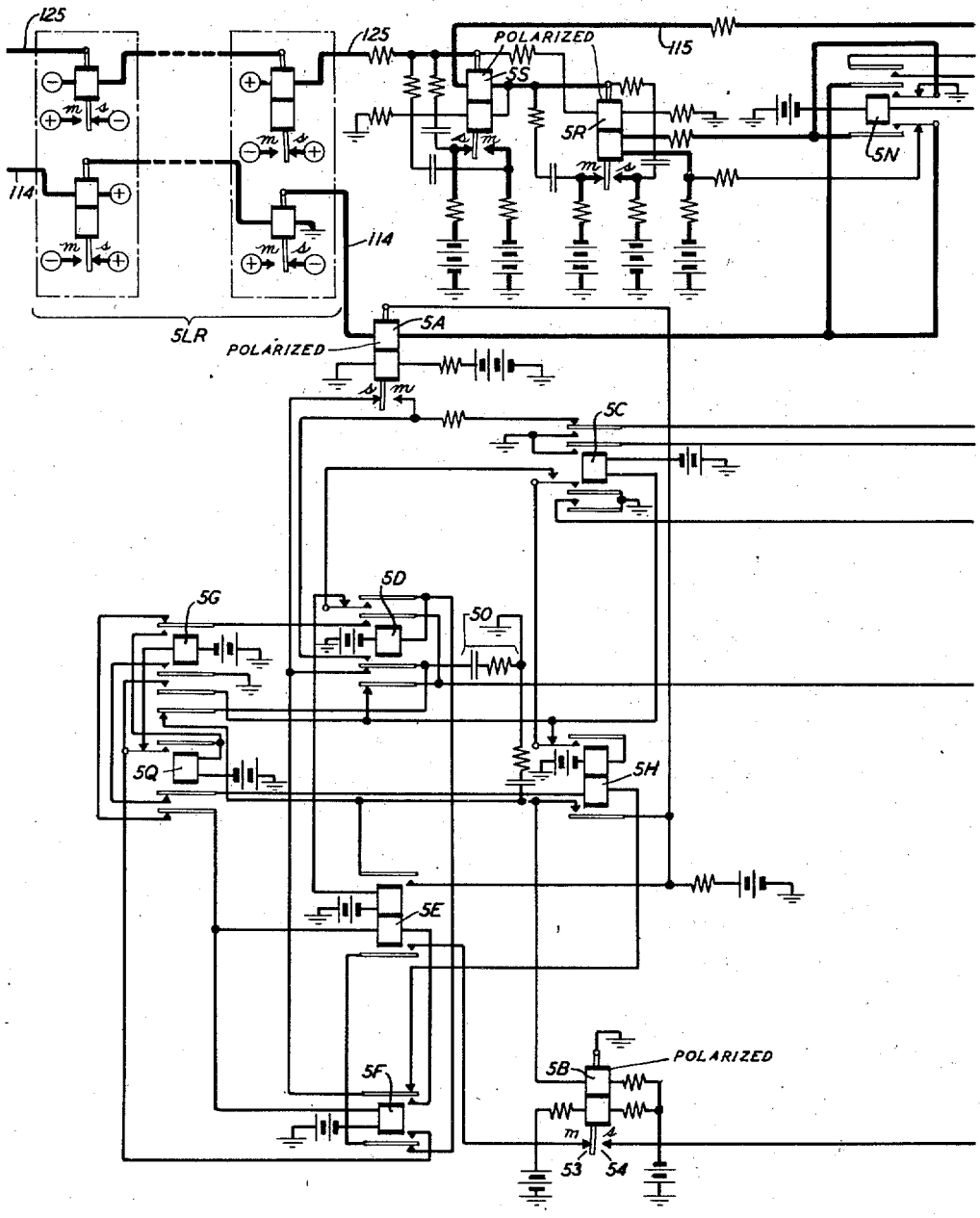
Figure 6:
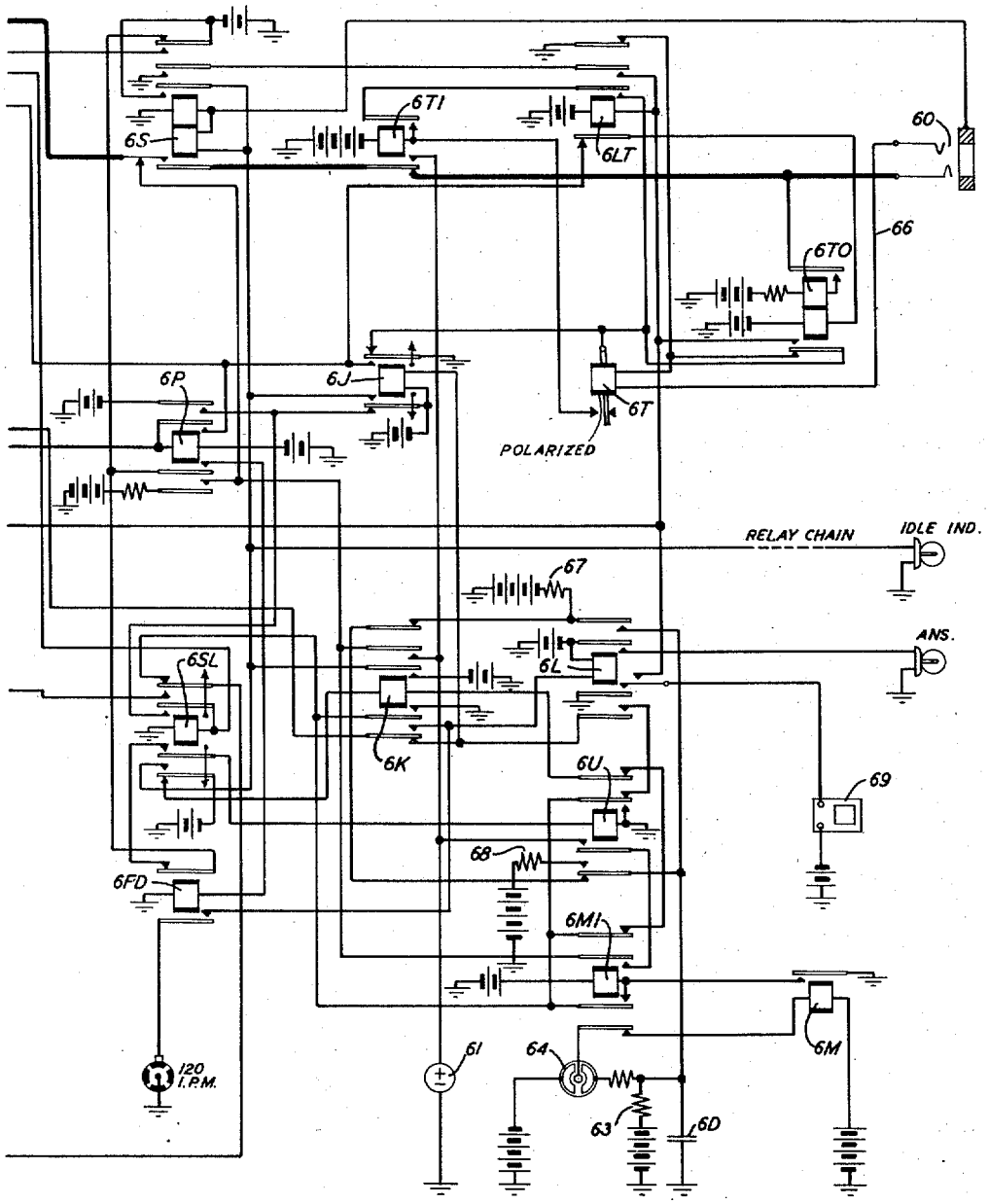
Figure 7:
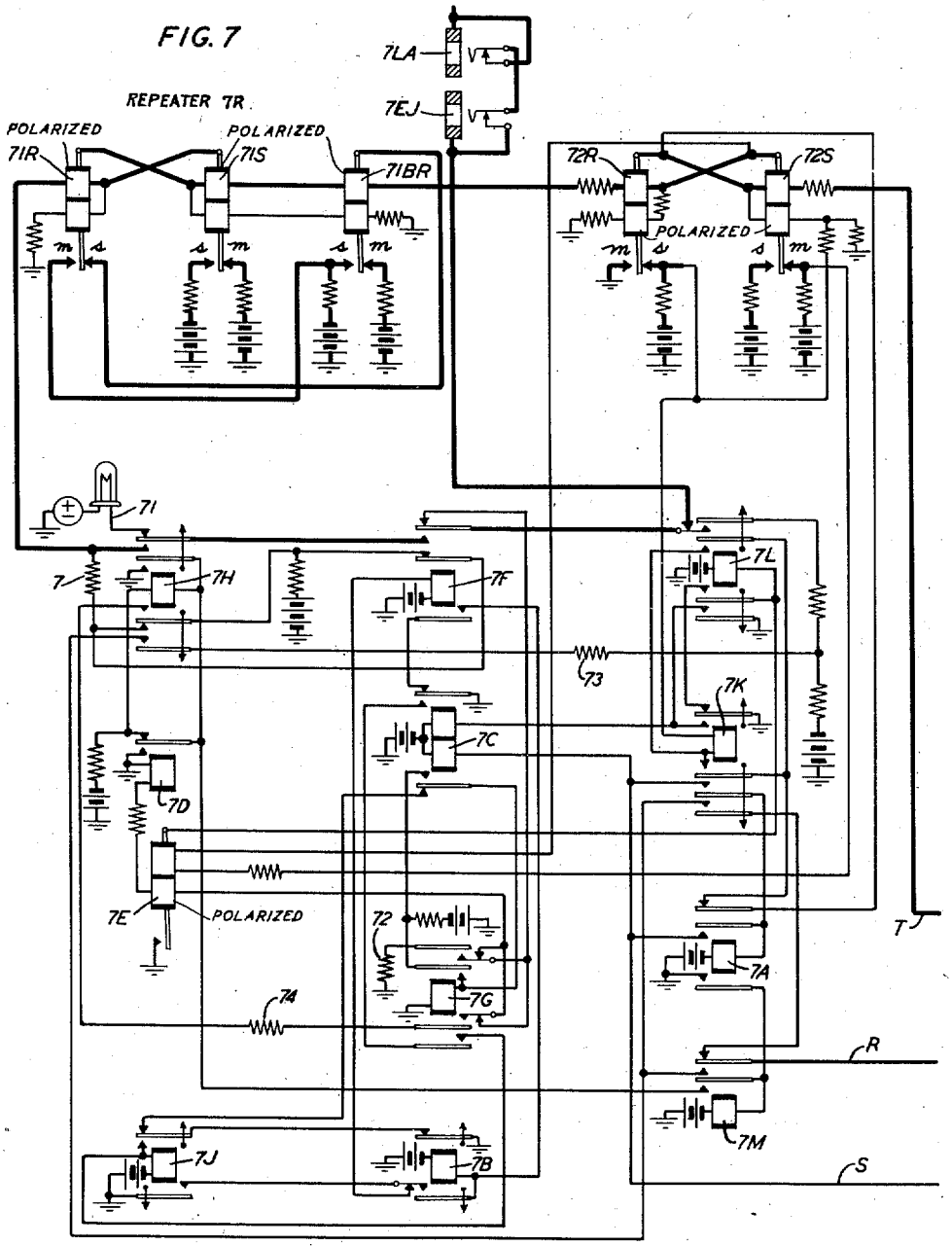
Figure 8:
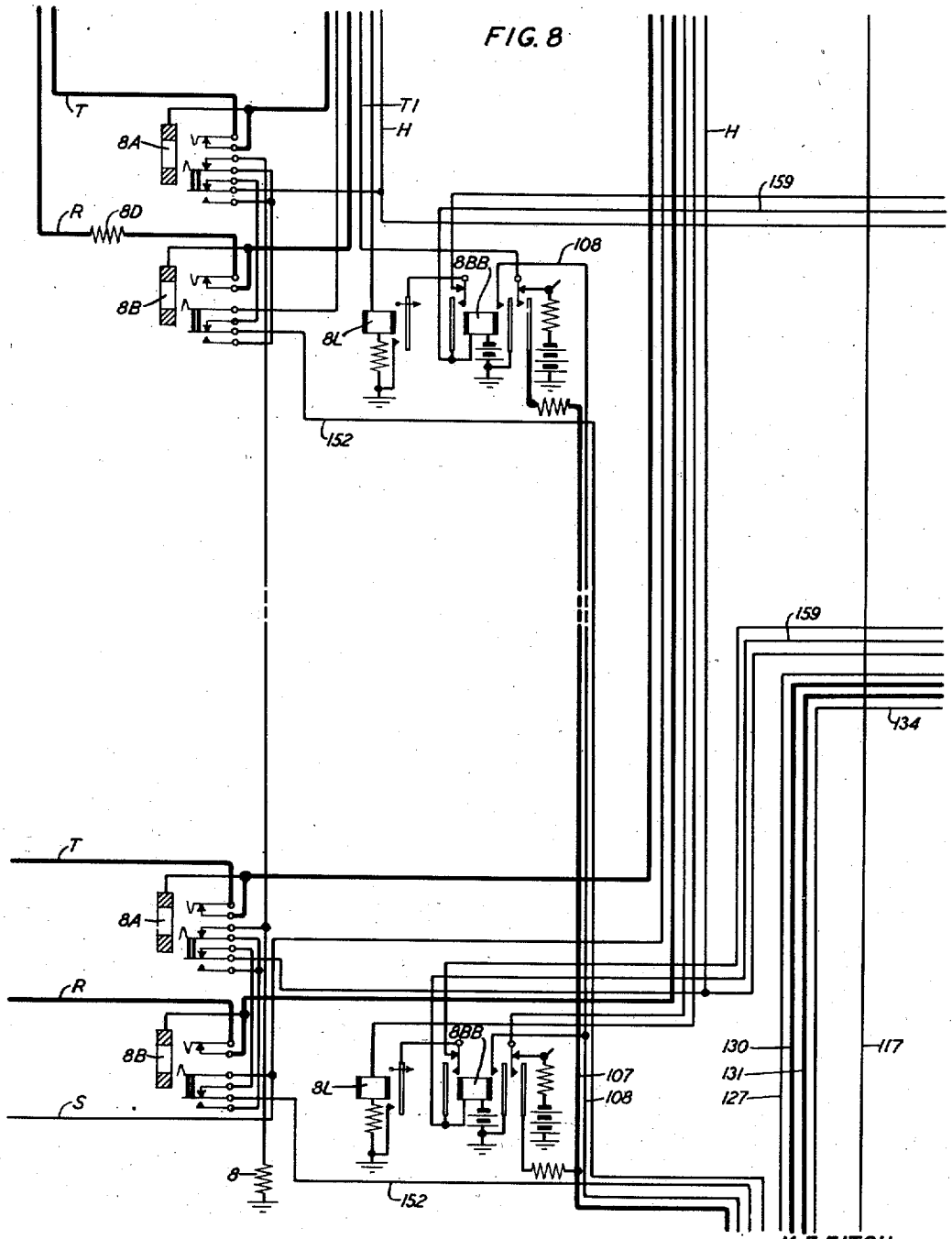
Figure 9:
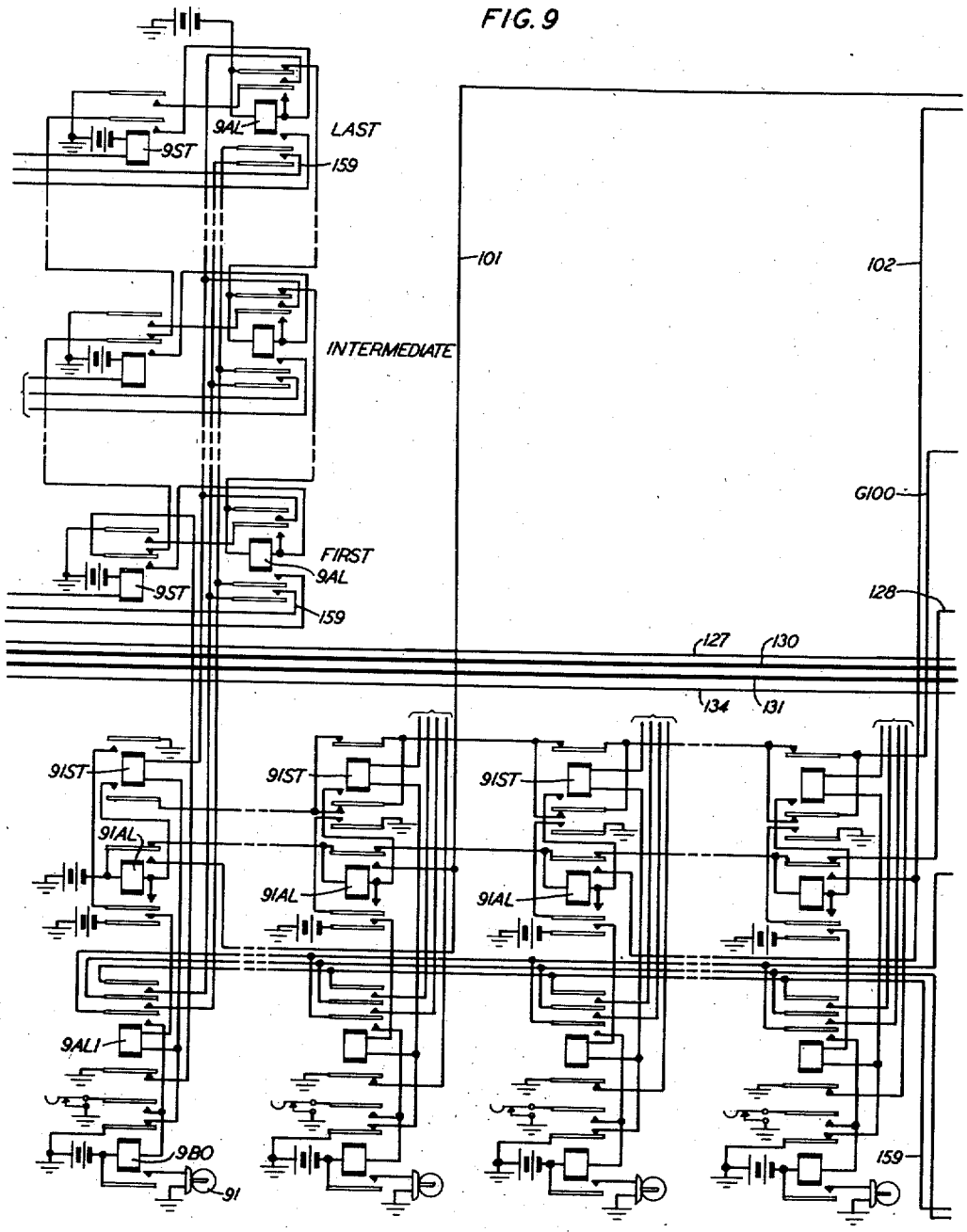
Figure 10:
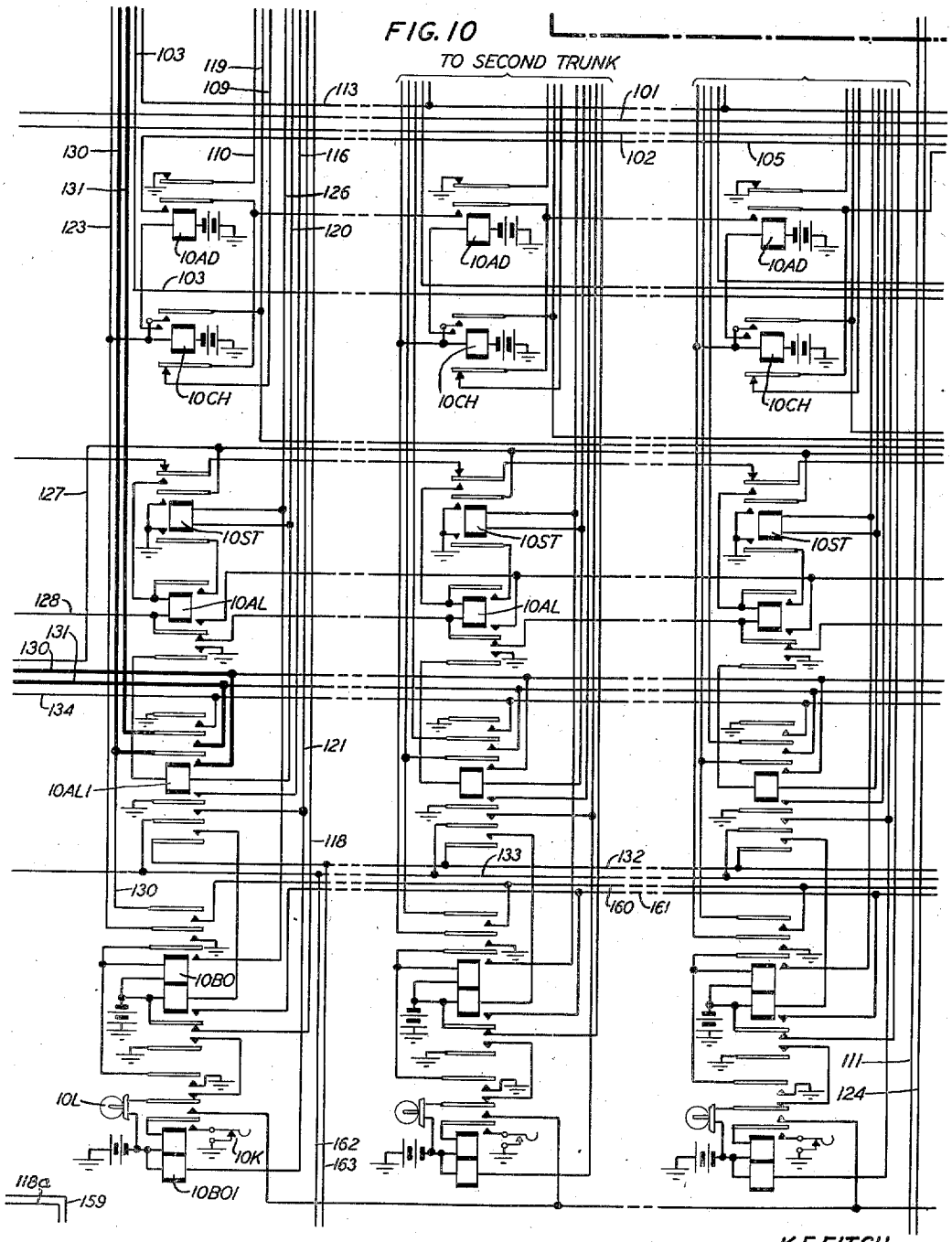
Figure 11:
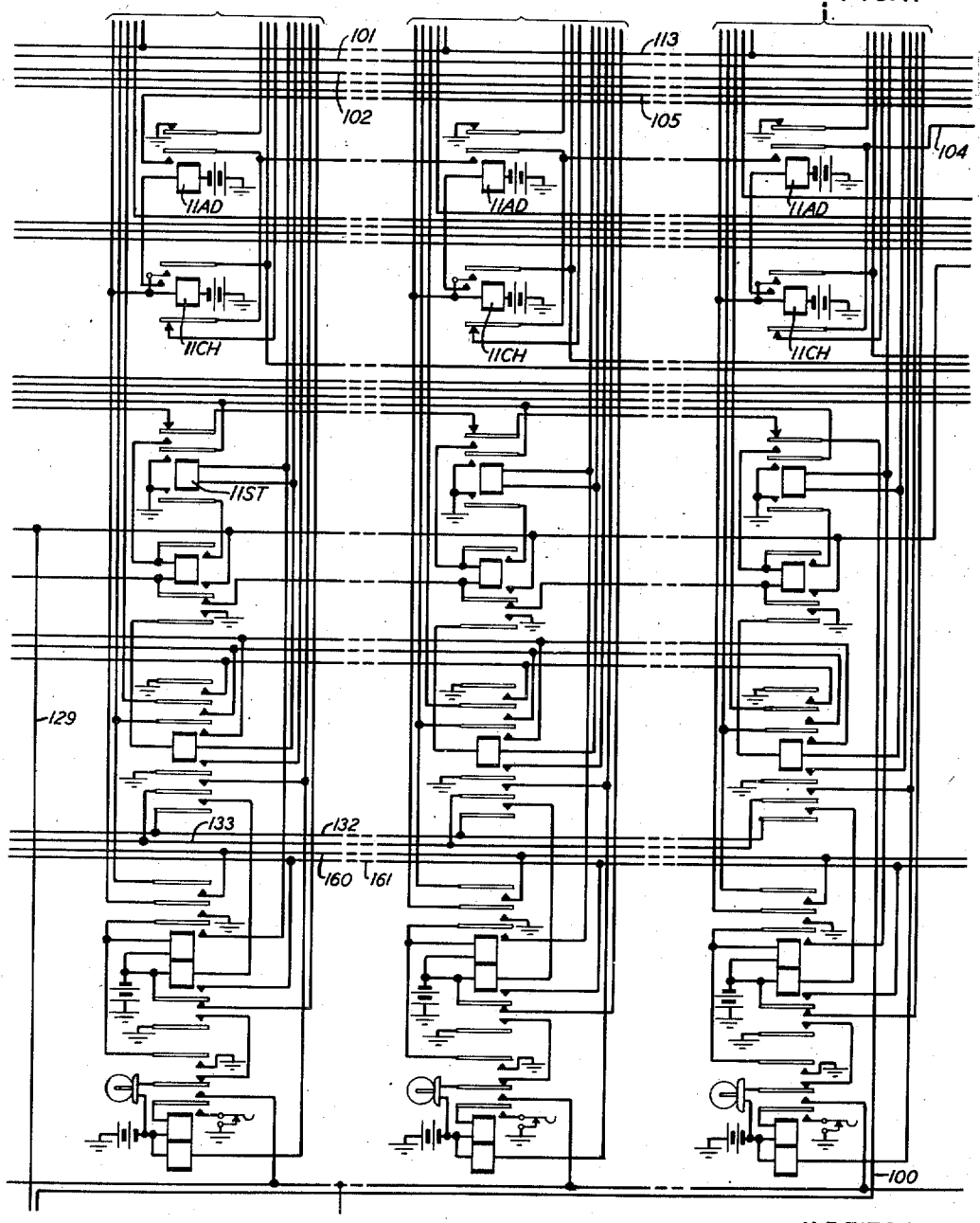
Figure 12:
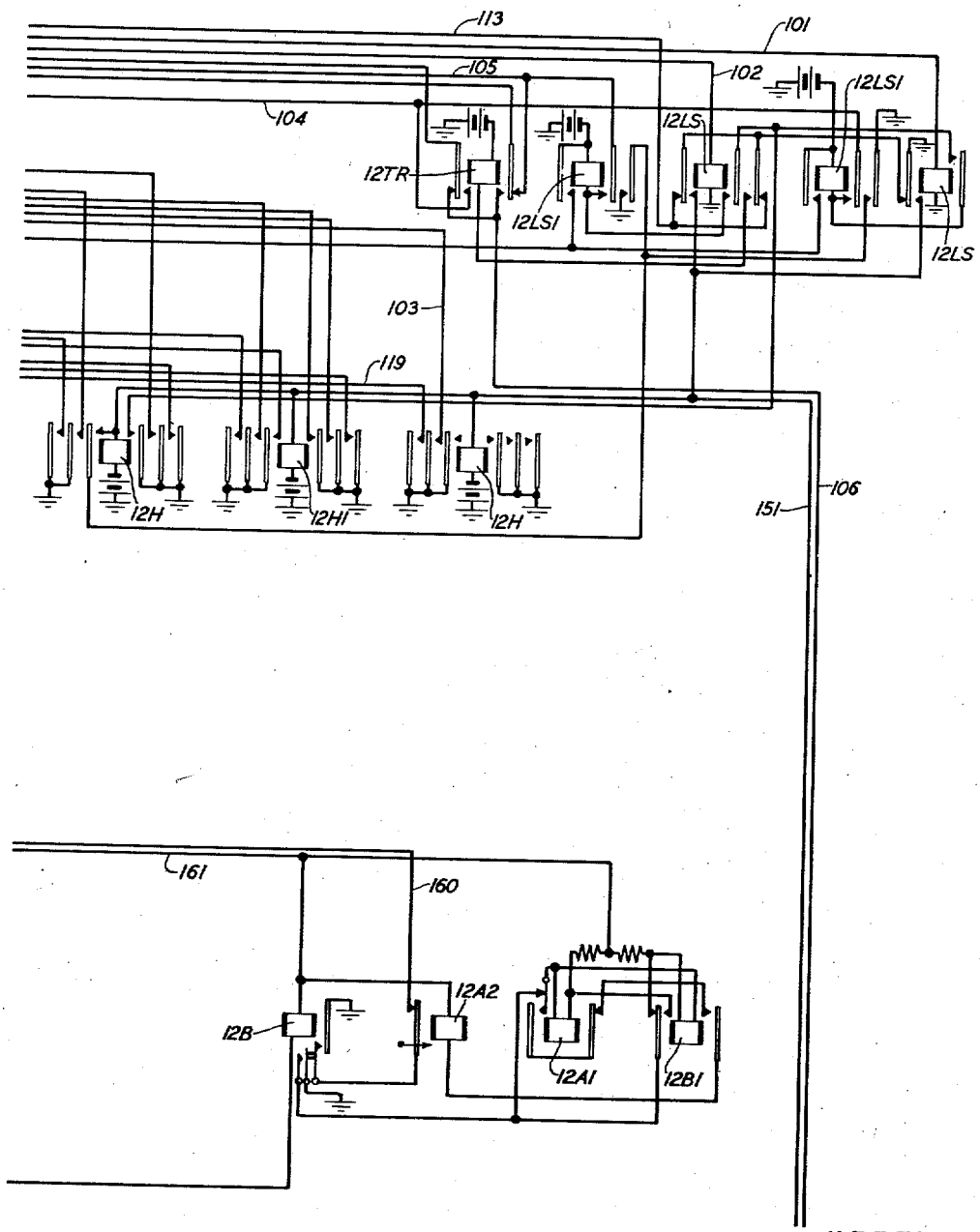
Figure 13:
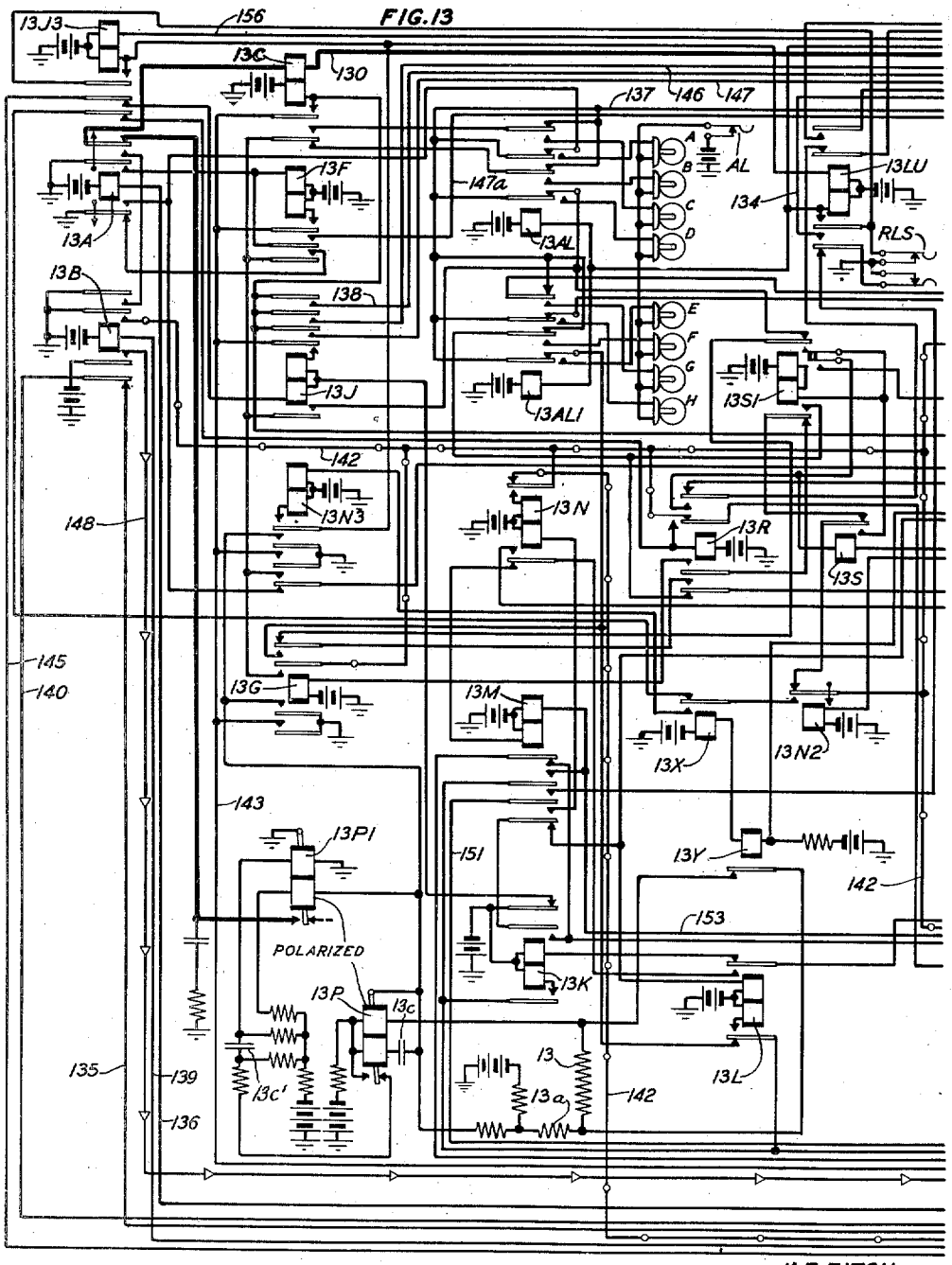
Figure 14:
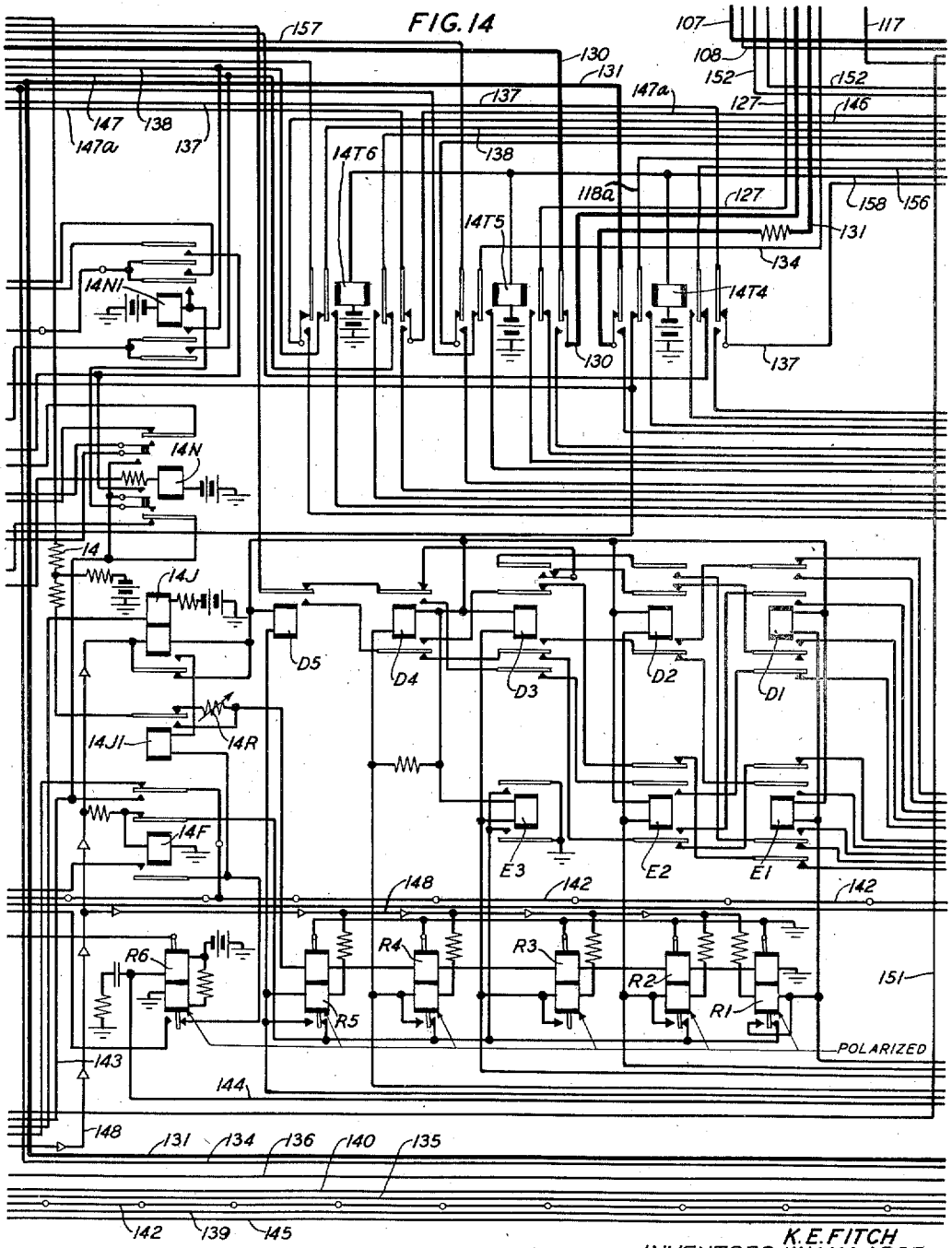
Figure 18A:
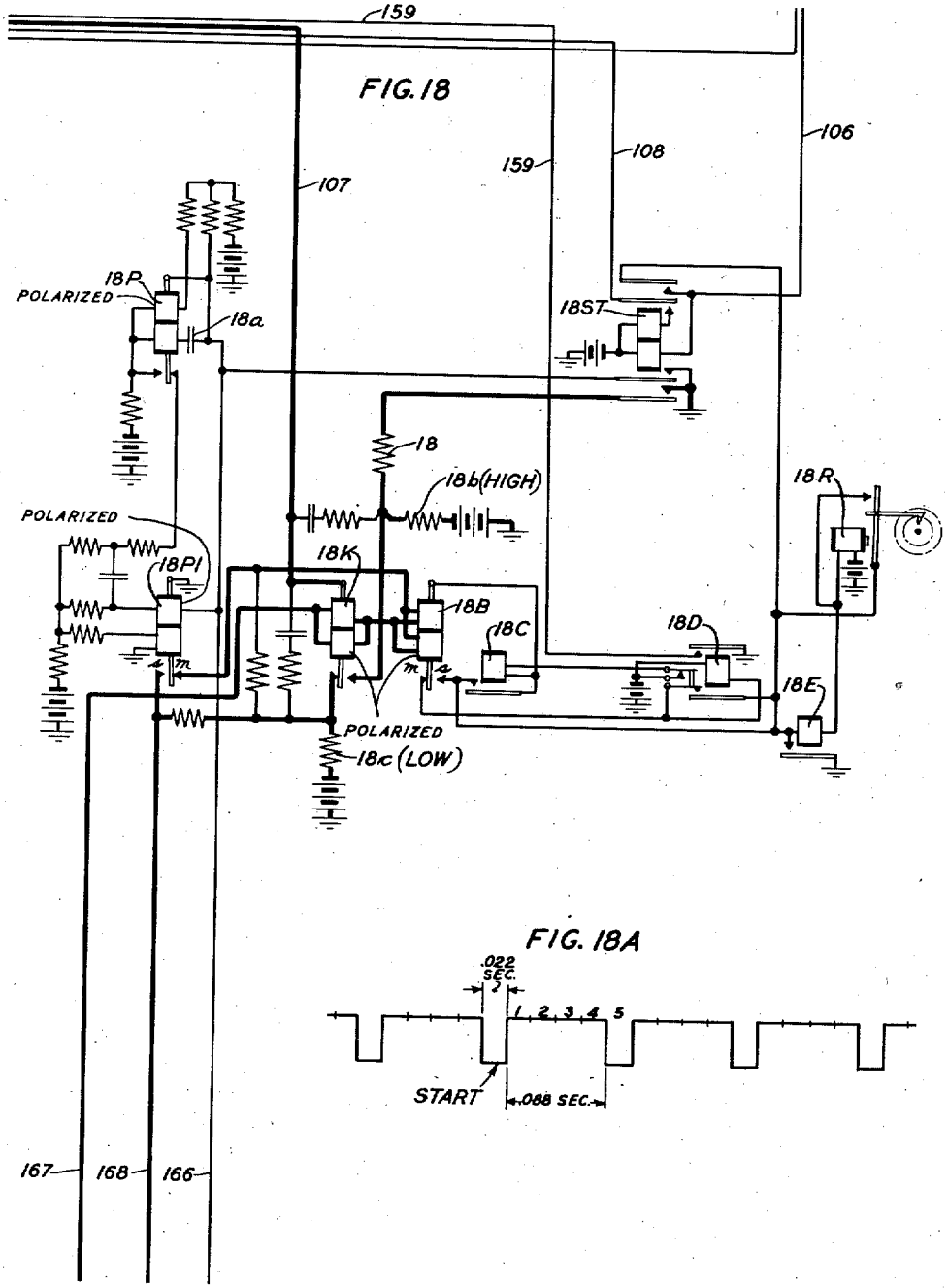
Figure 19:
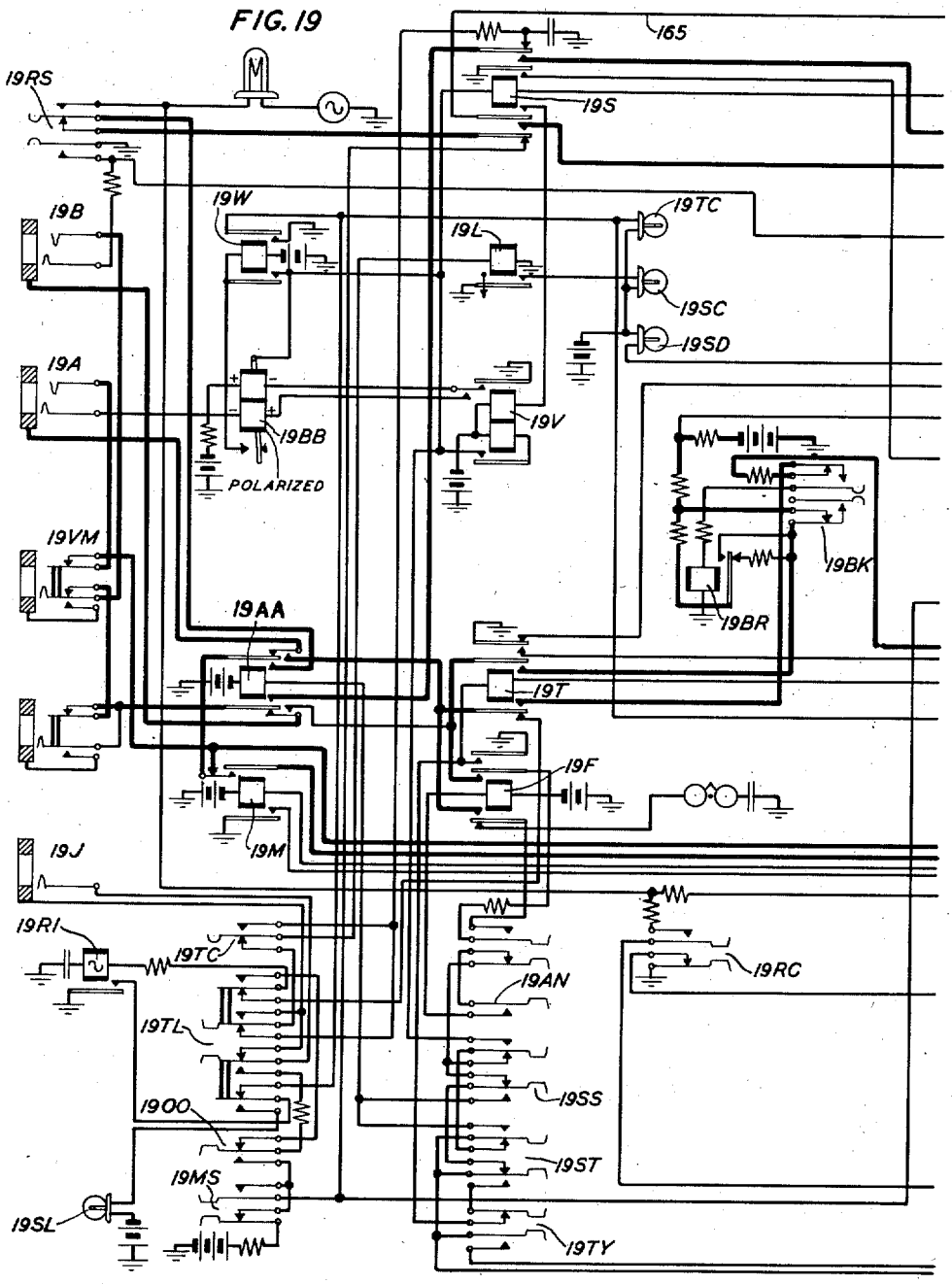
Figure 20:
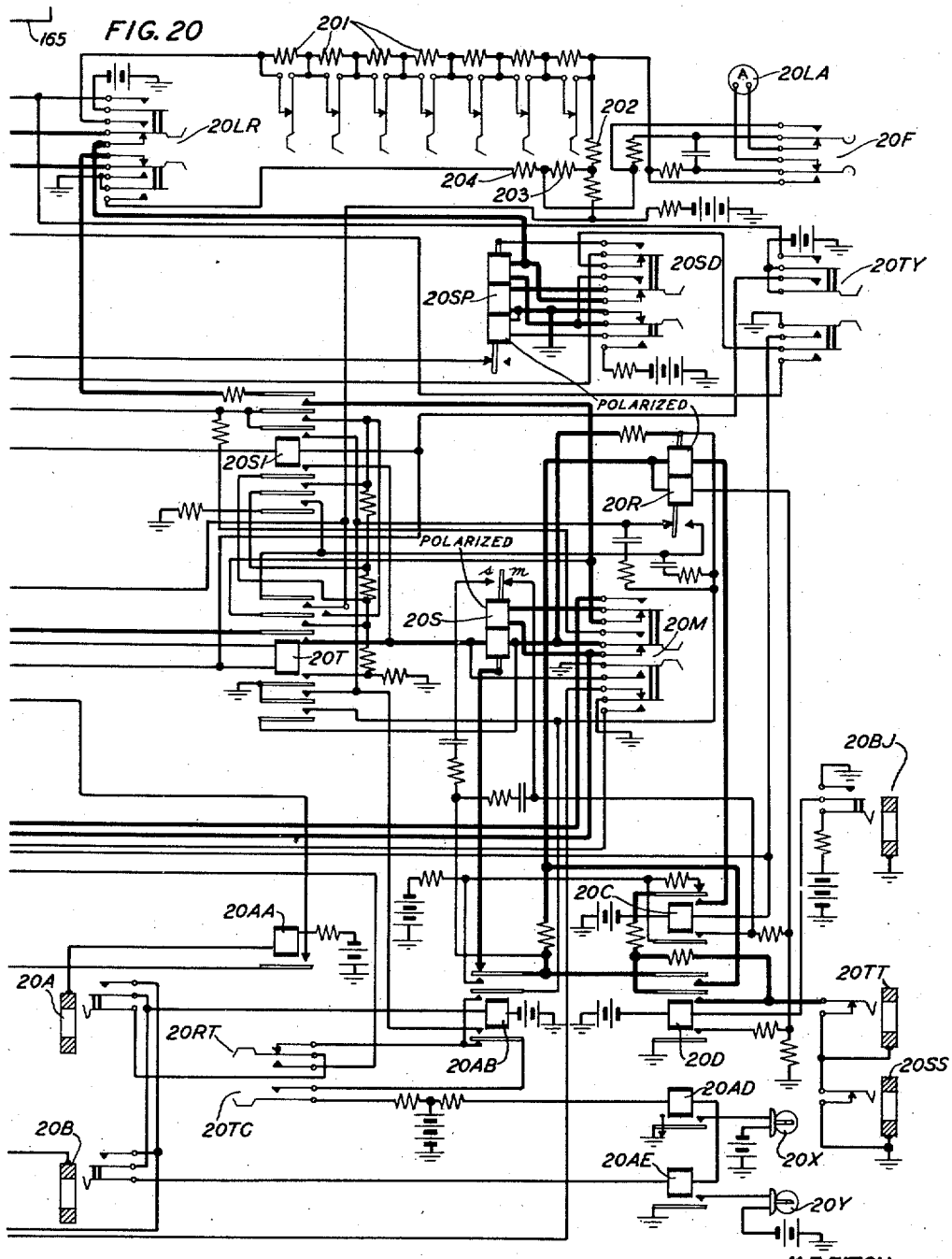
Figure 21:
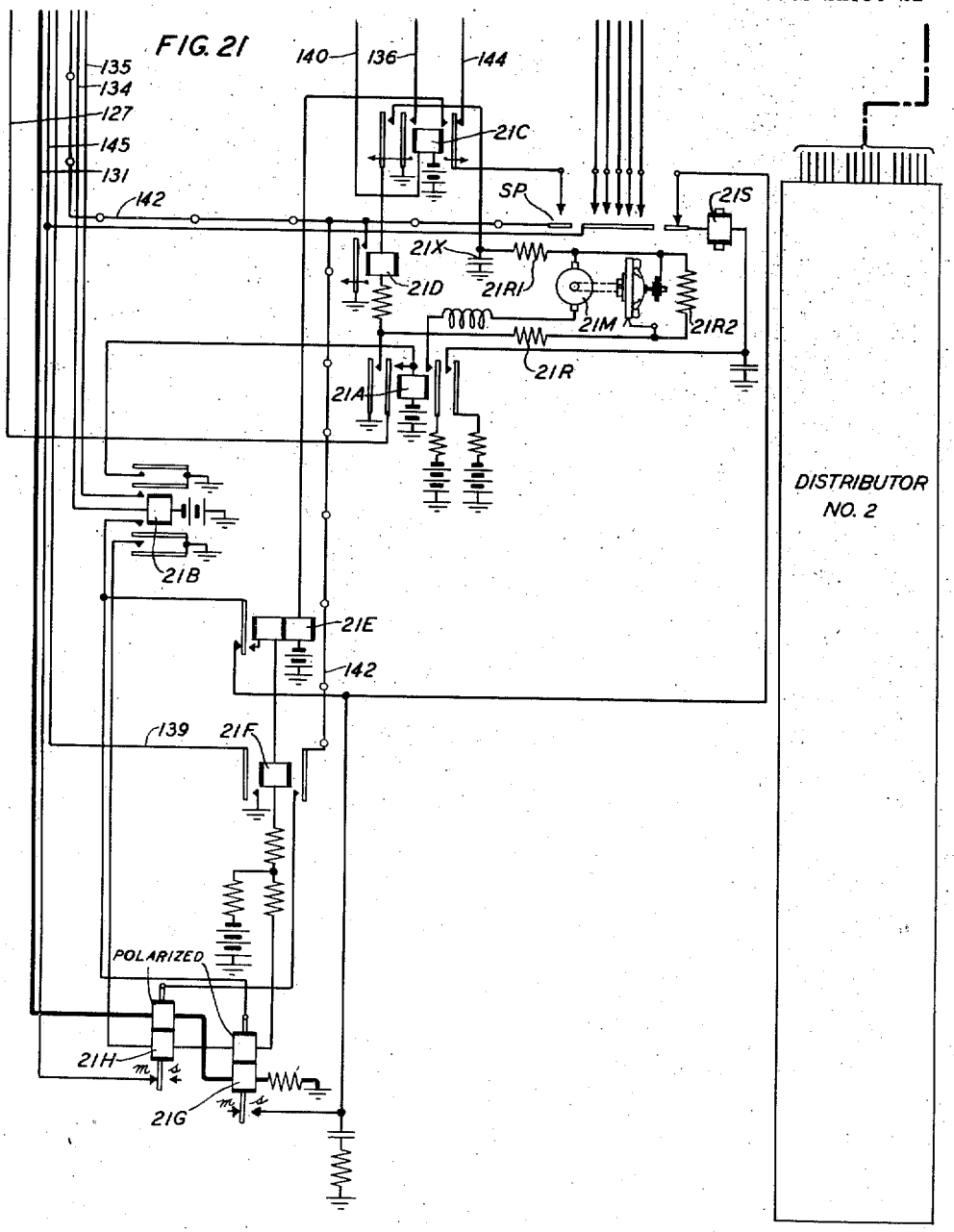
Figure 22:
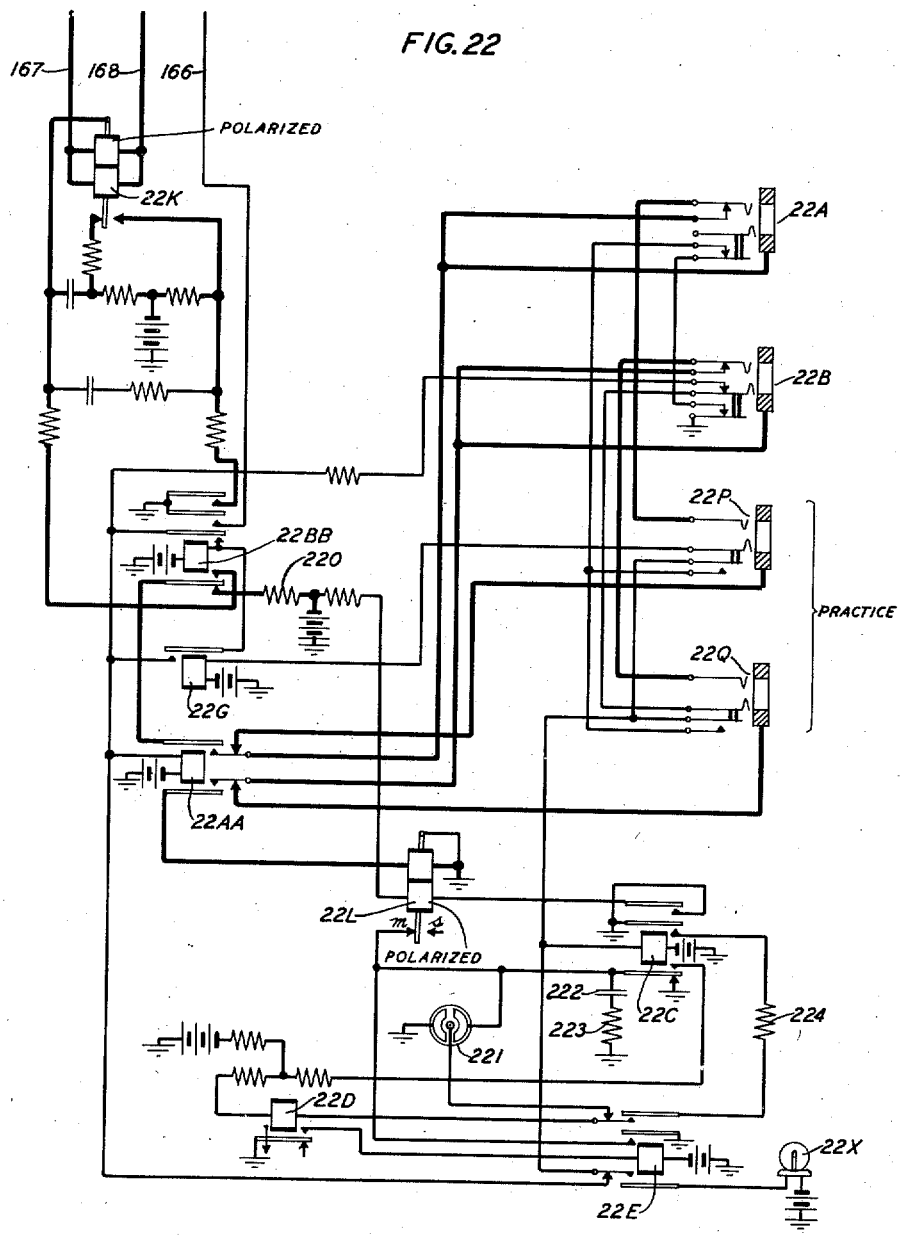
Figure 23:
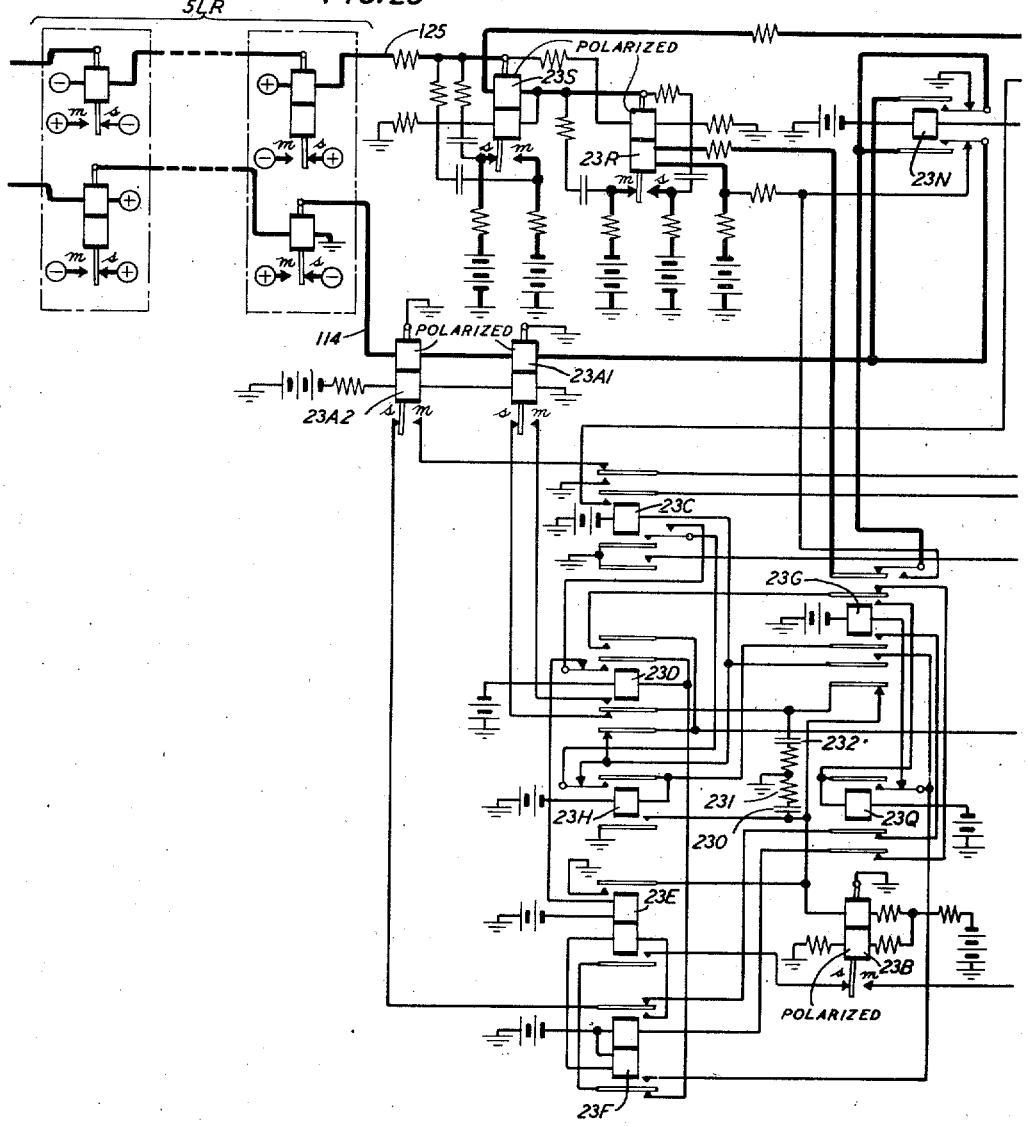
Figure 24:
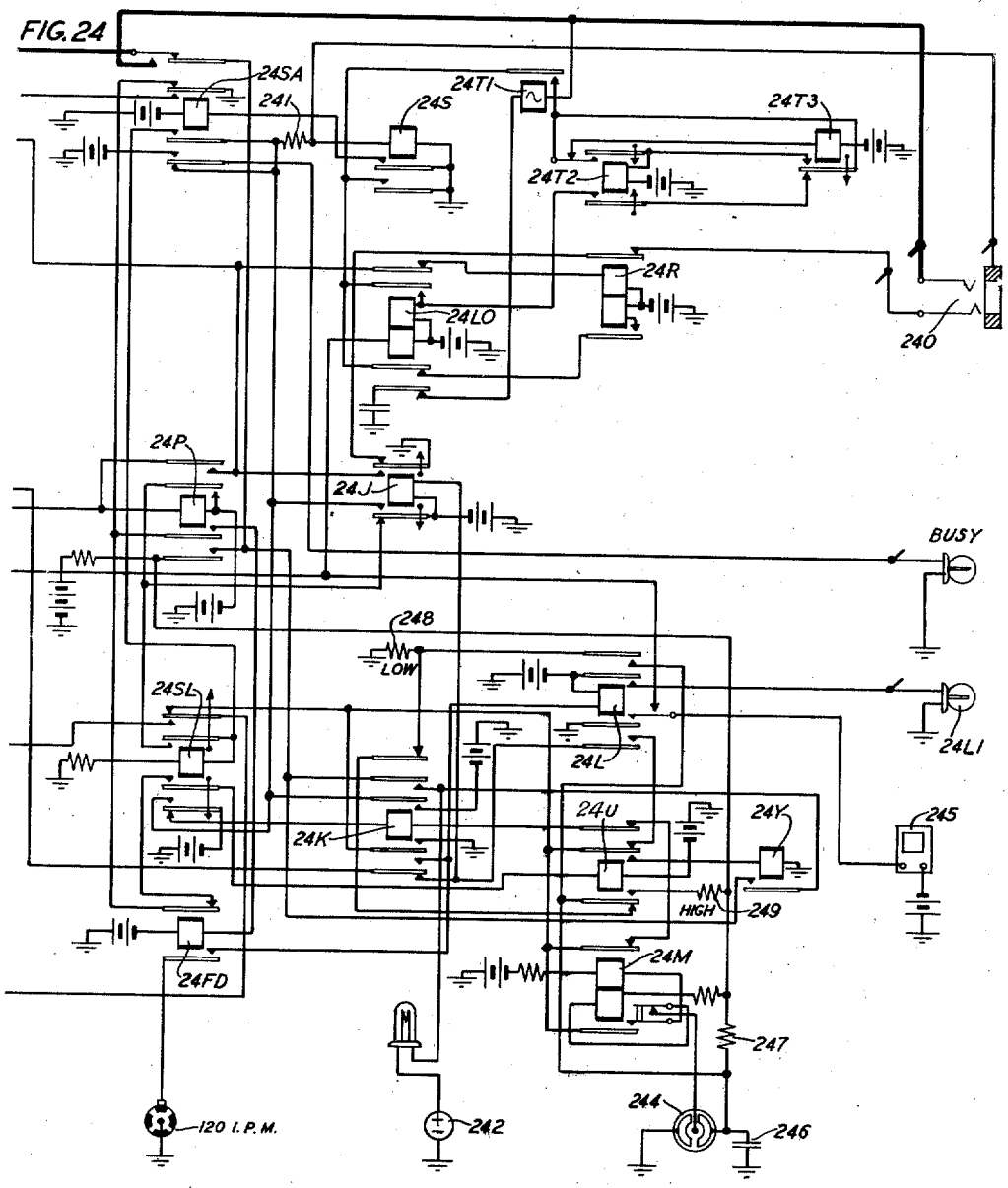
Figure 26:
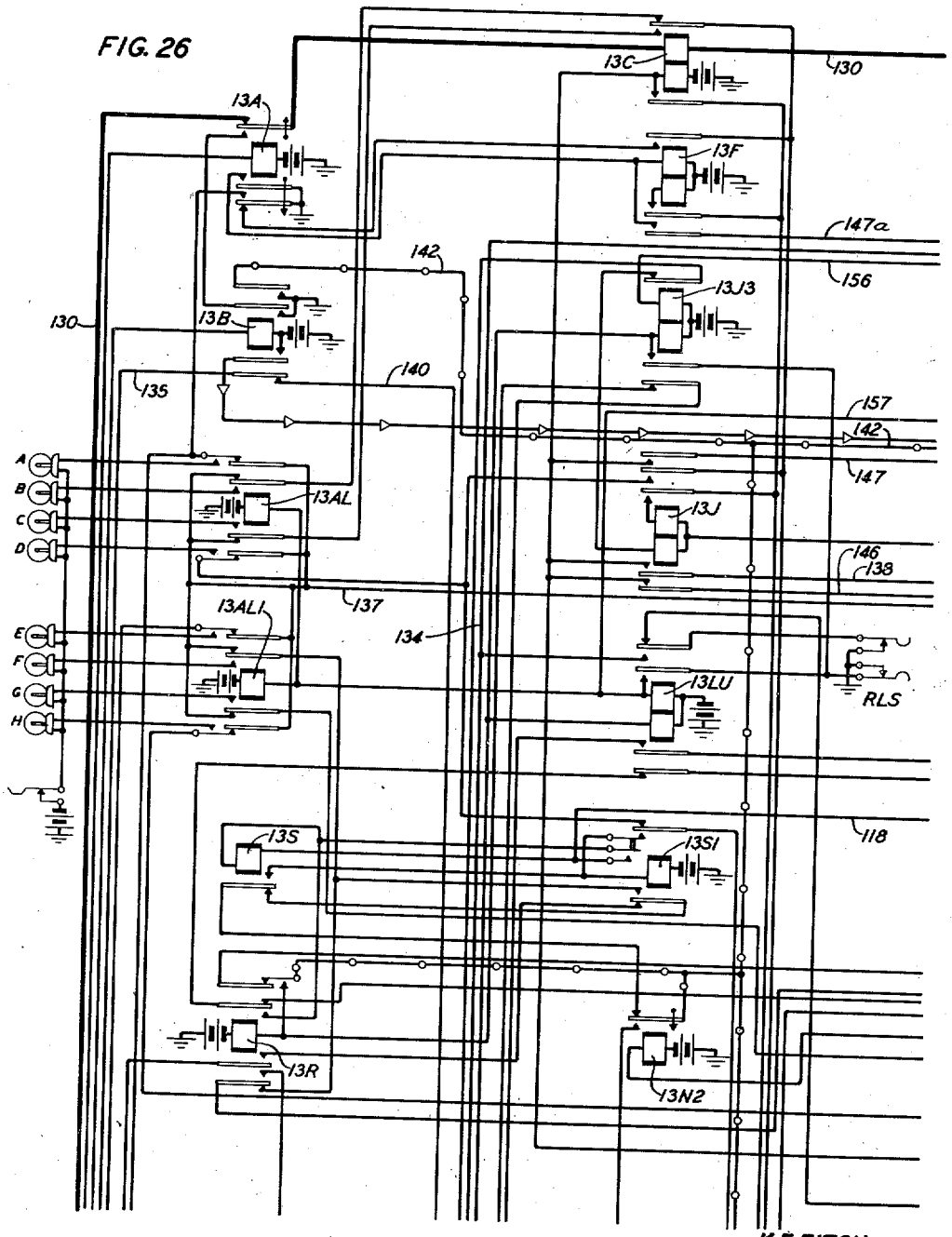
Figure 27:
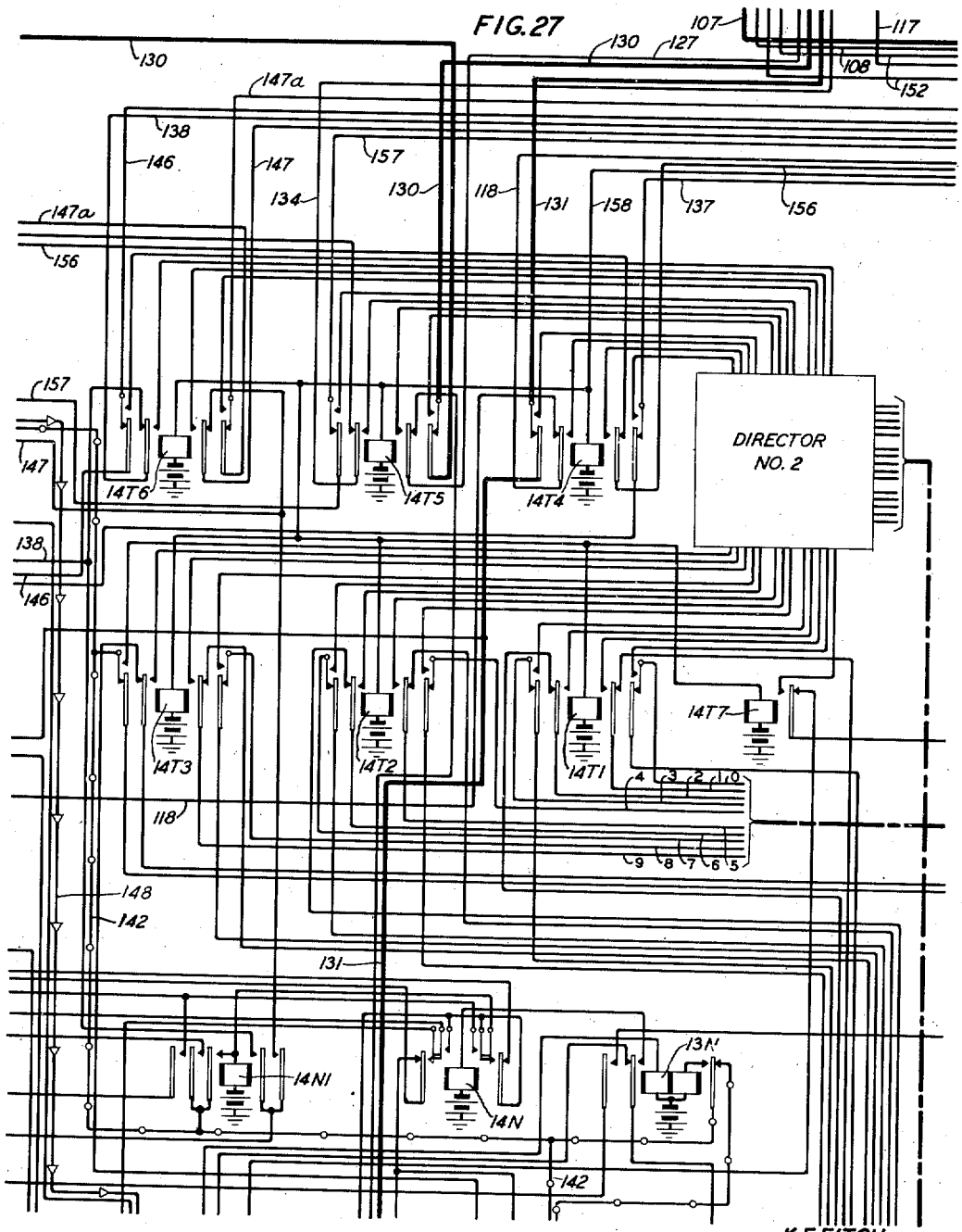
Figure 28:
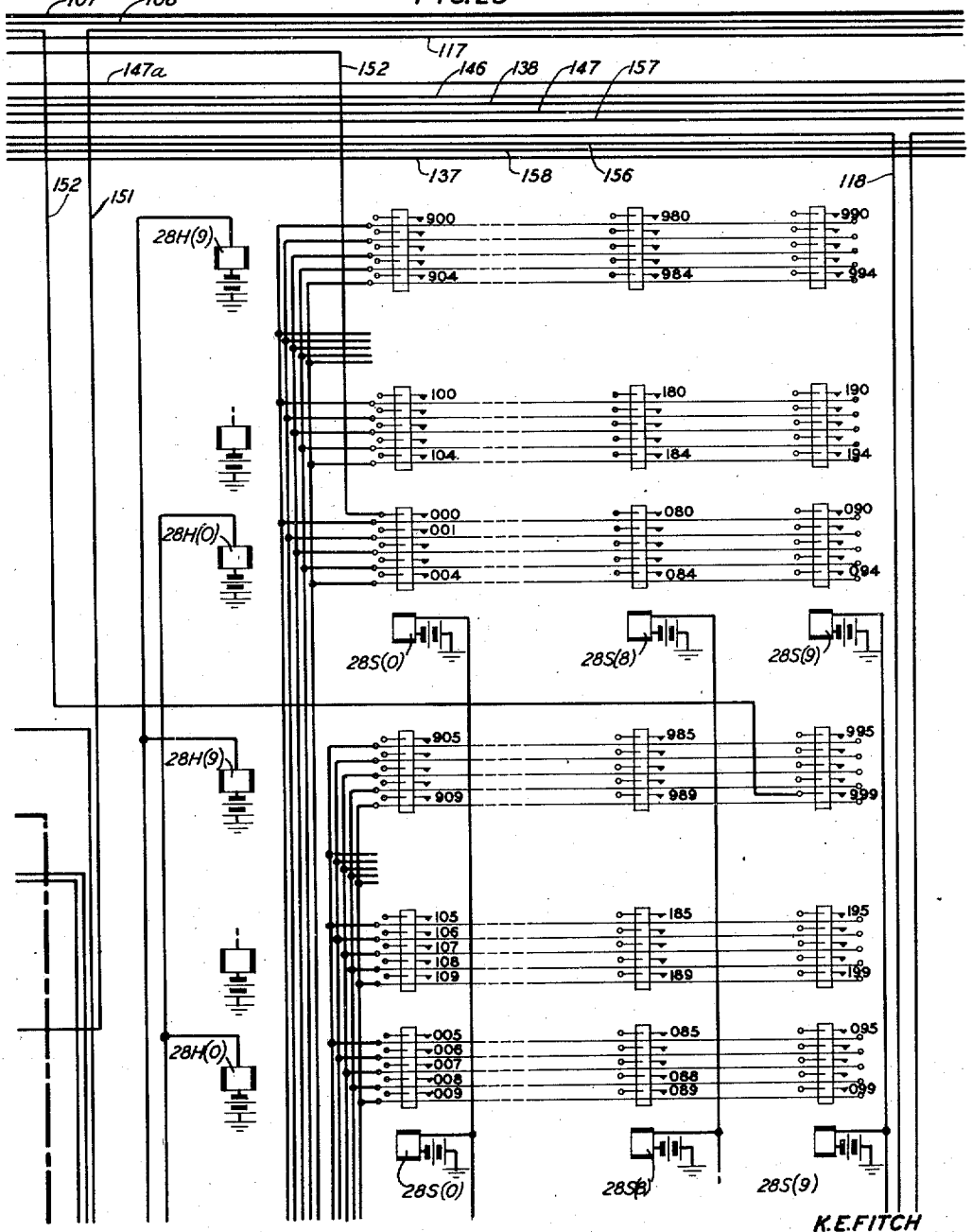
Figure 29:
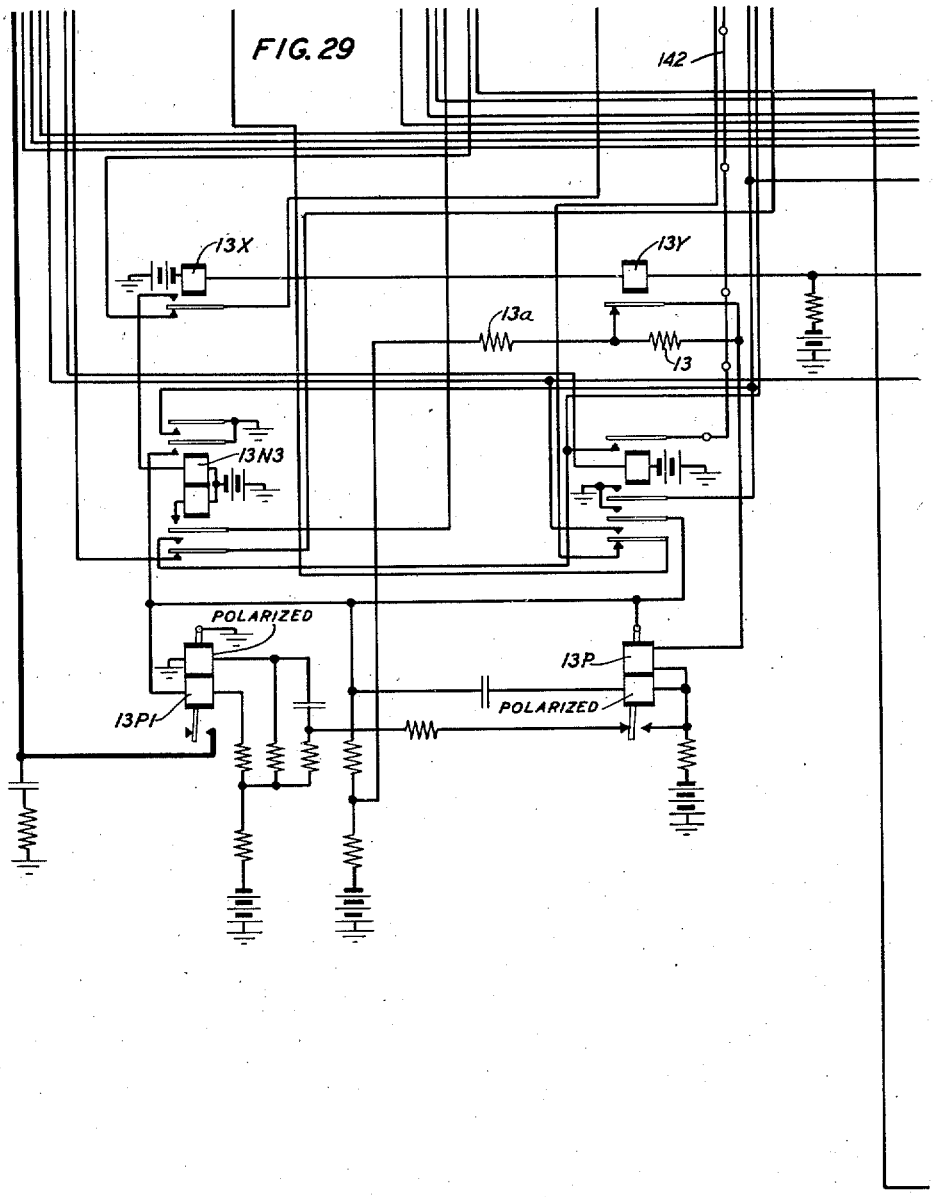
Figure 30:
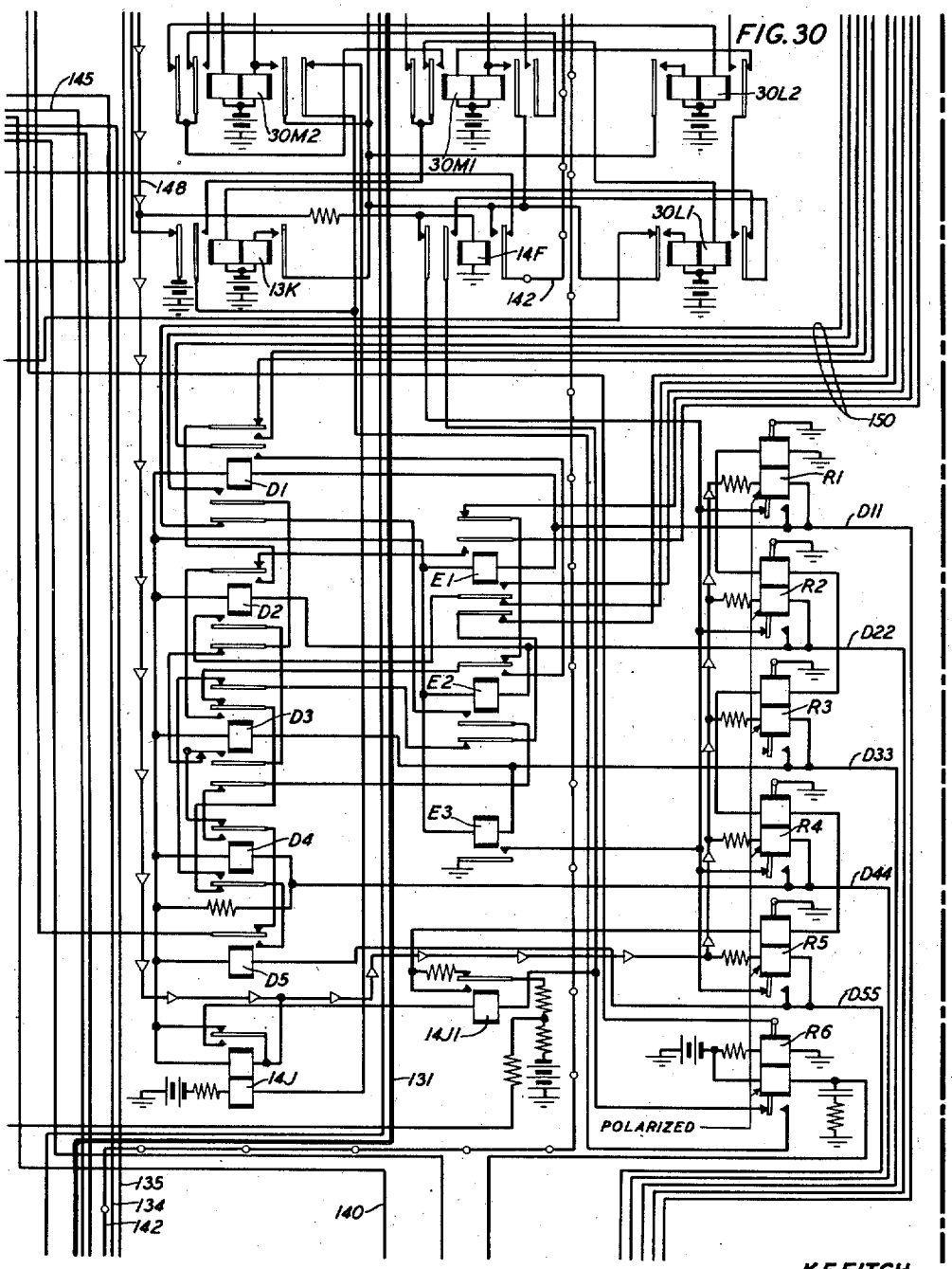
Figure 31:
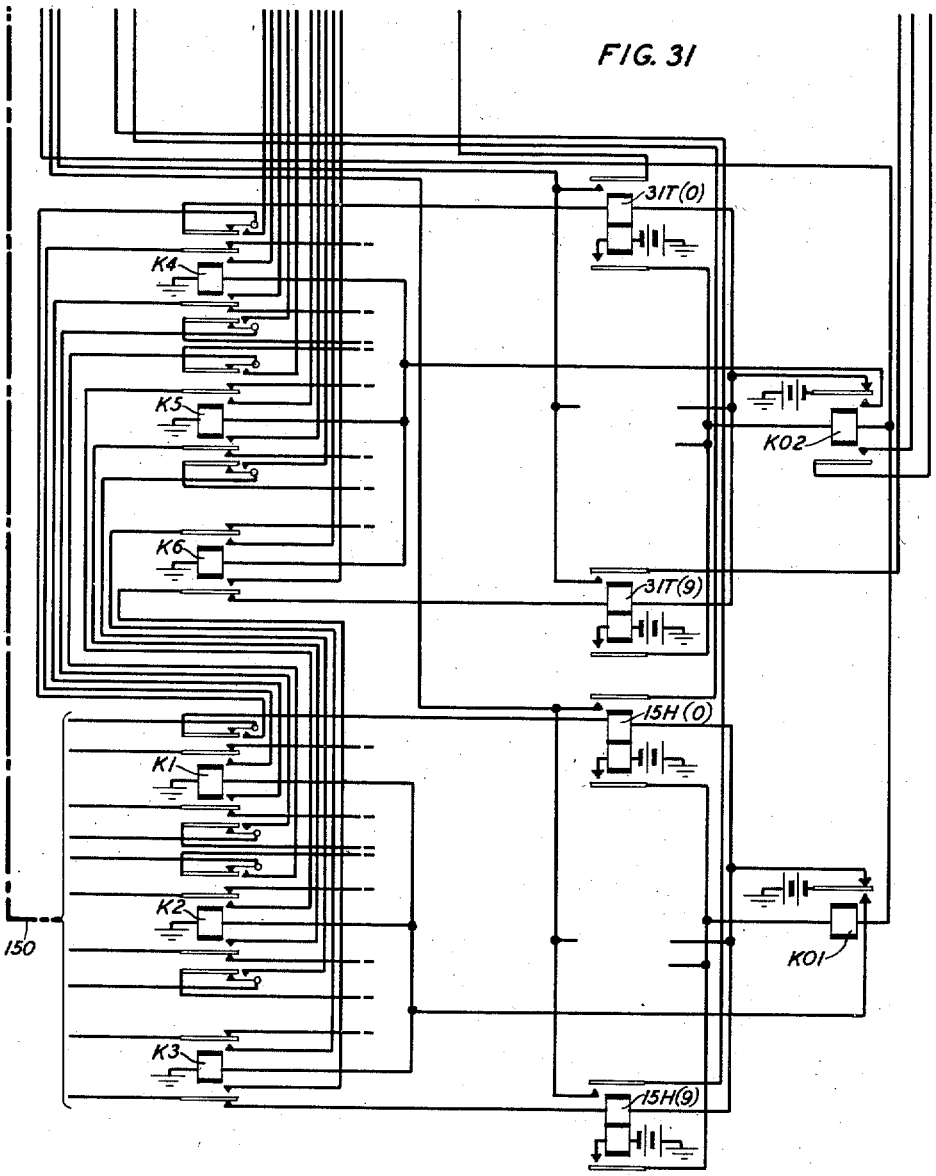

Figs. 3 and 4 together represent diagrammatically the circuits and equipment of a two-way trunk circuit, the chief function of which is to interconnect subscribers' lines over the link circuit with the line to the central office TWX switchboard; a second two-way trunk circuit typifying any additional number of such circuits is indicated by a rectangle labeled "Last trunk" at the lower right-hand corner of Fig. 4;

Figs. 5 and 6 together represent diagrammatically the telegraph repeater and line terminating equipment of one two-way trunk at the central office; at the right of Fig. 6 (not included in the present drawings) will be understood a cord circuit and operator's equipment according to Fig. 1 of Kinkead et al. Patent 2,024,581;

Fig. 7 represents the line terminating equipment at the satellite office of the line extending to the station of Fig. 1B;

Fig. 8 represents two subscribers' line terminations corresponding respectively to the subscribers' stations of Figs. 1A and IB;

Figs. 9, 10, 11 and 12 together constitute sequence circuits of which Fig. 9 shows in the upper left corner groups of relays corresponding to each subscribers' line, the lower part of Fig. 9 shows groups of relays corresponding to each group of ten (some of which may be unequipped) subscribers' lines, Figs. 10 and 11 constitute groups of relays corresponding to each two-way trunk circuit, and Fig. 12 constitutes a common start circuit for the sequence circuit;

Figs. 13, 14 and 15 represent circuits and equipment known as the director circuit with a spare director being indicated at the right of Fig. 15;

Figs. 16 and 17 represent circuits and equipment known as the miscellaneous alarm circuit;

Fig. 18 represents the all-trunks busy circuit, the chief function of which is to give an appropriate indication to a calling subscriber when no trunk from the satellite office to the central office is available;

Fig. 18A is a diagram useful for explaining the production of "all-trunks busy signals";

Figs. 19 and 20 represent a test circuit including equipment useful for testing the correct functioning of the operativeness of various elements of the equipment;

Fig. 21 represents a distributor for receiving directing code combinations and distributing them for storage in relays in the director circuits, the rectangle at the right of Fig. 21 indicates a spare distributor;

Fig. 22 represents a practice circuit in accordance with which a subscriber may practice without rendering his line unavailable for a desired communication;

Figs. 23 and 24 represent diagrammatically an alternative form of line terminating equipment of the two-way trunk at the central office; at the right of Fig. 24 (not included in the present drawings) will be understood a cord circuit and operator's equipment according to Fig. 3 of Lane Patent 1,965,383, granted July 3, 1934;

Fig. 25 indicates how other figures of the drawing may fit together as a diagrammatic disclosure of circuit organizations according to one embodiment of the invention. When the various sheets are arranged according to Fig. 25:

Figs. 26 to 31, inclusive, relate to a three-digit line selector system and comprise an alternative for Figs. 13, 14 and 15; in a complete system including Figs. 26 to 31, inclusive, those sheets are arranged with the other sheets in accordance with Fig. 32; and Figs. 33 to 52, inclusive, are supplementary diagrams of subcombinations useful in understanding the operation of the system; these special diagrams being based on Figs. 23 and 24 rather than on Figs. 5 and 6.

Reference Characters

The reference characters used in this description are systematically arranged with a view to making the description readily understandable.

For the most part as applied to Figs. 1A to 24, inclusive, the reference characters consist of a numeral and a letter; the numeral part indicates the figure of the drawing whereon the element is found and the letters are chosen as descriptively as possible; an exception to this occurs in Fig. 11 because the elements of that figure are coordinate with those of Fig. 10 and hence Figs. 10 and 11 have been regarded as one figure for the purpose of applying reference characters. Thus 2H designates a holding magnet found in Fig. 2, 3ST designates a start relay found in Fig. 3, relay 3ST1 designates a relay found in Fig. 3 which follows the relay 3ST in operation, 8L designates a line relay found in Fig. 8, and 12TR designates a transfer relay found in Fig. 12.

Reference numerals beginning with 101, 102, etc., have been used to designate conductors which extend through a number of figures. The designations T, R and S are used to indicate tip, ring and sleeve, as is frequently done, and a few other reference characters are assigned according to no definite plan.

If all grounds were perfect and earth potentials did not exist all grounds would be alike. In telegraphy it is not unusual to avoid the effects of earth potentials by using compensated grounds; these are generally referred to herein as "telegraph ground"; the use of compensated grounds is well understood to those skilled in the art.

Most relays having assignable marking and spacing positions have their contacts so designated.

In Figs. 26 to 31, inclusive, elements corresponding to the elements of Figs. 13 to 15, inclusive, are designated with the identical reference characters which they bear in Figs. 13 to 15.

Figs. 33 to 52, inclusive, have the elements designated with the identical reference characters used in the principal description and in addition bear certain descriptive legends and indications to aid in ready understanding of the parts and conditions of the system which they are intended to portray.

Preliminarily to describing the details of the equipment and mode of operation thereof the principal functions of the various major suborganizations will be outlined.

The objects of the invention are to provide equipment to correctly execute the functions now to be outlined; the features of the invention are the various combinations and subcombinations of elements as defined by the claims whereby these functions may be performed in the exemplary system described or in systems equivalent thereto.

The Functions of Local Subscriber Station Circuit

The subscriber's station or branch station circuit generally indicated in Fig. 1A is provided with equipment to perform the following general functions:

(1) To start up the circuit and enable the subscriber to make a call;

(2) To enable the subscriber to recall the operator;

(3) To set into motion forces which will register a disconnect signal at the central manual office;

(4) To receive a call and register a message under the control of the central office operator when no one is in attendance and to stop the motor and render the station equipment inactive after the termination of a message also under the control of the central office operator or of an interconnected calling subscriber at a distant station.

(5) To permit the subscriber to break against an incoming message thereby causing the distant station to stop sending.

The Functions of the Subscriber Line Circuit (1) Upon origination of a call by a subscriber it actuates a relay 8L to energize the start lead to the sequence circuit to obtain the privilege of routing the call through the satellite exchange.

(2) After the link circuit has functioned the relay or hold magnet 2H on the link circuit connects the tip and ring leads of the subscribers' lines to the selected trunk and disconnects the line terminating equipment.

(3) When all trunks are busy it arranges the circuit by means of the busy-back relay 8BB to permit the transmission of "character K" signals to the subscriber.

(4) On a call to the subscriber it connects the tip and ring leads of the subscriber's line to the calling trunk and disconnects the line terminating equipment.

(5) Jacks 8A and 8B are available for testing the subscriber's line, testing the subscriber's line terminating equipment, patching to another terminating circuit, to allow the line to test "out-of-order," for emergency patching directly to a trunk circuit to the central office, or monitoring, and for connection to the practice circuit (Fig. 22).

The Functions of Toll Subscriber Station Circuit (Fig. 1B)

The functions of the station circuit of a toll line subscriber are in general the same as those of the circuit of a local line subscriber and consequently they need no separate discussion.

The Functions of Toll Subscriber Line Circuit (Fig. 7)

(1) Provides at the satellite exchange, otherwise known as the line concentrating unit, terminating and supervisory arrangements for toll subscriber lines operated over direct conductors or over derived simplex or composite facilities. The circuit illustrated is a differential duplex circuit but may be modified to operate on a two-path polar basis by utilizing the principles of either of these two modes of transmission set forth in the patent of Large and Locke No. 2,114,253, granted April 12, 1938.

(2) Repeats inward calls from the trunks to the subscriber's station.

(3) Receives outward calls from the subscriber and repeats them to the distant manual central office if a trunk to the central office is available.

(4) Transmits a series of "K" teletypewriter code combinations to the subscriber as an indication of an all-trunks busy condition.

(5) During transmission causes no false supervisory signals and has no apparatus connected to the transmission paths tending to degrade the quality of transmission.

(6) Repeats disconnect signals from the subscriber to the central office.

(7) Transmits recall signals from the subscriber to the central office. A recall signal comprises essentially a disconnect signal followed by a new calling signal.

(8) Permits of recalling or disconnecting in case the line to which it is connected on the other side of the TWX switchboard, should be open or in trouble.

Figure 2:
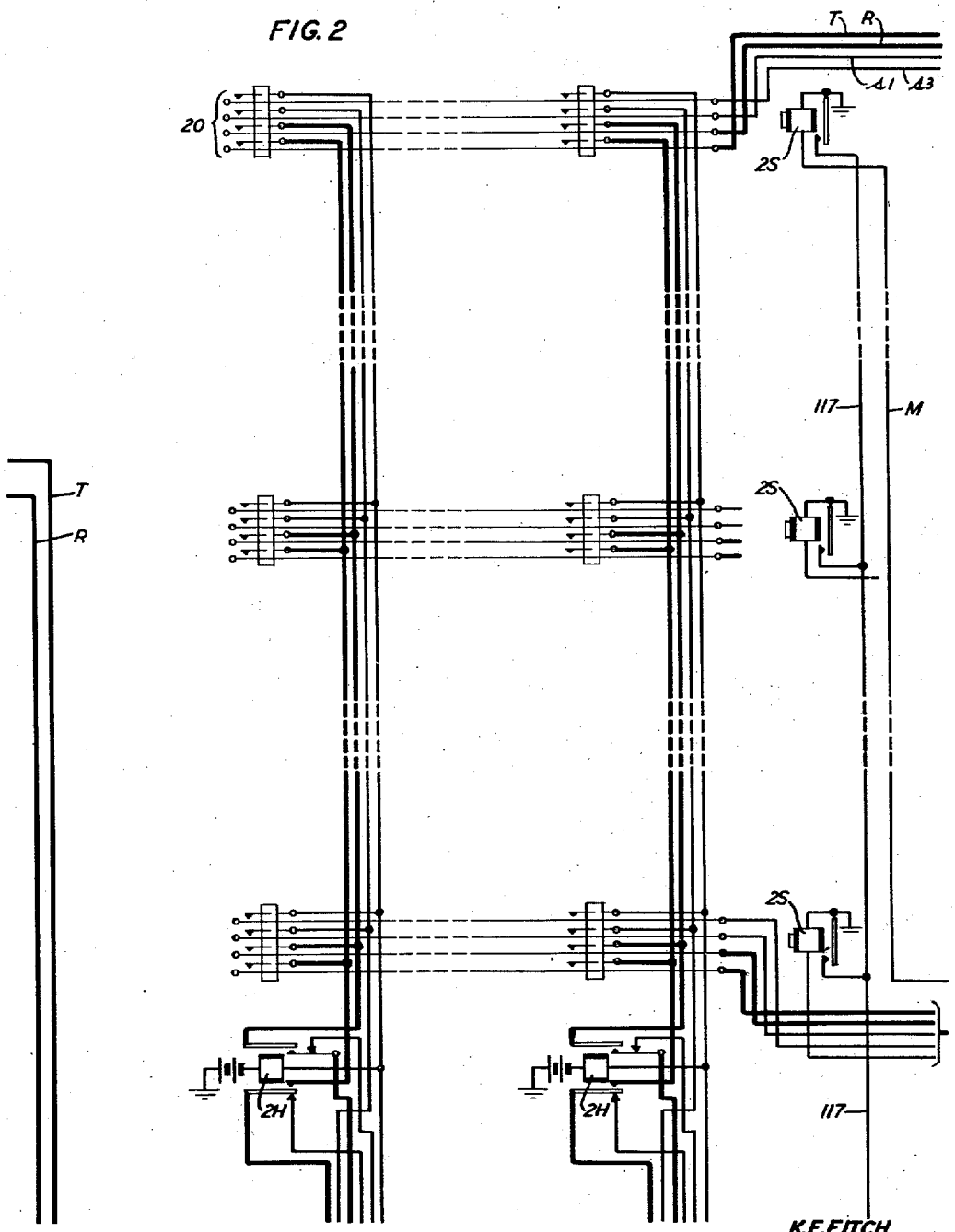
Fig. 2 represents a link circuit for interconnecting subscribers' lines with a two-way trunk circuit, the link circuit in the present instance being shown as a conventional representation of the elements of a piece of equipment commonly known as a cross-bar switch which typifies the general case of a suitable link circuit.

The Functions of the Link Circuit (Fig. 2)

(1) When a selecting magnet and a holding magnet are operated in the proper sequence the trunk circuit with which the selecting magnet is associated will be connected to the subscriber line circuit with which the holding magnet is associated.

(2) Off normal contacts on the selecting magnet insure, upon the establishment of a connection, that the magnets are operated in the correct sequence.

(3) When the holding magnet is operated it will lock under control of the trunk circuit in order that the selecting magnet may be released.

(4) The holding magnet contacts perform the "cut-off" functions required in the associated subscriber line circuit upon establishment of a call.

The Functions of the Sequence Circuit (Figs. 9 to 12)

(1) This circuit is arranged to permit only one subscriber at any one time the privilege of routing a call through the line concentrating unit, provided a call is not being received from the distant central office.

(2) This circuit is arranged to permit only one call at any one time from a central office to seize a director circuit and to be routed through the line concentrating unit, provided the routing privilege has not been seized by a subscriber calling the central office.

(3) In the case of trouble on an outward call attributed, after two-second interval, by the alarm circuit, in general to the subscriber line terminating circuit, the link circuit or to any part of this circuit used on an outward call, this circuit is arranged (1) to attempt to free the sequence circuit, (2) to remove and lock out of future outward service, under control of the release key, the particular subscriber and the particular subgroup of subscribers containing the calling subscriber, and (3) to light a lamp indicating the subgroup placed out of outward service.

(4) In case of trouble on an outward call in the trunk conductors or parts of the repeaters or trunk relay equipment at the line concentrating unit or the central office, as indicated by the alarm circuit after a two-second interval, this circuit is arranged to (1) attempt to free the sequence circuit, (2) to remove and hold the trunk out of outward service under control of a release key, (3) to light a lamp indicating the trunk removed from outward service, (4) to send to the central office a characteristic signal composed of a cycle of a half of a second "mark" signal, half of a second "space" signal, and a short "mark" spurt in the next half of a second followed by a half a second "space" signal. If the outward path to the central office is not faulty this will indicate a trunk in trouble at the manual office end. In this case the subscriber is connected to the next idle trunk available.

(5) This circuit is arranged to allot, in a predetermined order, idle trunks to subscribers calling the distant manual central office, regardless of whether the trunks are in one or more trunk groups, to one or more distant central offices. When more than one trunk group exists in an office, the circuit is arranged to pick an idle trunk in the particular trunk group to which the subscriber is predeterminedly connected before proceeding to select any trunk in any other subgroup and to hunt through every subgroup of trunks before connecting to the all-trunks busy circuit.

(6) This circuit is arranged to cause the selected trunk to repeat a calling signal to the central office when seized by a calling subscriber.

(7) In case all trunks of all groups are busy, this circuit is arranged to cause the all-trunks busy circuit to transmit "K" signals to the calling subscriber.

(8) This circuit is arranged to advance the trunk chain of Figs. 10 and 11 to the next idle trunk immediately after each subscriber calling the central office has obtained a routing through the line concentrating unit and before the sequence circuit is permitted to handle the next call in either direction.

(9) This circuit is arranged to prevent the release of any link equipment set up for an established call, during the interval the link circuit is actually being used to establish a routing through the line concentrating unit in either direction.

(10) This circuit is arranged to keep the trunk chain of Figs. 10 and 11 in a "status quo" condition during the entire period that the sequence circuit is attempting to route an outward call through the unit.

(11) This circuit is arranged to permit the miscellaneous alarm circuit to function to time the duration required for routing an inward call through the line concentrating unit.

(12) In case of a failure to complete the routing of an inward call within ten seconds after the director has been seized or two seconds after the sequence circuit has been obtained and a director has not been attached, the miscellaneous alarm circuit causes this circuit to function as indicated in paragraph 4 supra. In this case if the distant operator's teletypewriter is in circuit the signal will appear on the machine. If the operator has already retired her teletypewriter from the particular card used on the call the signal will cause her "cord" lamp to flash or light and, upon answering the lamp, the signal will appear on her machine as a trunk trouble indication.

(13) If one or more trunk calls from the central office are awaiting service, this circuit is arranged to start and keep the distributor motor "in speed."

The Functions of the Two-Way Trunk Circuit Extending to the Central Office (Figs. 3 and 4)

(1) When this circuit is seized by a calling subscriber it sends a "mark" signal to the distant manual offiice as a calling signal.

(2) In the case of an outward call this circuit is arranged to await an automatically sent ringing signal from the distant central office as a trunk conductor test before permitting the link to connect the calling subscriber to the trunk.

(3) In the case of an outward call this circuit is arranged to warn the miscellaneous alarm circuit that either the calling-in signal has not been registered at the distant central office or that the automatically sent ringing signal from the central office has not been received at the line concentrating unit.

(4) When the miscellaneous alarm circuit "times out" due to a failure described in paragraph 3, this circuit in conjunction with the sequence circuit takes the trunk in question out of service by making it busy to a local calling subscriber and sending a special signal originated in the sequence circuit to the operator at the distant end to indicate that the trunk is defective.

(5) In the case of an outward call after the link has connected the calling subscriber to the trunk circuit and the sequence circuit has released but before the sequence circuit is made available for the routing of the new call, this trunk circuit is arranged in conjunction with the trunk sequence portion of the sequence circuit to make this particular trunk busy to all calling subscribers. This busy condition is locked in as long as the trunk is in service on the particular call.

(6) On a call originated by a subscriber this circuit remains in the pretrip condition prior to being answered at the distant manual end. This permits the local calling subscriber manually to flash the calling lamp at the distant manual end.

(7) Under the condition described in paragraph 6, if a subscriber disconnects before the operator answers, the calling signal at the central office switchboard is immediately extinguished but the ringing received from the central office is continued for an additional five seconds. When the ringing is discontinued this circuit is arranged to permit the link circuit to disconnect the calling subscriber from the selected trunk.

(8) Under paragraph 7 as soon as the calling subscriber is disconnected from the selected trunk the busy condition is immediately removed and the trunk in question is made available to another calling subscriber. Meanwhile the discontinuance of the ringing from the central office makes the trunk available to a central office operator.

(9) In the case of a call originated by a subscriber, when a "mark" signal is sent from the central office to the line concentrating unit, indicating that an operator has answered, the subscriber then being connected to the trunk circuit, the circuit is arranged to change from the full duplex transmission arrangement of the pretrip or supervisory signaling condition to the half duplex basis or the normal transmitting condition. After the circuit has been arranged to operate on a half duplex basis the biasing winding on the trunk supervisory relay 3SP is opened to facilitate the holding of the relay 3SP during the reception of telegraph pulses and at the same time, in the case of a toll terminated line circuit, a ground is connected back over the sleeve lead to hold the toll line terminating circuit during the transmission of pulses.

(10) During the half duplex transmitting condition the circuit is arranged to distinguish between normal transmission of pulses and a transmission break caused either by the sending of a normal break from either end or by a subscriber disconnecting. This circuit is arranged to time the duration of a break signal and after this duration has been exceeded the circuit performs the following functions: (1) If the break has been received from the central office the circuit is arranged to change the subscriber's spacing loop current from 5 milliamperes to 10 milliamperes; (2) in the case of a break received from either direction the circuit is arranged to open the ground sent to the line circuit over the sleeve lead which in the case of a toll line terminating circuit permits the latter circuit to test the subscriber line for evidence of a subscriber's disconnect. In addition the bias current is reconnected to the trunk supervisory relay to permit it to distinguish between a normal break and a subscriber's disconnect against a break from the central office.

(11) If the trunk circuit determines that a normal break has been received from either end the circuit is arranged to disable transmission immediately after the break has ceased for an interval sufficient to cover the disconnect testing period incorporated in the trunk terminating circuit at the distant manual office.

(12) If the trunk circuit determines that a break was due to a subscriber disconnecting it is arranged to return the trunk circuit after a specified time interval to full duplex transmission and to send a supplementary timed measured break to the distant central office to insure setting up the disconnect testing feature in the trunk terminating circuit at the central office.

(13) Simultaneously with the return of the trunk circuit to full duplex transmission this circuit is arranged to prevent the closure of the subscriber loop, as might occur under recall signal, from affecting the trunk circuit at the distant manual end.

(14) Immediately after sending the supplementary break period to the distant central office the circuit is arranged to send a spurt of "mark" current to the distant central office as a disconnect signal. A short time after sending the disconnect signal to the distant central office the circuit is arranged again to permit a loop closure as in the case of a recall signal to send a "mark" signal to the distant central office. In case a disconnect signal has been sent the circuit awaits the withdrawal of the cord circuit from the trunk jack at the manual office.

(15) In case a recall signal has been sent the trunk circuit returns to half duplex transmission if a "mark" signal is received from the central office.

(16) When an operator withdraws the plug of the cord from the trunk jack in answer to a disconnect signal the "mark" signal received from the central office is discontinued causing this circuit to place itself in a preliminary condition for releasing the link circuit.

(17) After the cord is withdrawn from the jack at the central office, the trunk terminating circuit at the distant end, after a short open, automatically connects ringing to the trunk. Reception of this ringing at the line concentrating unit is utilized by the trunk circuit as a signal to cause the link to release the subscriber from the trunk and in releasing sends a short spurt of "mark" current to the central office to notify the trunk circuit that the release has taken place and that therefore both the ringing can be discontinued and the trunk busy condition removed from the trunk at the manual end.

(18) Under conditions outlined in paragraph 17 the trunk circuit does not utilize the reception of ringing to release the link if another call is being routed through the office, relaying the releasing until the routing in question has been consummated.

(19) When an operator at the manual end seizes a trunk to the line concentrating unit this circuit receives a "mark" signal from the central office and upon the reception of such a signal of a certain definite length the trunk circuit is arranged to make the trunk test busy to all calling subscribers and to enter the trunk portion of the sequence circuit for the privilege of seizing a director and routing the call to the called subscriber.

(20) If an operator seizes a trunk at the central office at the same time that a subscriber originates an outward call calling for a routing over the same trunk, the operator receives the use of the trunk and the subscriber's outward call is routed to the next idle trunk.

(21) If the subscriber originates a call and the operator plugs into the trunk over which the outward call is being routed just as the idle indicator lamp at the board is being extinguished or at least before the calling-in signal appears at the face of the board, the operator will receive use of the trunk and the subscriber will be removed from the trunk and forced to use the next idle trunk.

(22) If the operator selects a trunk just as or after the calling-in signal appears, the calling subscriber will be connected to the calling operator.

(23) When the privilege to route a call through the office is received the trunk circuit is connected to the director circuit on a full duplex transmission basis to permit the latter circuit to send the "director ready" signal to the central office end and to receive from the central office the called subscriber's number.

(24) The director decodes the information received from the central office end and proceeds to test the called subscriber line to determine whether it is idle, busy, out-of-order or unassigned. If it is idle it proceeds to connect the subscriber line to the trunk circuit. If the subscriber line is found in any of the other conditions a distinctive signal is immediately sent to the central office. This distinctive signal is originated in the director circuit.

(25) On a call originated by an operator when the called subscriber is connected to the trunk, the sequence circuit is released thus disconnecting the director circuit from the particular trunk and making both sequence circuit and director available to a new call.

(26) The circuit is arranged to repeat ringing under control of the distant operator. In the case of a local subscriber line ringing is sent out over the tip conductor to the subscriber station, while in the case of a toll line terminating circuit ringing current is not sent to the subscriber line directly but a ground is sent over the sleeve lead to the toll line circuit during the ringing period. When the subscriber answers, the trunk supervisory relay operates, ringing is discontinued from the subscriber line and the trunk circuit is changed from a full duplex operating basis to a half-duplex operating basis. Thereafter the trunk functions as described above in paragraphs 10 to 18.

(27) If a call originated by the central office operator fails to get through due to trunk conductor failure or failure in the trunk circuit, the associated sequence circuit or the director circuit, the miscellaneous alarm circuit associated with this unit times out, returns the trunk circuit to normal and frees the director and sequence circuits. The trunk circuit is removed from service, being made busy to all calling subscribers, and a distinct signal originating in the sequence circuit is sent through to the distant central office to indicate to the operator that the trunk is in trouble.

(28) If the operator seizes a trunk at the central office but disconnects before the "director ready" signal is sent, the trunk circuit at the line concentrating unit returns to normal immediately, releasing the sequence and director circuits, if attached, and sending a spurt of "mark" current to the distant manual end, which under this condition performs no useful function.

(29) If under paragraph 28 the operator disconnects after the "director ready" signal has been received but before the completion of dialing the called subscriber number the trunk acts as in paragraph 28 but in this case the spurt of "mark" current is utilized at the central office to prevent the sending of ringing current to the line concentrating unit.

(30) If the operator disconnects before the called subscriber answers but after his line has been connected to the trunk the circuit functions as described in paragraphs 17 and 18.

Functions of Two-Way Trunk Circuit at TWX Office (Figs. 5 and 6, Alternative Figs. 23 and 24)

A duplicate of this circuit or equivalent thereof serves to terminate at the manual TWX switchboard each trunk which extends to the satellite office. It provides the necessary supervisory features for establishing calls to or from subscriber lines connected to the satellite office. The first embodiment of the trunk circuit described herein terminates at jacks adapted to cooperate with cord circuits of the kind described in Kinkead et al. Patent 2,024,581 dated December 17, 1935. The trunk circuit performs the following functions:

(1) To place outward calls to the concentrating unit.

(2) To indicate to the operator that the concentrating unit circuits are prepared to receive call directing pulses.

(3) To indicate when the subscriber has answered the call.

(4) To indicate a busy, out of order busy, or if the operator has transmitted unassigned or impossible call directing characters.

(5) To permit two-way transmission of teletypewriter and break signals without producing false supervisory signals.

(6) To indicate the receipt of a disconnect signal.

(7) To indicate the receipt of a recall signal.

(8) To receive and indicate calls from the subscriber.

(9) To permit the abandonment of calls without disrupting the proper traffic sequence on subsequent calls.

(10) To maintain lighted busy lamps and energized sleeve busy condition after the operator has removed a cord upon disconnecting until the associated circuit at the distant concentrator is released.

Functions of the Receiving Distributor Circuit (Fig. 21)

The general purpose of this portion of the equipment is to receive call-directing teletypewriter pulses from a distant TWX central office, and to resolve them into their individual code element components for distribution to selection relays in the director circuit. It comprises a start-stop mechanical distributor of a conventional type driven through a clutch (not shown) by means of a motor 21M; a start magnet 21S sets the cam mechanism into a cycle of operation upon the receipt of a spacing start pulse; the cam mechanism distributes the five code pulses which are permutations of spacing and marking conditions to the conductors D11, D22, D33, D44, and D55 successively and then the mechanism stops unless and until another spacing start pulse is received. In greater detail the circuit functions:

(1) To provide means for starting the distributor motor when an incoming call is received and the motor is stopped when call is completed unless another incoming call is awaiting completion.

(2) If another call from the central office is awaiting attention the motor is left running after the completion of the present call but the remainder of the circuit is restored to normal until the director and associated distributor circuit has been seized again by the trunk which the sequence circuit has determined as having calling preference.

(3) To provide means for operating the start magnet 21S during the time the motor is attaining speed and gives an indication to the director circuit when the circuit is ready for reception of the call directing teletypewriter character pulses.

(4) To provide means for separating the received teletypewriter characters into their individual dot element components for distribution over the D11 to D55 leads to operate the proper selection relays in the director circuit.

Functions of Director Circuit (Figs. 13, 14 and 15)

The fundamental purpose of this circuit is to decipher telegraph pulses received from the central exchange office and convert them into the called subscriber's number and thus help in the selection of the called subscriber line. After accomplishing this function the director circuit frees itself from the established connection and is available in establishing other connections. Its functions in greater detail are as follows:

(1) Upon receipt of an inward call from the manual central office the sequence circuit will connect the director circuit to the trunk circuit on which the call is waiting. When the director circuit is prepared to direct the inward call to the desired subscriber line and the distributor motor of the receiving distributor circuit has been started and has attained proper speed, a director ready signal will be transmitted to the distant end to indicate to the manual operator that the call may be routed through the line concentrating unit.

(2) A "Figures" teletypewriter character received from the distant manual office will indicate that the operator has recognized the director ready signal and will cause the director to accept the next two characters transmitted from the distant end as the called subscriber's number.

(3) Upon receipt of the first digit of the call directing teletypewriter pulses, the director circuit will select the group of ten lines which contains the desired subscriber line.

(4) Upon receipt of the second digit of the call directing pulses the director circuit will select and test the desired subscriber line and disregard any additional characters sent to the director.

(5) If the called subscriber line has been made out-of-order by plugging a dummy plug into the jack 8B of the line circuit, a series of "Q" teletypewriter signals will be transmitted as an indication of this condition to the distant manual operator.

(6) If the called subscriber line is busy because of a previously established call or because of busy condition placed on it by the test circuit, a series of "K" signals will be transmitted to the distant manual operator.

(7) If the manual operator has transmitted first and second digits for which no subscriber line is assigned, a series of "Q" signals will be returned to the manual operator.

Because in normal operating procedure the operator's machine will likely be in upper case at the time of receiving such "K" or "Q" signals as they may appear on his or her machine as numerals.

(8) If the subscriber line is idle the director circuit will cause the link circuit to connect the called subscriber line to the trunk circuit. The director will then be released and restored to the idle condition in preparation for the routing of the next inward call.

(9) If for any reason whatsoever the director circuit is in use for more than a predetermined time of ten seconds (it may be more or less), the associated alarm circuit which times this interval, if so notified by the director circuit, causes the director circuit to be locked up in a stuck condition and to give tell-tale lamp indications of the progress of the particular call that failed to get through.

(10) In a line concentrating unit containing two director circuits, in the case of the condition described in the foregoing paragraph, the miscellaneous alarm circuit, after freeing the director circuit which is in trouble, from the sequence circuit causes the transfer portion of the director circuit to function thus removing the director circuit placed in the stuck condition from service and replacing it by the spare director circuit.

(11) If in the second preceding paragraph (9) the director operates in a manner to indicate that it is not responsible for the failure of the routing of the call, the miscellaneous alarm circuit will restore it to service and remove from service the trunk associated with the director in the attempt to establish the call.

Functions of the All-Trunks-Busy Circuit (Fig. 18)

The principal object of the all-trunks-busy circuit is to furnish a source of character "K" signals which is automatically set into operation to transmit a continuous series of such signals to calling subscribers when all available trunks are busy. In the operation of the system it functions as follows:

(1) When a subscriber in the line concentrating unit calls during the all-trunks-busy period the conductor 106 of this circuit is grounded, causing the all-trunks-busy circuit to start producing the character "K" signal permutation.

(2) This circuit is arranged to permit a calling subscriber's line to connect to the source of character "K" signals only during the "mark" period of the "K" signal.

(3) This circuit includes means to count all the calls originated by subscribers during the all-trunks-busy period.

(4) This circuit is arranged to continue the production of character "K" signals until all subscribers receiving such a signal have disconnected.

Functions of the Miscellaneous Alarm Circuit (Figs. 16 and 17)

In a system of this type the distributor circuit, the director circuit, and the sequence circuit must perform certain functions on all calls to subscribers and the sequence circuit must function correctly on all calls to subscribers. A seized trunk must function on each call. Failure of these pieces of equipment might result in lost calls or failure to give proper service. Certain other elements might fail and result in failure to give proper service. In order to reduce failures to give proper service to a minimum, arrangements are included whereby failure of the distributor circuit, director circuit, or a trunk results in the substitution of alternative circuits to function in place of those which may have become temporarily defective. In general, the miscellaneous alarm circuit effects this substitution and also functions to produce an alarm in case of failure of any of a considerable number of pieces of equipment in the system to function properly in their respective specified times. This will enable an attendant to be called in to clear the trouble. Furthermore, a series of lamps will be lighted in various combinations in case of trouble to indicate the source and nature of the trouble to assist in more promptly locating it. This use of these lamps, however, like certain other elements of the system is optional and not essential for proper operation of the principal elements of the system. In general, the miscellaneous alarm circuit performs the following functions in the manner specified:

(1) On a call from the local subscriber, the miscellaneous alarm circuit times the interval in which the sequence circuit is used, to see that it does not exceed two seconds or other predetermined time.

(2) On a call from a subscriber when the sequence circuit is in use for more than two seconds the circuit is arranged to indicate whether the trouble is in the trunk alone or, in any of the other circuits called into use. In case the miscellaneous alarm circuit receives an indication that the trunk is out of order it is arranged to give a minor alarm, flash a trunk lamp and to cause the removal of the particular trunk circuit from service. In case the miscellaneous alarm circuit determines that any of the other circuits in use on the particular call are out of order, the circuit is arranged to light a lamp 17S and to give a minor alarm, and to cause the removal of the subgroup of subscribers containing the calling subscriber from outward service.

(3) After removing the particular trunk or the particular subgroup of subscribers from service, the miscellaneous alarm circuit is arranged to detect the ability of the sequence circuit to return to normal and to light a lamp 17E and bring in a major alarm, if it fails to do so within ½ second.

(4) On a call to a local subscriber the miscellaneous alarm circuit begins timing, as soon as the inward call has received preference from the sequence circuit, being arranged to time the interval required to obtain a director circuit and to give an alarm if this period exceeds two seconds or other predetermined period. In this case the miscellaneous alarm circuit is arranged to cause the removal from the service of the trunk in trouble, flash the lamp associated with the trunk, and at the same time light the lamp 17S, bringing in a minor alarm. The alarm circuit continues to function as indicated under function 3.

(5) When informed over the conductor 137 that the director circuit has moved off normal, the miscellaneous alarm circuit waits a total of four seconds (or other predetermined period) for the director to place ground on the conductor 146. The director places ground on the conductor 146 if the distributor motor has attained speed, if the director ready signal reached the associated loop repeater and if a mark signal sent over the trunk from the central office has been registered in the distributor circuit.

(6) If the miscellaneous alarm circuit times out before the conductor 146 is grounded but after the conductor 137 was grounded the alarm circuit is arranged:

(*a*) To cause the associated director circuit to lock in a "stuck" condition.

(*b*) To bring in an audible and visual alarm associated with the director circuit.

(*c*) After the director has been locked up in a "stuck" condition to remove the trunk circuit used, under control of a key, and causing a lamp associated with this trunk to flash or if the conductor 138 or 147*a* remained grounded when the alarm circuit timed out to remove the trunk circuit from service temporarily under control of a mark signal sent from the central office, causing a lamp associated with the trunk to light steadily.

(*d*) After allowing approximately one-half second, the director having been locked in a "stuck" condition, the miscellaneous alarm circuit is arranged to test for failure of the sequence circuit to release and to bring in an audible major alarm and light the 17E lamp if the sequence circuit fails to release.

(*e*) If the sequence circuit has been released the miscellaneous alarm is arranged to replace the "stuck" director with a spare director if one is available.

(7) If the conductor 146 is grounded the miscellaneous alarm circuit permits the director circuit 10 seconds (or other period) to complete all of its functions, paragraph 8.

(8) If the miscellaneous alarm circuit times out after ten seconds (or other period), the alarm circuit is arranged to function as follows:

(*a*) If the conductors 138 and 147*a* were not grounded at the moment of timing out, the alarm circuit:

1. Causes the associated director circuit to lock in a "stuck" condition.
2. Brings in an audible and visual alarm associated with the "stuck" director.
3. After the director has been locked in a "stuck" condition removes the trunk circuit in use on the particular call from service under control of a key causing a lamp associated with the trunk to flash.
4. After the director has been locked in a stuck" condition, the alarm circuit, after waiting approximately one-half second, tests for failure of the sequence circuit to release and if the sequence circuit fails to release brings in a major audible alarm and a lamp 17E.
5. After the sequence has been released, the alarm circuit replaces the "stuck" director with a spare director if one is available.

(*b*) If both the conductors 138 and 147*a* are grounded at the moment of timing out, the alarm circuit functions as follows:

1. To remove the trunk circuit used on the particular call from service under control a "mark" signal received from the distant end lighting a lamp associated with this trunk.

2. After approximately one-half second test for failure of the sequence circuit to release and if the sequence circuit fails to release brings in a audible major alarm and lights the lamp 17E.

(9) If two directors are provided in the unit, the miscellaneous alarm circuit in taking a director out of service will give a minor alarm provided the spare director is available and not in trouble. If the second director is in trouble the circuit will give a major alarm.

(10) The circuit is arranged to permit manual transfer from one director to another at any time when the sequence circuit is not in use in routing of a call through the office and when the director transferred to is available and not in trouble.

(11) The circuit is arranged to prevent the use of a sequence circuit on a new call for one-half second after the sequence circuit has otherwise returned to normal after a timing out.

(12) The circuit is arranged to furnish a time delay between the operation of the selector magnet of the cross-bar switch and the application of ground for the operation of the magnet 2H of the cross-bar switch.

(13) The circuit is provided with keys associated with each type of trouble indicated, to permit removal of the audible alarm, leaving a lamp to indicate the trouble condition, and with keys to release the locked-in trouble indication, and also cut-off key 17C which prevents the alarm circuit from timing out.

Functions of the Practice Circuit (Fig. 22)

It is desirable to permit a local subscriber to practice on his circuit without tying up a trunk to a central office and without interfering with the establishment of calls to the subscriber and also at the same time without preventing him immediately making a call if and when he desires to do so. For this purpose a practice circuit is provided and in general it functions as follows:

(1) The practice circuit may be connected to or removed from its connection to a local subscriber line without disrupting normal service or placing false calls; it does not function with toll lines in this system.

(2) The test circuit may be introduced into the practice circuit for supervisory purposes.

(3) A proper termination is provided for the line during the period the subscriber is practicing.

(4) The practicing subscriber may dismiss the practice circuit by transmitting a disconnect signal. In this case the lamp 22D will light and although the connections of the practice circuit to the line may not as yet have been removed, subsequent calls may proceed without interruption.

(5) An inward call for the subscriber will cause the practice circuit to interrupt the subscriber's practicing by a series of character "K" signals. The subscriber may accept the inward call and dismiss the practice circuit by transmitting a recall signal.

Functions of Test Circuit

The general function of the test circuit is to supply means for testing all the operative functions of subscribers' lines, toll lines, trunks, sequence circuit, distributor, director, etc., and their detailed discussion will be found under the heading of "Test circuit" hereinafter.

Repeaters

In Fig. 7, the toll line subscriber's circuit, the repeater consisting of relays 11R, 11S and 11BR is a line terminating repeater and the repeater consisting of relays 12R and 12S is known as a loop repeater because from the viewpoint of the trunk circuit it simulates a subscriber's loop. The conductor T of the loop repeater extends through to the armature of relay 4R of the repeater in the trunk circuit and the winding of relay 12R is extended through the armature of relay 11R to a source of spacing battery on a contact of relay 11BR. In the marking condition both sides of the repeater will be closed and the relays 12R and 12S held in their marking contacts. Leads from the marking contact and the armature of relay 12S extend through a winding of relay 1E and supply zero current in the marking condition and a current from both the marking and spacing batteries in series when in the spacing condition.

A trunk loop repeater consisting of relay 4S and 4R interconnects a subscriber's loops (or a loop repeater 12R, 12S) with a trunk to the central office.

Repeater 5R, 5S connects the trunk with the central office supervisory and cord equipment.

The trunk repeater 5LR is not completely shown and conventionally signifies any number of repeaters in a two-way two-path polar trunk from the satellite office to the central office and, subject to supply of proper potentials to the inward and outward ends of conductor systems 114 and 125, it may comprise any suitable equipment.

Details of Call From Subscriber Station to Central Office

*Local subscriber*

The local subscriber operates the power locking switch PS. This energizes the rectifier 1A and the relay 1C. The driving motor of the teletypewriter starts. Relay 1C closes the tip T and ring R over the line through the teletypewriter sending contacts. This closes a path over the line from battery on the back contact of relay 8BB over the tip to the subscribers' station, back over the ring to a lower contact on magnet 2H, through winding of relay 8L. Relay 8L closes the circuit of relay 9ST corresponding to the particular subscriber's line in the subscriber's subgroup sequence circuit. See Fig. 38.

*Variant condition for toll line subscriber*

In the case of the toll line subscriber provided with a station according to Fig. 1B, the subscriber closes the switch PS which starts the driving motor and energizes the rectifier 1A and relay 1C. The rectifier applies marking potential (negative) to the line over a contact of key 10 and the make contact of relay 1C in the subscriber circuit, through the line and equipment jacks to a back contact of relay 7G to windings of the polar relay 7E and a non-polar relay 7D. Relay 7D operates and operates relay 7H which locks up over an obvious path. Relay 7H prepares a path for holding the relay 7D when the relay 7G operates. Relay 7H also opens one of the paths to the resistance 7 which holds the line terminating repeater relay 11R to spacing and transfers a lead extending to a make contact of relay 7F from the ringing lead 11 to a winding of a relay 11R of the line repeater. Relay 7H at its lower contact closes a path to the upper make contact of a relay 7M in preparation for operation of the line relay 8L (Fig. 8). Relay 7E also operates on negative current and operates relay 7L which locks up over the back contact of relay 7K. Relay 7L at its lower contact causes the operation of relay 7C. Relay 7C operates relay 7G which locks up and operates relay 7J. Relay 7G also transfers the windings of the relays 7D and 7E to a local path through resistance 74 as follows: From battery, a make contact of relay 7H, a make contact of relay 7G and winding of relays 7E and 7D. This battery is of opposite polarity to that previously applied to relays 7E and 7D which releases relay 7E and maintains relay 7D operated. Relay 7L remains operated because it is locked over a contact of relay 7K. The relay 7J locks up over a back contact of relay 7B and also operates the relay 7F which transfers winding of relay 71R from positive battery through the resistance 7 to negative battery over a path beginning at the winding of relay 71R, make contact of relay 7H, make contact of relay 7F, make contact of relay 7L to negative battery. This causes the relay 71R to operate from spacing to marking condition which causes the operation of relay 72R to the marking condition. This causes the operation of relay 7K, which, upon operating, causes the release of relay 7L. In operating, relay 7K closes a circuit to operate the associated line relay 8L (Fig. 8) as follows: Beginning with negative battery resistance 73, over a make contact of relay 7H, make contact of relay 7K, back contact of relay 7M to the ring conductor R over a back contact of magnet 2H (Fig. 2) and winding of relay 8L (Fig. 8) to ground. Operation of relay 8L operates the corresponding relay 9ST.

*Selection, finding and connection of an idle trunk*

A condition has now been traced for either a local subscriber or a toll line subscriber, resulting in the operation of a relay 8L corresponding to the calling line. See Fig. 34. The operated relay 8L closes a path to operate a relay 9ST associated with a particular line. Each relay 9ST has associated with it a relay 9AL and a group of subscribers' lines have these relays 9AL arranged in a sequential series. If but one relay 9ST is operated it operates the associated relay 9AL but if some other relay 9AL in the group has previously been operated the relay 9AL for a second call waits until the previously operated relay 9AL has released because it will be observed that the operation of any relay 9ST removes the ground necessary to operate any other relay 9AL while any 9AL relay removes battery necessary to operate a 9AL relay. Therefore to operate a 9AL relay all other 9ST and 9AL relays must be down. Let it be assumed that the first relay 9ST associated with the subscriber's line extending to Fig. 1A alone has operated. The associated relay 9AL operates over a circuit extending from battery through the winding, back contacts of other relays 9ST and back contact of the associated relay 9AL1. The operated relay 9AL locks up over the make contact of associated relay 9ST. The relay 9AL closes a path for the operation of the associated relay 91ST which operates. The operation of relay 91AL now depends on whether any other relay 91ST in the subscriber's group (Fig. 10) or 10ST in the trunk sequence (Figs. 10 and 11) is operated. See Fig. 35. If any other relay of the sequence is operated the operation of the particular relay 91AL associated with the particular relay 9AL, in turn associated with the particular calling subscriber's line, awaits its release. The energized relay 91AL operates over a circuit from battery through its winding to the make contact with the associated relay 91ST, a chain circuit through the back contact of relays 10ST to conductors G100 and 100 and ground upon the common start relay 17CS. Relays 91AL are divided into two groups one of which has make contacts associated with conductor 101 and the other with conductor 102. Let it be assumed that the operated relay 91AL is connected to conductor 101 which closes a path for the operation of relay 12LS. Upon operating, relay 12LS closes an obvious circuit for the operation of relays 12H and 12H1. Relays 12H1 ground conductors 103 and extend the grounds into the trunk circuits which prevent any trunk and link circuit in use on an established call from releasing during the interval of selecting a trunk for another call. This anti-release feature is necessary to prevent the snagging of two sets of cross-bar switch fingers in the cross-bar switch of Fig. 2. Relay 12H, upon operation, operates the relay 12LS1 associated with the operated relay 12LS. The operated relay 12LS1 associated with a particular relay 12LS places ground on the start lead 104 at a place in the trunk chain and advance circuit where there is available the lowest numbered trunk of a particular group of trunks normally connected to the particular calling subscriber's circuit. The path is from ground on a right inner make contact of a relay 12H over a make contact of a relay 12LS and a make contact of relay 12LS1 to the armature of relay 11CH of the right-hand trunk of Fig. 11. Assuming this trunk were busy this ground would be extended over the make contact of the relay 11AD to the armature of the relay 11CH of the next trunk to the left, etc. It is sometimes desirable to have a particular subscriber's station normally become associated with a trunk in a particular trunk group and to seek selection of trunks in another group of trunks only if all the trunks in the primary group are busy. For example, the trunks whose leads extend into Fig. 10 may extend to one central office and those whose leads extend into Fig. 11 may extend to another central office. Thus, in case the call had come over a subscriber's line connected to the two sub-groups at the right of Fig. 9 the lead 102 would have been energized to operate another relay 12LS than in the case when the lead 101 was energized. When the relay 12LS connected to the lead 102 is energized the relay 12TR is also energized over a path from battery, through the winding, a make contact of the relay 12LS which is operated and ground upon the left back contact of the relay 12LS which is not operated. In this case the ground extended to the armature of a relay 10CH is to the third trunk illustrated in Fig. 10 and extends to ground over conductor 105, the make contact of relay 12LS1, the make contact of relay 12LS to ground on make contact of relay 12H. In this case the trunk hunting begins at the right of Fig. 10 and proceeds to the left. The hunting proceeds over all the trunks of Fig. 10 and then if all relays 10AD are operated the hunting continues at the right trunk of Fig. 11 and proceeds to the left because the upper inner make contact of relay 10AD at the left of Fig. 10 is connected over a make contact of relay 12TR to conductor 104 when relay 12TR is operated. When the hunting results from energization of conductor 102, ground upon conductor 104 to the armature of the right-hand relay 11CH of Fig. 11 is applied and the hunting proceeds to the left; if the trunks extending into Fig. 11 are busy the inner upper make contact of the left relay 11AD of Fig. 11 is connected over a back contact of relay 12TR to the armature of the right-hand relay 10CH of Fig. 10.

We now consider the case where all the trunks are busy.

When all trunks are busy all the relays 10AD and 11AD and 10CH and 11CH will be operated. A circuit will then be closed to operate the relay 18ST over conductor 106. This circuit will proceed differently depending upon whether the call came from a line of the group causing the operation of relay 12TR or from a line of the group not causing the operation of that relay. In the first case the circuit proceeds from conductor 106 over a make contact of relay 12TR over the make contact of the left relay 11AD of Fig. 11 through the make contacts of other relays 11AD to another make contact of relay 12TR, through the make contacts of all the other relays 10AD of Fig. 10 to ground over a make contact of relay 12LS1 and the associated relay 12LS and a contact of a relay 12H. When relay 12TR is not operated a similar circuit will be traceable over its back contacts and the closed contacts of relays 10AD and 11AD. Operation of relay 18ST will cause to be applied to conductor 107 a continuous series of impulses representing the character "K." The operation of the all-trunks busy circuit of Fig. 18 to generate these character "K" impulses is elsewhere described. These character "K" impulses proceed over conductor 107 and a make contact of relay 8BB (which is operated over a conductor 159) and lead T1, the operating winding of relay 72S of loop repeater 7R or directly to the tip of the subscriber's line in the case of a local subscriber's loop. The series of "Ks" recorded on the subscriber's machine indicates to him that all trunks are busy. The subscriber abandons the call by opening the line. This sends a break signal to stop the transmission of the letter "K" impulses with an effect in the all-trunks busy circuit discussed elsewhere. In the toll subscriber's line circuit of Fig. 7 the relay 7G will be released because its winding will be short-circuited by the contact of the relay 72R moving to spacing. The release of relay 7K will release the relay 7C. The release of relay 7C will cause the relay 7B to operate. The operation of relay 7B will unlock the relay 7J and release the relay 7F which will open the original operating path of the relay 7B and transfer the line conductor from its connection to the repeater to the current discharge resistance 72 to discharge the line. By the time this has happened the relay 7B will release and short-circuit the winding of the relay 7G which will connect the windings of the relay 7D and 7E in the path from the line to ground. Because the line is open at the subscriber's station the relay 7D will release and short-circuit the winding of the relay 7H. The letter "K" signals will be removed from the tip lead T and the entire circuit of Fig. 7 will be returned to normal position. The release of the relay 9ST will release the associated relay 9AL and start a sequence of operations which will restore the sequence circuit to normal and the release of relay 8BB will open the locking circuit of relay 18ST which extends over conductor 108.

*Subscriber's call continued through two-way trunk circuit*

We return now to the case where all the trunks are not busy and for illustrative purposes we assume that the trunk illustrated in Figs. 3 and 4 is the one selected. The conductors 103 of all trunks are grounded at a relay 12H to hold all the trunks from releasing. The conductor 105 has been extended to the start conductor 109 of the first idle trunk. The trunk start relay 3ST is operated. The relay 3ST locks under control of a ground on the conductor 110 leading to a back contact of the relay 10AD. The relay 3ST closes a ground over a portion of conductor 130 through resistance 31 (4000 ohms) and a back contact of relay 4TR1 to the winding of relay 4S. Relay 3ST also closes a path from ground on the back contact of the relay 3R3 over the conductor 111 to the relay 16TK which operates for reasons to be discussed elsewhere. The relay 3ST also prepares a path from the conductor 113 to the conductor 123 to the winding of the relay 10CH in the sequence circuit and extends the conductor 113 to open contacts on relays 3SS and jack 3B. Relay 3ST also closes conductor 111, which extends to trunk start indicating relay 16TK, to ground upon an armature of relay 3R3; it also closes conductor 121 of this particular trunk to conductor 124 which extends to a front contact of relay 16TK to ultimately operate relay 10BO1 of the particular trunk as discussed in connection with the "Miscellaneous alarm circuit." It also connects battery to the winding of the relay 3R1. The relay 4S operates and transmits a marking impulse (negative) over the outward going leg 114 of the trunk (including line and terminal repeaters therein, if any) to operate the relay 5A to its marking contact.

In the trunk termination equipment at the central office (Figs. 5 and 6) the operation of the relay 5A causes the operation of relay 6J by applying positive battery over the marking contact of relay 5A, and back contacts of relays 5C and 6K. Relay 5A also removes battery from the upper winding of relay 5B which is supplied via contacts of relays 5D and 5G. Relay 5B will operate to its contact 54 after a time of about 0.3 second owing to the inclusion of the condenser-resistance combination 50 in shunt to its circuit. When relay 5B operates, however, a circuit is supplied to operate relay 6K from ground on the armature of relay 5B, contact 54, back contact of relay 6SL, back contact of 6M1, back contact of 6U, winding of 6K, and another contact of 6SL to battery. Relay 6K locks up over a path through the back contacts of relays 6U, 6M1 and its own front contact. Relay 6J closes a grounded path to operate relay 5N and also applies a busy potential to the sleeve of the jack 60 and relay 5N cuts through the conductor 114 to the winding of repeater relay 5R. Relay 6K remains locked under control of relay 6M1 and relay 6U.

Relay 6J also applies negative battery to the idle trunk indicator "Relay chain" of Fig. 6 to step the relay chain forward and cause the idle indicator lamp "Idle ind." to go out, thus indicating that this trunk is busy. Such idle line indicators are well known and it will be understood that this is arranged in the conventional manner with a lighted lamp to indicate always the first trunk of a series which is idle and hence is available for use.

Relay 6L now operates over a path through a make contact of the relay 6K and marking contact of relay 5A to positive battery. This energizes line lamp ANS. Relay 6L also operates the night alarm device 69 and operates relay 6LT which prepares a locking path to a contact on the relay 6S which will become operated when the operator plugs in as later described. Operation of relay 6K connects a source of continuous ringing current 61 to the transmission conductor 115. This ringing current vibrates the repeater relays and causes the relay 4R in the repeater circuit of the satellite office to operate and operate the alternating current relay 3R. At the relay 4R the circuit extends from battery on the armature over a back contact of relay 4TR, through a winding of relay 4L and back contact of relay 4TR1 to ground over resistance 32 in parallel with alternating current relay 3R and a path to ground through condenser 33. As the relay 4R vibrates it opens and closes the circuit which extends from battery over the contact of relay 4R, over back contact of relay 4TR, winding of relay 4L, back contact of relay 4TR1, and shunt resistance 32 in parallel with winding of relay 3R, condenser 33, to ground. This low frequency alternating current operates relay 3R which causes relay 3R1 to operate, which in turn causes relay 3R2 to operate because the relay 3R1 is now connected to battery through the winding of relay 3R1 under control of relay 3ST. Operation of relay 3R2 releases relay 3R1 and operates relay 3R3. The relays 3R1, 3R2 and 3R3 are so arranged as to cause a short delay between the reception of the ringing current and the operation of the relay 3R3 to prevent relay 3R3 from being operated on momentary line hits. The relay 3R3 upon operation removes ground from the conductor 111 leading to the winding of the relay 16TK which gives notice to the miscellaneous alarm circuit that the incoming call signal had been received at the TWX switchboard and that ringing current returning to the satellite exchange had determined the continuity of the trunk, a test which is made prior to allowing the link circuit to connect the calling subscriber to the selected trunk. (Further discussed elsewhere.) The relay 3R3 operates the relay 3ST1 over the ground existing on conductor 109. Relay 3ST1 locks under control of the relays 3S1 and 3R3 to ground on its own contact; it also furnishes ground through contacts of the relay 3R3 to the conductor 116; it opens the path which is adapted to send ringing current to the subscriber on calls to the subscriber; (see under Ringing called subscriber) and it connects telegraph ground through a direct current path to the ground side of the relay 3R through a resistance 34 to hold the relay 3R operated during the interval caused by the operator answering when ringing has been discontinued at the distant end and the subsequently received marking signal has not as yet been registered at the satellite exchange. The relay 3ST1 when operated also furnishes ground to winding of relay 3SL by connecting ground on a make contact of relay 3ST1, second lower make contact of relay 3R3 over a back contact of relay 3S1, to relay 3SL. The ground connected to the conductor 116 causes the operation of the relay 3M which in turn causes the operation of the cross-bar selecting magnets 2S associated with the particular trunk. Furthermore, the operated selecting magnets connect ground to the conductor 117 which operates the relay 17D. Relay 17D connects ground to the conductor 118 which closes a circuit to operate the particular magnet 2H belonging to the calling subscriber's line. This circuit begins at battery, extends through the particular magnet 2H, a contact of the particular relay 9AL which is operated, a make contact of particular relay 9AL1 which is operated and conductor 118 to ground upon a make contact of relay 16D. The operation of the magnet 2H closes the tip and ring of the calling subscriber's line through to the tip and ring of the selected trunk by closing a set of coordinate contacts 20 in the cross-bar switch. A resistance is included in the conductor 118 which causes battery to be applied from the source connected to magnet 2H to conductor S3 of the selected trunk to operate the relay 3SL which is provided with ground, as previously stated. The relay 3SL operates and causes relay 3SL1 to operate. See Fig. 33. Relay 3SL1 removes telegraph ground from the armature of the relay 4C; it also causes the operation of the relay 3SL2 and prepares a locking path for the relay 3S1. The relay 3SL2 places a ground on the conductor 119 which will be used to hold the advance chain of the sequence circuit operated; it also disconnects ground from the winding of the relay 3M which results in the release of the selecting magnets 2S of the cross-bar switch; it also helps prepare a path to send ringing current to the calling subscriber on an incoming call, a function which has no useful purpose at this time; it disconnects battery received over the conductor 118 from the conductor 120 and connects battery (from the same lead 118) to the relay 3R1 thereby supplementing the battery furnished by the relay 3ST; and it places ground on the conductor 35 lighting the lamp 36 adjacent the patching jack 3A of the trunk. Release of the selecting magnet 2S disconnects ground from the conductor 117, releases the relay 17D and removes the ground applied by the relay 17D from the circuit of the magnet 2H. Magnet 2H remains operated over a path through contacts 20 and the sleeve relay 3SL, contacts of relay 3S1, 3R3 and ground on a contact of relay 3TS1. The operation of the magnet 2H caused the release of the associated relay 8L which released the operated relay 9ST and releases the sequence circuit. See Fig. 39.

Thus, the cross-bar link circuit and the associated calling subscriber line circuit function; (1) to connect the line through the link circuit to the trunk circuit and (2) to cause the release of the sequence circuit.

While the sequence circuit is returning to normal ground is removed from the conductor 109 and at the same time the subscriber's loop circuit has been closed through to the trunk which causes current from the negative source of potention on the tip conductor to flow around the loop and cause the operation of the relay 3SP through both of its windings in parallel. When the relay 3SP operates to its contact 37 it causes the operation of the relay 3SP0 which in turn operates the relay 3SP1. The relay 3SP functions during the communication as the supervisory relay. The relay 3SP1 in operating opens the path which sends ringing current to the subscriber, a function which has no useful purpose at this moment, since this path is already opened by the operated relay 3ST1; it prepares a path for the operation of the relay 4TR (when relay 3SS operates); it supplements a ground furnished to the relay 3SL by the relay 3R3; it supplements a telegraph ground furnished to the relay 4R from the loop repeater by the relay 3ST and it furnishes an additional holding path for the relay 3ST1. These supplementary paths furnished by the relay 3SP1 are chiefly useful to prevent disconnection of the subscriber from the trunk, if the operator plugs in slowly or fumbles the cord plug upon inserting it into the jack associated with the calling line lamp.

The sequence circuit, in returning to normal, places a ground on conductor 113 at the back contact of relay 12LS but this ground is continued to the conductor 123 of only the one trunk in which relay 3ST is operated where it causes the operation of relay 10CH of the selected trunk and causes the advance of the trunk chain circuit. The advance of the trunk chain circuit has therefore been delayed until the continuity of the trunk in both directions has been tested and it has been connected to the subscriber line. In the chain circuit the operation of the relay 10CH associated with the selected trunk is caused and this causes the operation of the associated relay 10AD. Both of these relays lock up to a ground in the trunk circuit for the duration of the call and their operation causes the conductor 104 or the conductor 105, as the case may be, to be advanced to the next idle trunk. The locking circuit for the relays 10CH and 10AD is over the conductor 119 to a contact on the relay 3SL2 of the selected trunk. The operation of the relay 10AD disconnects ground from the conductor 110 which had been holding the relay 3ST in the trunk circuit and removes holding ground from the relay 12LS1 in the sequence circuit causing their release. The release of relays 12H and 12H1 removes the individual holding grounds to the relays 10CH of any trunk circuit which was operated, thus permitting any relay 10CH which is not locked up by its trunk to release, thereby removing the fixed condition of the trunk chain circuit which has been enforced throughout the entire routing of the call. The release of the relay 12LS1 which was operated causes the release of the relay 17CS. The trunk sequence and subscriber's sequence circuits have thus been returned to normal and to a condition which will permit the routing of another call in either direction. The entire routing of a call as described to this point requires only a second or so and upon the expiration of this time the sequence circuit is now available for routing further calls in either direction through the system. Although the relay 3ST is released the relay 3ST1 remains locked up. In releasing the relay 3ST had opened up the conductive connection between the conductors 112 and 113 leading to the sequence circuit and had disconnected this particular trunk from the conductors 111 and 124 which extend to the miscellaneous alarm circuit. The functions of the other contacts of the relay 3ST have been taken over by the operation of the relays 3SL2 and 3SP1.

The calling in signal is now registered at the central office, the line lamp thereat is lighted, the subscriber is connected to the trunk, the sequence circuit is released for a new call and the subscriber is awaiting the answer of the operator. The subscriber may now become impatient and flash the operator by opening and then reclosing the power switch PS. This opens one side of the line and grounds the other through the subscriber's teletypewriter and recloses the line when the switch is reoperated. Each complete cessation of the current flowing through the loop circuit due to opening the power switch PS causes the relay 3SP to move to its contact 39 and this causes the relay 3SP0 and the relay 3SP1 to follow, operating and releasing. The relay 3SP1 upon each operation and release removes and applies ground over conductor 130 to the relay 4S of the loop repeater, which in turn sends marking and spacing signals to the distant central office over conductor 114. These are translated into flashes at the calling in signal lamp ANS. This occurs because the relay 5A is alternately released and operated and this causes the relay 6L to release and operate. If the relay 5B reoperates the relay 6K remains locked.

The apparatus of Figs. 5 and 6 is so arranged that it will not respond to the off periods on the subscriber's switch as a permanent disconnect signal unless the switch is turned off by the subscriber for a period of five seconds or more in which case the ringing signal which has been sent from the central exchange over the chosen trunk would cease. This ringing signal while it persists holds the trunk circuit in a fixed condition, thus maintaining the calling subscriber definitely connected to the selected trunk.

If the length of time the power switch PS remains in the normal position exceeds three-tenths (.3) of a second the relay 5B will operate to its contact 53. Relay 6K, however, remains operated under control of the relay 6M1 and its own front contact. The release of relay 5B has no effect. The release of the relay 6L, however, removes the negative battery from the non-grounded side of condenser 6D which permits the positive battery to slowly charge the condenser 6D through the resistance 63. When the subscriber's switch remains in its normal open position for a period of five seconds the relay 6L remains released for five seconds and permits a charge to accumulate on the condenser 6D sufficient to cause the gaseous trigger tube 64 to break down. In breaking down this tube causes a discharge of current through the path including the relay 6M which operates and in turn operates relay 6M1. The operation of relay 6M1 opens the locking path for the relay 6K. The relay 6K releases and removes the ringing source 61 from the line, thereby removing the ringing current being sent over the conductor 125 to the satellite office.

The operator answers by inserting the cord answering plug into the jack 60 whereupon relay 6S operates over the sleeve of jack 60. The operator does not find ground on the tip lead 66 because the relay 6J and the relay 6LT are both operated. Because the relay 6LT is operated and locked under the control of the relay 6S the relay 6T0 is prevented from operating on calls from the subscriber. Because relay 6S is operated and relay 5N is operated battery is applied to the winding of the sleeve relay 6SL, causing it to operate. The relay 6SL in operating removes battery from the winding of the relay 6K thereby causing it to release; relay 6SL also helps to prepare a path for the later operation of the relay 6U; closes its own locking path under control of the relays 6J and 6P and transfers the ground at the contact 54 of the relay 5B to the winding of the relay 5C. The release of the relay 6K causes the release of the relay 6L, extinguishes the lamp ANS, replaces negative potential on the non-grounded side of the condenser 6D and disconnects the ringing source 61 from the lower back contact of the relay 6S. Because the relay 5B is on contact 54 and the relay 6SL is operated ground is available to operate the relay 5C. The relay 5C in operating functions as follows:

(1) To place a permanent direct ground on the winding of the relay 6J keeping it operated;

(2) To operate the relay 6P;

(3) To lock up on its own ground under the control of relay 5H;

(4) To place a supplementary operating ground on the winding of the relay 6LT, a function which causes no beneficial result at this time because that relay has already locked under the control of the relay 6S; and (5) To cause the operation of the relay 5E through a path including a back contact of relay 5D.

Relay 6P locks under control of relay 6J, connects locking battery to the winding of the relay 6SL, prepares a path for the subsequent operation of the relay 6FD and closes marking battery back to the contact of the relay 6S, both of these last two functions to be used if the operator should improperly disconnect (false disconnection). The relay 5E in operating connects positive battery of 48 volts to the upper winding of the relay 5B, causing it to operate to contact 53. The relay 5B quickly operates to contact 53 and causes the operation of the relay 5D. The relay 5D on operation functions as follows:

(1) Locks under control of relay 5C;

(2) Removes the operating path of the relay 5C from connection to the contact 54 of the relay 5B and transfers the contact 54 of the relay 5B to the winding of the relay 5F;

(3) Removes the upper winding of the relay 5B from control of the spacing contact of the relay 5A; and (4) Releases the relay 5E.

The relay 5B is now held under control of the marking contact of the relay 5A and it remains in that condition throughout the transmission of telegraph impulses.

We now proceed to Figs. 3 and 4 into the trunk at the satellite office to see what happens as a result of the operator answering the call. The operation of the cord plug into the jack associated with the lighted answering lamp has disconnected the ringing source and has transmitted a marking signal to the satellite office causing the relay 4R to operate to marking position. This causes the relay 4L to operate to the marking position and holds the relay 3R operated over the direct current path through its winding furnished by the relay 3ST1. The relay 4L may have been operating to its marking contact while the ringing current was being received but until the marking current is received from the distant office the relay 4L does not stay on its marking contact long enough to affect the circuit. The operation of relay 4L to its marking contact removes ground from the lower winding of the relay 4TM. The circuit for this ground before its removal is from the armature of the relay 4L over a back contact of relay 4B2, a back contact of relay 4B through the lower winding of relay 4TM to a point connected to battery. Upon removal of this ground the current flows through the lower winding of the relay 4TM to charge the condensers 40 and 42 which become charged after approximately two-tenths (.2) of a second whereupon the relay 4TM operates to its contact 44. This causes the operation of relay 4A which locks to ground on its own contact and then reconnects the lower winding of the relay 4TM to the marking contact of the relay 4L which causes the relay 4TM to return its armature to its contact 43. With the armature of the relay 4TM on contact 43 ground is available for the operation of the relay 4B which operates to perform the following functions:

(1) To lock up under control of the relay 4A;

(2) To remove the lower winding of the relay 4TM from any connection to the spacing contact of the relay 4L over a back contact of relay 4B2;

(3) To prepare a path for the operation of relay 4C on the next movement of the armature of the relay 4TM to contact 44;

(4) To place ground on the conductor 126 of the sequence circuit which performs no useful function at this moment since the battery connected to the relay 10ST of the sequence circuit to which the lead 126 is connected had previously been removed by the relay 3SL2 which in operating had disconnected battery from the conductor 120 leading to the sequence circuit; and (5) To cause the operation of the relay 3SS over the following circuit:

From battery on conductor 118, winding of relay 3SS and conductor 126 to ground on a make contact of relay 4B. The operation of the relay 3SS functions:

(1) To cause the operation of the relay 3S1;

(2) To open in advance the operation path of the relay 3S2;

(3) To place ground on the conductor 123, a function which has no useful purpose on this call;

(4) To establish a part of the circuit used to send ringing signals to a called subscriber, a function which has no useful purpose on this type of call since this path is opened at the relays 3ST1 and 3SP1;

(5) To cause the operation, from battery on conductor 118 of the relays 4TR, 4TR1 and 3TR2; and (6) To short-circuit the resistance 45 associated with the lower winding of the relay 4TM which permits the relay 4TM more accurately to regulate the time it requires to release.

The operation of the relay 3S1 functions:

(1) To place a direct ground on the winding of the relay 3SL;

(2) To close its locking contact in preparation for locking over the relay 3R3 when the latter releases; and (3) To open one of the holding paths of the relay 3ST1.

The relays 4TR and 4TR1 operate and lock under the control of the relay 4D1. The relay 4TR in operating removes the short circuit around the resistance 4Q in series with the bias winding of the relay 3SP and decreases the current in the bias winding, a function which is needed during ringing. The relays 4TR and 4TR1 upon operating connect the subscriber's loop circuit directly to the loop repeater and, in general, change the transmission circuit of the trunk at the satellite end from full-duplex to half-duplex transmission. Short momentary openings of the subscriber's loop may cause the armatures of the line relay 4L and the supervisory relay 3SP to move but this will have no further effect upon the circuit at this time. The operation of the relay 3TR2 functions:

(1) To open up the bias winding path of the supervisory relay 3SP thus insuring its continued operation during the transmission of impulses;

(2) To remove ground from the holding winding of the relay 3ST1 thereby permitting its release; and (3) To connect ground through resistance 30a (150 ohms) to the S1 lead to the link circuit and the subscriber line circuit which if connected to a line circuit according to Fig. 7 will hold the latter circuit in transmitting condition during the transmission of impulses.

The release of the relays 3ST1 opens the direct current holding ground for the relay 3R, recloses the path used to send ringing current towards a subscriber, a function which has not useful purpose at this time since the relay 3SP1 is operated, and removes the supplementary holding ground for the relay 3SL.

The removal of the holding ground from the relay 3R performs no useful purpose as the relay 3R was released as soon as the relay 4TR1 operated and caused the release of the relays 3R1, 3R2 and 3R3 in succession. The release of the relay 3R3 functions:

(1) To furnish ground to lock the relay 3S1 operated;

(2) To remove battery from the operating winding of the relay 3ST1 which has already released; and (3) To open its remaining contacts which perform no useful function at this time.

The trunk is now in its half-duplex transmitting condition, a condition which it maintains during the transmission of telegraph pulses. The following relays remain operated during this time: 4A, 4B, 4TM to contact 43, 4L, 3SP, 3SP0, 3SP1, 4TR, 4TR1, 3TR2, 3SS, 3S1, 3SL, 3SL1 and 3SL2. Transmission of telegraph signals has no permanent effect on the trunk circuit. All the relays enumerated remain securely operated except the relay 4L which follows pulses but never remains off its marking contact long enough to permit the apparatus of the trunk circuit to function. However, the armature of the relay 4L leaves its marking contact long enough during the transmission of a break signal originated from either end to permit the relay 4TM to operate to its contact 44 for purposes which will be discussed elsewhere.

On this call from a subscriber conditions are now established for transmission to and fro from the subscriber to the central office or to any line to which the subscriber is connected at the central office or over another trunk to the same or a different satellite exchange. The telegraph transmission, break signals, disconnect and recall signals may be transmitted as will be discussed elsewhere.

Details of Call From Central Office to Subscriber Station

A trunk such as shown in Figs. 3 to 6, inclusive, may be utilized by an operator at the central office to call a desired subscriber. Transmission over the trunk for the purpose of establishing a call will be handled on a full-duplex basis. Outward calls are directed over the trunk to the proper subscriber line by permutation code combinations.

In the idle condition of Figs. 5 and 6 both paths of the trunk circuit would be in the spacing condition. A call placed on a trunk by the operator will be indicated by placing of a marking condition on the outward conductor 125. In the idle condition relays 5A and 5B along will be operated to their spacing and contacts 53, respectively.

*Operator seizes trunk*

The operator calls by inserting a cord plug into one of the multiple jacks 60. Reference will now be made to certain elements in the cord circuit of Patent 2,024,581.

When the operator takes up or seizes a trunk by inserting a cord plug in jack 60, ground from the upper back contact of the relay 6LT through the winding of the relay 6T over the tip of the plug of jack 60 causes the operation of a relay in the cord circuit and a lamp in the cord associated with the calling plug will light. Battery applied from the cord over the sleeve of the plug and jack 60 will cause the operation of the relay 6S by energizing its upper winding. Negative battery from the cord circuit will be extended over the ring of the plug and jack 60, back contacts of the relay 6T1, lower back contacts of the relay 6S, upper winding of the relay 5S of Fig. 5, through the contacts of the repeater relay 5R to negative battery. The relay 5S being operated to marking will connect negative battery over conductor 125 of the line system which will repeat a marking signal in the form of positive polarity to the upper winding of the relay 4R of Fig. 4 causing it to operate to its marking position. Operation of the relay 6S will connect battery through the upper inner contacts of the relay 6S to the idle indicator relay chain, thus making the trunk busy to other operators.

The operation of the trunk equipment at the satellite office on the operator's call will now be described. The closure of the transmission lead 125 under a marking condition indicates to the satellite office that a call is about to be routed. The marking pulse on the conductor 125 causes the operation of the relay 4R to its marking contact. This causes the operation of the relay 4L to its marking contact, which in turn causes the operation of the relay 4TM to its contact 44 and also the operation of 4A and 4B. The circuit for the relay 4A is from battery over a back contact of relay 4C, winding of relay 4A, a back contact of relay 4B, a back contact of relay 4B2, contact 44 of relay 4TM and ground. Relay 4A locks up and reoperates relay 4TM to contact 43. The operating path for relay 4B is from battery, winding of relay 4B, make contact of relay 4A and contact 43 of relay 4TM. Relays 4B and 4A, together, in operating, transfer contact 44 from the winding of relay 4A to relay 4C. Relay 4C is of a type which closes its upper front contact before opening its upper back contact and upon releasing the back contact is closed first. Relay 4A in operating transfers the operating path of relay 4TM from the spacing to the marking contact of relay 4L. The operation of the relay 4B grounds the conductor 126 extending into the sequence circuit and also causes the operation of the relay 3SS from battery on the conductor 118 to ground on the upper armature of the relay 4B.

We now trace the result of grounding this conductor 126. The relay 10ST associated with the seized trunk operates from battery on the inner lower back contact of relay 10BO over the conductor 118, the back contact of relay 3SL2, conductor 120, winding of relay 10 ST, conductor 126, to ground. The operation of relay 3SS also causes the operation of the relay 10CH associated with the seized trunk. This advances the trunk chain circuit. The operation of the relay 10ST places a ground on the conductor 127 which will function subsequently to keep the distributor motor 21M up to speed. If no other relay 10ST of the sequence circuit is operated or if the particular relay 10ST is in a preferential condition, ground on the conductor 100 applied at the back contact of the relay 17CS in the miscellaneous alarm circuit will cause the operation of the relay 10AL associated with the operated relay 10ST provided also no other relay 10AL is operated. If these conditions are not met the particular relay 10AL will be delayed in operating until it has received a preference by the sequence circuit. In operating the relay 10AL locks under control of its associated relay 10ST which causes the operation of the associated relay 10AL1 and the relay 17ST, which in turn operates the relay 17CS. The circuit for the relay 17ST is from battery on conductor 128 over a back contact of a relay 91AL, a make contact of operated relay 10AL to conductor 129 and winding of relay 17ST to ground. The operation of the relay 10AL1 places ground on the conductor 134 and operates relay 21B as a start signal for the signal director and also connects the two transmission conductors 130 and 131 which extend from the particular trunk circuit to the director circuit. It also places a ground on the conductor 116 of the associated trunk circuit and connects the associated relay 10BO and 10BO1 to the common busy alarm timing-out conductors 132 and 133, respectively. The operation of the relay 17CS will disconnect ground from the conductor 100 of the sequence circuit chain.

The operation of the relay 3SS also functions:

(1) To cause the operation of the relay 3S1 owing to a battery on conductor 118.

(2) To place a ground on the conductor 123 which operates the advance chain of the sequence circuit and immediately makes the trunk busy to a calling subscriber.

The operation of the relay 3SS opens the operating path on the relay 3S2, prepares a circuit for applying ringing current to the subscriber's line, short-circuits a resistance 45 which is in series with the relay 4TM and prepares a path for the operation of the relay 4TR. The operation of the relay 3S1 establishes a ground in preparation for the operation of the relay 3SL and opens the locking path of the relay 3ST1.

The grounding of the conductor 116 will operate relay 3M over a path through a back contact of relay 3SL2. The operation of relay 3M causes operation of the selector magnet 2S (or magnets 2S in the case of multipled cross bar switches) associated with the particular trunk. This places a ground on the conductor 117.

*Director ready signal*

After the conductor 134 has been grounded by the operation of the relay 10AL1 the director circuit functions and sends a "director ready signal" to the operator at the central office.

The sequence switch has now connected the director circuit to the particular trunk making the call. The transmission lead 131 from the two-way trunk is connected to the director circuit and the transmission lead 130 from the director circuit to the two-way trunk is also connected. The sequence circuit has connected ground to conductor 134. This ground on conductor 134 which includes back contacts of a relay 14T5 operates the relay 21B which among other things grounds conductor 135 in the distributor circuit which causes the operation of the relay 21C in the receiving distributor circuit over conductor 140, back contact of relay 13B and conductor 135. The operation of relay 21C applies ground to the conductor 136 which causes the operation of relay 13A in the director circuit. The operation of relay 13A causes:

(1) The application of ground to the conductor 137 extending to the miscellaneous alarm circuit to warn it that the director circuit has been seized and moved off normal;

(2) Prepares a path for the sending of the "director ready signal"; and (3) The operation of the relay 13F, which locks under the control of the ground on the back contact of the relay 14F when the relay 13B operates, and at the same time places a ground on the conductor 147*a* extending to the miscellaneous alarm circuit.

The path to ground of the conductor 137 is through a back contact of a relay 14T4, a back contact of relay 13AL to the armature of relay 13A and ground. The path to ground of conductor 147*a* is through a back contact of relay 14T6, front contact of relay 13F, front contact of relay 13A, to ground. The grounding of lead 147*a* serves to give notice to the miscellaneous alarm circuit that if the "timing out" period is reached the trunk circuit should be taken out of service only so long as the marking signal is received from the distant central office. The motor 21M in the receiving distributor circuit comes up to its proper speed and causes the operation of the relay 21F (as described elsewhere) on this ground. The ground on conductor 139 at the make armature of relay 21F (operated in a manner to be described) causes the operation of the relay 13B in the director circuit.

In operating, the relay 13B:

(1) Connects telegraph ground through the upper winding of the relay 13C to conductor 130 which leads to the two-way trunk where by means of the associated loop repeater a mark signal is sent to the central office as the beginning of the "director ready signal"; this ground is only maintained for an instant for upon the operation of relay 13B, relay 21C will release and this will in turn cause the release of relay 13A to break the telegraph ground circuit to relay 13C;

(2) Opens the continuity between the conductors 135 and 140 extending to the distributor circuit releasing relay 21C which releases 13A which in turn removes ground from the conductor 147*a* extending to the miscellaneous alarm circuit;

(3) Furnishes off-normal battery to certain elements of the director circuit over a conductor 148; and (4) Furnishes an off-normal holding ground to the director circuit over a conductor 142.

If the circuit path from telegraph ground connected to the conductor 130 by the relay 13B is continuous up to and including the winding of the relay 4S in the telegraph repeater, the current flowing through the upper winding of the relay 13C will cause it to operate. The relay 13C locks under control of the back contact of relay 14F, over a locking path extending from the inner armature of relay 13C, conductor 143, back contact of relay 14F to off-normal ground on the make contact of relay 13B, and at the same time continues a ground to a front contact of the relay 13J in anticipation of the operation of the relay 13J. The off-normal holding ground furnished by the relay 13B is connected to the conductor 142 extending to the distributor circuit over a back contact on the relay 13N.

Before, during and after the director ready signal has been transmitted to the central office a marking signal has been and continues to be received and transmitted over the associated loop repeater in the trunk circuit. This marking signal has an effect on the relay 21H but before discussing it further the previous preparation of the distributor circuit to receive the marking signal will be described. The conductor 131 beginning in Fig. 21 is extended through a back contact of relay 14T4 into the trunk circuit and is connected to the inward transmission path 125 which is in a marking condition. Local ground is connected to the conductor 134 over a back contact of relay 14T5 in the sequence circuit.

This local ground will already have operated the relay 21B. In operating the relay 21B will have functioned:

(1) To apply a ground to operate relay 21A;

(2) To apply a ground over conductor 135 which is connected back over conductor 140 to operate relay 21C;

(3) To apply a telegraph ground over the armature and back contact of relay 21E for operating the start magnet 21S; and (4) To apply ground to the biasing windings of relays 21H and 21G which tends to cause the relays 21H and 21G to operate to their spacing contacts.

However, the relays 21H and 21G are held to their marking contacts by the marking current received from the trunk circuit over the conductor 131. Relay 21A locks up to ground which is present on the conductor 127, which ground is present as long as any call to a subscriber is awaiting completion. Relay 21A also connects ground and a driving source of current through resistance 21R to operate the motor 21M. It also connects ground through a winding of slow release relay 21D.

When relay 21C operated it functioned:

(1) To connect the other side of the winding of the relay 21D to a resistance 21R1;

(2) To transfer the stop contact of the distributor from the conductor 144 to the right-hand or primary winding of relay 21E; and (3) To connect conductor 136 to ground which causes the operation of relay 13A in the director circuit.

During the time the motor 21M is being started the start magnet 21S is operated to allow the motor to attain full speed quickly without having to overcome the friction of the driving clutch constituting a part of such a distributor. As soon as the motor has reached its normal operating speed the governor contacts employed therein in the usual manner will regulate the motor speed within close limits. When the governor contacts open they remove the short circuit across resistance 21R2 which causes the relay 21D to operate in series with resistance 21R1 from the voltage drop across resistance 21R2. Relay 21D is a slow release relay and holds over short closures of the governor contacts; it is aided in so doing by the charge stored on condenser 21X which maintains a current flow in the winding of relay 21D for a short time after the governor contacts are closed. Operation of relay 21D applies ground to the stop segment SP of the distributor set. Because the distributor cams are operating and because the start magnet 21S has been operated a relay 21E will operate from the ground extending through the stop segment contact SP when that contact is closed. The relay 21E removes ground from the start magnet 21S thus preventing the magnet 21S from operating when its contact is closed and thus leaving the latch of the distributor up. The relay 21F operates in series with the secondary or holding winding of the relay 21E which locks up through its make contact to ground on a contact of relay 21D. The operation of relay 21F applies ground over the conductor 139 to the director circuit which causes the operation of relay 13B in the director circuit as previously described. This removes ground from the conductor 140 and causes the release of relay 21C. The grounding of the conductor 139 is an indication that the distributor is now ready to receive line selecting permutation code impulses.

The operation of relay 21F has also closed the conductor 142 extending from ground on a make contact of relay 13B in the director circuit over a back contact of relay 13N through to the armature of relay 21H. The release of relay 21C has opened the operating path for relay 21D, closed conductor 144 through to the stop contact SP and opened the operating path for the right-hand winding of the relay 21E.

In the previous discussion of the functions of the relay 13B it was pointed out that it sends a "director ready signal." The procedure by which this signal is sent will be reviewed, as follows:

Conductor 130 was extended through a winding of relay 4S in the trunk repeater to negative battery; conductor 134 is connected to ground on the upper make contact of relay 10AL1 of the interconnected trunk which operates relay 21B; relay 21B in turn applies ground to the armature of relay 21G, ground to the biasing winding of relays 21H and 21G, applies ground to the spacing contact of relay 21G over the back contact of relay 21E which is at this instant not operated, and applies ground to operate relay 21A.

The operation of relay 13B connects conductor 130 to ground over a make contact of the operated relay 13A.

The operation of relay 13B causes release of relay 21C by disconnecting conductor 140 from the grounded conductor 135.

The release of relay 21C causes the release of relay 13A by removing ground from conductor 136.

The release of relay 13A disconnects conductor 130 from ground and restores it to the open left-hand contact of relay 13P1.

The time for transmission of the "director ready signal" is determined by the combined releasing times of relays 21C and 13A in succession, both of these being slow release relays.

The release of the relay 13A opens the operating path of the relay 13F which, however, remains locked.

*The receipt of and effect of a director ready signal at the central office*

When the distant satellite circuits are prepared to receive the call directing teletypewriter impulses the momentary marking signal known as the "director ready signal" causes a momentary operation of the relay 4S of Fig. 4 to its marking contact, causing a negative impulse to be transmitted through the contacts of the 4D6 relay over the toll system represented by conductor 114, through the upper winding of the relay 5A, contacts of the relay 5N to operate relay 5A. The relay 5A will be momentarily operated to its marking contact to place +48 volts through the upper outer back contact of the relay 5C, lower outer back contact of the relay 6K to the winding of the relay 6J, thus causing the relay 6J to operate momentarily. The momentary application of ground to the upper make contact of the relay 6J will cause the relay 6TO to operate over its lower winding. The relay 6TO will then lock by its upper winding from negative battery connected to its upper winding to positive battery supplied on the ring lead from the cord circuit. When the relay 6J releases ground will be applied from the upper back contact of the relay 6J through the lower armature and make contact of the relay 6TO to operate the relay 6LT. The relay 6LT will lock by means of its upper middle contacts to ground from the upper middle contacts of the relay 6S. The relay 6LT will open by its lower contacts the path by which the relay 6TO was originally operated. Removal of ground at the upper outer contacts of the relay 6LT from the tip of the plug to the cord will cause a relay of the cord circuit to release and since another relay has been prevented from locking by circuits over an open key in the cord the associated supervisory lamp associated with the answering plug of the cord will be extinguished. The extinguishing of this lamp is an indication to the operator that the satellite circuits are conditioned to receive the call directing teletypewriter impulses. The momentary operation of the relay 6J will also cause the momentary operation of the relay 5N. The operation of the relay 5N will extend the circuit from conductor 114 through the upper winding of the relay 5A to the lower winding of the relay 5R to negative battery but since conductor 114 is repeating a marking signal to the central office the relay 5R will remain on its marking contact. After the toll circuit represented by conductor 114 has returned to the spacing condition at the end of the director ready impulse the relay 5R will operate to its spacing contact under the influence of the biasing current in its upper winding and place a spacing condition on the cord circuit through the upper winding of the relay 5S, lower contacts of the relay 6S, lower contacts of the relay 6T1 and ring of the jack 60. As soon as the relay 6J has released the relay 5N, the repeater relay 5R will be returned to the marking condition and this marking condition will be repeated into the cord circuit over the paths previously traced. A spacing impulse that has been repeated to the cord circuit by this action will cause momentary interruption of the current to the operator's teletypewriter and may cause an extraneous character to be recorded. This action effects no further result. Battery from the upper outer make contact of the relay 6S will be connected during the period the relay 5N is operated to the winding of the relay 6SL causing it to operate. Since the relay 5N is operated from the relay 6J the operating battery for the relay 6SL will not be removed until after the relay 6J has released. When the relay 6J is released a locking path will be provided for the relay 6SL through the lower back contact of the relay 6J. Operation of the relay 6SL will remove battery from the winding of the relay 6K to prevent its operation at any later time. The lower outer make contact of the relay 6SL will also apply 24-volt battery to the idle indicator relay, but this battery had been previously applied by relay 6S when the plug was inserted in the jack.

The director ready pulse is not of sufficient duration to cause the relay 5B to operate to its contact 54.

Consequently the response of the central office to the director ready signal is to continue a marking condition over the conductor 131. This conductor is at this time extended through the windings of relays 21H and 21G and causes these relays to move to their marking position. This was previously referred to wherein it was stated that the marking signal has an effect on the relay 21H. The consequence of this operation of the relay 21H to marking condition is to close the conductor 142 to the conductor 145 which completes the path for operation of the relay 13J from ground on 13B, back contact of relay 13N over conductor 142, make contact of relay 21F, marking contact of relay 21H, conductor 145, back contact of relay 13J3, winding of relay 13J, back contact of relay 13K to battery. The operation of relay 13J, if relay 13C is operated and locked as it should be, places ground on the conductors 146, 138 and 147.

The ground on the conductor 146 serves to instruct the miscellaneous alarm circuit to extend the time allowed for the director to function; ground on the conductor 138 serves to inform the miscellaneous alarm circuit that in case of failure the director circuit is not responsible; ground on the conductor 147 will instruct the miscellaneous alarm circuit in case of failure to complete a call to take the particular trunk being used out of service only so long as the marking signal is received from the distant office.

The release of relay 21C as previously set forth caused the release of relay 13A in the course of sending the director ready signal and the release of the relay 13A opened the operating path of the relay 13F which remains locked up. The conductor 130 which extends to the sequence circuit is connected through the winding of the relay 13C to the left-hand contact of the relay 13P1. The release of relay 13A also extends ground through the operated contact of the relay 13F to the conductor 137 which extends to the miscellaneous alarm circuit, said ground being at the lower contact of relay 13A. Conductor 137 remains grounded from one source or another during the entire time that the director circuit is in use and the reason for obtaining these grounds from various sources as will be apparent later is that when the director circuit, if and when it does, is placed in a stuck condition, telltale lamp indications will be available. In any case the miscellaneous alarm circuit is informed during the total time that the director is off normal.

*The central office operator sends line selecting signals*

One object achieved by the present system is the use of a single selector (with a spare) for establishing connections to desired subscribers' lines with arrangements and equipment whereby the selector is seized and utilized for only the brief time required to select the desired subscriber's line whereupon the selector itself and all auxiliary equipment and relays cooperating therewith to perform the desired selection are freed from the circuit and are available to set up other circuits. The selector with its driving motor together with the necessary equipment which cooperates with it to select the desired subscriber's line constitutes a relatively large item of expense both from the standpoint of original production and maintenance from which it is obvious that important features of the invention comprise the organizations of parts by which the selector is utilized for a minimum amount of time in establishing each communication path to a subscriber.

Circuit conditions have now been set up as set forth in the part of the foregoing description relating to calls from a central office by which the operator may now proceed to establish a connection to the desired subscriber's line by means of permutation code whereupon the selective equipment utilized in establishing the call consisting of the apparatus of Figs. 13, 14, 15 and 21 will be released for service on other calls.

By observing the extinguishing of the cord lamp associated with the plug of the calling cord the operator is informed that the satellite office circuits are conditioned to receive the call directing permutation code impulses and proceeds to transmit the necessary code combinations. Inasmuch as subscribers' lines are usually designated by number, it is advantageous to use numerical designations and to this end the operator first transmits the figures or upper case combination followed by the numerical designation of the subscriber's line.

Telegraph pulses received from the operator are transmitted by the relay 4R of the trunk repeater over the conductor 131 to operate the relay 21H. See Fig. 36. Relay 21H has signal ground on its armature and functions to extend this ground to the receiving cam contacts when it is operated to its marking contact. Relay 21G has telegraph ground on its armature and is used for operating the start magnet 21S when on its spacing contact. Relays 21H and 21G will be operated to their marking condition normally. The receipt of the start pulse will operate the relay 21G to its spacing contact which actuates the start magnet 21S and causes the distributor cam to rotate for one revolution. During this revolution the contacts connected to the conductors D11, D22, D33, D44 and D55 are made and broken in sequence. Also during this revolution the relay 21H is operated in unison with the received pulses. Battery is present on the conductor 143, being supplied by the relay 13B as previously stated, and combinations of relays R1 to R5 (Fig. 14) are operated. When the rotating cam reaches the sixth or stop position SP, ground is extended over the conductor 144 to cause relays in the director circuit to function and prepare the selection relays R1 to R5 for the reception of the next code combination. At the conclusion of the code combination the relay 21G operates to its marking contact, opens the circuit for the magnet 21S and causes it to latch the clutch. Teletypewriter code combinations are received in the same manner.

In the director circuit the relays R1 to R5 are set up in the following manner. If the code combination received contains a marking signal in the first element of the combination momentary ground on the conductor D11 causes the operation of the relay R1 which locks to ground on its own contact and causes the operation of the relays D1 and E1. Similarly the marking element for the second code combination causes the operation of the relays R2, D2 and E2; the third element of the relays R3, D3 and E3; the fourth code element of the relays R4 and D4; and the fifth code element of the operation of relays R5 and D5. During the stop pulse following the transmission of a character the conductor 144 is momentarily grounded which operates the relay R6 and discharges the condenser connected to ground from its winding. When the momentary ground is removed from the conductor 144 the charging current for the condenser keeps the relay R6 operated for about 0.03 second longer. In operating the relay R6 connects ground to the winding of the relay 14J and operates the relay 14J over a path from battery through its upper winding, back contact of relay 13M through the armature of relay R6 to ground. The operation of relay 14J removes the direct battery connections to the relays D1, D2, D3, D4, D5, E1, E2 and E3 and replaces it with battery through the lower winding of the relay 14J and also applies battery to the relay 14J1. This replacement of battery has no effect upon the relays to which it is connected at this time. When the relay R6 finally releases, ground on its armature is connected to the relay 14J1 which causes that relay to operate. In operating the relay 14J1 removes from circuit a resistance 14R which is in series with the bias windings of the relay R1 to R5 which causes an increased biased current and results in the release of any of the relays R1 to R5 that have operated. The release of these relays is followed by the release of any of the associated relays D1 to D5, inclusive, and E1 to E3, inclusive, that have operated and also the release of the relay 14J which is being held operated on its lower winding, which also causes the release of the relay 14J1, returning the code combination registration portion of the circuit to normal.

It is proper to mention at this point that although certain code combinations used in the present system perform certain specified functions, these are selected merely as a matter of convenience or to conform to standard practice. Those skilled in the art will understand that other code combinations might be used. Code reversals might be effected at one point or another in the system to produce image codes. Codes other than five-unit codes might be used, for example, six-unit codes, etc., all such changes or code reversals being well understood by those skilled in the art.

Upon receiving the director ready signal the operator first transmits the figures combination and then two digits representing the subscriber's line.

We digress at this moment to the trunk circuit and note that the opening of the ring lead in the cord connected to the jack 60 (Fig. 6) caused by the operation of the sending contacts of the operator's teletypewriter opens a locking path through the upper winding of the relay 6TO which causes it to release. Since the relay 6LT remains locked over a contact on the relay 6S, the tip or supervisory lead from the cord circuit through the winding of the relay 6T remains connected to ground at the upper back contact of the relay 6J. The reapplication of ground to the tip lead will cause the operation of a certain relay in the cord circuit to relight the supervisory lamp in the cord circuit associated with the plug of the cord connected to the jack 60.

Returning to the director circuit the reception of the figures character causes the operation of the relays R1, D1, E1, R2, D2, E2, R4, D4, R5 and D5. As soon as the relay R5 operates, a short-circuiting ground is removed from the winding of the slow operating relay 14F which causes it to operate from battery furnished by the relay 13B over conductor 143. Meantime the relay R6 is operated over a path closed by the stop segment SP (Fig. 21) and as previously stated it remains operated for an additional .03 second. During its operation it had caused the operation of the relay 14J which had prepared a path for the operation of the relay 14J1. The relay 14F is slow in operating and the armature of the relay R6 will be on its left-hand contact before the contacts of the relay 14F close. When the relay 14F operates it removes the holding ground from the relays 13F, 13C and 13J. This holding ground for these relays extends over conductor 143 to the back contact of relay 14F and back to ground over conductor 142 over a contact of relay 13B. The relays 13C and 13F release but the relay 13J continues operated and remains operated if a marking signal is being received in the associated receiving distributor. Relay 13J remains operated from ground on the armature of relay 21H, conductor 145, back contact of relay 13J3 and the operating winding of relay 13J to battery on a back contact of relay 13K. Whether the relay 13J remains operated or not the conductor 137 continues to be grounded over an operated contact on the relay 14F. When the relay R6 finally releases at the conclusion of its additional holding time of .03 second it causes the operation of the relay 14J1 which results in the release of all the relays operated in registering the figures character. At the same time the relay R6 causes the operation of the relay 13K over a path from battery through the upper winding of the relay 13K, a back contact of the relay 13L, a front contact of the relay 14F, right-hand contact of relay R6, back contact of relay 13R to ground. The operation of the relay 13K functions:

(1) To lock itself to ground furnished by the relay 14F on the make contact thereof;

(2) Removes battery from the winding of the relay 13J causing that relay to release if it has not already done so; and (3) Prepares a path for the operation of the relay 13L.

The circuit is now in condition to accept and translate the next two permutation code combinations as the called subscriber's number.

The subscribers' lines are numbered numerically and it is assumed the operator's machine will transmit certaincombinations which upon upper case represent certain numbers. A certain standard type of machine is assumed to be used in which figures are represented on the upper case by certain code combinations in accordance with the following table. The table shows the particular relay condition of the relays R1 to R5, inclusive, set up to represent given combinations used. In the relay column a small *x* indicates the operated condition of that relay and the blank indicates the unoperated condition.

| Character | | Relay condition | | | | |
|---|---|---|---|---|---|---|
| Lower case | Upper case | R1 | R2 | R3 | R4 | R5 |
| Letters | Figures | x | x | – | x | x |
| P | 0 | – | x | x | – | x |
| Q | 1 | x | x | x | – | x |
| W | 2 | x | x | – | – | x |
| E | 3 | x | – | – | – | – |
| R | 4 | – | x | – | x | – |
| T | 5 | – | – | – | – | x |
| Y | 6 | x | – | x | – | x |
| U | 7 | x | x | x | – | – |
| I | 8 | – | x | x | – | – |
| O | 9 | – | – | – | x | x |

Upon the reception of the code elements of the first digit of the subscriber's number the relay R6 again operates and is held operated for an additional period of .03 second. In operating on this occasion the relay R6 causes the operation of relay 14J as before and also causes the operation of the relay 13L over a path from battery through the upper winding of the relay 13L, back contact of relay 13M, a make contact of the now operated relay 13K, armature of relay R6, back contact of relay 13R to ground. The relay 13L locks up to ground on the path over the make contact of the relay 14F. Meantime, while the relay R6 remains operated it furnishes ground to the armature of the relay D5 over a path through a back contact of relay 13LU, a back contact of relay 13R, a back contact of relay 14N, a back contact of relay 13M, a front contact of relay 13K, armature of relay R6 and ground on relay 13B. This ground is extended by means of the fanning out conductors over the operated or non-operated pulse registering relays D1 to D5 and E1 and E2 to a relay 15H, there being a relay 15H for each group of ten subscribers' lines or a fraction thereof. If we assume the first digit is "zero," relays R2, R3 and R5 will be operated and relays R1 and R4 unoperated which will extend the ground to the winding of the left-hand relay 15H of Fig. 15. This relay which corresponds to the "tens" group of the particular called subscriber's line operates and locks in series with the relay 15KO to off-normal ground furnished by the relay 13B. In operating the relay 15KO removes battery from the operating windings of all other relays 15H which prevents the operation of another relay 15H on this call and at the same time it causes the operation of the relays 15K1 and 15K2 which definitely removes the relay 15H from the conductors extending to the fanning out leads 150. The relay 15KO closes the ground lead 118A from relay 17D to the director circuit. The function of closing conductor 118 by relay 15KO is to prevent false operation in case of the operator using first an imposssible number (one that operates no relay 15H) followed by other numbers which would operate a relay 15H. It prevents this otherwise possible false operation. The relay 13L in operating prepares a path for the operation of the relay 13M. When the relay R6 releases, relay 14J releases, as described before and causes the release of all the operated registering relays and at the same time causes the relay 13M to operate. The operation of the relay 13M is over the path prepared by the relay 13L which extends from battery through the winding of the relay 13M over the back contact of the relay 13N, make contact of relay 13L, make contact of relay 14F, armature of relay R6 to ground. In operating the relay 13M functions:

(1) To open the path for the operation of the relay 14J preventing its further operation on this call;

(2) Locks to ground on the relay 14F;

(3) Prepares a path for the operation of the relay 13N;

(4) Connects off-normal ground to the conductor 151 which supplies an additional ground to the relays 12H and 12H1 in the sequence circuit and other relays therein to fix the trunk advance chain and to prevent the release of any link circuit in use on an established call; and also (5) At the same time connects ground over a contact of the relay 14F to a contact of the particular relay 15H (0) to (9) which is operated, thereby causing the operation of the relays 15H1 and 15H2 associated with the particular tens group of the called subscriber's line, in this case the upper relays 15H and 15H1.

In operating relays 15H1 and 15H2 connect the fanning out conductors 150 to the magnets 2H of the particular group of ten subscribers' lines, wherein the called subscriber's line is located, over conductors 152.

The path for operation of the relays 15H1 and 15H2 extends from battery to the windings of these relays over a make contact of the associated operated relay 15H (in this case the left-hand relay, Fig. 15), through a back contact of relay 15T3, a conductor 153, the second armature of relay 13M to ground on a make contact of relay 14F. The fanning out conductors 150 are now connected to the conductors 152 extending to the magnets 2H of the group of subscriber lines wherein the desired subscriber line is included.

The connection to ground of conductor 151 may be traced from conductor 151 in Fig. 12 through to Fig. 13 and over the make contact of the third armature of relay 13M, through a key RLS (in Fig. 13 adjacent relay 13LU), through a back contact of relay 13LU to off-normal ground.

The second digit of a subscriber's number is now transmitted. If we assume that the second digit is "zero" the same combination is set up on the combination registering relays and at the end thereof the relay R6 operates while the stop segment SP is grounded and causes the operation of the relay 13N. The relay 13N in operating functions:

(1) To disconnect ground from the conductor 142 extending to the distributor circuit so that if additional pulses of any kind are received in the receiving distributor no information is sent to or recorded in the director circuit;

(2) Locks under control of the relay 13B; and (3) Prepares a path for the operation of the relay 14N.

When the relay R6 releases it causes the operation of the relay 14N over the make contact of the relay 13N and make contacts of relays 13L and 14F and contact of relay R6 to off-normal ground on a back contact of relay 13R.

The operation of relay 14N functions:

(1) To connect battery through windings of the relays 13X and 13Y over back contacts of relays 13R and 13LU and through the fanning out circuit to the conductor 152 extending through the magnet 2H of the called subscriber line;

(2) Causes the operation of the slow acting relay 13N2; and (3) Causes the operation of the relay 14N1.

The relay 14N1 together with contacts of other relays, whose operation has already been mentioned, is concerned primarily with the illumination of certain telltale lamps indicating the progress of a call if and when a director is timed out and placed in a stuck condition. A detailed analysis of the functions and information given by these telltale lamps is included elsewhere. After the reception of the second digit the relays 14J and 14J1 do not function and the registration of the called line or whatever registration is set up in the director remains locked therein until the director is restored to normal.

The preparatory code combination "Figures" removes the short-circuit from relay 14F and operates relay 14K; the first line selecting code combination causes the operation of relays 13L and 13M; the second and last selecting code (with two-digit selection) operates relay 13N; after the operation of this relay further selecting codes sent by the operator or introduced spuriously as a result of line hits or otherwise are not recorded and do not disturb the selection already made; not until the relay 13B releases and restores the director circuit to normal can it function again in response to received selecting codes; this part of the system therefore includes means responsive to a preparatory code (upper case) and counting means for counting off the appropriate number of selecting codes and then closing a gate as it were to lock further non-desired codes out.

*Testing subscriber line*

The connection of battery through the relays 13X and 13Y to the particular called line as previously indicated enables these two relays to determine if the conductor 152 extending to the subscriber's line is terminated in a direct ground or no ground or a ground through 1300 ohms which is used for an out-of-order indication. In case no ground is available neither relay 13X nor 13Y operates. This test for a ground takes place during the slow operating time of the relay 13N2 which begins to operate when the relay 14N operates. As soon as the relay 13N2 operates the off-normal ground from the contact of the relay 13B is connected to the armature of the relay 13X. Assuming that the called line is idle in which case no ground is connected to the particular conductor 152 the relay 13X will not be operated and ground connected to its armature by the relay 13N2 will cause the operation of the relay 13R over a path from battery, through the winding of the relay 13R, back contact of relay 13A, back contact of relay 13X, front contact of relay 13N2 to off-normal ground. The relay 13R in operating functions:

(1) To disconnect the relays 13X and 13Y from the conductor 152 of the called subscriber's line and replace them by a connection to the relay 13S;

(2) To cause the release of the relay 14N by removing ground from the armature of relay R6; and (3) To prepare a path for the operation of the relay 13G.

The release of the relay 14N causes the relay 13N2 to release slowly. During the time the relays 14N and 13N2 are releasing, a ground through 20 ohms in the miscellaneous alarm circuit is connected to the relay 13S over conductor 118A and through its winding to the conductor 142 of the called subscriber's line circuit. The circuit is from ground upon the armature of the relay 17D over conductor 118D, contacts of relay 15KO, back contact of relay 14T4, winding of relay 13S, make contact of relay 13R, back contact of relay 13LU, fanning out relays, and thence to the particular conductor 152. Under the assumed condition of the subscriber's line being idle, battery on the magnet 2H causes the relay 13S to operate at the same time keeping the magnet 2H unoperated. When the relay 13N2 releases the off-normal holding ground is connected to the armature of the relay 13S, which being operated, causes the operation of the relay 13S1. The operation of relay 13S1 functions:

(1) To lock itself up to off-normal ground;

(2) To short-circuit the winding of the relay 13S; and (3) To open the operating path of the relay 13G.

When the winding of the relay 13S becomes short-circuited the ground connection through 20 ohms in the miscellaneous alarm circuit connected through the fanning out relays of the director circuit to the conductor 152 of the called subscriber's line will cause the operation in the cross-bar switch link circuit of the magnet 2H which connects the desired subscriber's line to the particular trunk circuit used to establish the call. The trunk circuit will function to release the sequence circuit.

The operation of magnet 2H opens the circuit of line relay 8L of that particular line. This locks out the called subscriber's line from access to the line relay 8L thereof and prevents the closure of the subscriber's line circuit from starting the trunk hunting functions which the closure would start when the subscriber makes a call.

In the trunk circuit the relay 3SL is operated. This results in the operation of the relays 3SL1 and 3SL2. The operation of the relay 3SL1 furnishes a locking ground to the relay 3S2 and removes telegraph ground from the contacts of the relay 4C and also prepares a locking path for relay 3S1 during the time the relay 3SL2 in operating functions:

(1) To place a ground on the conductor 119 to hold the advanced chain in an operated condition;

(2) To help prepare a path for ringing;

(3) To remove battery from the conductor 120 thereby causing the sequence circuit to return to normal; and (4) To transfer that battery to the winding of the relay 3R1.

The sequence circuit will function to remove the ground from the conductor 134 extending to the distributor circuit which will cause the release of the relay 21B therein, which in turn causes the release of the relay 13B in the director circuit. Because the relay 13B, when it releases, removes off-normal battery and off-normal holding ground from practically all the relays in the director circuit it will directly or indirectly cause all operated relays therein to release and return the circuit to normal.

A calling subscriber line which has not been connected to a trunk but is connected to the "all trunks busy circuit" will not test busy but may be selected. This is because the busy test ground is in the trunk circuit.

*Testing subscriber's line in the case of a busy or out-of-order line*

As previously indicated after the registering relays have been operated in accordance with the second digit of the subscriber's number, the relays 13X and 13Y are connected in series by the operation of the relay 14N to the conductor 152 of the called subscriber's line circuit. See Fig. 37. If we assume that the called subscriber's line is busy, a ground is connected to the conductor 152 which causes the operation of both of the relays 13X and 13Y. This ground is through the 20 ohm winding of the relay 3SL of the trunk to which the busy line is connected and is connected to the conductor 152 when magnet 2H of the called line is operated over contacts of the cross-bar switch to the conductor S3, winding of relay 3SL to ground on a make contact of relay 3S1. Therefore, when the relay 13N2 operates the ground connected to the armature of the relay 13X causes the operation of the relay 13N3. The operation of the relay 13N3 functions:

(1) To connect telegraph ground to various points of the relays 13P and 13P1 and associated apparatus;

(2) To prepare a locking path for the relay 13C; and (3) To prepare a locking path for itself under control of the operation of the relay 13J3.

The operation of the relay 13Y removes the short circuit across a resistance 13 for a purpose to be described. The operation of the relay 13X prevents the operation of the relay 13R and the consequential release of the relays 14N, 15H1, 15H2, which ordinarily would have been followed by the release of the relay 13N2. The relays 13X and 13Y, therefore, remain connected to the conductor 152 of the called subscriber's line. The relays 14N, 14N1, 15H1 and 15H2 remain operated resulting in the continued operation of the relay 13N3 over its original path. If we assume that the called subscriber line was out of order instead of busy the 1300 ohm ground connected to the conductor 152 would in that case cause the operation of the relay 13X but not the relay 13Y. The operation would have been the same as described under the busy condition except that the resistance 13 would have remained short-circuited. The application of telegraph ground to the relays 13P and 13P1 and the associated apparatus eventually results in the production of telegraph signals in the form of code combinations representing the letters "K" or "Q" dependent upon whether the resistance 13 is short-circuited or not. The letters "K" and "Q" have been selected for their convenience and their transmission to and receipt by the calling operator's teletypewriter instrument is recognized as indicating a busy or an out-of-order line.

The connection of a 1300 ohm resistance 8 to a line to indicate out-or-order busy is accomplished by a plug in jack 8B which connects the conductor 152 over a contact on jack 8A to ground through resistance 8.

*Production of "K" or "Q" busy or out-of-order signals*

The application of telegraph ground to the 13P and 13P1 relays by the relay 13N3 causes current to flow in the primary winding of the relay 13P through resistance 13 (unless it is short-circuited) and the resistance 13*a* to ground. This current eventually moves the relay 13P to its left contact. Meanwhile a charging current flowing through the secondary winding and a condenser therein prevents the armature of the relay 13P from moving. When the charging current has decreased in value the relay 13P operates to its left contact. Upon operation to the left contact the charge accumulated in the condenser begins to discharge through the secondary winding in a direction tending to keep the relay 13P on its left contact and at the same time the current in the primary winding is reversed, thus flowing in a direction to move the armature of the relay to the right contact. When the condenser is sufficiently discharged the armature of the relay 13P is moved to its right contact. At this point the cycle so far as the relay 13P is concerned is repeated. The presence in or absence of resistance 13 from the circuit determines the time taken by the relay 13P to operate and release and, therefore, determines the frequency of the cycle. With the resistance 13 included the frequency is approximately nine per second. With the resistance 13 short-circuited the frequency is approximately eleven per second. Meantime, of course, telegraph ground has been connected to the winding of the relay 13P1. Current flowing in the lower winding immediately overcomes the biasing current flowing in the upper winding and the relay 13P1 operates to its left contact. Telegraph ground is thereupon connected through the left contact to the winding of the relay 13C and the conductor 130 extending to the two-way trunk circuit and is instrumental in transmitting a marking signal to the manual central office end and in causing the operation of the relay 13C. The relay 13C upon operation locks under control of the relay 13N3 and continues its locking ground through the operated contacts of the relay 14N1 to the conductors 146, 138 and 147 extending to the miscellaneous alarm circuit. The grounding of the conductors 146, 138 and 147 gives notice to the miscellaneous alarm circuit that the director is not responsible for any failure to route the call and that the associated trunk circuit should be taken out of service only so long as the marking signal is received from the distant central office end. Whenever the relay 13P strikes its right contact the condenser 13C1 is discharged to ground. As soon as the armature of relay 13P leaves the right contact the condenser is recharged and causes an increased current to flow in the upper winding of the relay 13P1 which causes its armature to move to its right-hand contact to send a spacing signal out over the conductor 139 to the repeater in the trunk circuit of Fig. 4, which in turn sends a spacing signal to the distant manual end. As soon as the charging current has decreased sufficiently, relay 13P1 again operates to its left contact which causes the termination of the spacing signal. The functioning, therefore, of the relays 13P and 13P1 causes a spacing signal of approximately 0.022 second in length to be transmitted at the distant end at a frequency of approximately nine or eleven cycles, as the case may be. These two frequencies correspond to the transmission of the two telegraph characters "K" or "Q," respectively, and so appear on the teletypewriter at the distant manual end. (A transmission speed of six characters per second is assumed.) When the relay 13Y operates and removes the short circuit around the resistance 13 the relay 13P operates with a frequency of nine per second which transmits "K" characters to the distant end. If the subscriber line is out-of-order and the relay 13Y remains unoperated, the resistance 13 is short-circuited and the relay 13P operates with a frequency of eleven per second causing the transmission of "Q" characters. The operator is thus advised if the line is busy or out-of-order. The effect of these "K" or "Q" characters at the central office is elsewhere discussed.

*Unassigned or impossible number*

If the calling operator should attempt to call a number to which no subscriber line is assigned or impossible number, the director circuit functions as in the case of a proper call. However, when the relay 13S is connected to a conductor 152 and no ground is available on the conductor 152 the relay 13S fails to operate. As a result when the relay 13N2 releases it connects off-normal ground to the relay 13G which causes it to operate. The relay 13G operates and locks and connects telegraph ground to the relays 13P and 13P1. The relays 13P and 13P1 function and produce a sequence of character "Q" signals in the manner previously stated except that in this case the relay 13C locks under control of the relay 13G. Upon receiving either the "K" or "Q" signals the operator disconnects the calling cord plug from the trunk jack at the distant central office. This causes the associated two-way trunk at the line concentrating or satellite office to function to return to normal to release the sequence circuit, which in turn removes ground from the conductor 134 extending to the director circuit. Removal of ground from the conductor 134 causes the release of the relay 21B of the receiving distributor which removes ground from the relay 13B in the director circuit. The release of the relay 13B restores the circuit to normal as previously described.

*Failure of the director circuit to route a call to a called subscriber*

As previously stated, an off-normal ground is continuously kept on the conductor 137 whenever the director circuit is off-normal and applied to various points in the director circuit. This grounding of the conductor 137 gives notice to the miscellaneous alarm circuit that the director circuit is off-normal. It has also been previously mentioned that various contacts on various relays together with the relays 14N1 and 13J3 form a system which, when called upon, will indicate the progress made by the director if the call failed to be routed through the office. The associated miscellaneous alarm circuit is arranged to "time out" in a predetermined maximum time which may be adjusted as desired and in the subsequent description it will be assumed that the maximum time allowed is ten seconds. If other times are selected the intervals herein mentioned must be modified accordingly. The miscellaneous alarm circuit is further arranged so that it will allow two seconds for a director circuit to get off-normal, a total of four seconds for the distributor motor to attain the speed to prove itself able to receive the operator's call signal and a total of ten seconds is allowed for it to complete all its functions. In the analysis that is to follow it will be helpful to remember:

(1) That the grounding of the conductor 137 gives notice to the miscellaneous alarm circuit that the director has reached the off-normal stage and that, therefore, it should be allowed at least two more seconds but not more than four seconds;

(2) That the grounding of the conductor 146 gives notice to the miscellaneous alarm circuit that the distributor motor has attained speed, that a director ready signal has reached the trunk circuit and that a marking signal has been registered in the distributor circuit and that, therefore, the director circuit should be allowed more than four but not more than ten seconds;

(3) That the grounding of the conductors 138 and 147*a* gives notice to the miscellaneous alarm circuit that when the trunk circuit is taken out of service it shall remain out only as long as the marking signal is received from the distant central office end; and (4) That the grounding of the conductor 147 gives notice to the miscellaneous alarm circuit that the director circuit is not responsible for the failure of the call to be routed through the satellite office.

If, therefore, the conductor 147 is grounded at the time the miscellaneous alarm circuit times out, the alarm circuit causes the sequence circuit to release the director by removing ground from the conductor 134 but the director stays in service and is not placed in a stuck condition. When the miscellaneous alarm circuit times out in accordance with a notice served upon it by the director circuit by not grounding the conductor 147 it grounds the conductor 156 which causes the operation of the relay 13J3 which functions:

(1) To lock under control of the release key RLS;

(2) To open the conductor 145 extending to the distributor circuit;

(3) To open the operating path of the relay 13R;

(4) To close the holding circuit of the relay 13N3 if that relay is operated; and (5) To cause the operation of the lock-up relay 13LU.

The opening of the conductor 145, the opening of the operating path of the relay 13R and the locking of the relay 13N3 (if operated) are necessary to maintain the director in the same condition it was when the miscellaneous alarm circuit timed out so as to give a true picture of the condition it was in when it became stuck. The operation of the relay 13LU functions:

(1) To place negative telegraph battery through the resistance 14 upon the conductor 131 to the distributor circuit which causes the distributor circuit to remain in a marking condition without further rotation of the distributor cam;

(2) To open the lead to the armature of the relay D5 thus disconnecting the fanning out circuit;

(3) To lock under control of the director release key RLS and at the same time place ground on the conductor 157 extending to the miscellaneous alarm circuit and to operate the relays 13AL and 13AL1;

(4) To remove ground from the conductor 151 extending to the sequence circuit over a contact of relay 13M, thereby removing the fixation from the trunk chain circuit and permitting the release of any cross-bar link circuits in a position to do so; and (5) To supplement ground on the conductor 134 to the distributor circuit, causing the relays in the distributor and director circuits to remain in a fixed condition.

The operation of the relays 13AL and 13AL1 transfers the ground or grounds connected to the conductor 137 from various places in the director circuit to the lamps A to H. The illumination of the lamps A to H either singly or in various combinations as hereinafter indicated signify to a service attendant the progress the director circuit had made in its failure to route the call that was instrumental in bringing a director into the stuck condition.

It is obvious that the use of part or all of these lamps and the elements which control them, as well as a number of other pieces of equipment, is optional because they are not intended to perform any function essential to the normal operation of the equipment but only to assist in indicating and locating trouble in case some defective operation occurs.

After the miscellaneous alarm circuit has functioned and discovered that the sequence circuit has gone back to normal, ground is placed on the conductor 158 (in Fig. 16) which causes the operation of the transfer relays 15T1, 15T2, 15T3, 14T4, 14T5 and 14T6. The operation of these relays removes the director circuit shown in detail in Figs. 13, 14 and 15 from service and replaces it by director No. 2 which stays in service until ground is removed from the conductor 158.

This is an important feature of the invention from the operating standpoint because the director and distributor are essential to the making of calls to subscribers and their failure would render any further calls to subscribers impossible except by patching up individual subscribers' lines to individual trunks. The director circuit and the distributor circuit, therefore, not only are removed from any established call and become free to route another call immediately, but also become removed from service and replace themselves by a substitute in case of failure to function correctly.

*Significance of tell-tale lamps A to H*

The tell-tale lamps may be illuminated in any one of the following fourteen conditions shown in the table below:

| Lamp | Condition |
|---|---|
| A | 1 |
| B, D | 2 |
| B | 3 |
| C | 4 |
| E, F | 5 |
| F | 6 |
| A, G, H | 7 |
| B, G, H | 8 |
| C, G, H | 9 |
| F, G | 10 |
| D, G | 11 |
| B, E, G | 12 |
| C, E, G | 13 |
| A, G | 14 |

*Condition 1.*—Illumination of lamp A alone indicates that the distributor motor has failed to attain speed. If it attains the proper speed the relays 21B, 21E, 21F and 13B should have operated. The failure of any of these relays to operate indicates an investigation of its operating path.

*Condition 2.*—Illumination of lamps B and D indicates that the director circuit has originated a "director ready signal" but that the signal failed to reach the winding of the loop repeater associated with the trunk upon which the call was originated and which at this time should have a flashing red lamp associated with it. The lamp 10L will flash when the relay 10BO1 is operated. The circuit for the lamp may be traced from battery through the lamp, contact of the 10BO1, a key 17C to an interrupted ground 171. The relay 10BO1 will be operated because relay 17ST is operated. The circuit may be traced from ground on relay 17ST through contacts of relays 16TM and 16TM1 which are operated because the circuit has timed out, contact of relay 16TK, contact of relay 16K4, lead 162, contact of relay 10AL1 and winding of relay 10BO1. The path used by the director ready signal through the sequence circuit and into the trunk circuit should be investigated.

*Condition 3.*—The illumination of lamp B alone is an indication that the director has originated a "director ready signal" which failed to reach the loop repeater and also that a marking signal received by the trunk and registered in the distributor circuit failed to be registered. In addition to investigating the path used by the "director ready signal" attention should be given to the path used by the marking signal originated in the trunk circuit and sent to the telegraph relay 21H in the distributor circuit.

*Condition 4.*—The illumination of lamp C alone is an indication that the director circuit has transmitted a "director ready signal" which did reach the loop repeater but that the marking signal which is ordinarily received in the distributor circuit from the trunk circuit failed to be registered in the distributor. The path of transmission of this marking signal should be investigated.

*Condition 5.*—The illumination of lamps E and F is an indication that the "figures" telegraph character has been received by the director circuit but the subscriber's number has not been received or registered. This trouble may have occurred because the trunk circuit repeaters were blocked immediately after the figures character was transmitted, thereby preventing the transmission of the subscriber's number. If the trunk is satisfactory it is possible that the operator failed to transmit the subscriber's number. If trunk transmission is satisfactory and the operator did transmit the subscriber's number, the trouble is in the director circuit or the distributor circuit and is due to the inability of these two circuits to decipher and register the telegraph character received.

*Condition 6.*—The illumination of lamp F alone is an indication that the "figures" and the first digit of the subscriber's number have been received and registered but the second digit was not received or registered. The possibilities of trouble in condition 6 are the same as in condition 5.

*Condition 7.*—The illumination of lamps A, G and H is an indication that "figures" and two digits have been registered by the director and that the director has reached the stage at which it tests for ground on the conductor 152 associated with the subscribers' lines. The possibilities are that a relay 15H1 or 15H2 failed to operate but if it had operated either the relay 13N3 or the relay 13R failed to operate. If the relay 13R had operated and locked then the relay 14N failed to release.

*Condition 8.*—The illumination of lamps B, G and H indicates that the relay 13N3 operated but that the character "Q" or character "K" signals failed to reach the loop repeater. If the relay 13N3 had operated the relays 13P and 13P1 should be performing their function of producing character "K" or character "Q" telegraph signals. If these two relays are continuing to produce character signals, the path used by the signals proceeding through the director circuit, the sequence circuit and the trunk circuit requires investigation.

*Condition 9.*—The illumination of lamps C, G and H indicates that the director had reached an out-of-order or busy line and that signals indicating this fact went to the loop repeater. Under ordinary circumstances the director circuit should not have been taken out of service and if it has been taken out of service the failure might be laid to the conductors 138 and 147*a* extending to the relay 16AB controlling relay 16K4.

*Condition 10.*—The illumination of lamps F and G indicates that the relay 13R operated but failed to lock.

*Condition 11.*—The illumination of lamps D and G indicates that the director reached an unassigned or impossible line and the relay 13G failed to operate.

*Condition 12.*—The illumination of the lamps B, E and G is similar to condition 9 with respect to possibilities of trouble.

*Condition 13.*—The illumination of lamps C, E and G indicates the possibilities of trouble similar to that of condition 9.

*Condition 14.*—The illumination of lamps A and G indicates that the director reached an idle line and that sufficient current was transmitted to the magnet 2H of the line but either the link circuit or the trunk circuit, or the trunk sequence circuit, failed to release the director circuit or the director itself was locked up due to false ground.

The service attendant after noting the conditions of the lamps A to M can extinguish them by operating the key AL (Fig. 13) and after clearing the trouble or determining that the trouble has been cleared can return the director No. 1 back into service by operating the key RLS (Fig. 13). The operation of this key causes the release of relays 13LU, 13AL and 13AL1. Release of relay 13LU removes the supplementary ground on conductor 134 which results in the release of the associated distributor circuit and the consequent release of all the operated relays in the director circuit which returns the circuit to normal.

*Ringing called subscriber*

The operator rings by actuating a key (designated RI in Patent 2,024,581) in the cord circuit which will cause the relay designated CR in the cord circuit to operate to connect the circuit of the ringing current reversals through the contacts of the relay CD to the ring of the plug and jack.

If the line corresponding to the number that the operator has called is busy, out-of-order busy, or if no subscriber has been assigned to the number, distinctive signals will be generated as previously stated, that is, character "K" or "Q" signals and repeated over the toll line system comprising conductors 114 to operate relay 5A alternately to its marking and spacing contacts. Because these signals are predominantly marking, relay 6J will remain operated to remove ground from the tip lead of the cord circuit, thus releasing a relay designated CD in the patent to discontinue transmission of ringing pulsations if the operator has already operated the ringing key. In general the operator may operate the ringing key immediately after transmission of the code combinations representing the line of the called subscriber. Operation of the relay 5N as a result of the operation of relay 6J will extend the conductor 114 to the lower winding of the relay 5R and cause it to repeat the "character K" or "character Q" signals to the operator's teletypewriter as an indication that the called line is busy or that there is no such line.

In the trunk circuit at the satellite office the ringing current pulsations are repeated by the relay 4R. This results in the operation of the relays 3R1, 3R2, and 3R3 owing to the operation of the alternating current relay 3R. Whenever the relay 3R3 operates the relay 3R4 operates over a circuit from ground on the back contact on the relay 3SP1, a make contact of relay 3R3, a back contact of relay 3ST1, a make contact of the relay 3SS and a make contact on the relay 3SL2. The operation of the relay 3R4 continues the ground on the back contact on the relay 3ST1 to both windings of the relay 3R5. The operation of relay 3R5 sends ringing pulsations from the source 38 to the tip conductor T of the subscriber line circuit to cause the operation of the bell 1R in the subscriber's set. In the case of a subscriber's toll line such as that of Fig. 1B the lead *s1* extends to lower winding of a relay 7C in the toll line circuit and a primary winding of the relay 3R5 is energized in addition to the secondary winding. Under this condition the relay 3R5 remains unoperated but the relay 7C in the subscriber's toll line circuit operates and that circuit functions to connect a source of ringing current to the conductor of the subscriber's line circuit.

The lead *s1* in Fig. 3 is connected in such case to the lead S in Fig. 7. Each time the lead S is grounded the relay 7C operates to prepare a path for the operation of the relay 7J and to operate relay 7G. When the relay 7G operates the windings of the relays 7D and 7E are transferred from the subscriber's line to a local holding path through the resistance 74 and the contacts of the relay 7H. Because the relay 7D and therefore the relay 7H have not as yet been operated, this local holding path will not be closed. Relay 7G in operating will lock and cause the relay 7J to operate and lock on the lower back contact of the relay 7B. This will operate the relay 7F. Operation of the relay 7F connects the subscriber's line to the source of ringing current 71 connected to the back contact of the relay 7H. The application of this ringing voltage to the line will signal the subscriber in the same way as in the case of the subscriber's local loop.

When current flows in the lead S and the relay 3R5 will not operate because the two windings balance out, therefore ringing current from the trunk circuit cannot be applied to the transmission lead. In either case, therefore, during the ringing period of ringing sent from the central office ringing is connected directly to the called subscriber's line. In the case of long subscribers' loops some of the ringing current, due to mutual conductive capacity, may flow into the windings of a relay 3SP but the relay 4TR, in its normal release position, places a short circuit about some of the resistance in a circuit of the bias winding of the relay 3SP, thereby causing an increase in the bias current sufficient to keep the relay 3SP on its left-hand contact.

*Called subscriber answers*

The called subscriber answers by operating his power switch PS in the manner previously described in connection with the making of a call. In the case of a local line the closing of the power switch closes the subscriber's loop.

In the case of a subscriber's toll line the subscriber acknowledges the ringing signal by closing the power switch PS. This has a similar result, but the operation is more complicated. When ground is removed from the lead S (Fig. 7) at the beginning of each silent interval between ringing the relay 7C will release. The release of relay 7C will cause the relay 7B to operate and close its locking path, will also unlock the relay 7J and release the relay 7F. The release of relay 7F will transfer the subscriber's line from the ringing source 71 to ground through the contacts of the relay 7G and a resistance 72. Although the original operating path on the relay 7B is opened by the relay 7F the relay 7B will remain locked until the relay 7J releases at which time the relay 7B will be energized. The relays 7J and 7B are slow to release. Therefore, before the relay 7B releases, the charge stored in the capacity of the line passed the ground through the resistance 74. Upon the release of the relay 7B ground will be applied through the contacts of the relays 7J and 7C to the winding of the relay 7G. When the relay 7G releases the windings of the relays 7D and 7E will be connected to the line in place of the resistance 74. The action of the relay 7B in delaying the application of a relay 7D and 7E to the line prevents false operation of these relays by a charge left on the line at the cessation of ringing. When the subscriber answers tripping can take place only during the silent intervals between ringing. Application of the local power supply to the subscriber's set causes marking potention to be applied over the line to the windings of the relays 7D and 7E. The relay 7D operates, causes the operation of relay 7H which functions:

(1) To lock itself operated;

(2) To prepare a path from battery through the resistance 73 to operate the supervisory relay 3SP in the two-way trunk circuit;

(3) To prepare a path for holding the relay 7D through the resistance 74;

(4) To open one of the paths to the resistance 7 by means of which the toll line terminating repeater has been held to a spacing condition; and (5) To transfer the conductor which will eventually be connected to the line by the relay 7F from the ringing source to the line side of the terminal repeater relay 71R.

The presence of marking potential to the subscriber's line circuit on the lead T during the entire ringing period will hold the relay 72S of the loop repeater to its marking contact. This results because lead T is connected from the subscriber's line circuit to the two-way trunk circuit in Fig. 3 to a back contact of the relay 3R5, and as previously stated, the relay 3R5 will not be operated, consequently the lead T is connected over the back contact of relay 3R5 to a source of marking potential on the back contact of relay 4TR1. The relay 7E will therefore have no biasing current in its secondary winding and it will be operated by current flowing over the line from the subscriber's station. The operation of the relay 7E will cause the relay 7L to operate, lock and prepare a path for the operation of the relay 7K. The relay 7L will cause the operation of the relay 7C and supplement the marking condition received from the line. The relay 7C will cause the relay 7G to operate which will operate the relay 7J and transfer the windings of the relays 7D and 7E to the local holding path through the resistance 74. Relay 7D will remain operated but the relay 7E will release since the polarity of the local holding path is opposite to that applied from the subscriber's set when in a marking condition and the supplementary marking paths supplied by the relay 7L. The relay 7L will remain locked over a back contact of the relay 7K. The operation of relay 7J will cause that relay to lock under control of the relay 7B and also to operate the relay 7F which will transfer the line side of the line terminating repeater from the path through a resistance 7 by which it had previously been held to spacing condition to the line through the supplementary marking path. The terminal and loop repeaters will be operated to marking because the subscriber's set is in marking condition. The operation of the relay 71R on the loop repeater to marking position causes the relay 7K to operate to close its own locking path, to prepare a path for the operation of the relay 7A and to supplement ground which is holding the relay 7C operated and to release relay 7L. The release of the relay 7L returns the terminating repeater from the supplemental marking path to the line and opens the path by which the relay 7K was originally operated but the relay 7K remains operated over its locking path. The marking condition of the transmission lead in conjunction with the battery path prepared by the relay 7H and closed finally to the ring lead R by the relay 7K will cause the two-way trunk circuit to connect ground to the lead s1. This occurs because the marking potential applied to the transmission lead in connection with a battery potential applied by the 7H relay and closed to the ring lead R causes the relay 3SP to operate to its right-hand contact 37. This causes the operation of the relays 3SP0 and 3SP1. The operation of the relay 3SP1 breaks the path sending ringing current to the subscriber and thus disconnects further ringing. The operation of the relay 3SP1 causes the operation of the relays 4TR, 4TR1 and 4TR2. This arranges the trunk circuit for half-duplex transmission. This causes the operation of the relays 4TR and 4TR1 in which condition they remain during the entire subsequent communication. The operation of the relay 3TR2 as previously described in connection with a call from the subscriber removes current from the bias winding of the relay 3SP thereby causing that relay to remain solidly operated through its right-hand contact 37 during the transmission of telegraph impulses and also places ground through a resistance 38a (150 ohms) over the lead s1 with the subscriber's toll line circuit holding that circuit during the transmission of telegraph pulses.

The grounding of the lead S over the lead s1 energizes the primary winding of the relay 7C and operates the relay 7A. The relay 7A locks over the conductors S and s1 and causes the release of relay 7K. The release of the relay 7K opens the secondary path of the relay 7C and the original operating path of the relay 7A. The relay 7A, upon operating, closes the operating path of the relay 7M which, when operated, continues to maintain the ring lead R closed after the relay 7K has released. The relay 7M locks under the control of the relay 7H. These relays remain operated by the ground applied over the lead S. Telegraph communication will now take place between the subscriber and the operator or to any other subscriber or circuit beyond the central office to which the operator may connect the subscriber. In the toll line circuit the following relays are operated during telegraph transmission: relays 7A, 7C, 7D, 7F, 7G, 7H, 7J, and 7M. The conductor R supplies battery from a contact of the relay 7H over a contact of relay 7M to control the supervisory relay 3SP of the trunk and relays 7A and 7C are held operated from a ground in the trunk circuit over the conductors S, s1. The lead S remains grounded during teletypewriter communication but will be opened on break signals. The operation when break signals are transmitted will be separately described.

If the subscriber station is unattended and the call is to be completed on an unattended basis the operator at the central office by means of a manual ringing key or otherwise applies ringing current for a period of six seconds or more continuously. The ringing current pulsations in the case of a subscriber's station according to Fig. 1A and according to Fig. 1B pass through the ringer 1R and the alternating current relay 1AC in parallel. The operation of relay 1AC causes the operation of the relay 1D which is a slow-operating relay of any suitable type, for example, a dash-pot relay requiring six seconds to operate. When the relay 1D operates it closes the circuit of the relay 1B which upon operation applies power to start the motor of the teletypewriter and to operate relay 1C. The operation of the relay 1C opens the ground connection of the ringer and in the case of Fig. 1A it connects the tip and ring conductors together through the winding of the line relay 1L and the sending contacts of teletypewriter and at the same time renders the line relay effective to record received and transmitted characters.

In the case of either an attended or unattended communication the teletypewriter may be stopped by transmitting to the station from any connected station a motor stop signal combination which may consist of three combinations, "Figs.," "Blank" and character "H" or any other equally effective combination. For this purpose the teletypewriter is of a type in common use having stop contacts suitable for this purpose. Transmission of such a combination releases the relay 1D and the relay 1C which restores the station to its normal idle condition.

In the case of an attended station the attendant operates the power switch PS to the "on" position which has the same effect as in the case of making a call and at the end of the communication the power switch is operated to the "off" position which releases relays 1D and 1C, thus restoring the set to its normal open condition causing a disconnect signal to appear at the switchboard.

In the case of a station according to Fig. 1B the operation of the relays 1C and 1D have the same general effect except that the transmission conductor, after passing through the contact of the relay 1C and the line relay 1L, terminates at the negative terminal of the rectifier 1A through which the path is closed to ground.

Transmission of Telegraph Signals and Break Signals

Circuits are now closed for telegraph transmission on a half duplex basis between the subscriber and the central office operator or the station beyond the central office to which the operator has established a connection by means of the cord circuit. The subscriber's loop (marking condition) begins at the armature of repeater relay 4R and extends over a contact of relay 4TR1 through the winding of relay 4S, over a contact of relay 4TR1 through the winding of relay 4L, over another contact of relay 4TR1, a back contact of relay 3R5, through the link circuit, to the tip T of the subscriber's loop, back over the ring R thereof and through a winding of relay 3SP to ground.

In the spacing condition a normal current of 5 milliamperes flows over the subscriber's loop over a path as follows: negative telegraph battery on the marking contact of relay 4R, through resistance 47 (120 ohms), winding of relay 4S (in shunt to resistance 48, 4400 ohms), lower winding of relay 4S, contact of relay 4TR1, winding of relay 4L, contact of relay 4TR1, back contact of relay 3R5, subscriber's loop, through windings of relay 3SP to ground; a shunt path upon this circuit begins at the upper contact of relay 4TR1, extends through resistance 49, spacing contact of relay 4R, resistance 49a to ground upon an armature of relay 4B1; when the ground on relay 4B1 is opened the path extends through the winding of relay OB (Fig. 3) to ground.

In the case of a toll line subscriber, the circuit extends from the negative terminal of a rectifier 1A through the transmitting contacts and line relay 1L over a contact of relay 1C, front contact of relay 7F, a front contact of relay 7H through repeater relay 71R to battery on the marking or spacing contacts of relay 71S. The circuit is extended through the repeater consisting of relay 72R, 72S, over tip conductor T to marking battery and ground on the contact of relay 4R as traced above. Transmission between the repeaters consisting of the relays 4S and 4R and the repeater consisting of the relays 5S and 5R is on a two-path polar basis through such intermediate line repeaters 5LR of any suitable type as may be included. Transmission to and from the repeater consisting of relays 5R and 5S proceeds over the front contact of relay 6S and the back contact of relay 6T1 into a cord circuit according to Patent 2,024,581 or a suitable equivalent thereof.

As previously stated transmission of telegraph signal impulses has no permanent effect on the trunk circuit. The following relays are operated: 4A, 4B, 4TM to contact 43, 4L to its marking contact, 3SP to contact 37, 3SP0, 3SP1, 4TR, 4TR1, 3TR2, 3SS, 3S1, 3SL, 3SL1 and 3SL2. All relays therein remain operated except the relay 4L which follows teletypewriter pulses but never remains off its right-hand contact long enough to cause the apparatus in the trunk circuit to function. Relay 4L monitors transmission from either direction, i. e., subscriber line and central office trunk, during transmission and during the transmission of a break signal the armature of the relay 4L leaves its right-hand or marking contact long enough (regardless of the source of the break signal) to cause the relay 4TM to operate to its contact 44, thus furnishing ground through the contacts of relay 4B to operate relay 4C. Relay 4C operates and locks under control of relay 4B and independently under the control of the relay 4TM over a contact of relay 4B2 and at the same time removes battery from the winding of the relay 4A, which releases and causes the release of the relay 4B. Upon releasing, the relay 4B connects the secondary winding of the relay 4TM to the left or spacing contact of the relay 4L which causes the relay 4TM to quickly reoperate to its contact 43. The reoperation of the relay 4TM to its contact 43 causes the release of slow-release relay 4C which releases after an interval and reapplies operating battery to the relay 4A which does not reoperate during the break. With the relay 4TM on its contact 43 and the relays 4A, 4B and 4C released, the conditions established remain fixed as long as the relay 4L remains on its spacing contact, i. e., as long as the break signal continues. Meanwhile the release of the relay 4B connects ground through a make contact of the relay 4TR which causes the operation of the relay 4B1 and removal of ground from the relay 3SS causes it to release. The operation of the relay 4B1 functions:

(1) To remove telegraph ground from the spacing contact of the repeater relay 4R;

(2) To help prepare a path for the operation of the relay 4PR;

(3) To connect the winding of the relay 4B2 to the left-hand contact of the relay 3SP; and (4) To cause the release of the relay 3TR2.

The release of the relay 3SS with the relay 3S1 remaining operated causes the operation of the relay 3S2 and removes a short circuit from the resistance 45 which is in series with the secondary winding of the relay 4TM. The resistance 45 slows up the charging of any condenser or condensers connected through the lower winding of relay 4TM, i. e., condenser 40, during any time relay 3SS happens to be released; if relay 4L should leave its spacing contact for an instant for any reason. The remaining contacts of the relay 3SS perform no useful function at this time. Assuming for the moment that the relay 4L had been operated as a result of the transmission of a break signal from the central office, the removal of telegraph ground from the spacing contact of the relay 4R of the loop repeater causes a relay OB (central office break) to operate, and at the same time changes the potentiometers on the loop repeater so that the spacing current flowing in the subscriber's loop is changed from the usual 5 milliamperes to 10 milliamperes; by substituting the path through the winding of relay OB plus resistance (total 135 ohms) for the ground on relay 4B1.

The marking current supplied to the subscriber line proceeds from battery, marking contact of relay 4R, a contact of relay 4TR1, lower winding of relay 4S and thence ultimately out over the tip T of the subscriber line; there is no shunt to ground on this path except through high resistance 48. The normal spacing current supplied to the subscriber line (5 milliamperes) is from the same battery, resistance 47, upper winding of relay 4S, lower winding of relay 4S, thence ultimately out over the tip T. Normally there is a shunt on this path from the lower terminal of the lower winding of relay 4S, a contact of relay 4TR1, resistance 49, armature and spacing contact of relay 4R, resistance 49A, and ground on a back contact of relay 4B1. Under the condition that a break signal is coming from the central office operator this ground on a contact of relay 4B1 is removed and replaced by a higher resistance ground through a resistance and the winding of relay OB which increases the potential applied to the tip T of the subscriber line and causes the increased current of 10 milliamperes as stated above. This increased current holds supervisory relay 3SP more certainly on its contact 37 and enables it to determine more accurately if and when the subscriber disconnects. Except for this change of loop current plus the change from parallel to series of windings of relay 3SP a double break condition would reduce the loop current to the order of 2.5 milliamperes or less; a current value which could be distinguished by relay 3SP from zero current or from possible earth currents of small value only with difficulty unless the relay 3SP were of an unusually expensive design.

The operation of the relay OB together with the release of relay 3TR2 functions:

(1) To place the primary and secondary windings of the relay 3SP in series instead of in parallel;

(2) To cause a reduced bias current in the tertiary winding in the relay 3SP; and (3) To remove the ground (in the case of a toll line circuit) connected to the toll line circuit over the conductor *s1*.

Removal of the ground on the conductor *s1* in the case of an interconnected toll line circuit causes the toll line circuit to examine the subscriber's toll line for evidence of a disconnect signal. This will be discussed. During teletypewriter signaling the relays 1A, 1C, 1D, 1F, 1G, 1H and 1J will be operated. Battery will be applied to the conductor R over contact of relay 1H. When a break signal opens the conductor S connected over conductor *s1* into the trunk circuit, the relays 1A, 1C will release. The release of relay 1C operates relay 1B which releases relay 1J. The release of relay 1J releases relay 1F which transfers the line from a terminal repeater to the discharge resistance 14. By the time the line has been discharged, the relay 1B releases and short-circuits the winding of the relay 1G. The release of relay 1G transfers the line from the resistance 14 to the windings of the line testing relays 1D and 1E. If the break signal has originated from the central office end, the normal condition will be applied from the subscriber's set to the line. This polarity will be opposite to that applied to the relays 1D and 1E by the local holding path through the resistance 1. The reversal of current will release and reoperate the relay 1D, but the time interval during which it is closed on its back contact will be so short that the subscriber's station will be in the proper direction to tend to operate the relay 7E. Since the relay 72S of the loop repeater will be in the spacing position a biasing current will flow in the secondary winding of the relay 7E. This biasing current will be sufficiently great to prevent the operation of the relay 7E. When the break signal ends and relay 72S of the loop repeater returns to marking, this biasing current will be reduced to zero and the relay 7E will therefore operate to cause the relay 7L to operate. The operation of the relay 72S in the marking condition will repeat the marking condition to the sending relay 71S and the break relay 71BR of the line terminating repeater. Since the relay 71R of the line terminating repeater has been and is held in spacing position by the released condition of the relay 7F, a spacing condition will now be repeated back to the relay 72R of the loop repeater. This reversal will take place so quickly that the relay 72R will be in spacing position before the relay 7L has become fully operated. Thus the relay 7K is prevented from operating immediately after the operation of the relay 7L. The relay 7K will eventually operate after the relays 7C, 7G, 7J and 7F have operated in sequence and a marking condition has been repeated from the subscriber's line by the loop and terminal repeaters upon operation of the relay 7F. This delay in the operation of the relay 72R of the loop repeater to marking position assures that the relay 7L is firmly held before the relay 7K operates. The operation of the relay 7G will return the test relays to the local holding path of the relay 7H and the relay 7E will release. Relay 7K locks, releases the relay 7L and prepares a path for the operation of the relay 7A. In this condition, after a break signal and subsequent resumption of communication, ground will be returned to the conductor S upon establishment of the marking condition in both directions. When this occurs the relay 7A will be operated and release the relay 7K with the result previously described under the reception of a ringing signal by the subscriber and communication may be resumed. During the time the resistance 74 or the windings of the relays 7D and 7E are connected to the line, full spacing current will not flow through the subscriber's set. It will be sufficient, however, to indicate that a break signal is intended. During the period beginning with the receipt of the original break signal ending with the release of the relay 7F, full spacing current will flow to the subscriber's set under the influence of the terminal repeater. This will be sufficient to insure the operation of the locking element of the subscriber's teletypewriter which indicates a break signal.

Under the condition that the break signal has originated from the subscriber it may be assumed that the repeaters in the trunk circuit will be in a marking condition. The spacing condition placed on the line side of the line terminating repeater by the relays 7F and 7H cause the subscriber's break signal to be extended to the two-way trunk circuit. Spacing polarity supplied over the line from the subscriber holds the relay 7D operated. Since this spacing current is neutralized in relay 7E by the local holding current, relay 7E will not operate. When the break is ended and the subscriber's set reverses the line current the relay 7D will release and immediately reoperate and will not release the relay 7H. The relay 7E will now be operated on the marking current to operate and lock the relay 7L. Further operation of the relays will take place in the manner described in discussing a break signal from the central office and communication may be resumed.

In the two-way trunk circuit the break signal originated by the subscriber does not cause the relay OB to operate because the relay 4R of the trunk repeater is on its marking contact. The relay 3SP remains connected to the ring conductor R of the subscriber's loop with its primary and secondary windings in parallel and a maximum bias current flowing in its tertiary winding. In either case, since we have assumed transmission of a break as the reason why the armature of the relay 4L moved to its left-hand contact, the relay 3SP will remain on its right-hand contact. If it should temporarily reach its left-hand contact during the line current interruptions incident to the operation of the relay OB long enough to operate the relay 4B2, the relay 4B2 in operating will lock under control of the relays 4PR and 4D5. The relay 4B2 upon operation functions:

(1) To cause the relay 4B3 to operate over a circuit from ground on the right-hand contact 37 of the relay 3SP when the armature returns to that contact; and (2) To open the operating path of the relay 4TM which, however, does not release as it is now connected to another operating path on the front contact of the relay 4B3.

Relay 4B2 upon operation also transfers the lead from contact 44 of the relay 4TM (the armature of which is on the contact 43) from the winding of the relay 4A to the secondary or lower winding of the relay 4D. This prepares a path for operation of relay 4D which would operate under a disconnect condition when relay 4TM returns to contact 44 but does not operate under this break condition because relay 4B2 will have been released before relay 4TM reaches contact 44 again, as hereinafter stated. Regardless of whether the relay 3SP had returned to its left contact long enough to operate the relay 4B2 the relay 4TM, under the assumed condition of transmission of the break signal, does not have an opportunity to permit its armature to operate to contact 44 and the circuit remains fixed in this condition until the conclusion of a break signal. This is because the bias path is closed to ground on a front contact of relay 4B3.

*Resumption of transmission to trunk circuit after break signal*

The trunk circuit awaits the termination of the break signal which, regardless of the origin of the break, has caused the operation of the relay 4L to its left contact. If the break originated in the central office the termination of the break operates also the relay 4R of the repeater to the marking position. The operation of the relay 4L to its right or marking contact immediately causes the paralysis relay 4PR to operate over a path in parallel with the subscriber's loop circuit. This path extends from the marking contact of relay R4 over an obvious but circuitous path to ground over the marking contact of relay 4L. Relay 4PR locks under control of the relay 4B1 and thereby maintains a separate path in parallel with the subscriber's telegraph loop. If the subscriber should start the transmission of telegraph pulses immediately after termination of the break signal such pulses will not be transmitted to the distant manual office since this parallel path formed by the winding of relay 4PR in series with a resistance will hold the relay 4S to its marking contact. Transmission to the central office is therefore suspended so long as this supplementary path is kept in parallel with the subscriber's loop. This prevention of transmission is maintained for a definite time interval, as described hereinafter, to the end that a special testing circuit incorporated in the trunk terminating circuit at the distant manual end and designed to detect a special disconnect signal sent from the trunk circuit at the concentrating unit does not confuse the resumption of transmission following the break signal with a disconnect signal (the testing operation of the trunk circuit at the central office is discussed elsewhere) when the armature of the relay 4L operated away from its left contact. Upon the assumption that the relays 4B2 and 4B3 did not operate, the relay 4TM after an interval of approximately 0.3 second operates to its contact 44. If the relays 4B2 and 4B3 had operated, the operation of the relay 4PR would also have caused the release of the relay 4B2. The release of the relay 4B2 reconnects the conductor leading from the contact 44 of the relay 4TM back to the winding of the relay 4A and reconnects the secondary winding of the relay 4TM back to the left contact of the relay 4L, at the same time causing the release of the relay 4B3. Since the relay 4B3 is slow release it finally removes ground from the secondary winding of the relay 4TM and permits it, after an interval, timed by condensers 40 and 42 to operate to contact 44. Thus, the relay 4TM moves to contact 44 either approximately 0.3 second after the operation of the relay 4L to its right contact or after a slightly longer period, the difference being accounted for by the release of the relays 4B2 and 4B3. In either case, ground on the contact 44 of relay 4TM causes reoperation of the relay 4A. As previously described, relay 4A locks and connects the winding of the relay 4TM to the right contact of relay 4L which causes a speedy reoperation of the relay 4TM to its contact 43. This in turn causes the operation of the relay 4B which causes the operation of the relay 3SS in the manner described under the heading "Operator answers a call" and this causes the release of the relay 4B1. The operation of the relay 3SS short-circuits the resistance 45 in series with the winding of relay 4TM and causes the relay 3S2 to release which brings that portion of the circuit back to the condition in which it was prior to the transmission of the break signal. The release of the relay 4B1 applies direct ground through the 120 ohm resistance connected to the spacing contact of the repeater relay 4R, removes the winding of the relay 4B2 from connection with the contact of the relay 3SP, and causes the relay 3TR2 to reoperate; and, meanwhile opens the parallel path which was used for disabling the transmission during the period following the break signal, thereby causing the release of the relay 4PR. The operation of the relay 3TR2 removes the bias current from the tertiary winding of the relay 3SP and reconnects ground through a resistance to the lead *s1* to the toll subscriber's line circuit to continue to hold the latter circuit during further transmission of the telegraph pulses. Upon reapplication of ground upon a back contact of released relay 4B1 through resistance to the spacing contact of the loop repeater 4R, 5 milliamperes will flow during subsequent spacing intervals. The circuit is thus returned to the same condition in which it was prior to the transmission of the break signal.

*Central office trunk during transmission*

In the central office trunk circuit the relay 5B has a condenser resistance system associated with its winding so designed that it will not release when the relay 5A remains off its marking contact for less than 0.140 second. Current in the upper winding of relay 5B moves its contact to the contact 53 and the normal bias current in the lower winding tends to move it to contact 54. Normal telegraph transmission for which this system is designed involves no consecutive combination of spacing signals exceeding over 0.140 second. Break signals do exceed 0.140 second and disconnection by the subscriber also involves a spacing condition longer than 0.140 second. In such a case the relay 5B operates to its contact 54 and with relays 5D and 6SL operated this causes the operation of the relay 5F. The relay 5F in operating locks under control of the spacing contact of the relay 5A and causes the operation of the relay 5E in the locking path. The operation of the relay 5E causes the reoperation of relay 5B to contact 53 and this causes the operation of a relay 5G which locks under control of the relays 5C and 5E. Operation of relay 5G removes one of the condensers from the timing circuit of relay 5B and shortens its timing period. Consequently for as long a time as a space signal is being transmitted, the relay 5A is on its spacing contact, relays 5E and 5F are locked in series with that spacing contact and the relay 5E holds the relay 5B on its contact 53. In a manner elsewhere described, the line concentrating unit determines that the spacing signal being transmitted is not a result of the subscriber sending a disconnect signal to the trunk circuit at the satellite office and will permit the break signal to persist but moreover at the completion of that break signal will insure that the first three-tenths of a second of the following marking signal remains uninterrupted. As soon as that marking signal is received at the central manual TWX office the relay 5A operates to its marking contact and causes the release of the relays 5E and 5F. The release of the relay 5E causes the release of the relay 5B to its contact 54 after approximately 0.2 second and causes the operation of the relay 5Q. The relay 5Q locks in its operated position under control of the relays 5G and 5C and opens the operating and locking path for the relay 5G. The relay 5G upon releasing releases the relay 5Q and at the same time reconnects the secondary winding of the relay 5B to a marking contact of the relay 5A. The relays 5E, 5F, 5G and 5Q are now released and the circuit is in the same condition as prior to the reception of the break signal. Thus the uninterrupted marking condition of 0.3 second insures that the central office trunk termination recognizes the break signal as such.

*False disconnect*

If the central office operator erroneously removes the cord from jack 60, the relay 6S releases and in releasing it connects battery on the back contact of its upper armature through a front contact of the relay 6P to the winding of the false disconnect relay 6FD which causes it to operate and at the same time connects marking battery toward the satellite station.

This marking battery (positive) is connected over a front contact of the relay 6P to the conductor 115. The operating path of the relay 6U is closed except at a contact of the relay 6FD which prevents the relay 6U from operating. The relay 6FD connects ground interrupted 120 times per minute to the winding of the relay 6L which causes its armature to vibrate rapidly and in turn to flash the answering lamp ANS 120 times per minute. The operator observes this flashing lamp and reinserts the cord in the jack which under this condition causes the relay 6S to reoperate, release the relay 6FD and to extinguish the flashing lamp ANS.

*Disconnect*

To disconnect, the subscriber restores the power switch S. This stops the teletypewriter motor, releases the relay 1C reconnects the ringer 1R to ground and relay 1A to the line. In the case of an unattended station a stop signal from the switchboard opens the teletypewriter contacts, unlocks the relay 1B, stops the teletypewriter, and releases the relay 1C, which sends the same kind of disconnect signal to the central office.

In the case of a toll subscriber the direct current path of the line is opened at the subscriber set. The line terminating repeater recognizes this as a spacing signal and repeats the break to the two-way trunk circuit. The test relays 7D and 7E will be connected to the line in accordance with a sequence of operations previously discussed under break signals. Because no current is supplied over the line, relay 7D will release and short-circuit the winding of the relay 7H which releases and removes battery from the local holding path on the relays 7D and 7E and also removes battery from a conductor R which has the same effect in the two-way trunk circuit as in the case of the disconnect signal over a simple loop.

If the break signal has originated in or beyond the trunk circuit the relay 7D will be held by the current supplied from the subscriber's line. At any time during this condition the subscriber may disconnect by opening the direct current path of the line. This featutre is provided in order that the subscriber's disconnect signal may be recorded at the central office even though a failure of the transmission path beyond that office may have caused the break to be sent to the subscriber.

The effect of the subscriber disconnect signal on the trunk circuit while either a spacing or marking signal is being received from the central office is to produce the same operation of the trunk circuit as the reception of the break signal from the subscriber. In fact, until the relay 3SP has definitely determined that the change of current flow is the result of a subscriber disconnect signal, the trunk operates in the same manner as though a break signal is being transmitted. As previously indicated, the relay 4L operates to its left contact, and relay 4TM operates to its contact 44. The relay 4C operates and releases the relays 4A and 4B. Relay 4B causes the operation of relay 4B1, the quick reoperation of the relay 4TM to its contact 43 and the release of relay 3SS which causes the operation of the relay 3S2. The relay 4TM on contact 43 causes the relay 4C to release slowly and the operation of the relay 4B1 connects the winding of the relay 4B2 to the left contact of the relay 3SP, causes the release of the relay 3TR2 and reconnects a source of potential to the bias winding of the relay 3SP. Relay 3SP, therefore, has the primary and secondary windings connected in parallel to the ring conductor R. If the complication of simultaneous reception of a space or break signal from the central office happened the relay OB operates and places the primary and secondary windings of relays 3SP in series. In either case the relay 3SP operates to its contact 39 under the influence of its bias winding and causes the operation of the relay 4B2. The relay 4B2 opens the path to the spacing contact of the relay 4L of the lower winding of the relay 4TM, connects the relay 4B3 to the right contact of relay 3SP, but since the relay 3SP remains on contact 39 during the subscriber's release condition the relay 4B3 does not operate. If this condition prevails for 0.3 second (timed by condensers 40 and 42) then relay 4TM operates to contact 44. From this it follows that the relay 4TM determines the time that the relay 3SP has remained off its right contact and if this time exceeds 0.3 second, relay 4TM operates to its contact 44. The operation of relay 4TM to contact 44 causes the operation of the relay 4D which:

(1) Operates the relay 4D6;

(2) Opens the transmission disabling path through the winding of relay 4PR;

(3) Connects the winding of the relay 4D2 to contact 43 of the relay 4TM and at the same time locks in series with the relay 4D1 which operates under the control of the relay 4D4 from battery on the operated relay 4D6.

The operation of relay 4D6 removes battery from the relay 3SP1 thus preventing its reoperation in case the subscriber should, after a short period, again close the line and cause the reoperation of the relay 3SP to contact 37. Relay 4D6 also opens the transmitting conductor 114 extending toward the central office. The relay 4D1 transfers the winding of the relay 4B3 to a contact of relay 4D2 and causes the relay 4B3 to operate; it also opens the holding circuit for the relays 4TR and 4TR1. These two relays together release and return the transmission circuit of the trunk to the full duplex transmission condition. The operation of the relay 4D6 assures the sending of an open signal to the distant central office in case the transmission of the signal was blocked due to the reception of a spacing signal from a distant central office. This is necessary in order to guarantee that a special testing circuit at the distant central office will respond to the open signal sent to it and thus prepare itself for the reception of a special disconnect signal originated in the trunk circuit at the satellite office. Meanwhile the operation of the relay 4B3 has reapplied ground to the secondary winding of the relay 4TM and caused it to move to contact 43. This caused the operation of the relay 4D2 which:

(1) Locks under control of the relay 4D5;

(2) Causes the operation of the slow release relay 4D3;

(3) Opens the circuit of the relay 4B3 and causes its release;

(4) Places supplementary capacity 41 in the charging circuit of the relay 4TM; and (5) Removes the secondary winding of the relay 4D from contact 44 and connects operating winding of the relay 4D4 to the contact 44 of the relay 4TM.

When the slow release relay 4B3 releases, the relay 4TM, after an interval, operates to contact 44 causing the operation of the relay 4D4. Condenser 41 lengthens the supplemental break which precedes the short marking disconnect signal. The relay 4D4 locks in series with the relay 4D5, operates that relay, furnishes a supplementary path to hold relay 4D6, and causes the release of the relays 4D and 4D1. The operation of the relay 4D5 connects marking telegraph potential through the resistance 46 over the contact of the relay 4D6 to the conductor 114 extending to the manual central office and meanwhile removes ground permitting the relay 4D2 to release which releases the relay 4D3 and consequently the relays 4D5 and 4D4. During the interval of the release of the relays 4D2 and 4D3 a short marking pulse has been transmitted to the manual central office as a disconnect signal. The operation of the relay 4D5 has meanwhile caused the release of the relay 4D2 which again connects the secondary winding of the relay 4TM to the left-hand contact of the relay 4L. The release of the relay 4D4 at the same time causes the release of the relay 4D6 which removes battery from the locking winding of the relay 4D, reapplies battery to the winding of the relay 3SP1 and closes the conductor 114 extending to the manual office back to the armature of the associated loop repeater 4S. The original break signal having been received at a satellite trunk, positively retransmitted to the central office, directly followed by a supplementary break timed by the operation of the relay 4D1, the release of the relay 4D3 and release of relay 4TM having been followed by the pulse of marking current obtained from contacts of the relay 4D5, measured by the release of the relays 4D2 and 4D3, has sent a disconnect signal to the distant central office and the circuit now awaits the withdrawal of the cord plug by the operator. Ordinarily a marking condition exists on the line from the central office when a subscriber disnects. Because the relay 4L is held to its right contact in such case, relay 4TM does not operate to its contact 43 when the relay 4B2 releases. Ground from contact 44 of relay 4TM causes the relay 4A to operate which in turn causes the relay 4TM to operate to contact 43. The relay 4TM operates relay 4B and thereafter the relay 4TM is held on contact 43 by the relay 4L until a disconnect signal is sent from the manual office. If, however, a satellite subscriber has disconnected during the period when a trouble condition exists in a line to which the satellite subscriber is connected beyond the manual central office or from such a line a break signal is being received relay 4L will be held on its left or spacing contact 44 when relay 4B2 releases. The relay 4B2 under this condition closes a path to operate both the relays 4A and 4TM but the relay 4TM is the quicker in operating and the operating path of the relay 4A is broken before it has had time to operate. Before the final disconnect signal has been sent from the manual office the relay 4L may or may not be operated to its right contact. In case it is not operated the circuit remains in the condition described until the final portion of the disconnect signal is received. If the relay 4L is operated to its right contact momentarily, the same action will take place as if the marking condition from the central office had caused the relay 4L to be operated to its right contact when the relay 4B2 released. The disconnect permission signal from the central office for disconnecting the link circuit is in the form of a spacing signal or continuance of the spacing signal followed by ringing pulses. The spacing condition is of sufficient duration to release the relays 4A and 4B by the action of the relays 3TM and 4C in case they have not already been released. The release of the relays 4B causes the release of relay 3SS which causes the relay 3S2 to operate. The ringing pulse from the central office causes the operation and release of the relay 4R of the repeater and results in the operation of the relays 3R, 3R1 and 3R2, the release of relay 3R1 and the operation of relay 3R3. The operation of the relay 3R3 causes the release of the relay 3S1 which removes the ground from the relay 3SL.

This releases the link circuit and opens the operating path on the relay 3S2 which remains locked. The link circuit will release unless supplementary ground is placed on relay 3SL by the conductor 103. This conductor 103 is grounded in the sequence circuit by the armature of a relay 12H whenever a call is being routed through the office in either direction so as to prevent the release of any cross-bar switch apparatus while another call is being routed. If the conductor 103 is not grounded, the relay 3SL will release and at the same time release the link circuit. This causes the release of the relay 3SL1 and in turn the release of the relay 3SL2 and 3S2. During the release time of the relay 3S2, telegraph ground on relay 3SL1 is connected through the operated contacts of the relays 3R3 and 3S2 to the relay 4S of the repeater causing it to send a spurt of marking current to the central office where it is identified as evidence that the apparatus at the satellite office has disconnected the trunk from the subscriber's line. This is used by the trunk circuit at the central office to discontinue ringing current being sent to the satellite office and also to remove the busy indication and change the position of the first idle trunk indicating lamp. Removal of the ring current causes the release of the relays 3R, 3R2 and 3R3 which restores the satellite trunk termination to normal. Furthermore, the release of the relay 3SL2 removes ground from the conductor 119 extending into the sequence circuit thereby restoring the released trunk into the sequence chain by causing the associated relay 10CH to release. With the release of the advance chain and with the removal of the busy condition applied to the trunk at the distant manual (TWX office) end, the trunk equipment is brought to normal and is available for a new call in either direction.

At any time after a disconnect signal has been sent by the subscriber, and before the distant operator has disconnected, the subscriber can place a recall condition on the circuit by closing a direct current path to the line. In the toll subscriber's line circuit this will cause operation of the relays 7D and 7E as previously described and the closure of the lead R by the relay 7H will cause the two-way trunk circuit to transmit a recall signal over the trunk to the manual central office in a manner similar to that which occurs in case of a simple subscriber's loop. The operation in the satellite trunk will be clear when it is remembered that after the subscriber has disconnected the relay 4D6 operates and opens the conductor from the satellite office toward the central office. If the subscriber closes his power switch subsequent to the operation of the relay 4D6 the trunk at the satellite office proceeds to operate as though a disconnect signal had been transmitted and sends a disconnect signal to the distant manual office. During the interval the subscriber has thrown his power switch to cause the operation of the relays 3SP and 3SP0. The relay 4D6, however, was operated for which reason the relay 3SP1 does not operate and the trunk is therefore not changed to the half duplex transmission basis. After the disconnect signal has been sent the relay 4D6 releases, thus permitting the operation of the relay 3SP1. If a marking signal is being received from the central office, relay 3SP1 operates and causes the relays 4TR, 4TR1 and 3TR2 to operate which changes the transmission to a half duplex basis under which the closure of the subscriber's loop sends a marking signal to the distant manual office. At the manual office this marking signal is recognized as a recall signal and will result in an appropriate indication to the operator.

*Effect of recall at the central office*

It has been pointed out that in the case of break signals followed by resumption of communication the first three-tenths of the following marking signal arriving at the central office remains uninterrupted and this enables the central office to identify the break signal and function accordingly. If, however, the operator had disconnected, the satellite office, in releasing, sends the central office a disconnect signal which consists of a short marking pulse preceded by a space signal of at least three-tenths of a second. The registration of the spacing signal is exactly as described hereinbefore. Relays 5D and 5G are operated. When the short marking impulse arrives at the central office the relay 5A operates to its marking contact, causes the release of relays 5E and 5F and causes the relay 5B to begin to release to contact 54. However, before the relay 5B has released to contact 54, relay 5A has closed again to its spacing contact and caused the reholding of the relay 5B on its contact 54 for a further period. The release of relay 5F has caused the operation of the relay 5H. The operation of the relay 5H causes it to lock under control of the relay 5C until relay 5C releases and at the same time opens the locking path for the relay 5C. The operating path for 5H is from battery on the armature of relay 5A, space contact of 5A, back contact of 5F, winding of 5H, back contact of 5Q, front contact of 5G, to ground. Relay 5H also applies battery through the upper winding of the relay 5B thereby preventing it from operating to its contact 54. Relay 5C releases and causes the release of the relays 5D and 5G and also the opening of the operating winding of the relay 6P, which, however, stays operated a little while under the control of the slow release relay 6J which the relay 5C also released. The release of the relay 6J completes the release of relay 6P and supplements the holding battery for the relay 6SL which had been supplied over a contact of the relay 6P. The release of the relay 6J connects ground to tip conductor which extends into the cord circuit and registers a disconnect or release signal in the form of a lighted cord lamp in the cord circuit. Thus the short marking pulse following the measured break is recognized as a disconnect signal. At this time the central office continues to send the marking condition from the cord circuit out to the satellite office and the spacing condition continues to be received from the satellite office. The relays 6S, 6SL and 6LT remain operated.

If the subscriber recalls by reclosing his power switch before the operator removes the cord from the jack the trunk circuit at the satellite office sends a marking signal to the central office as previously described which causes the operation of the relay 5A to its marking contact to cause the operation of the relay 6J. Relay 6J removes the ground from the tip of the jack of the associated cord circuit to function to cause a flashing recall signal to appear before the operator. The same marking signal received from the satellite office operates relay 5B to contact 54 to cause relay 5C to reoperate over contacts of 5H, 5D, 6S4, and 5J1, which causes relays 5E and 6P to operate, which after a time reoperates the relay 5B to its contact 53 to cause the reoperation of a relay 5D and the release of the relay 5E. The central office trunk circuit is now again in a normal transmitting condition.

*Disconnect by subscriber and break by subscriber discriminated*

In the central office end of the trunk during transmission relays 6S, 6J, 5N, 6SL are operated; 6K and 6L are released; 5C, 6P, 5B to contact 53 and 5D are operated.

As previously stated a break or disconnect condition originating with a subscriber conditions conductor or channel 114 to spacing; relay 5A moves to spacing, relay 5B moves to contact 54 after about 0.3 second, relay 5F operates and operates relay 5E whereupon relay 5B moves to contact 53 immediately; 5G operates and locks under control of 5C and 5E and removes a timing condenser from the operating circuit of relay 5B which shortens its time to 0.2 second. When a marking condition on path 114 is resumed relays 5C and 5E release and condition the relay 5B to begin to move to contact 54. In the case of a break this movement is completed because the marking is over 0.3 second but in the case of a disconnect the marking pulse sent over the contact of relay 4D6 is short, hence relay 5B does not finish its movement before relay 5H operates upon release of relay 5F. The operation of relay 5H sets into operation a train of events described above which leads to a disconnect indication whereas if the marking condition had been long enough to permit relay 5B to close its contact 54 (which it would have been in the case of a break) the relay 5Q would have operated and relay 5H could not have operated.

Therefore, the sequence of space followed by marking of over 0.3 second is distinguished from the sequence of break, marking of very short duration (under 0.2 second) and break by the relay system at the central office and especially by relay 5B which may be called a break-disconnect discriminator.

If the subscriber does not recall the disconnect condition properly remains before the operator and if she has no occasion to rering the subscriber the operator will disconnect by removing the cord plug from the jack 60. This causes the release of the relay 6S which functions:

(1) To cause the release of the relay 6LT;

(2) To cause the operation of the relay 6U over the back contact of a relay 6FD and front contacts of the relay 6SL; and (3) To apply battery through the secondary winding of the relay 6S to the sleeve of the jack as a busy indication.

The relay 6U in operating removes negative potential, which was connected through the resistance 67, to the non-grounded side of condenser 6D and connects positive battery through the resistance 68 to the non-grounded side of condenser 6D in parallel with positive battery through resistance 63. This causes the condenser 6D to charge to the striking voltage of the trigger tube 64 in approximately 0.7 second. When the tube 64 reaches the striking voltage, a discharge occurs from the left-hand element of the tube over the central element to cause the operation of the relay 6M which in turn causes the operation of the relay 6M1. In passing it is noted that the tube 64 is a cold electrode trigger tube containing a certain amount of gas and three electrodes; such type of tube is well known and in common use. Arrangements of similar function employing high vacuum tubes have been devised and are preferred as being somewhat more accurate in timing. The relay 6M1 operates:

(1) To lock under control of the relay 6U;

(2) To open up the operating winding of the relay 6M thereby opening its own operating winding and removing battery from the central electrode of the tube 64; and (3) To connect ringing current under the control of the relays 6U and 6M1 to the back contact of the relay 6S to be sent over the trunk conductor system 125 to the satellite office.

As previously explained the effect of this ringing current received after a spacing signal is to disconnect the switches which had been holding the subscriber's line to the trunk circuit. In the act of disconnecting, as also previously explained, the circuit at the satellite office sends a short marking signal to the central manual office. This marking signal causes the relay 5A to operate to its marking contact and in so doing causes the momentary operation of the relay 6J. The operation of relay 6J removes the holding battery for the relay 6SL which in turn opens the operating winding on the relay 6U which caused it to release and to release the relay 6M1. All relays in the trunk circuit at the central office are now returned to normal.

*Operator rerings subscriber*

After the subscriber has disconnected and the satellite end of the trunk has sent a supplementary break signal and a special disconnect signal to the central TWX office the circuit awaits disconnection by the operator of the cord circuit from the jack associated with the trunk. In the satellite trunk a marking signal sent from the central office is being received and the following relays are operated: 4L to its right or marking contact 4TM to contact 43, 4A, 4B, 3SS, 3S1, 3SL, 3SL1, and 3SL2. The operator may rering the subscriber by operating the ringing key which transmits ringing current to the satellite office thereby causing the relay 4R of the repeater to operate and release thereby causing the operation of the relays 3R, 3R1 and 3R2, release of the relay 3R1 and finally the operation of the relay 3R3. The relay 3R3 closes the path to send ringing current to the subscriber as previously indicated under the heading "Ringing called subscriber" and the subscriber in reanswering causes the apparatus to function as stated under the heading "Called subscriber answers."

*Subscriber disconnects before operator answers*

If the subscriber disconnects before his line circuit has selected a trunk for him the trunk circuit is not affected since it is not moved off normal. If the subscriber disconnects after the two-way trunk circuit has been selected, but before his line circuit is connected to the trunk, the sequence circuit removes ground from the start conductor 109 of the associated trunk. Removal of ground from the conductor 109 will prevent the relay 3ST from operating if it has not already operated. The release of the sequence circuit causes the advance trunk chain to function and to remove ground from the conductor 110 of the trunk which causes the release of the relay 3ST if it has operated and a discontinuance of the marking signal being sent to the distant central office. The relays of the advance trunk chain portion of the sequence circuit operate, but they do not lock since no ground is available on the conductor 119 because the relay 3SL2 is released. The trunk at the central office is arranged to continue sending a ringing current, if its sending has already been commenced, for a period of five seconds after the discontinuance of the calling-in signal from the satellite office. This is designed to permit the calling subscriber to flash a distant operator since the ringing current sent from the central office is designed to hold the subscriber's circuit to the trunk during such flashing, as previously described in detail. When the ringing is discontinued at the central office the busy condition at the central office is removed. The effect of sending these ringing currents has been nullified in the satellite end of the trunk because the relay 3ST is released which has removed battery from the relay 3R1 or if the relay 3R1 has operated the unoperated condition of the relay 3ST1 has prevented the operation of the relay 3R3 from having any effect. When the ringing current ceases to arrive the relays 3R2 and 3R3 are released, if they are operated, which returns the trunk circuit at the satellite office to normal. If the subscriber disconnects after his line has been connected to the trunk circuit, but before the operator answers, relay 3SP moves to its left contact which releases the relays 3SP0 and 3SP1. The release of relay 3SP1 discontinues the marking signal being sent to the distant central office. The distant central office continues to send ringing pulsations but the calling-in signal at that office on this trunk is extinguished. After five seconds the ringing pulsations cease which causes the release of the relays 3R2 and 3R3. The release of the relay 3R3 removes ground from the relay 3SL which releases the relays 3SL1 and 3SL2 and the relay 3ST1. If no ground is now available on the conductor 103 in the sequence circuit, the release of the trunk is complete and all operated relays in the trunk return to normal. If the conductor 103 is grounded the sleeve relay 3SL does not release and the cross-bar link circuit does not release but these elements do release upon the removal of the ground from conductor 103.

Condenser 42 protects the circuit in the idle condition against line hits which might cause relay 4L to leave its spacing contact.

*Loop transmission and supervision conditions*

The elements involved in loop transmission and supervision from a transmission standpoint are:

(1) The trunk repeater 5LR;

(2) The trunk loop repeater consisting of relays 4R and 4S;

(3) The trunk terminating circuit consisting of relays 4L, 3SP, OB, two pairs of contacts on relay 4B1 and relay 4TR and 4TR1;

(4) A loop assumed to be of a resistance of 150 ohms for each wire with an assumed leakance from wire to wire equivalent to 50,000 ohms and including the subscriber's relay 1L, sending and breaking contacts, shunt resistances therearound, and resistance 1T and 8D.

For telegraph transmission it is necessary to have two conditions in the form of mark signals and space signals. For supervisory purposes in the past there has been used in some systems a third condition often obtained by grounding one side of the loop as a disconnect condition and using a differential relay at the central office to indicate this condition. In the present system this third condition is obtained on a wholly metallic basis so that ground potentials at the subscriber's station may not interfere with proper operation. To this end, instead of using closed loop and open loop, respectively, for marking and spacing as has often been done, for example 20 milliamperes for marking and zero current for spacing with a bias current on the polar relay of 10 milliamperes and an equal number of turns in the biasing and operating windings, there are employed in the present system 25 milliamperes for marking and 5 milliamperes for spacing with a bias current of 15 milliamperes which produces the same transmission results but leaves 5 milliamperes flowing in the spacing condition to indicate a closed loop and hold the supervisory relay 3SP. As a break signal in telegraph transmission the spacing condition is used and could be used in the present case except that if break signals present in the loop due to a break being sent from each end at the same time each of them would be producing a condition adapted to reduce the curdent to 5 milliamperes with a rough approximation of a net result of 2.5 milliamperes for which the relay 3SP could not be economically designed. Consequently, for the establishment of a break signal condition in the subscriber loop the system is designed to produce a current of 10 milliamperes and the combined result of two simultaneous breaks will not reduce the current much below 5 milliamperes.

All loops are padded to be of equal resistance within a close approximation and the circuits of the subscriber toll line stations are padded to simulate this average loop. For explanatory purposes a loop having a resistance of 300 ohms will be assumed, that is 150 ohms in each conductor. With this assumption the resistance 1T is adjusted to 1600 ohms, a value which is selected in view of wave-shaping requirements. The subscriber's relay 1L is assumed to be of a resistance of 136 ohms. A total loop resistance of 3,736 ohms (from jack 8A to jack 8B), within close limits, is assumed to make up this value, the resistance 8D is adjusted to 1,700 ohms. With these assumptions proper operating conditions are achieved whether the leakage resistance is assumed to be 50,000 ohms or whether it increases to infinity. The windings of the relay 3SP are the upper or primary, middle or secondary and lower, otherwise identified as the biasing or tertiary. The primary and secondary windings are of 285 ohms each, the bias winding 3,230 ohms. The resistance 1F shunting the subscriber's break key has a value of 6,600 ohms, and the resistance 1G shunting the sending contacts at the subscriber's station is 18,700 ohms. The resistances of the windings of relay 4S are 136 ohms each, and of relay 4R are 85 ohms each. In series with each transmission battery lead is a protection resistance of 120 ohms; and biasing circuits are provided with suitable adjustable resistances to give the desired value of bias current. The line winding of relay 4L has a resistance of 220 ohms.

Typical approximate current conditions will be outlined. With a marking condition in the subscriber loop, current of approximately 15 milliamperes in the bias winding tending to hold it to spacing condition is overcome by current of approximately 23 to 25 milliamperes dependent on leakage, in the line winding holding it to marking condition. The 25 milliamperes through the line winding of the subscriber relay 1L overcomes the bias current of 15 milliamperes and holds that relay in marking condition.

When a transmission circuit is established, the repeater 5LR, which merely typifies the general case of one or more trunk repeaters, is so conditioned with respect to the repeating relay 4R and 4S and the relays 5R and 5S and the relay 5A as to maintain the relay 4S in marking position and the relay 4R in marking position.

A spacing signal from the subscriber is produced by opening the sending contacts. In this condition the current in the line winding of relay 4S is reduced to 5 milliamperes and the bias current is increased to 18 milliamperes. The relay 4S moves to spacing position, the subscriber line relay 1L moves to spacing position. The relay 3SP which received 25 milliamperes in marking condition now receives only 5 milliamperes which is sufficient to hold it to contact 3T. The current in that relay of repeater 5LR which is connected in the conductor 114 adjacent the satellite office falls to zero and the bias current moves it to spacing position. The spacing signal from the subscriber holds the relay 4R in marking condition and if the incoming path 125 moves to spacing condition during such time, this will have no effect on the relay 4R even though the current in its line winding is reduced to zero.

The spacing condition of the conductor 125 from the central office reduces the line current in the winding of relay 4R to zero and the bias current moves the relay armature to spacing position. Under this condition, relay 4S has a current in its biasing winding of 43 milliamperes and additional current in its line winding both holding it to marking and it, therefore, remains in marking condition. This application of a large marking current is an anti-kick condition which prevents loop capacity from causing this relay to be impulsed off its marking contact. The subscriber relay has the current in its line winding reduced to 5 milliamperes which moves it to spacing position.

The subscriber breaks by opening his break key and the line windings of the subscriber relay 1L and the relay 4S receive approximately 10 milliamperes tending to move them to marking position but this is about 5 milliamperes less than the current in their bias windings tending to move them to spacing position and both move to spacing position. Because quick relay action is not necessary, a full differential of 10 milliamperes is not required.

On a break condition received over conductor 125 the relay 4R moves to spacing position. After a short interval the relays 4B1 and OB operate. The relay 4S stays in marking position but the subscriber relay 1L receives a line current of 8 milliamperes only against its normal bias current of 15 milliamperes which moves it to spacing position and registers the break.

The requirements of a break signal are that if a spacing signal longer than the length of the maximum code space signal is produced at either end of the transmission system against transmission from the other end, a spacing signal will be transmitted to the end transmitting without interference with the transmission from the transmitting end. These conditions are fulfilled when the subscriber breaks because the relay 4R will go to marking condition and the break will be applied to the conductor 114 and no signals on the receiving conductor 125 can affect the relay 4R. Likewise, on a break signal from the central office, the relay 4S will be held in marking condition and no interruptions in the subscriber loop can affect it. Hence, the loop is held definitely to the spacing position because the relay 4R is held spacing.

A double break condition can arise only if the trunk line breaks first because, as stated, if the relay 4S moves to spacing, the relay 4R is held marking. In consequence, the relay 4R must first be moved to spacing condition and then the subscriber break key is operated. In this condition the subscriber relay receives about 2 to 4 milliamperes in the line winding, depending on line leakage conditions, and moves to spacing but about 4 milliamperes is available to hold the relay 3SP.

The operation of the relay 3SP will now be discussed. The primary is 5,850 turns, the secondary 4,500 turns, the tertiary 4,000 turns. When the trunk is first connected to a subscriber loop about 25 milliamperes flow in the primary and secondary windings of relay 3SP in parallel. The bias winding is open because the relay 3TR2 is operated. The relay 4TR operates only during ringing and need not be considered under this condition. The relay 3SP is consequently held to contact 37 during transmission and break.

Under the idle condition, current of 10 milliamperes holds the relay 3SP to contact 39. The relay 3SP is adjusted so that it will operate to contact 37 on 0.7 milliampere with the primary and secondary windings in series. In the tertiary winding it will operate on 1.4 milliamperes. Consequently, during the idle condition it is held to contact 39 but in the marking condition it is held to contact 37. Under a spacing condition from the subscriber or a spacing condition from the central office it is held to contact 37 as it is also held by a break from the subscriber and a break from the central office. Under the double break condition, the current in the line windings of the relay 3SP is reduced but sufficient is still available to hold it against the bias in the biasing winding.

Under the disconnect condition, the relay 3SP moves to contact 39 but before it moves the relay 4S goes to spacing condition and current in the line winding of relay 3SP falls to between 2 and 3 milliamperes which would be ample to hold it with no bias current. However, when the relay 4B1 operates and causes the relay 3TR2 to release, a bias current of 6 milliamperes flows in the bias winding of relay 3SP which overpowers the line current and moves it to contact 39.

A further conditions is the paralysis condition, that is, that in which the subscriber cannot transmit to the central office for a short period of time following a break signal. At the termination of a break the relay 4PR is connected to ground and its effect is to prevent signals from the subscriber loop passing into the conductor 114 until the termination of the break is registered at the central office at which time the relay 4PR is disconnected. Under this condition the relay 4S is definitely held in marking position which prevents signals from being repeated to the conductor 114. When the relay 4PR is removed from the circuit, the relay 4S returns to a condition where it is under control of the subscriber's sending contacts and the relay 3SP receives sufficient current in its line windings to hold it to contact 37.

The current values given above are approximate and, moreover, are varied somewhat by leakage conditions within the limits permitting operation.

Summary of Functions of Relays of Subscriber's Toll Line Circuit

The relay 7A is provided to operate when the conductor S is closed at any time after the relay 7K has been operated. When operated, the relay 7A will open the operating and locking path of the relay 7K. This is done to remove the winding of the relay 7K from its connection to the repeater 72R, 72S and to insure that the relay 7K will not be operated when the lead S is opened during break, disconnect or recall periods to introduce the test condition which consists in the connection of the windings of the relays 7D and 7E to the subscriber line.

The relay 7B operates prior to the connection of the test relays 7D and 7E to the subscriber line. Its slow releasing characteristic provides sufficient time to insure that the line has reached the steady state condition prior to testing in order to prevent false operation of test relays.

The relay 7C is the primary control relay for introducing or removing the test relays 7D and 7E. Upon operation of the relay 7C it prepares a path for the operation of relay 7J and causes the relay 7G to operate. Upon release of relay 7C it causes the relay 7B to operate in preparation for the return of the relays 7D and 7E to the line.

The relay 7D, when connected with the line, will operate if telegraph battery is being supplied from the subscriber's station to the line, regardless whether it is marking or spacing. It will release under the test condition when the subscriber's set is idle. The relay 7D must be sensitive in order to operate in a circuit of sufficiently high resistance to permit sending to the subscriber's set of the spacing stimulus. Upon the operation of the relay 7H, when the relays 7C and 7G are operated, the relay 7D will remain operated if it had previously been operated by line current and it will remain released if no line current had previously flowed from the subscriber line.

The relay 7E will be transferred with the relay 7D from the line to the local holding path and vice versa. The relay 7E is polar so that it will operate only when the subscriber's set is in the marking condition and then only when the circuit from the trunk is in the marking condition in the direction toward the subscriber.

The relay 7F operates as the final step in a sequence to connect the terminal repeater 71R, 71S to the line when the test relays have determined that the line from the trunk and the line from the subscriber are in the marking condition. It also closes a path in preparation for the operation of the relay 7B which will be accomplished upon the subsequent release of the relay 7C. Upon release of the relay 7C, the relay 7F will remain operated until the relay 7B is fully operated. The premature release of the relay 7F at such a time would open the original operating path of the relay 7B so that relay 7B might not fully establish a locking path. The release of the relay 7F will also remove the repeater or ringing source from the line of the subscriber in order that the line may be discharged. When this occurs, it is necessary that the relay 7F place a spacing condition on the line side of the repeater to continue a spacing signal toward the trunk, in the event that the spacing signal of break length which caused the relay 7C to release had originated on the subscriber line.

The relay 7G is provided for the function of switching the test relays 7D and 7E to and from the line and the local holding circuit and for the purpose of introducing the discharge resistance 72. This function must be provided upon a relay separate from any other relays because, first, the test relays must be connected to the local holding path before the relay 7F operates to connect the line to the repeater or the ringing current supply upon operation of the relay 7C; second, the test relays must not be reconnected to the line upon release of the relay 7C until after the line has been discharged and has assumed a sufficiently steady state condition.

The relay 7H is provided to control all the circuits dependent upon the relay 7D. When operated it will prepare to repeat supervisory signals from the subscriber line to the two-way trunk circuit over the conductor R, prepare the local holding path for the relay 7D when the relay 7G is subsequently operated and prepare for the connection of the terminal repeater to the line when the relay 7F is operated. When released it will place a spacing holding condition of positive battery to the line side to the terminal repeater to augment that supplied by the relay 7F because relay 7F will be operated during the application of ringing current to the line and the spacing condition must be maintained during those times. When released, the relay 7H will also prepare for the application of ringing current to the line at any time that the relay 7F is operated. The relay 7H is slow release and its releasing path is connected to require the full and persistent release of the relay 7D for the relay 7H to release. This is necessary to insure the continuous operation of the relay 7H even though the operating path of the relay 7D may be interrupted for short intervals.

The relay 7J is slow releasing to delay the release of the relay 7F until the relay 7B becomes adequately magnetized after the release of the relay 7C. This is necessary because the release of the relay 7F will open the original operating path of the relay 7B.

The relay 7K is provided to hold the operating path of relay 7C closed following the operation of the relays 7E and 7L between the operation of the relay 72R to marking position and the closure of the conductor S, *s1* in the trunk circuit at a front contact of the relay 3TR2. Because the relay 7K will release the relay 7L, the relay 7C will be held operated only by the relay 7K during this period. This step in the sequence of operation is necessary to provide a holding path for the relay 7C and yet, nevertheless, to place the holding of the relay 7C under the control of the subscriber and, furthermore, in order that a call by the subscriber may be abandoned during the period just mentioned above, and also in the case when teletypewriter signals indicating "All trunks busy" are being transmitted to the subscriber when all trunks are busy. The relay 7K has been made slightly slow to release so as to hold in an operated position for a sufficient time to insure the complete operation and locking of the relay 7A in case the break contacts of the latter open before the make contacts close. Relay 7K, in operating, will also cause the final closure of the conductor R prepared by the relay 7H.

The relay 7L is provided to prepare the operating path of relay 7K and to operate the relay 7C each time the relay 7E becomes operated. It is necessary to lock the relay 7L operated because when the relay 7G is operated by the relay 7C, this will cause the relay 7E to release and the relay 7L must hold the relay 7C operated until the relays 7J and 7F are operated and the terminal and loop repeaters of Fig. 7 have assumed a marking condition. When this is accomplished, relay 7K will assume control of relay 7C and release the relay 7L. The relay 7L has been made slightly slow to release in order to insure the complete operation of the relay 7K in case its lower back contacts open in advance of the closure of the top front contacts.

The relay 7M is provided to transfer the control of the lead R from the joint action of the relays 7K and 7H after a call has been established. This is done to prevent the lead R from opening to indicate recall signals falsely during break signals. This would be the case if the lead R remained under the control of the relay 7K.

Simultaneous Selection of a Two-Way Trunk by a Calling Subscriber and the Calling Operator If a central office operator seizes a trunk at the same time that a subscriber originates a call which would be routed to the distant central office over the same trunk in the absence of a call from the central office, the trunk equipment sends a marking signal to the central office as a calling-in signal, but the insertion of the plug in the trunk jack 60 at the central office prevents the application of ringing current to the trunk owing to the fact that the relay 6T1 is operated. This ringing current would ordinarily function to connect the subscriber line to the trunk. However, a marking impulse will be sent from the central office end to the satellite office. This marking impulse will function in the same manner as a calling signal from the central office functions to cause the operation of the relays 4L, 4TM, 4A, 4B, 3SS, and 3S1 as described in connection with a call from the central office. The operation of the relay 3SS grounds the chain conductor 123 at its armature which advances the trunk chain portion of the sequence circuit by removing ground from the start conductor 109 by disconnecting it from the conductor 105 at the operated relay 10CH, also removing ground from the conductor 110 and causing the relay 3ST to be released. On the assumption that the subscriber originated his call simultaneously with the origination of a call by the central office and that the sequence circuit is available at the same time the subscriber will have seized the privilege to route his call through the satellite office first. The operation of the advance chain will, therefore, connect a ground to the conductor 109 of the next idle trunk and when a routing has been secured to the central office over the next idle trunk, the sequence circuit is free to handle the call of the operator who had simultaneously seized the first trunk. In simultaneous operation, therefore, the operator receives preference in the use of the seized trunk and the subscriber is connected to the next idle trunk although the routing of his call will take place before the routing of the call from the operator because the subscriber was first to enter the sequence circuit. If the operator plugs into the trunk seized by a calling subscriber at the exact instant that the idle indicating lamp is extinguished but before the calling-in signal appears on the board, the operator in this case also will receive the use of a trunk and the subscriber will be forced to use the next idle trunk by giving prior service in routing his call. In this case, it may be assumed that ringing has already been received in the trunk as a result of the calling-in signal being sent to the central office, but that it had not been received for a long enough time for the link circuit to connect the subscriber's line to the trunk circuit. Consequently, the operation of the relay 3SS as a result of the operator plugging in at the distant end grounds the conductor 109 and causes the advance trunk chain to function and to remove ground from both the conductors 109 and 110 exactly as it did in the case of simultaneous calls. Removal of these two grounds together with the discontinuance of the sending of ringing impulses as a result of the operator inserting the plug of the calling cord into the jack associated with the trunk at the central office releases the relays 3ST, 3R, 3R2, 3R3, and 3ST1 (if operated). If the operator originates a call at any time after the calling-in signal appears or possibly a fraction of a second later and the ringing has been sent from the distant manual office long enough to permit the calling subscriber to be connected to the trunk, then both the calling subscriber and the calling operator are connected together, a fact of which the calling operator will soon become aware. The operator will become aware of this because she will not receive a director ready signal, then she will either challenge thereby contacting the subscriber, or plug into another trunk.

Operator Disconnects Before the Subscriber Answers

If the operator disconnects any time after originating a call before the called subscriber's line is connected to the trunk the open signal received over the conductor 125 causes the relay 4L to operate to its left contact which causes the operation of the relay 4TM, the operation of the relay 4C, the release of the relays 4A and 4B and finally the release of the relay 4C. In consequence, the ground is removed from the conductor 126 which returns the sequence circuit to normal. However, the relay 4C, in operating, connected telegraph ground over a contact of the relay 3SL1 to the conductor 130 which ends a spurt of marking current to a central office. This spurt is effective at the central office to disconnect the source of ringing current and prevent the sending of ringing current which ordinarily would be sent to the satellite office whenever the operator disconnects. The release of the relay 4B in this case releases the relay 3SS and in consequence the relay 3S1 and returns the circuit to normal. If, however, the subscriber's line had been connected to the trunk but the operator at the central office disconnects before the subscriber answers and regardless of whether ringing current had been sent from the central office and had been sent out on the called subscriber's line, removal of the plug from the jack by the central office operator causes the functioning of the relays 4L, 4TM, 4A, 4B and 4C which results in the release of the relay 3SS, but in this case the relay 3S1 locks operated under control of the relay 3R3. The condition of the relay 3S1 being operated and the relay 3SS being unoperated causes the operation of the relay 3S2 which locks under control of the relay 3SL1. After the operator removes the plug at the central office, the trunk circuit at that end waits for a short interval but meanwhile sends a spacing signal and then connects a ringing source to the trunk. This ringing current is received in the satellite office and causes the functioning of the relays 3R, 3R1, 3R2 and 3R3. The operation of the relay 3R3 causes the relay 3S1 to release and removes ground from the winding of relay 3SL. If a supplementary ground is not at this time connected to the relay 3SL over the sleeve relay holding conductor 103 due to another call being routed, this removal of ground would cause the relay 3SL to release and cause the link circuit to disconnect the subscriber's line from the trunk. The release of the relay 3SL causes the release of the relay 3SL1 and 3SL2, the former causing the release of the relay 3S2. During the time the slow release relay 3S2 is releasing, the telegraph ground on the back contact of the relay 3SL over the operated contacts of the relays 3R3 and 3S2 is connected to the repeater relay 4S which in turn sends a marking current to the central office. This marking current signifies to the central office that the subscriber's line has been released and that the ringing current can be disconnected and the busy condition removed from the trunk at that end. If the relay 3SL is held operated due to another call being routed the subscriber's line is not released, the relay 3SL1 does not release and the spurt of marking current is not sent to the central office. Ringing, therefore, continues until this ground on the conductor 103 is removed when the release takes place. Upon discontinuance of the ringing being transmitted from the central office relays 3R1, 3R2 and 3R3 release and restore the circuit to normal.

Operation of All-Trunks-Busy Circuit

In connection with the description of the making of a call by a subscriber, it was pointed out that if all trunks were busy a source of "character K" signals was connected to the conductor 107 thereby sending these signals over the subscriber's line for recording on his teletypewriter as an indication that all the trunks were busy. It was also pointed out that under this busy condition the relay 18ST was operated.

In operating the relay 18ST:

(1) Connects telegraph ground to the relays 18P and 18P1;

(2) Connects telegraph ground to the resistance 18 to complete a potentiometer to obtain potential for spacing current for the character K signals; and (3) Continues the ground on the conductor 106 to the winding of the relay 18C and to the spacing contact of the relay 18B.

Connection of telegraph ground to the winding of the relay 18P causes a current to flow in the primary and secondary windings such that the current in the primary winding tends to operate the relay to its left contact and in the secondary winding to maintain the relay on its right contact. When the charging current flowing through the secondary winding has charged up the condenser 18a the relay operates to its left contact. As soon as the left contact is closed the current is reversed in the primary winding tending to remove the armature to the right contact. The discharge of condenser 18a causes current to flow through the secondary winding to hold the relay for a time to its left contact. When this discharge current has fallen to a sufficiently low value the relay 18P is driven to its right contact under the influence of the reverse current in the primary winding. When the left contact is open the reverse current in the primary winding ceases and the current begins to flow through the secondary and primary windings to cause a repetition of the cycle. Relay 18P, therefore, operates and releases at a rate of about nine cycles per second. Relay 18P1 is normally held to its marking contact under the influence of the current in the lower winding and receives a greatly increased current in the upper winding every time the right-hand contact of relay 18P opens and this increased current is sufficient to move the armature of relay 18P1 to its spacing contact. When this current has decreased to a sufficiently small value the relay 18P1 moves back to its marking contact. The armature of relay 18P1 remains on its spacing contact for approximately 0.022 second and as a result of the action of the relays 18P and 18P1 a pulse of about 0.022 second occurring nine times per second is produced. The resultant current is illustrated diagrammatically in Fig. 18A, and is sent to constitute a start pulse followed by four properly timed marking pulses and a properly timed spacing pulse repeated over and over again. This signal is correctly timed to produce a series of "character K's" on the subscriber teletypewriter. The operation and release of relay 18P1 causes the relays 18K and 18D to follow in unison and it is relay 18K which actually applies the pulses to the conductor 107 and thence to the subscriber's line. It will be noted that the resistances 18b and 18c are so proportioned that the marking impulse is full current and the space pulse is approximately 5 milliamperes.

It will be obvious to those skilled in the art that other signal combinations representing other characters might be generated by a suitable system of relays such as 18P and 18P1 or even a combination of characters could be sent as an all-trunks-busy indication and that the timing should be regulated in accordance with the transmission speed of the teletypewriters used in the system. The timings given are approximate, it being known that teletypewriters function with slight variations of timing of received signal pulses. When the relay 18B follows the relay 18P1, as described, the ground on the conductor 106 is continued to cause the operation of the relay 18C which temporarily locks over the same ground and continues the ground to the armature of the relay 18B. When the armature of the relay 18B moves to its marking contact, it continues the ground on the conductor 106 to the winding of the relay 18D which places ground on the conductor 159, extending to the sequence circuit and through the sequence circuit to the particular calling subscriber's line circuit over contacts of operated relays 9AL1 and 9AL to cause the operation of the relay 8BB which effects the connection of the calling subscriber's line to the conductor 107 over which the character K signals are being transmitted. The operation of the relay 8BB places a ground on the conductor 108 at a front contact of the relay 8BB which holds the relay 18ST of the all-trunks-busy circuit operated independently of the sequence circuit and at the same time relay 8BB dismisses the sequence circuit which in functioning removes the ground from the conductor 106. The dismissal of the sequence circuit is accomplished by the operation of the relay 8BB because the relay 9ST of the line is held operated to ground on the line relay 8L over a contact of the relay 8BB and upon operating the relay 8BB breaks this connection and releases the relay 9ST of that particular line. Consequently although the subscriber may continue to hold his line circuit and maintain his line relay 8L operated, he is locked out of the sequence circuit and continues to receive character K signals until such time as he chooses to disconnect. If by this time the relay 18C and the register relay 18R have operated the removal of the ground will cause the release of the relay 18D and the register relay 18R. The function of the register relay is to count the number of times all trunks have been busy on a subscriber's call. This register may consist of any well-known type of equipment and needs no further description. Relays 18P, 18P1, 18A and 18B continue to function to send character K signals so long as the relay 18ST is held operated by a ground on any subscriber's line at a relay 8BB; the release of the relay 8L of such subscriber's line will disconnect character K signals from the line of that particular subscriber.

When a subscriber calls during the time that all the trunks are busy the ground that is placed on the conductor 106 by the sequence circuit is continued through the operated contact of the relay 18ST to the winding of the relay 18E causing it to operate. The operation of the relay 18E supplements this ground by the ground on its own front contact and insures the operation of the register relay 18R. The register relay upon being operated locks to this ground and causes the release of the relay 18E. The register relay therefore operates only once on one single grounding of the conductor 106. The relay 18E insures the application of ground for a sufficient time to insure the operation of the register relay 18R. If the all-trunks-busy circuit and the line circuit in the sequence circuit function speedily and remove the ground from the conductor 106 before the register relay 18R is operated the relay 18E insures its operation. This ground on the relay 18E is continued to the conductor 106 to prevent the sequence circuit from dealing with another call until relay 18C has released and removed the ground. Consequently, every additional subscriber's line to which character K signals are transmitted by the all-trunks-busy circuit is registered by the registering device operated under control of the relay 18R.

The subscriber may receive a call while his line is connected to the all-trunks-busy circuit because his line will not test busy owing to the non-operation of his relay 2H and his relay 8BB being operated.

Alarms and Substitution of Equipment

In a system of this kind it is essential that the time during which common equipment, such as the sequence circuit, the director, and the distributor circuits, is in use should be reduced to a minimum, as this equipment is used to route all calls through the office and if this equipment is unavailable no call can be routed. To accomplish this definite times have been allotted during which the routing functions must be accomplished and, if they are not accomplished during these times, some trouble must be assumed and the faulty apparatus removed from service and also the attention of the attendants should be called to the fact that these functions have not been accomplished during this time.

The functions that are timed are as follows:

(1) On an outward call from a local subscriber the interval during which the sequence circuit is in use to find a trunk is timed to see that it does not exceed two seconds.

(2) On an inward call to a subscriber the interval during which the sequence circuit is in use to find the director is timed to see that it does not exceed two seconds.

(3) If the trunk gets a director, the interval during which the director gets up to speed, delivers the "director ready signal" and tests, the continuity of the incoming trunk is timed to see that it does not exceed 4½ seconds.

(4) If the director is obtained and found in good order the interval during which the director completes selection is timed to see that it does not exceed ten seconds. This includes the time taken up by the operator at the central office switchboard.

These times may be increased, if desired, by means stated below or such other means as required.

*Time counting relays*

The basic element in this circuit is the group of relays which provides this basic timing. These are the relays 16A1, 16B1, 16A2, 16B2, 17A3, 17B3 and 17A4. These relays are used in conjunction with a source 171 of 60 interruptions per minute. A complete explanation of the operation of these relays without reference to the other parts of the circuit will clarify much of the subsequent explanation. The following table will materially assist in this explanation:

| | 1 | | 2 | | 3 | | 4 | | 5 | | 6 | | 7 | | 8 | | 9 | | 10 | | 11 |
|---|---|---|---|---|---|---|---|---|---|---|---|---|---|---|---|---|---|---|---|---|---|
| A1 | A1<br>B1<br>A2 | B1<br>A2<br>B2 | A2<br>B2 | A1<br>A2<br>B2<br>Two sec. path K2–76 Norm. | A1<br>B1<br>B2<br>A3 | B1<br>A3<br>B3 | A3<br>B3 | A1<br>A3<br>B3 | A1<br>B1<br>A2<br>A3<br>B3<br>4–½ sec. path K2–K6 Op. | B1<br>A2<br>B2<br>A3<br>B3 | A2<br>B2<br>A3<br>B3 | A1<br>A2<br>B2<br>A3<br>B3 | A1<br>B1<br>B2<br>B3<br>A4 | B1<br>A4 | A4 | A1<br>A4 | A1<br>B1<br>A2<br>A4 | B1<br>A2<br>B2<br>A4 | A2<br>B2<br>A4 | A1<br>A2<br>B2<br>A4<br>10 sec. path K6 Norm.<br>K2 Op. | A1<br>B1<br>B2<br>A3<br>A4 |

We will assume for the moment that the upper contacts of relay 17CS are closed which will connect the source 171 to the relay 16P. Relay 16P in consequence will follow the interruptions and relay 17CS will also supply locking ground for the counting relay group.

Consider first only relays 16A1 and 16B1. The first closure of the relay 16P operates relay 16A1 and a short is placed on relay 16B1 to prevent it from operating. Now, the first open of relay 16P takes place which removes the short on relay 16B1 and allows it to operate.

The second closure of the 16P relay because relay 16B1 is operated puts a short on relay 16A1 causing it to release, but relay 16B1 remains operated, and the release of relay 16A1 transfers its holding path from relay 17CS to relay 16P. Now on the second open of relay 16P, therefore, relay 16B1 will release.

These two relays have, therefore, gone through one cycle of their operation which they will do on every two cycles of the interrupted impulses.

Now consider only the relays 16A2 and 16B2. It will be noted that when both relays 16A1 and 16B1 were operated a path was completed to operate relay 16A2 and place a short across relay 16B2 to prevent it from operating, and when relay 16A1 releases relay 16B2 will operate. When relay 16B1 releases, of course, nothing can happen in the second group as the circuit is already open. When relay 16A1 operates the second time nothing can happen in the second group as the circuit is still open, when relay 16B1 operates the second time relay 16A2 will be shorted and will release, transferring the holding circuit to the first group, and when relay 16A1 releases, opening this holding circuit, relay 16B2 will release and the relays 16A2, 16B2 group will stay released until both the relays 16A1 and 16B1 are again both operated at which time the relays 16A2 and 16B2 group will go through their paces again, which they will do on every four cycles of the interrupted impulses.

It will be noted that the circuit for starting the relays 17A3 and 17B3 group through their paces is only closed when the relay 16B2 is operated and the relay 16A2 released.

The relays 17A3, 17B3 group will then start their paces which they would go through every eight cycles of the interruptions.

Now referring to the table, the relays 16A1, 16B1 group starts on the first open of the relay 16P, the relays 17A3, 17B3 group starts on the third open of the relay 16P, and relay 17A4 operates on the seventh open of the relay 16P. In the table, the initial number of the relays is omitted, thus 16A1 is designated as A1.

*Time path closures*

As indicated before there are three timed path closures that it is wished to obtain, a two second, a four and one-half second and a ten second, and no matter which path is chosen it will always result in the operation of relay 16TM which is the final indication that the chosen time has been reached.

The three paths are chosen as follows: With relay 17CS only operated, the two second path is chosen, with relays 17CS, 16K2 and 16K6 operated the four and one-half second path is chosen and with relays 17CS and 16K2 operated the ten second path is chosen.

We will trace each of these paths, referring to the counting relay chart. Assuming relay 17CS only operated at the beginning of the third second, relays 16A1, 16A2 and 16B2 only of the counting group will be operated and a path may be traced from battery on winding of relay 16TM, back contact of relay 16K6, back contact of relay 16B1, make contact of relay 16A1, contact of relay 16B2, back contact of relay 16K2, to ground on the front contacts of relay 17CS. Thus the two second path.

Assuming relays 17CS, 16K2 and 16K6 operated the two second path will be open by relay 16K2 and we pass on to the first-half of the five second interval at which time relay 16A1, 16B1, 16A2, 17A3 and 17B3 are operated, therefore the path can be traced from battery on the winding of relay 16TM, a front contact of relay 16K6, front contact of relay 16B1, contact of relay 16A1, contact of relay 17B3, contact of relay 16K6, to ground on the front contacts of relay 17CS. Thus the four and one-half second path.

Assuming the relays 17CS and 16K2 operated, relay 16K2 opening the two second path, relay 16K5 being normal opening the four and one-half second path, we pass on to the beginning of the eleventh second, when we have relays 16A1, 16A2, 16B2 and 17A4 operated and a path may be traced from battery on the winding of relay 16TM, back contact of relay 16K5, back contact of relay 16B1, contact of relay 16A1, contact of relay 16B2, contact of relay 17A4, to ground on the front contacts of relay 17CS. Thus the ten second path.

If desired, a relay arrangement may be connected between the contact of relay 16P and relays 16B1 and 16A1 to halve the frequency or double the time, thereby having the same effect as though 30 interruptions per minute were connected to the relay 16P. This alternative arrangement has been omitted to simplify the drawings. Obviously other means might be employed such as changing the frequency of interrupter 171 to give any necessary or desired timing.

*Timing of sequence circuit on call from a subscriber*

This function is accomplished in two seconds. When the sequence circuit is seized a relay 12LS1 is operated which applies battery to conductor 129 which operates relay 17ST.

Relay 17ST operated:

(1) Removes ground from key 170 to prevent manual substitution of directors;

(2) Operates relay 17CS and lights the sequence busy light 17B; and (3) Furnishes ground to supplement the ground on the lower contacts of key 170 in case the key 170 was thrown to prevent a change of directors, if the key was returned to normal.

Thus we have the condition previously described as the two second interval and at the end of the two second interval, if the relay 17CS is still operated, which it would not be if the sequence circuit had been released by this time, the relay 16TM will operate:

Relay 16TM functions:

(1) To close the operating winding of the relay 16TM1 through back contact of relay 16K5 to contacts on relay 16K2;

(2) To connect ground over the contact of relay 17ST to hold the relay 16TK; and (3) To open the operating path of the relay 16TR.

Because relays 16K5 and 16K2 are released the relay 16TM1 operates immediately and locks under the control of the relays 16K6, 16A1, 16B2, 16K2 and 17CS, places a supplementary ground on the relay 17CS, and prepares a path for testing the subsequent release of the sequence circuit and connects ground obtainable on the relay 17ST to another contact of the relay 16TK. During the routing of the call to the central office the trunk circuit sends the calling-in signal to the central office and awaits reception of the ringing current sent automatically from the central office. If the calling-in signal is not received at the central office, or if the calling-in signal fails to be registered at the central office, or if for any reason the ringing current fails to be received in the satellite office, a ground on the conductor 111 at the back contact of the relay 3R3 would continue to hold the trunk relay 16TK operated and cause it to lock as soon as the relay 16TM operates. Consequently the ground furnished by the relay 17ST over the contacts of the relay 16TK by means of the relays 16TM and 16TM1 would be applied to the conductor 124 and to the operating winding of the relay 17T.

*Effect of trunk failure*

If the relay 16TK continues to be operated owing to the failure of ringing current to come back to the central office, ground on conductor 124 is continued by the relay 3ST to conductor 121 which causes the operation of the relay 10BO1 of the particular trunk preselected for the call to the central office which causes the operation of that relay 10BO1 which locks under control of the associated manually operable trunk release key 10K and causes the operation of the relay 10BO.

The relay 10BO functions:

(1) To place ground on the conductor 123 which causes the operation of the relays 10CH and 10AD;

(2) To connect the conductor 130 extending to the two-way trunk circuit to the conductor 160;

(3) To connect battery to the conductor 161;

(4) To remove the battery from the conductor 118 extending to the trunk circuit; and (5) To lock under the control of any marking signal sent from a distant central office.

The operation of the relay 10BO1 causes the associated trunk lamp 10L to function as an indication that the trunk is for the moment defective.

The operation of the relays 10CH and 10AD eliminates the particular trunk from service on the particular outward call and causes the outward call to be connected to the next idle trunk and the subscriber will be connected to an idle trunk if one is available. Relay 12B operates on the first closure of the interrupted ground device 171 and connects telegraph ground to the conductor 130 over the conductor 160 and also causes the operation of the relay 12A1 which locks. On the next open pulse of the device 171 the relay 12B releases and removes telegraph ground from the conductor 130 and causes the operation of the relay 12B1 which locks. On the next closed pulse of the interrupter the relay 12B again operates and connects telegraph ground to the conductor 130 but this time the relay 12A1 releases and the relay 12B1 remains operated which causes the operation of the relay 12A2 which removes the telegraph ground from its connection to the conductor 130. On the next open pulse the relay 12B again releases and restores the relay 12B and associated relays to the initial condition. Consequently, the functioning of these relays produces a one-half second marking pulse followed by a one-half second spacing pulse followed by a short spurt of marking within the next one-half second period and a one-half second of spacing pulse terminating the same. This characteristic signal is sent to the manual central office as a trunk trouble indication. If the operator has not answered the calling-in signal, this characteristic signal will cause the answering lamp to flash in a peculiar manner at the central office. This signal is a repeated recall signal so that under a trouble condition this signal will flash the light in the cord if the cord is connected to the jack but the operator's teletypewriter is not connected to the cord. On a "trunk-out-of order" signal the operator is expected to remove the plug from the jack while the signal lamp is lighted; if she does not the trunk is left tied up but this condition will be indicated and may readily be removed by replugging and withdrawing the plug at an appropriate instant because the trunk-out-of-order signal will continue to arrive. If the operator, however, has already answered the calling-in signal, this characteristic signal will appear on her teletypewriter. If the path 125 to the central office is in trouble obviously no signal can be sent to it and trouble of such a nature will become apparent when the operator selects the trunk to originate the call. The miscellaneous alarm circuit, therefore, has caused the removal of the ineffective trunk from service on the subscriber's call and has given a trouble indication to the operator at the distant manual office.

In the satellite office trunk if the calling-in signal sent out failed to arrive at the central office or failed to be registered, or if the ringing signal failed to arrive back at the satellite office due to the failure of the trunk conductor, or if having arrived the satellite office trunk failed to register it, the relay 3R3 would not have operated. Under this condition, the non-operation of the relay 3R3 has continued ground on the conductor 111 of the miscellaneous alarm circuit. Consequently, the failure of the ringing signal to return and operate the relay 3R3 within two seconds functions:

(1) To advance the trunk chain of the sequence circuit and connect the subscriber to the next idle trunk;

(2) To transmit a distinctive signal over the conductor 114 as an indication of trunk trouble; and (3) To flash a lamp indicating the particular trunk in trouble.

Moreover, in addition to flashing the lamp 10L the operation of the relay 17T functions:

(1) To light a lamp 17TL which remains lighted since relay 17T locks up under control of the associated release key.

A suitable minor alarm, such as a bell, is associated with the lamp. When the subscriber's call has been connected over another trunk the sequence circuit will return to normal and remove battery from the conductor 129 causing the release of the relay 17ST and the relay 16TK.

When the trouble is cleared by the attendant or otherwise, the trunk may be put back into service by operating the keys associated with the lamps indicating the trouble. The operation of key 10K releases relay 10BO1 and removes ground from the upper winding of the relay 10BO and at the same time changes the flashing lamp to a steady lamp. The relay 10BO will remain operated under control of a marking signal that might be received from a distant central office. If the operator has originated a call, marking will be present on the inward path 125 which will hold relay 10BO operated until the operator recognizes the signal and removes the cord. At the termination of this marking signal the relay 10BO releases. This causes the release of the relays 10AD and 10CH which restores the trunk to the trunk advance chain and makes it available to subscribers originating calls and removal of the characteristic trouble signal from the trunk removes the trouble indication at the distant central office, thus restoring the circuit to normal.

*Timing of the sequence circuit on call from subscriber continued*

After the selected trunk has satisfactorily registered the receiving ringing signal relay 16TK will be released when the relay 16TM operates and ground available on the contact of the relay 17ST supplied to the contacts of the relay 16TK by means of the relays 16TM and 16TM1 will be applied to the conductors 162 and 163 and also cause the operation of the relay 17SA to ground on the conductor 162 (conductor 163 is ineffective on this type of call). This will cause the sequence circuit to function and will remove from calling service the particular subgroup of subscribers containing the calling subscriber. The operation of the relay 17SA lights lamp 17S as a minor alarm and locks under the control of the associated release key. After one-half second, the relay 16P again releases and causes the operation of the relay 16B1. This causes the release of the relay 16TM which upon release connects the operating winding of the relay 17SE to the contact of the relay 17ST. Consequently, in the one-half second that the relay 16A1 was operated alone and in which the relays 16TM and 16TM1 apply ground to the contacts of the relay 16TK and during which an attempt was made to free the sequence circuit, if the relay 17ST does not release, ground on its front contact causes the operation of the relay 17SE as soon as the relay 16TM releases. Relay 17SE upon operation locks under control of the associated release key and lights the lamp 17E in addition to which a major alarm may be given as an indication that the sequence circuit is in trouble. If, however, the relay 17ST is not operated during this interval, the miscellaneous alarm circuit waits for another one-half second until the relay 16A1 releases which causes the release of the relay 16TM1. This causes removal of ground from the winding of the relay 17CS which releases and removes the interrupter from the winding of the relay 16P, removes locking ground from the time measuring relays of Figs. 16 and 17, and reconnects ground to the conductor 100 of the sequence circuit which renders it available to handle another call.

The removal of holding ground from the time measuring relays and the disconnection of interrupted ground from the relay 16P returns the miscellaneous alarm circuit to normal except for the locked-in trouble indication, thus permitting the alarm circuit to handle the timing of the new call. As previously indicated the relays 17T, 17SA or 17SE remain operated depending upon the type of trouble (if any) the miscellaneous alarm circuit has discovered. Keys associated with these relays permit the alarm circuit (understood to be connected) to be opened but leave the lamp indicating the trouble lighted until separate operation of the associated release key releases the lamp after the trouble has been cleared.

*Sequence circuit on call from central office to a subscriber*

After the conductor 134 has been grounded by the operation of the relay 10AL1 the director circuit functions and sends a "director ready signal" to the central TWX office which is followed by reception from the operator of signals identifying the called subscriber line. The director circuit translates this number to decimal code to designate the desired line which causes the link circuit to function and connect the subscriber's line to the trunk used to make the call. Immediately after the first digit is received by the director circuit the conductor 151 is grounded to cause the operation of the relays 12H and 12H1 which as previously described establish conditions which prevent the release of the link circuit used in an established call. The fixation of the trunk chain circuit is without function at this particular time. After the link circuit has functioned, the trunk circuit removes battery from the relays 10ST and 10AL (by taking battery off the conductor 120) which causes the release of these two relays. The release of the relay 10ST removes ground from the conductor 127 provided the conductor 127 is not grounded by some other relay 10ST and causes the release of the associated relay 10AL which releases relay 10AL1. The release of relay 10AL1 functions:

(1) To remove ground from the conductor 134 which causes the director circuit to return to normal;

(2) To open the conductors 130 and 131 which disconnect the trunk circuit from the director circuit; and (3) To disconnect the relays 10BO and 10BO1 from the conductors 163 and 162, respectively.

The release of the relay 10AL removes battery from the conductor 129 extending to the miscellaneous alarm circuit. The relay 17CS of the miscellaneous alarm circuit does not release until the director circuit has returned to normal (because conductor 137 is grounded in the director circuit keeping relay 16K1 operated) but upon the release of relay 17CS it reconnects ground to the conductor 100 which renders the sequence circuit available to handle a new call. The return of the director circuit to normal removes ground from the conductor 151 in the director circuit which causes the release of the relays 12H and 12H1 which enable any other link circuit in use on an established call to return to normal. Upon the completion of a call the trunk circuit functions to cause the release of the relays 10CH and 10AD (if the relays 12H and 12H1 are not operated). If the relays 12H and 12H1 are holding the chain circuit of the sequence circuit in a fixed position, the particular relays 10CH and 10AD remain operated until the fixed condition is removed, whereupon they release and return the sequence circuit to normal.

*Removal of trunk from service on call to subscriber if director circuit is not seized*

When a trunk circuit on a call to a subscriber is connected to the sequence circuit, battery applied to the conductor 129 causes the operation of the relay 17ST as previously described. This causes the operation of the relay 17CS. This causes the time registering relays 16P, 16A1, 16B1, 16A2 and 16B2 to function to measure off approximately two seconds and if when the relay 16B2 operates the relay 16K2 is still not operated (as a result of the failure of the sequence to seize a director) relay 16EM will operate and will be followed by the operation of the relay 16TM1. If the relay 17ST still remains operated, ground on its contacts will be supplied over contacts of the relays 16TM, 16TM1 and 16TK to the conductors 162 and 163. (The subsequent operation of the miscellaneous alarm circuit under this condition is the same as described under the condition when it timed out in a period in excess of two seconds on an outward call in which the trunk circuit selected for use was found unsatisfactory.)

Because the relay 10AL1 is operated the relays 10BO and 10BO1 will operate and lock. The relay 10BO will:

(1) Place ground on conductor 123 to hold the trunk busy;

(2) Remove battery from conductor 118 to release relay 10ST, which in turn will release relays 10AL and 10AL1 to restore the continuity of the sequence circuit; and (3) Connect battery to conductor 161 to energize relay 12B from source 171 of 60 interruptions per minute, which causes relays 12A1, 12A2 and 12B1 to produce the "repeated recall signal" previously described.

This signal is introduced over lead 160 to lead 130 over contacts of relay 10BO to relay 4S to be transmitted to the central office. The relay 10BO locks to the closure of ground on conductor 126 which held closed by the incoming mark at relay 4R. The relay 10BO1 locks under control of key 10K and connects 60 interruptions per minute to lamp 10L. The grounding of lead 123 operates relays 10AD and 10CH to keep the trunk busy for outward calls.

The release of relays 10ST, 10AL and 10AL1 will release relay 17ST and in turn relay 17CS which will restore ground to conductor 100.

The operation of relay 16TM will cause the operation of relay 17SA which will lock and connect ground to give a minor alarm and light lamp 17S.

The trunk will remain locked out until the key 10K is released to release relay 10BO1 and until the mark from the central office is removed to release relay 10BO. The relay 17SA is released by a key associated with the locking winding.

*Further timing conditions on calls to a subscriber*

As previously stated when the sequence circuit is seized the relay 17ST and the relay 17CS operate. The relays 16A1, 16B1, 16A2, 16B2 count off an interval of approximately two seconds. Upon the assumption that the conductor 137 has been grounded, the relay 16K1 operates and functions:

(1) To connect the conductor 156 to contacts of the relay 16TM;

(2) To place a supplementary ground on the operating winding of the relay 17CS;

(3) To lock under control of the relay 17ST;

(4) To prepare a possible operating path of the relay 17D1 to a contact of relay 17ST over open contacts of relay 16TM; and (5) To cause the operation of the relay 16K2 and 16K6.

The operation of the relay 16K2 connects the conductor 157 to an armature of the relay 16TM, partially prepares a path for operating the relay 16TR, locks under control of the relay 17CS, and removes ground (over an armature of relay 17CS) from the upper armature of relay 16B2. The operation of the relay 16K6 places ground on a lower armature of relay 17B3. Relays 16A1, 16A2, 16B1 and 16B2 function and at the end of two seconds the relay 16K2 is operated and the relay 16TM is not operated. At the end of four seconds, however, the relays 17B3, 16A1 and 16B1 are operated and ground is furnished over a contact of the relay 16K6 to cause the operation of the relay 16TM which functions:

(1) To connect ground to the conductor 156 to bring the director into a stuck condition in a manner elsewhere stated;

(2) To connect the relay 16TM1 to conductor 157;

(3) To operate the relay 17D1 or 16D depending upon which director is in service; and (4) To open the operating path of the relay 16TR or 17LT.

The operation of the relay 16D or 17D1 locks up whichever relay is operated under control of its associated release key, sounds the trouble alarm and lights a lamp associated with the director in trouble and also prepares a path for the operation of the relays 16TR, 17LT or 17M (indicating major alarm) the functions of which will be described later.

After the director circuit is locked in a stuck condition, ground is placed on the conductor 157 which operates relay 16TM1 which functions:

(1) To lock under control of the relay 16B1;

(2) To place a supplementary ground to hold the relay 17CS operated;

(3) To connect ground under control of the relay 17ST over contacts of the relays 16TK and 16TM to the conductors 162 and 163 extending to the sequence circuit; and (4) To help prepare a path to test for the failure of the sequence circuit to release and the transfer of the directors, both of which functions take place in the next half second.

If the conductor 138 or 147*a* had been grounded when the relay 16TM operated, the relay 16AB would have been operated and the relay 16K4 would have been operated and locked for which reason ground would have been applied to conductor 163 only. With conductors 162 and 163 both grounded the trunk circuit is taken out of service permanently until the restoring key is operated, but if only the conductor 163 is grounded the trunk circuit is only removed from service temporarily under control of a marking signal received from the distant central office; a repeated recall signal being sent to the central office until the marking signal is discontinued. In either case, however, the sequence circuit releases in the process of taking the trunk out of service which removes the battery from the conductor 129 and causes the release of the relay 17ST. These things occur within a half second at the conclusion of which the relay 16A1 releases and causes the release of the relay 16TM but the relay 16TM1 remains locked for an additional half second. With the relay 16TM released, if the relay 17ST is still operated for some reason, which indicates that the sequence circuit has failed to release, ground furnished by the relay 17ST over the back contact of relay 16TM and front contact of relay 16TM1 causes relay 17SE to operate and lock under control of its associated release key which sound a major alarm in addition to lighting a lamp 17E. If the relay 17ST is released, however, ground furnished by the relay TM1 through back contacts of the relay 16K5, 17ST and 16TM and the front contact of the relay 16K2 (locked under control of relay 16CS) is connected to the operating winding of relay 16TR (if director No. 2 is available and relay 16D is therefore unoperated). Relay 16TR operates, locks under control of relay 17ST grounds the director transfer conductor 158 and operates the transfer relays 15T1, 14T4, etc., to replace director No. 1 by director No. 2. If relay 16D is operated and relay 17D1 is released, relay 17LT operates and causes relay 16TR to release. The release of relay 16TR removes ground from the conductor 158 and places director No. 1 in service instead of director No. 2. If both relays 16D and 17D1 are operated then ground supplied by relay 16K2 on its upper inner armature causes the operation of relay 17M which lights a lamp 17MA and sounds a major alarm indicating that both directors are ineffective. After another half second the relay 16B1 releases and causes relay 16TM1 to release which removes the additional holding ground from the relay 17CS which in releasing:

(1) Causes relay 16K2 to release;

(2) Opens the holding ground to the counting relays 16A1, etc.; and (2) Reconnects ground to the conductor 100 which renders the sequence circuit available for use on calls.

If the director circuit has placed ground on the conductor 146, relay 16K3 will be operated and locked under control of ground on the relay 17CS. Operation of relay 16K3 causes the release of relay 16K6 and thereby removes ground from the bottom armature of relay 17B3. The counting relays 16B1 to 17B3 and 17A4 therefore count until ten seconds have elapsed at which time relays 17A4, 16B2 and 16A1 are operated and ground furnished by the relay 17A4 over contacts of relays 16B2 and 16A1 causes the operation of relay 16TM.

Reviewing, therefore, if the miscellaneous alarm circuit is off normal the absence of ground on conductor 137 causes it to time out and operate relay 16TM in two seconds. Ground on conductor 137 causes the operation of relays 16K1, 16K2 and 16K6 and causes the alarm circuit to time out in four and one-half seconds. The presence of ground on relay 16K3 causes the release of relay 16K6 and permits an interval of ten seconds before the relay 16TM is operated.

When the miscellaneous alarm circuit "times out" after ten seconds there are two conditions the first of which is that in which the conductors 138 and 147*a* are not grounded. Relays 17A4, 16B2 and 16A1 are operated. Ground over a contact of relay 17A4 operates relay 16TM which functions:

(1) To connect ground from the contact of the relay 17ST to the conductor 156 extending to the director circuit;

(2) To cause the operation of relay 16D or 17D1 according to which director is in use;

(3) To open the operating path of the relay 16TR or 17LT; and (4) To connect the winding of the relay 16TM1 to conductor 157.

The operation of the relay 16D or 17D1 produces a minor alarm and lights the lamp associated with the particular director and at the same time locks under control of the release key associated with that particular director. Ground on conductor 156 brings the director into a stuck condition. After the director is in a stuck condition, ground on the conductor 157 is extended to the miscellaneous alarm circuit to operate the relay 16TM1 which functions:

(1) To connect the winding of the relay 17SE to the contacts of the relay 16TM;

(2) To connect ground on the armatures of relay 17ST to conductors 162 and 163 (relay 16K4 not being operated);

(3) To prepare a path for the testing of the failure of the sequence circuit to release;

(4) To lock under control of the relay 16B1 and;

(5) To furnish a supplementary ground to hold the relay 17CS operated.

When the sequence circuit returns to normal, battery is disconnected from conductor 129 causing the relay 17ST to release which causes the relay 16K1 to release all within half a second at the end of which time the relay 16TM releases because the relay 16A1 releases. With the relay 16TM released and the relay 16TM1 operated, the failure of the sequence circuit to release as indicated by the continuing operated condition of the relay 17ST furnishes ground on the relay 17ST through the back contact of relay 16TM and front contact of the relay 16TM1 to cause the operation of the relay 17SE which produces a major alarm and locks up under control of the associated release key and lights a lamp 17E indicating that the sequence circuit has failed to release. However, if relay 17ST has released because the sequence circuit has returned to normal, ground furnished by the relay 16TM1 through the back contacts of relay 17ST and 16TM and the front contact of relay 16K2 which is still operated connects ground to the conductor 164.

With director No. 1 in use and director No. 2 available as indicated by the non-operated condition of relay 16D, ground on conductor 164 operates relay 16TR which substitutes director 2 for director 1. If, however, director No. 2 is in service and has just been placed in a stuck condition due to trouble and director No. 1 is free and available as indicated by the relay 17D1 being unoperated, the ground on conductor 164 would cause the operation of the relay 17LT which releases relay 16TR. In releasing, relay 16TR replaces director No. 2 by director No. 1. If both directors are in trouble as indicated by the operated conditions of both of relays 16TR and 17LT, relay 17M will operate, light lamp 17MA and sound a major alarm. After one-half second relay 16B1 releases and causes the release of relay 16TM1, removes ground from relay 17CS which releases and functions:

(1) To release relay 16A2;

(2) To remove interrupted ground from the counting relays 16A1, etc.; and (3) Consequently to place the miscellaneous alarm circuit in a condition to time the next call.

The other condition in which the miscellaneous alarm circuit has timed out after ten seconds is that in which the conductors 138 and 147*a* are grounded. This indicates that neither the director circuit nor the trunk circuit are responsible for the failure to route the call. Ground on conductor 138 or 147*a* causes relay 16AB and relay 16K4 to operate which prevents conductor 162 from being grounded in the miscellaneous alarm circuit and also prepares its own locking path under control of the relay 16TM. Ground on conductor 147 causes the operation of relay 16K5 which functions:

(1) To close its own locking path under control of the relay 16TM1;

(2) To open the operating path of relay 16D or 17D1 depending upon the director in service which prevents the alarms from indicating trouble;

(3) To open the operating path of relay 16TR or 17LT thus preventing the directors from being transferred;

(4) To open the conductor 156 which prevents the director in service from being placed in a stuck condition; and (5) To replace the conductor 157 with a local ground.

When, after an interval of ten seconds, the relay 16TM operates, the relay 16TM1 operates immediately. The operation of relays 16TM and 16TM1 together causes the relays 16K4 and 16K5 to lock; they also place ground on the conductor 163 extending to the sequence circuit where they are instrumental in taking the trunk circuit out of service under control of the marking signal sent from the distant central office as elsewhere described. The removal of the trunk from service causes the release of the sequence circuit which results in the removal of battery from the conductor 129 and releases the relay 17ST. After half a second the relay 16TM releases and causes the relay 16K4 to release. If the sequence circuit has not released and the relay 17ST is still operated at this time, the relay 17SE will operate, sound a major alarm, light the lamp 17E as an indication that the sequence circuit has failed to release, and lock over the contact of its associated release key. If, however, the relay 17ST has released at this time, after another half second the relay 16TM1 will release and cause the release of the relays 17CS and 16K5. The release of the relay 17CS causes the release of the relay 16K2 and other relays which returns the miscellaneous alarm circuit to normal for the purpose of timing another call. Consequently, the grounding of the conductors 138 and 147 takes the trunk out of service temporarily under control of the marking signal from the central TWX office and returns the director in use back into service.

The operation and release of key 170 enables the manual transfer of one director for the other. If the first director is in service, the operation of the key will place the other in service if the other director is satisfactory and provided a call is not at the time being routed. If the second director is in service, the operation of key 170 will remove the second director from service and replace it by the first director provided the first director is available and provided a call is not being routed through the office.

In the cross-bar switch the selecting finger actuated by one of the selecting magnets 2S chatters considerably on operation. To prevent the holding magnet 2H from snagging two sets of contacts while the directing finger is chattering, ground for the application of the holding magnet is delayed for a short period. The operation of the selecting magnets on the cross-bar link circuit places a ground on the conductor 117 extending to the miscellaneous alarm circuit which causes the slow operating relay 17D to operate. Upon operation the relay 17D, after introducing sufficient delay to permit the directing fingers to come to rest, applies ground through a resistance of 20 ohms on conductor 119*a* to operate a particular magnet 2H. When the selecting magnets 2S return to normal, the relay 17D releases and removes ground through 20 ohms from conductor 118*a*.

The miscellaneous alarm circuit is provided with a cut-off key 17C. The operation of key 17C prevents the miscellaneous alarm circuit from timing out a call and also lights a lamp 17CL. The circuit is also provided with a sequence busy lamp 17B which is lighted as an indication to the maintenance attendant whenever the sequence circuit is off normal as a result of the operation of relay 17ST. Each relay 17SA, 17T, 17SE, 17M, 17D1 and 16D has an audible alarm device (not shown) and a circuit with a key which may be used to cut off the alarm device but leaves the associated lamp lighted to indicate the type of trouble.

The illumination of the lamp 17S indicates that the subscriber line circuit or subscriber line equipment has failed on a call from a subscriber or that on a call to a subscriber the sequence circuit failed to cause the director to move off normal.

The illumination of the lamp 17TL indicates that on a call from a subscriber, the continuity of the two trunk conductors is imperfect.

The illumination of the lamp 17E indicates that the sequence circuit has failed or needs attention.

The illumination of the lamp 16L or 17L indicates one director or the other in trouble and the illumination of the lamp 17MA indicates that both directors are in trouble.

After the clearing of any particular trouble the miscellaneous alarm circuit is brought to normal in so far as the alarm indication is concerned by returning to normal the alarm releasing key that had been operated during the momentary operation of the release key associated with the particular alarm. These actions cause the release or discontinuance of both audible and visible alarms.

Test Circuit

*General*

The test circuit is intended to be employed to permit adjustment of the subscriber's loop resistance, to test the subscriber line, to permit monitoring of lines or trunks, and to provide means for calling the local subscriber or the distant operator. It is arranged to function either with a teletypewriter equipment operating on a 60 milliampere marking current with zero spacing current, or an equipment operating on a 25 milliampere marking current with a 5 milliampere spacing current.

When testing a subscriber's line it is necessary to use a repeater to simulate the local side of the repeater in the trunk circuit (relays 4R and 4S and associated equipment). This repeater can be switched to simulate the local side of a subscriber's toll line repeater when testing towards the central office. The teletypewriter side of this repeater is arranged to operate with an attendant's monitoring teletypewriter of the usual type or a station set operating on a 5–25 milliampere basis. In the latter case the wave shapping resistance 10 in the subscriber's set should be short-circuited and the power switch PS operated to the "on" condition at all times when tests are being made. If a monitoring teletypewriter operating on a zero–60 basis is used, local power for the relay bias and the receiving magnet is obtained by using the bias jack 20BJ. An auxiliary contact on this jack operates the relay 20D which arranges the teletypewriter side of the repeater to work on a zero–60 milliampere basis. The jack 20SS is used to introduce signals from a device known as a "multiple sender" which is a known instrumentality for furnishing teletypewriter signals for testing purposes. If a 5–25 basis teletypewriter is used, a dummy plug should be inserted in the jack 20BJ when the signals are being transmitted from this multiple sender.

*Subscriber line tests*

To make a voltmeter leakage test of the subscriber's line the conductors may be extended to the telegraph test board and use made of the equipment usually employed at such a board, by connecting a testing cord to the jack 19VM of the test circuit and connecting the jacks 8A and 8B, respectively, by patching cords to the jacks 19A and 19B of the test circuit.

With the jacks 8A and 8B thus connected to the jacks 19A and 19B the subscriber split key 19SS may be operated, which will operate relay 19AA and connect battery to the tip conductor T, and the ring conductor R will be connected to the winding of the relay 19L. If the subscriber calls during this condition, the relay 19L will operate and light the subscriber's calling lamp 19SC.

With conditions as stated in the preceding paragraph, the resistance of the subscriber's line plus the associated line compensating resistance may be measured by a bridge introduced by the operation of the line resistance measuring key 20LR. The operation of this key will cause the operation of the relay 19S which will release the relay 19L to extinguish the lamp 19SC. The relay 19S will connect tip and ring conductors of the subscriber line to the bridge in series with resistances 201. The resistances 202 and 203 form the ratio arms of the bridge and the resistance 204 forms a standard against which the line is compared. The unbalance is indicated by the line resistance microammeter 20LA. A small unbalance may be ascertained by the momentary operation of the final balance key 20F, which will charge the associated condenser and impulse the meter momentarily in the direction of the unbalance.

With conditions as stated in the first sentence of the second preceding paragraph, the operation of the teletypewriter key 20TY will cause the operation of the relays 19S, 20S1, and 20C and the repeater, consisting of relays 20R and 20S, will be conditioned to transmit to and receive from a subscriber's teletypewriter. Signals from the teletypewriter of the test attendant plugged into the jack 20TT will operate the relay 20R to spacing condition and effect the desired reduction in voltage applied to the line through the lower winding of the relay 20S. The relay 20S will remain on its marking contact because of the reversal of the current in its upper winding. In a similar manner the signals will be repeated from the subscriber to the attendant's teletypewriter by the operation of the relay 20S. During each spacing signal the relay 20S will be operated to its spacing contact to reduce the voltage applied to the attendant's teletypewriter through the upper winding of the relay 20R, which will hold to its marking contact because of the reversal of current in its lower winding. The operation of the teletypewriter key 20TY will place ground through the ring of the jack 19B and the conductor S of the toll subscriber's line circuit, which will condition the latter for transmission in the case of a toll subscriber's line.

For testing disconnect and recall, if the keys 19SS, 20TY, and the subscriber's disconnect key 20SD are operated, biasing current will be closed through a winding of the test supervisory relay 20SP and the other two windings will be connected in series with the subscriber line. The armature of the relay 20SP will be held to its right contact so long as the subscriber's set is in operation. When the subscriber's set is turned off to open the subscriber's line, the relay 20SP will be operated to its left contact by its biasing current and the subscriber's disconnect lamp 19SD will be lighted. A disconnect signal lights the lamp continuously and a recall will cause the lamp to flash.

To send a test ringing signal to the subscriber with the subscriber's set in the idle condition, and the key 19SS operated, the operation of the ringing key 19RS will apply a ringing source to the tip of the subscriber's line. This will operate the ringer of a local subscriber's set directly but in the case of a toll line subscriber this will have no useful function. The ground connected to the ring of the jack 19B of the key 19RS will cause the toll subscriber's line circuit (Fig. 7) to apply ringing current to the toll line subscriber's set.

During the testing of the subscriber's line with no keys operated in the test circuit, the presence of the patching cord in the circuit will not interfere with the progress of a call to a subscriber. If the key 19SS alone is operated, the subscriber's line will be interrupted but terminated in such a manner as to indicate calls in either direction. If the line under test is selected by an operator at the central office, ringing signals will cause the operation of the relay 19RI to light the trunk call lamp 19TC. Because battery is connected to the tip conductor toward the subscriber and the ringing conductor is connected to the relay 19L, a call from the subscriber will light the subscriber's call lamp 19SC. Restoration of the key 19SS will permit either call to progress. If the key 19SS and either of the keys 20TY or 20LR are operated, the relay 19S will be operated to close the operating path of the relay 19V to the conductor 165. If no selecting magnets of the link circuit (Fig. 2) are operated, ground will be present on the conductor 165 at the relay 17D, which will cause the relay 19V to operate, lock and place ground on the winding of the relay 19BB and the ring of the jack 19A and the ring of the jack 8A to the conductor 152 of the subscriber line circuit. The purpose of this is to give an operator calling from the central office a busy signal in case a call is placed for a line under test. The current flowing in this path will operate a holding magnet 2H of the link circuit and will be in the proper direction to operate the relay 19BB. However, the relay 19BB will not operate on account of the biasing current flowing in its upper winding. If the conductor 152 of the line under test is selected by the director circuit, the presence of ground through the lower winding of the relay 19BB will cause the busy and out-of-order busy test relays of the director circuit to operate and send the busy signal to the central office operator. The operation of the relay 19V is delayed until such time as no link circuit selecting magnets are operated in order to prevent false multiple connections. Such connections would occur if the holding magnet of the line under test were operated while a selecting magnet 2H of the link circuit were also operated preparatory to the establishment of the connection of a trunk circuit and a subscriber line circuit other than the one under test. When the conductor 152 of the line under test is selected and tested, additional current caused to flow in the primary winding of the relay 19BB will cause it to operate and operate the relay 19W which locks and operates the trunk call lamp 19TC. Restoration of the key 19SS will release the relays 19V and 19W and also the relay 19S, if not already released, and the lamp 19TC will be extinguished. In other words, if the attendant who is operating the test equipment of Figs. 19 and 20 has used a patching cord in the manner previously described and has set up a teletypewriter communication circuit between his instrument and any particular subscriber, that particular subscriber line will test busy to a call coming from the central office.

*Toll subscriber line*

For testing the supervisory functions of a toll subscriber line circuit, the key 19SS and the key 19TL should be operated and a path established between the line and equipment jack 19J to the line jack 7LA of the test board. This path should be established in such a manner that the tip will be connected toward the subscriber's set and the ring connected toward the toll subscriber's line circuit. A relay 19L will be connected to receive calls from a subscriber set at all times except when the key 19TC is operated. The relay 19RI will be connected toward the line termination equipment of Fig. 7. Operation of the key 19RS will ground the conductor S of the toll subscriber line circuit and cause it to apply ringing current in the direction of the subscriber set. The ringing current in this case will not be transmitted to the subscriber but will be intercepted by the relay 19RI, which will operate and light the station lamp 19SL.

Operation of on-off key 1900 will place a call condition on the line side of the toll line equipment under test. The momentary operation of the key 19TC will transfer the winding of the relay 19L back from its direct connection to the subscriber line conductor to the ring conductor of a subscriber line circuit. The correct operation for the establishment of a call by the subscriber will be indicated by the operation of the relay 19L and the lighting of the lamp 19SL. Operation of the key 20TY will cause the attendant's teletypewriter to be connected to the lead T from the subscriber toll line termination and will also place ground on the ring of the jack 19B and thus over the conductor S of the subscriber's toll line circuit to condition it for transmission. Under this condition the attendant's teletypewriter should remain in marking condition. Momentary operation of key 19MS will place a break condition on the attendant's teletypewriter. With the key 20TY restored and the subscriber's disconnect key 20SD operated, the repeated operation and release of the key 19MS will not cause the lighting of the lamp 19SD. Restoration of the key 1900, however, should cause the operation of the relay 20SP to the left to light the lamp 19SD.

*Trunk*

The test circuit may be used to make tests of the trunk and other equipment toward the central office. For this purpose the jacks 19A and 19B are respectively connected by patching cords to the jacks 8A and 8B of the subscriber's line circuit and the splitting key 19ST is operated. The relay 19AA will be operated to split or separate the subscriber's line conductors and the winding of the relay 19L will be connected to the line toward the subscriber, to indicate calls from the subscriber.

Operation of the key 20TY, in addition to the key 19ST, will cause the relays 19T and 20T to operate to connect the transmission lead of the test circuit repeater to the tip of the subscriber's line circuit. Battery will be connected to the sleeve of the jack 19B, thence to sleeve of jack 8B and the ring conductor R of the subscriber's line circuit (toward the trunk), for registration of a call as from the subscriber. As soon as the connection is established through the link circuit, the tip or transmission conductor from the loop repeater associated with the trunk will be extended to the repeater of the test circuit. Operation of the key 20TY also operates the relay 20C.

In connection with testing the transmission; in the condition of the foregoing paragraph both the relays 20R and 20S are held to their marking contacts by line currents which override the bias currents. A spacing signal from the attendant's teletypewriter will cause the relay 20R to move to its spacing contact and apply ground to the transmission conductor of the trunk through the lower winding of the relay 20S which will be held to its marking contact by reversed current in the biasing winding.

To test the capability of the supervisory relay 3SP of the trunk circuit to hold operated during break signals, the attendant will operate the break key 19BK with the test circuit in the condition of the preceding paragraph. If the loop repeater is in the marking condition, sufficient current will flow in the tip conductor of the line to operate the relay 19BR when the key 19BK is operated. Under this condition approximately 0.010 ampere will flow in the ring side of the line to the trunk circuit. If the key 19BK is operated while the spacing signal is being sent to the test circuit by the loop repeater, relay 19BR will not operate. In this case approximately 0.0035 ampere will flow in the lead. This condition will test the ability of the trunk circuit to remain in the trip condition even though break signals are sent in both directions over a connecting subscriber's line.

To test the disconnect and recall conditions the key 20TY will be released to release the relays 19T, 20T and 20C, which will open the tip and ring sides of the subscriber's line toward the trunk circuit. This will cause a disconnect signal to be sent to the central office and reoperation of the key 20TY will cause a recall signal to be sent.

The ringing signal received from the central office for the line under test will be repeated in the test circuit over the tip conductor of the subscriber's line. The relay 19RI will be operated by the ringing current and will light the lamp 19TC.

*Monitoring*

The satellite office attendant may monitor on a subscriber's line by attaching the jacks 19A and 19B to the jacks 8A and 8B, respectively, of a particular line, and operating the monitoring key 20M which will operate relays 19M and 20C to connect the winding of the relay 20S in series with the tip conductor of the subscriber's line. The ring conductor will continue to operate the test circuit without interruption. The path for biasing current will be closed through the upper winding of the relay 20S independently of the relay 20R. The relay 20S will repeat all signals received from the subscriber's line to the attendant's teletypewriter.

The attendant may monitor on a trunk circuit by connecting a single patching cord between the jack 19A of the test circuit and the jack 3B of a trunk circuit. Operation of the monitoring key 20M will operate the relays 19M and 20C, which will condition the repeater circuit for reception of signals and the operation of the relay 19M will introduce the lower winding of the relay 19S in series with the ring conductor of the subscriber's line to which the trunk circuit may be connected.

*Local tests of trunk*

Local testing of the supervisory features of the trunk circuit may be accomplished by connecting the jacks 20A and 20B to the jacks 4RA and 4RB of the trunk circuit. This connection should not be made while the trunk is in service on a call and should be made only after the busy key 3BY of the trunk has been operated to preclude selection of the trunk being tested on an outward call before it is made busy in the course of testing. The distant appearance of the trunk may be made busy without placing an outward call condition by the operation of the ringing cut-off key 19RC. With all other keys in the test circuit normal, no relays in the test circuit or the two-way trunk circuit under test will be operated and the inward and outward transmission paths will remain in the spacing or idle condition.

To test for the placing of a call from the central office, the keys 19TY and 20TY are operated, which will operate the relays 20AB and 20C, which will prepare the attendant's teletypewriter for transmission into the path of the two-way trunk circuit normally extending to the central office. Operation of the trunk call key 20TC will place a marking condition on the connected path through the tip of the jack 20A to cause a calling condition to be registered in the trunk circuit. If no other calls are being established, the sequence circuit will associate the director circuit with the trunk termination under test.

When the director circuit has been seized in response to the operations of the preceding paragraph, and the distributor has come up to speed, a director ready signal in the form of a short negative marking pulse, will be transmitted on the outward path of the trunk into the test circuit through the tip of the jack 20B. This will cause the momentary operation of the relays 20AD and 20AE to cause the flashing of the lamp 20X and possibly lamp 20Y, the relay 20AD being slow releasing.

In response to the director ready signal, the test attendant may select the subscriber line circuit to which the jacks 19A and 19B have been connected or may select a local test attendant's subscriber line circuit to which the test circuit is permanently assigned. This may be done by typing a figures character followed by the number of the line circuit to be called. The relay 20R will repeat the signals to the incoming path 125 of the two-way trunk by interrupting a circuit through the tip of the jacks 20A and 4RA. In response, the director circuit will select the called line and return to idle condition.

Momentary operation of the trunk ringing key 20RT after a line has been selected will apply ringing signals to the path 125 and cause ringing to be repeated over the tip of the called subscriber line circuit. If the called line is one associated permanently with the test circuit, the attendant's signal bell associated with the line (not shown) will ring. If the selected line is one to which the test jacks 19A and 19B have been connected, the relay 19RI will operate and light the lamp 19TC.

The test attendant may answer the simulated inward call by restoring the key 19TY, thereby releasing the relay 20AB, the key 20TY being operated, and by operation of the answering key if the permanently assigned line has been called. In this case the relays 19F, 19T and 20T will operate. The test attendant's teletypewriter may then be connected to simulate an answering condition on the local side of the two-way trunk. This condition will place a negative marking condition on the outward path which is connected to the test circuit through the tip of the jacks 20A and 4RA, which will cause the relays 20AD and 20AE to operate and light the lamps 20X and 20Y.

For testing break signal operation under the condition outlined in the preceding paragraph, if the break key 19BK is operated, the break relay 19BR will be connected to the tip of the subscriber line in place of the repeater. Full voltage will be applied to the line in this case by the trunk circuit and the relay 19BR will operate to cause approximately 0.010 amperes to flow in the ring conductor of the subscriber line. In this condition a spacing signal will be repeated by the loop repeater to release the relays 20AD and 20AE, thus extinguishing the lamps 20X and 20Y. If the trunk circuit functions properly, these lamps should remain consistently in the extinguished condition until the key 19BK is restored. To test the trunk circuit for a double break condition, the test attendant should restore the key 20TC before operating the key 20BK. In this case the lamps 20X and 20Y should remain lighted.

The trunk circuit is designed to paralyze transmission from the subscriber for a period of approximately 0.3 second immediately following the break signal. This feature may be tested by connecting a source of open and closed dot signals to the test circuit repeater by plugging into the jack 20SS. These open and closed dot signals will be repeated to the windings of the relays 20AD and 20AE. Because the relay 20AD is slow releasing, it will remain operated to maintain the lamp 20X lighted. The relay 20AE will follow the dot signals and the illumination of lamp 20Y will be reduced. If the key 19BK is now operated, both lamps will be extinguished as set forth in the preceding paragraph. When the key 19BK is restored, both lamps will light steadily for approximately 0.3 second during the paralysis period which is produced by the first marking signal following the break signal which arrives in the trunk circuit and prevents spacing signals from being repeated to the relay 20AD and 20AE for 0.3 second, after which time the repetition of the signals will be resumed and the illumination of the lamp 20Y will return to the reduced degree existing prior to the operation of the key 19BK.

When the key 20TY is restored from the condition obtaining in the third preceding paragraph, the relays 19T, 20T and 20C will release to remove the test circuit repeater from the subscriber line conductors. The opening of the tip and ring leads will cause the trunk circuit to repeat trunk supervisory signals over the outward path containing conductor 114 and jacks 4RB and 20B. These disconnect supervisory signals will be in the form of a spacing signal followed by a short marking pulse, after which the path remains in the spacing condition. This action will be indicated by the extinguishment of the lamps 20X and 20Y shortly after the release of the key 20TY, followed by a short flash of the lamp 20X and possibly the lamp 20Y. With proper operation the lamps will remain extinguished. The reoperation of the key 20TY will cause the lamps to relight to indicate that the trunk circuit functions properly on recall signals from the subscriber.

The reringing of the subscriber line may be tested from the condition of the preceding paragraph after the key 20TY has been released, if the key 20RT is operated, which will apply ringing current to the tip of the subscriber line in the manner set forth under the fifth preceding paragraph relating to a ringing signal, to cause the operation of the attendant's ringer set on the local line or the lighting of the lamp 19TC. In either case the cross-bar switch of the link circuit should remain operated to hold the connection.

The trunk and link release may be tested as follows: After the key 20TY has been restored and the disconnect pulse has registered as a short flash of the lamp 20X, the key 20TC may be released to produce a spacing condition upon conductor 125, that is, the inward path of the trunk. Application of ringing current to the inward path by operation of the key 20RT in this case, instead of reringing the subscriber's line as in the preceding paragraph, will cause the cross-bar switch of the link circuit to release. When the key 20RT and the key 3BY of the trunk circuit is restored, all the circuits will be restored to normal.

Upon release of the cross-bar switch as set forth in the preceding paragraph, the trunk circuit will generate a short marking pulse which will be transmitted to the relays 20AD and 20AE over the outward path 114 to flash the lamp 20X and possibly the lamp 20Y. At any time during the progress of establishing a connection as hereinbefore described, if the key 20TC is restored to abandon the call prior to the time the holding magnet 2H has been operated, the busy release marking pulse will be transmitted by relays in the trunk circuit. The action of these relays is caused solely by the spacing condition placed on the inward path 125 as a result of the release of the key 20TC. After the holding magnet has operated, however, it is necessary to not only restore the key 20TC but also to apply ringing to the conductor 125 by the operation of the key 20RT.

To test the placing of a call from a subscriber on the trunk, the key 3BY should be in normal condition and the keys 3BY of all lower numbered trunks should be operated. If the call is to be placed through the line circuit permanently assigned to the test circuit, the keys of the attendant's line, the key 19AN, and the key 20TY should be operated. If the call is to be placed from a subscriber's line circuit which is connected to the test circuit by means of the jacks 19A and 19B, the key 19ST should be operated prior to the connection of the patching cords and the operation of the key 20TY will then place the call. In either case, the operation of the key 20TY will cause a marking condition to be placed on the outward path 114 to light the lamps 20X and 20Y. Operation of the key 20RT will applying ringing current to the inward path 125 to cause a connection to be established through the link circuit. It should be possible to alternately release and operate the key 20TY during the time the key 20RT is operated without releasing the link circuit. The lighting and extinguishing of the outward path lamps 20X and 20Y will follow the operation and release of the key 20TY. The release of both keys 20TY and 20RT will release the link circuit.

The answering of a call from the subscriber may be accomplished if the keys 20TY and 20RT are first operated as follows: The key 20TC should be operated and the key 20RT subsequently released. This will cause a marking condition to exist on the inward path immediately upon the cessation of the ringing pulses. Thereafter the same conditions will obtain as in testing a call from the central office hereinbefore described and all the functions outlined under the paragraph dealing with testing of a break signal, testing signal paralyzation, testing recall and disconnect signals, testing the reringing of the subscriber's line, testing link circuit release, and testing the sending of a busy release marking pulse, may be tested. Operation of the key 20TY, followed by the operation of the key 20TC without the intermediate application of ringing on the inward path 125, will transfer the call to the next higher numbered idle trunk and the director circuit will be connected to the trunk, and the director ready signal returned in the manner previously set forth.

After testing the trunk circuit and before removing the patching cord from its jacks 4RA and 4RB, it is advisable to observe the condition of the inward path from the central office. This may be done by releasing the key 19RC and observing the lamp 19TC. If the lamp lights, it will be significant that the relay 20AA is operated as a result of a marking condition on the inward path. This may be caused by a busy, out-of-order busy or regular operating cord having been connected to the trunk at the central office. The patching cord should be removed from the jacks 4RA and 4RB only when the lamp 19TC indicates that the trunk is idle. Otherwise the director circuit may be connected to the trunk in error.

The transmission of busy, disconnect and busy release signals to the central office may be tested by operation of the key 3BY and connecting the jacks 4RA and 4RB with patching cords to the jacks 20A and 20B, respectively, with the key 19RC operated. The marking signals in the ringing pulses will not be of sufficient duration to register a call condition but will maintain a busy condition at the central office appearance of the trunk. If it is known that a regular operating cord is connected to the central office appearance of the trunk, a disconnect signal may be registered on the cord by momentary operation of the key 19RC, following a spacing condition which will cause the release of relays at the central office holding the busy condition of the trunk appearance.

An operator at the central office may call the test attendant by placing a call in the usual manner used for calling a subscriber, using a number permanently assigned to the attendant's line circuit (not shown). The operation of the keys 20TY and 19AN arrange the attendant's set for use as a subscriber. Outward calls can be made and inward calls received.

Subscriber Practice Circuit

Experience has indicated the desirability of permitting a teletypewriter subscriber to practice. It is undesirable to utilize a trunk to the central office during the practicing time. Equipment has been provided to terminate a subscriber loop line locally at the satellite office. The practice circuit disclosed is not suitable for use with subscriber toll lines, as shown herein in Fig. 7. A subscriber wishing to practice will call the central office operator in the usual manner and signify his wishes. The operator will then instruct the subscriber to disconnect, which will release the trunk. The operator will then call the satellite office attendant by a local line terminating in the satellite office or, if desired, by telephone or other means, and request the practice connection. The attendant will disconnect if a line local to the satellite office is used to call him, and thus the trunk will be free.

The attendant will patch the jacks 22A and 22B of the practice circuit to the jacks 19A and 19B, respectively, of the test circuit. The key 19SS of the test circuit should be operated.

Thereafter patching cords should be inserted in the practice jacks 22P and 22Q and connected to the jacks 8A and 8B, respectively, of the subscriber line. Under this condition the tip of the subscriber line will be extended through the tips of the jacks 22P, 22A and 19A to negative battery in the test circuit. The ring R of the subscriber line will be extended through the tips of the jacks 22Q and 22B to the winding of relay 19L in the test circuit, which is provided to indicate a subscriber calling condition. The ring of the subscriber line circuit in the direction extending from the central office, will be extended through the sleeves of the jacks 22Q and 22B and contacts of the relay 22AA to the test circuit, where it will be opened. The tip of the subscriber line extending from the central office will be extended through the sleeve of the jacks 22A and 22P and contacts of the relay 22AA to the winding of the ringing relay 19RI and series condenser in the test circuit, to indicate a call signal from the central office. If a call should be made from the central office for the subscriber in question, the connection will be established in the link circuit in the usual manner except that the relay 22G will be operated when the holding magnet 2H of the cross-bar switch is operated. Operation of relay 22G will perform no function under this condition. Ringing current from the trunk circuit will operate the ringing relay in the test circuit to light the trunk call lamp 19TC. The test attendant should observe this lamp and remove the patching cords from jacks 8A and 8B of the subscriber line circuit, which will allow the call to proceed.

Operation of the key 19RS of the test circuit will apply ringing current to the tip T of the subscriber's line, or in the case of a toll line subscriber, closure of ground on the rings of the jacks 22B and 22Q will cause the subscriber's toll line equipment to repeat the ringing current to the subscriber line. When the subscriber answers current will flow in the ring side R of the line, to operate a relay 19L in the test circuit, to light the lamp 19SC as an indication. Operation of the key 20TY will extinguish this lamp and condition the repeater of the test circuit so that the test attendant's teletypewriter will be connected into the circuit for communication. The test attendant may then inform the subscriber to proceed with practicing and may retire from the connection by removing the patching cords from the jacks 22A and 22B. The cords should be removed simultaneously or the one in jack 22A removed first.

With the cords removed from the jacks 22A and 22B, ground supplied over the auxiliary contacts of the jack will cause the relays 22AA and 22C to operate. The operation of relay 22AA will terminate the tip T of the subscriber's line in negative battery through resistance 220. The ring R of the subscriber line will be grounded through the upper winding of the relay 22L. Current flowing in this winding will operate the relay 22L to its marking contact. The operation of relay 22C will close the biasing path through the lower winding of the relay 22L and transfer the timing circuit of the discharge tube 221 from ground to the left-hand contact of relay 22L. If the practice circuit is connected to a toll line subscriber, ground will be extended to the conductor S over the path from the tip of jack 22Q, make contact of jack 22P, back contact of relay 22E, make contact of jack 22P to ground over contacts of jacks 22A and 22B to condition the toll subscriber line circuit for transmission. The relay 22L will follow the subscriber's practice signals. During spacing signals the condenser 222 will be charged through the resistance 223 but the charge will be insufficient to cause the breakdown of the tube 221.

The subscriber may dismiss the practice circuit by a disconnect signal which will open the tip and ring conductors, and the relay 22L will be operated through its right-hand contact indefinitely. When a sufficient charge has accumulated on the condenser 222, the tube 221 will become conductive and the relay 22D will operate, and operate the relay 22E. The relay 22E will ground the control element of the tube to substitute a path through the resistance 224 for holding the relay 22D instead of the path through the tube. This is done to extinguish the tube for the next use of the practice circuit. The relay 22E will remove ground from the conductor S of a subscriber toll line which happens to be connected, release the relay 22AA and light the disconnect lamp 22X. Subsequent calls to or from the subscriber may progress in the usual manner because the relay 22AA is released. The test attendant may remove the connection from the jacks 22P and 22Q to the subscriber line circuit without interrupting signals proceeding on any subsequent call.

If a call should be placed for a practicing subscriber from the central office, the relay 22G will operate when the holding magnet 2H of the link circuit is operated. The relay 22G will cause the relay 22BB to operate and lock. Ground placed on the conductor 166 will activate the relays 18P and 18P1 in the all-trunks-busy circuit, to cause them to operate in the manner previously described to generate a series of "character K" teletypewriter signals which will be supplied to the practice circuit over the conductors 167 and 168. The relay 22B will transfer the tip of the subscriber line from its termination through the resistance 220 to the armature circuit of the relay 22K and will close a potentiometer connected to the left-hand contact of the relay 22K. The practice signals will be interrupted by the series of "character K" signals which will serve as an indication that a call to the subscriber is awaiting completion. The subscriber may accept the call by sending a recall signal which will cause the tube 221 to function as set forth in the preceding paragraph, to release the relay 22AA and light the lamp 22X as an indication to the test attendant that practice connections may be removed. Operation of the relay 22E will release the relay 22B and remove the supply of "character K" signals from the practice circuit. If no other practice circuit is receiving "character K" signals at this time, ground will be removed from the all-trunks-busy circuit over conductor 166.

Alternative Form of Trunk Circuit Termination for Central Office

Different forms of central office equipment are in use. Figs. 23 and 24 comprise a circuit diagram of a central office trunk termination adapted to be substituted for that of Figs. 5 and 6, and when so substituted to cooperate with a central office and cord circuit according to Lane Patent 1,965,383, granted July 3, 1934. Such a cord circuit will be assumed in what follows.

Locke et al. Patent 2,237,154 hereinbefore referred to discloses the central office cord circuit of the Lane et al. patent in greater detail.

In describing the arrangements of Figs. 23 and 24, operation of only the elements disclosed therein will be discussed; conditions applied to the outgoing path 125 or received over the incoming path 114 will be mentioned; and it will be assumed that the equipment at the satellite office has functioned to produce the incoming conditions at proper times and will function in response to outgoing conditions at proper times in the manner hereinbefore described.

Transmission over the trunk for supervisory purposes will be on a full duplex basis. In the idle condition the incoming and outgoing paths 114 and 125 will be in the spacing condition. A call placed on a trunk by a subscriber will be indicated at the central office by the placing of a marking condition on the inward path 114. A call placed by the central office will be indicated by the placing of a marking condition on the outward path 125. In the idle condition all relays will be deenergized except the relays 23A1, 23A2 and 23B. The relays 23A1 and 23A2 will be held to their spacing contacts by current flowing in the lower biasing windings. The relay 23B will be held to its spacing contact by current flowing in the upper winding in opposition to current flowing in the biasing winding. Relay 23B tends to operate to its marking contact when the upper winding is opened but this operation is delayed by the time required to charge condensers 231, 232 to a predetermined voltage.

*Call to a subscriber*

The operator places the calling plug of the cord in jack 240 of the multiple which causes the relay 24S to operate and in turn operate the relay 24SA and prepare separate locking paths for the relays 24R and 24LO. Ground from the back contact of relay 24J will be applied to the ring conductor of the jack to light the cord supervisory lamp. The operation of the relay 24SA closes the transmission conductor to the winding of the relay 23S, controls the busy lamp to make the trunk indicate busy, and prepares an operating path for the relay 24SL. The closure of the transmission path causes the associated loop repeaters 23S and 23R to place a marking condition on the outward conductor 125 to indicate to the satellite office that a call is intended. See Fig. 50.

When the satellite office circuits are prepared to receive call directing teletypewriter impulses, a marking condition which is a "Director ready" signal will be placed on the conductor 114, which will be of sufficient duration to cause the relay 23A1 and 23A2 to operate to their marking contacts. This results in the operation of the relay 24J but does not cause the relay 23B to move to its marking contact because of the delay introduced by charging up the condensers 230 and 232 through the resistances 231 by the current through the operating winding of relay 23B. When the relay 24J operates, ground is removed from the ring of the jack 240, which extinguishes a lamp in the cord circuit and supplies ground to operate the relay 24R, which locks to ground on the contact of relay 24S, and the operating path of the sleeve relay 24SL is completed. Operation of the relay 24J also causes the operation of the relay 23N, upon the operation of which signals from the conductor 114 are extended to the repeater relay 23R, and repeated thence into the cord circuit. The transmission circuit remains closed at this time because the conductor 114 is in marking condition. At the end of the short marking impulse when the conductor 114 returns to spacing condition, the relays 23A1 and 23A2 return to their spacing contacts, which releases the relay 24J and in turn releases the relay 23N. The reapplication of ground over the contact of the relay 24J to the conductor normally extending to the ring of the jack will have no effect on the cord supervisory lamp which will remain unlighted because this lead is open at the contact of the relay 24R. The transmission path to the cord will be opened from the time the inward conductor 114 returns to its spacing condition until the relays 23A1 and 23A2 have released the relays 24J and 23N. This short spacing condition on the transmission lead to the cord will cause an operation of the operator's teletypewriter. This operation and the resultant extinguishment of the cord supervisory lamp will serve as an indication to the operator that calls may be transmitted. These signals will be transmitted from the keyboard of the operator's teletypewriter, after which the operator will ring on the circuit by operating a ringing key in the cord circuit to apply ringing current to the tip of the jack (ringing current operates the relay 24T1, which operates relay 24T3 and completes the operating circuit of relay 24T2). Operation of relay 24T2 releases relay 24T3 and completes the operating path of the relay 24LO, which operates and locks to ground on a contact of relay 24S. This opens both the operating and locking paths of the relay 24R and opens the ringing shunt path which caused the operation of relay 24T1. The release of relay 24R reconnects the ring conductor to the back contact of the relay 24J.

If the called subscriber's line is idle, the inward path 114 remains in the spacing condition during the ringing of the subscriber's bell. The relay 24J remains released, connects ground to the ring of the jack, and holds the cord supervisory lamp operated. When the subscriber answers, the inward path becomes marking. The relays 23A1 and 23A2 are then operated to their marking contacts to operate the relay 24J, and will open the operating path of the relay 23B and the discharge path for the condensers 230 and 232. As soon as the condenser charge is complete, the relay 23B operates to its marking contact. The operation of the relay 24J removes ground from the ring of the jack and extinguishes the cord supervisory lamp; it also operates relay 23N, which extends the incoming path to the repeater relay 23R. The operation of relay 23B to its marking contact will cause the relay 23C to operate over contacts of relays 23D and 24SL, which continues relay 24J operated by replacing ground on the marking contact of relay 23A2 with ground on a contact of relay 23C. Relay 23C operates relay 24P, prepares a locking path for relays 23D and 23H, and operates the relay 23E through its upper winding. Operation of relay 23E returns relay 23B to its left or spacing contact, discharges the condensers 230 and 232, and prepares a path for the operation of relay 23D. The return of relay 23B to its left contact causes the operation of relay 23D, which locks to ground over the contacts of relay 23C and removes the same ground from the operating path of the relay 23E. Relay 23D also transfers the right-hand contact of relay 23B from the winding of relay 23C to a path through contacts of the relays 23G and 23Q and the winding of relay 23F, in preparation for the operation of relay 23F upon subsequent movement of relay 23B to its right contact. The relay 23D also transfers the operating path of the relay 23B from the spacing contact of relay 23A1 to the marking contact thereof. Communication may take place and further action of the relays 23A1 and 23B will be as subsequently described.

If the called line is busy, out-of-order busy or unassigned, or impossible selecting characters have been transmitted, distinctive signal pulses will be returned over the conductor path 114. These pulses simulate a continuous series of teletypewriter signals, causing the repetitious recording of a preassigned character. The first marking condition in such signals causes the relay 23A2 to operate the relay 24J. Whenever the operator has applied ringing current, this will have removed ground from the ring lead R, have extinguished the cord lamp, and operated the relay 23N. If the operator has delayed operating the ringing key in anticipation of receiving a busy signal or otherwise, the operation of the relay 24J will not place ground on the ring of the cord circuit. The ring, therefore, is opened and the shunt in the cord circuit is removed from the transmission lead. The received pulses are recorded on the operator's teletypewriter. In case of a busy signal these pulses record "character K's" and in the case of an out-of-order busy condition they record "character Q's." If the satellite office has received characters for which no subscriber line is assigned or other than numerical characters, "letters" signals will be received. These will make no record but the audible response of the teletypewriter will be recognized by the operator. The slow release characteristic of relay 24J will cause it to hold operated over the single dot elements of these code combinations. Because the marking periods do not exceed 0.3 second, the relay 23B will remain in position.

*Call from a subscriber*

A subscriber's call causes the conductor 114 to receive a marking condition. Relays 24J and 23N operate without useful function at this time. After approximately 0.3 second, the relay 23B moves its armature to the right and operates the relay 24K which locks and places a busy condition on the jack appearance of the trunk in the multiple by connecting battery to the sleeve lead through a resistance 241. Relay 24K also connects a ringing source to the outgoing transmission conductor, which causes the operation of relay 23S, removes ground from the right-hand element of tube 244 and prepares a path for the operation of relay 24L. After ringing current indicates to the satellite office that the call has been registered, the relay 23A2 will be put in marking condition and cause the operation of the relay 24L to light the line lamp 24LI, also to operate the relay 24LO to close ground over a conductor to the night alarm device 245 and continue the grounding of the condenser 246.

The failure of the operator to answer promptly may induce the subscriber to recall, which will cause alternate opening and closing of the incoming conductor 114, which will cause operation of the relay 23A1 and which will alternately operate and release relay 24L and flash the lamp 24LI. Relay 24K remains locked independently of relay 23B.

The operator answers by inserting an answering plug in the line jack and causes the operation of relay 24S, with attendant operation of relays 24SA and 24SL. Relay 24K is released by operation of relay 24SL, which causes the operation of relay 23C which locks because relay 23B will be on its right contact. Operation of relay 23C will cause the operation of relay 24P, prepare a locking path for relays 23E and 23H, and cause the relay 23E to operate. The operation of relay 23E will reoperate the relay 23B, discharge the timing condensers 230 and 232, and prepare a path for the operation of relay 23D. The operation of relay 23B to its left contact will cause relay 23D to operate and lock over the contacts of relay 23C, and remove the same ground which locked it from the operating path of the relay 23E. Relay 24K will release to hold relay 24J operated over the contacts of relay 23A1 and when the relay 23C operates it will also hold the relay 24J operated. Relay 24L releases and extinguishes the lamp 24LI. The relay 24J operates the relay 24N, which connects the repeater relay 23R to the receiving path 114.

The relay 24P will lock up over the relays 24SA and 24J. Operation of relay 23D releases relay 23E. Telegraphic communication may now take place.

The calling subscriber may abandon the call with the consequent operation now to be discussed. The placing of the call puts a marking condition on the conductor 114. The final switching devices are not effective to connect the subscriber line to the trunk completely until ringing frequency or a steady marking condition is placed on the conductor 125. The operation of relay 24K connects ringing pulses to the conductor 125 and also removes ground from the condenser 246. If the subscriber abandons the call before the operator answers, the path 114 will return to marking condition to release the relay 23A1, which will release the relay 24L to extinguish the lamp 24LI and cause the condenser 246 to be charged positively through the resistance 247. When the condenser is charged to a suitable voltage, the gas-filled tube discharges current with the resultant operation of relay 24M, which locks and opens the operating path of relay 24K but the relay 24M will be held until the locking contact of the relay 24K has been opened. Removal of ringing from the transmission conductor releases the switching circuit at the satellite office and an interval of several seconds is provided to hold the circuit during intervals in which the subscriber may become impatient and flash his power switch on and off to cause the lamp 24LI to flash.

If an operator commences a call to a subscriber and abandons it before or after the process of selecting the desired line, or after the desired line has been selected and is being rung, the relays 24J and 23Q will not be operated when the relays 24S and 24SA release. The relay 24SL will remain operated by a locking circuit over a back contact of relay 24J and the circuit will be restored to normal idle condition as outlined under the heading of "Disconnect signals."

Removal of a cord in error from an established connection by the operator will cause the release of relay 24S. Relays 23C, 24P, 24SL, 24J and 24LO will remain operated and negative transmission battery over a contact of the relay 24P will hold the outward transmission circuit in marking condition. Release of relay 24SA will operate relay 24FD, which will apply interrupted ground at 120 interruptions per minute to the winding of relay 24L. This flashes lamp 24LI to indicate removal of a cord in error. Upon the operator reconnecting, relay 24S reoperates directly from the sleeve of the jack, reoperates relay 24SA and relay 24FD releases to restore normal operating conditions.

*Transmission*

During communication relays 23A1 and 23A2 follow all subscribers' signals. Relay 23B remains on its left contact during all signals except break signals. Condensers 230 and 232 are discharged during marking signals and charged during spacing signals to the upper winding of relay 23B. Any spacing interval exceeding 0.3 second reduces the charging current to such a value that relay 23B operates to its right contact.

During such a break signal relay 23B on its right contact causes the operation of relay 23F, which opens the original operating path of 23D and prepares a path for operation of relay 23G. Operation of relay 23F closes its locking path through the winding of relay 23E to ground on the spacing contact of relay 23A2. Operation of relay 23E closes the operating path of relay 23B. Opening of the right contact of relay 23B removes the operating source of relay 23F but relays 23E and 23F continue locked during the spacing condition over the armature of relay 23A2. Closure of the left contact of relay 23B operates and locks relay 23G, which assists in preparing operating paths for relays 23H and 23Q, also removes condenser 232 from the timing network of the relay 23B, and disconnects the operating path of relay 23B from the contacts of relay 23A1. With condenser 232 disconnected the condenser charging time is reduced to 0.2 second. This sequence of operations brings into play, in preparation for timing, a test interval without which no disconnect signal could be received and registered. Assuming no disconnect signal then at the end of the break signal, the relays 23A1 and 23A2 return to marking condition, which releases relays 23E and 23F. Relay 23E upon releasing opens the operating path of the relay 23B. Thus the charging time of the condenser 230 alone will determine the holding time of the relay 23B. However, the relay 23B releases in approximately 0.2 second after the release of relay 23E and the relay 23Q operates over the path prepared by the relay 23G to open a locking path for the relay 23G. The consequent release of relay 23G returns the operating path of relay 23B to the marking contact of relay 23A1, which reoperates relay 23B to its left contact. Relay 23Q releases and returns the relay system to the condition existing prior to the break signal and communication may be resumed.

The period following a break signal is one within which a disconnect signal may be registered. This test period is brought into play only after a break is received which has sufficient duration to operate the relay 23B to its right contact and cause the sequential operation of relays 23F, 23E and 23G. Following the break and the operation of the relay 23A1 away from its spacing contact, the test period is timed from the release of the relay 23F to the operation of the relay 23Q. The return of the conductor 114 to spacing condition during this period results in the registration of a disconnect signal, as will be set forth later.

To prevent the registration of a false disconnect signal as a result of resumption of transmission of teletypewriter signals immediately after breaks from the subscriber, the satellite office paralyzes the transmission circuit for an interval following each break signal. No spacing signals may be transmitted to the central office by the subscriber for approximately 0.3 second, which is longer than the test period of 0.2 second. This margin is provided to insure a factor of safety to cover variations of the timing elements. For a similar reason the satellite office will paralyze transmission following all breaks in excess of 0.2 second, whereas the test period circuit will not be called into play unless breaks exceed 0.3 second. To give this desired margin the condenser 232 is removed from the timing network of the relay 23B during the test period. The transient period of paralyses following breaks does not ordinarily interfere with communication because the subscriber sending a break signal would not attempt retransmission after the break signal without pausing to learn whether the break had been effective.

When a disconnect signal is transmitted, the break is of sufficient duration to move relay 23B to its right contact and operate relay 23F. The relays 23E and 23G will operate as set forth under the paragraph relating to break signals. Following the break a marking pulse of approximately 0.1 second will arrive over the conductor 114 unless a recall is intended. At the beginning of this marking impulse relays 23A1 and 23A2 will be operated to their marking contacts. The locking path of relay 23F will be opened and relays 23E and 23F will release. This action will initiate the test period to determine whether a disconnect signal was intended. The end of the 0.1 second marking pulse will occur within this test period, which will cause relays 23A1 and 23A2 to return to spacing. The closure of the spacing contact of relays 23A2 will operate relay 23H because its operating path has been previously prepared by operation of relay 23G and release of relay 23F. Relay 23H will lock to ground on the contact of relay 23C, also open the locking path of relay 23C, and release the relay 23G. The release of relay 23C releases relays 23H and 23D and because relays 23E and 23F have been previously released and relay 23R has not been operated, the circuits will be returned to the condition which existed prior to answering by the subscriber, as set forth in the first paragraph of a "Call to a subscriber." During the time in which relay 23H is operated, the condenser 230 and possibly condenser 232 will be discharging, which resets the timing feature of relay 23B because with relay 23D released, the relay 23B will be operated to its left-hand contact by the left-hand contact of relay 23A1. Otherwise, if the end of the disconnect marking period should occur late in the test period, the relay 23B might reoperate the relay 23F or 23C in error. The release of the relay 23C will release the relay 24J, which will apply ground directly to the ring of the jack and light the cord supervisory lamp indicating a disconnect signal. The release of relay 24J releases relay 23N to cause the repeater to place a marking condition on the transmission lead of the cord circuit. Relay 24P releases. When the operator removes the cord plug from the jack, relay 23S releases, which releases relays 24LO and 24SA. Relay 24SL remains operated and locked over a back contact of relay 24J. Under this condition ground from the inner upper armature of relay 24SA will operate relay 24U, which in turn removes ground through a 500 ohm resistance 248 from the condenser 246 and connects the conductor with a positive source of 130 volts through a much larger resistance 249. When the condenser 246 is charged to the striking voltage of tube 244, the resultant current through the tube will operate the relay 24M, which will operate and lock to the ground through the winding of relay 24Y. See Fig. 49. Operation of relay 24Y applies ringing current over a back contact of relay 24SA to the outgoing transmission circuit to release the trunk at the satellite office, which relay in turn applies a short marking current to the incoming conductor 114, which causes a momentary operation of relays 23A1 and 23A2. This momentary operation operates relay 24J, which releases relays 24SL, 24U, 24M, 24Y and 23N, and restores the circuit to normal.

A recall signal may be registered at any time after a disconnect, provided the operator has not removed the cord from the multiple jack. In doing this the incoming path 114 returns to the marking condition, which causes relay 24J to operate directly from the marking contact of relay 23A2. Release of relay 23B to its right contact causes the operation of relay 23C in a manner set forth under the heading "Call to a subscriber" to recondition the circuit for transmission. Operation of relay 24J removes ground potential from the ring of the cord circuit under which condition the cord is arranged to automatically flash the supervisory lamp of the cord circuit.

Director for One Thousand Lines

The arrangement previously described is adapted for use with not to exceed one hundred subscribers' lines. It may be extended to a greater number of lines by using non-numerical code combinations. It may also be extended for use with one thousand or even ten thousand or more lines with numerical line designations, and to show the priniciples of such extension the case of one thousand lines is given in detail. For this purpose Figs. 26 to 31, inclusive, replace Figs. 13 to 15, inclusive, and are fitted to the other figures in accordance with Fig. 32. No essential modification of the remainder of the system is required and for the purpose of describing the one thousand line system we may assume that we enter the previous description under the heading "Details of call from central office to subscriber station" and the subheading "The central office operator sends line selecting conditions." The situation existing at this stage, in so far as is material to what follows, is that the director ready signal has been received at the central office, the central office equipment has responded thereto and the satellite office is conditioned for reception of line selecting code combinations. In this condition the repeater relay 4S is set in spacing condition over conductor 114 to the central office; the repeater relay 4R is receiving a marking condition from the central office; and the following relays are operated, or operated to the relay contacts specified, as the case may be: Selector magnet 2S of the trunk in use, relays 4D, 10CH, 10AD, 4L to contact *m*, 4TM to contact 43, 4A, 4B, 3SS, 3S1, 10ST, 10AL, 10AL1, 21B, 21A, 21E, 21G on its marking contact, 21F, 13B, 13F, 13J and 13C. Furthermore, the conductor 131 is extended from the trunk circuit to the director circuit where it terminates at an open back contact of the relay 13LU, with a branch extending also through the upper winding of the relay 21H. The conductor 130 is extended from the trunk circuit to the director circuit where it passes through the upper winding of the relay 13C and thence to the open right-hand contact of relay 13P1. The conductor 134 is grounded in the sequence circuit at the back contact of relay 10AL1 of the particular trunk. The ground on conductor 134 maintains the relay 21B operated. The relay 13B is maintaining the conductors 135 and 140 separated at its lower back contact. The motor 21M in the distributor circuit is operating at normal speed. The relays 13C and 13J, being operated, will be maintaining grounded the conductors 138, 146 and 147 extending to the miscellaneous alarm circuit.

When the operator sends the upper case or "figures" combination, the relays R1, R2, R4 and R5 are operated in the same manner and with the same result as in the two digit system previously described. This causes the operation of the relay 14F. This releases relay 13C and removes the ground from conductors 138, 146 and 147. The relay R6 functions in the manner previously described and upon its release it causes the operation of the relay 13K which locks to ground over a make contact of the relay 14F and off-normal ground on the back contact of the relay 13N. The first code combination, which is the hundreds digit of the desired line, registers on the relays R1, R2, etc., and is extended by the relays D5, D4, etc. The stop pulse of the first digit operates the relay R6 and causes the operation of the relay 30L1, which locks up to ground over a make contact of the relay 14F. This code combination extends the ground on the armature of the relay D5 through the fanning-out relays to one of the conductors 150. It will operate one of the relays 15H(0) to 15H(9). Assuming that the digit is 0, the relay 15H(0) will be operated and this relay will lock up to off-normal ground over a path extending from its lower make contact and the winding of lockout relay KO1 through a contact of transfer relay 14T3 and back contact of relay 13N. Operation of relay 15H(0), therefore, causes the operation of relay KO1 and two magnets 28H(0). As soon as the relay R6 releases to its left contact, it causes the operation of the relay 30M1 over a path from off-normal ground on the armature of relay R6, a make contact of relay 14F, a make contact of relay 30L1, a back contact of relay 30L2, winding of relay 30M1 to battery. Release of relay R6 to its right contact operates relay 30L2. Operation of relay KO1 causes the operation of the relays K1, K2 and K3 (Fig. 31) which transfers all the conductors 150 to the windings of the relays 31T(0) to 31T(9). The next digit causes the operation of one of these last-named relays. Assuming that the digit is the 0 digit, the relay 31T(0) will be operated over the fanning-out leads 150 and it will lock to the same off-normal ground which locked the relay 15H(0). It will be noted that when the relays K1, K2 and K3 operated, they prevented the operation of any unoperated relay in the series 15H(0) to 15H(9) by the second digit. When the relay 31T(0) operates and locks it causes the operation of two selecting magnets 28S(0). As soon as the relay R6 releases to its left-hand contact, it causes the operation of the relay 30M2. The magnets 28S(0) operate from battery, windings of relays 28S(0), through the winding of relay KO2, back contact of transfer relay 14T7, make contact of relay 30M2 and make contact of relay 14F to off-normal ground. Relays K4, K5 and K6 are operated by the upper make contact of relay KO2 to prevent the next digit from operating any additional relay of the series 31T(0) to 31T(9). Selector magnets 28H(0) are now operated and two holding magnets 28S(0) are operated, which close contacts of ten subscribers' lines 000, 001, etc., to 009. The fanning-out leads 150 are now extended to these ten closed contacts because relays K4, K5 and K6 are operated. The next and third digit is received in a manner similar to the second except that the relays 14J and 14J1 are prevented from operating and the relay R6 upon its operation causes the operation of the relay 13N. The relay 13N in operating functions:

(1) To disconnect ground from the conductor 142 extending to the distributor circuit so that if additional pulses of any kind are received in the receiving distributor, no information is sent to or recorded in the director circuit;

(2) To lock under control of the relay 13B; and (3) To prepare a path for the operation of the relay 14N.

When the relay R6 releases to its left contact it causes the operation of the relay 14N over the make contact of the relay 13N and make contacts of relays 30L2, 30L1 and 14F.

The operation of relay 14N functions:

(1) To cause the operation of the relay 14N1;

(2) To cause the operation of the slow-acting relay 13N2; and (3) To connect a circuit to test the called subscriber line.

If we assume that the third code combination is 0, that is, that the three code combinations have been 000, the circuit for testing this line will now be established as follows: From battery through the windings of relays 13X and 13Y, a make contact of relay 14N, a back contact of relay 13R, a back contact of relay 13LU through the armature of relay D5, thence through the armatures of the fanning-out relays to the 0 conductor of the conductors 150, a contact of relay K1, a contact of relay K4 to those contacts of a cross-bar switch of Fig. 28 designated 000, thence over the conductor 152 of the particular subscriber, a contact of jack 8B to conductor H, thence to the winding of the magnet 2H and battery. If the line is idle no ground will be connected to the conductor 152 and neither relay 13X nor 13Y will be operated. This test for ground takes place during the operating time of the slow operating relay 13N2 which begins to operate when the relay 14N operates. The path for the relay 13N2 is from battery through the winding of the relay over a make contact and a second make contact of the relay 14N, and a make contact of relay 14N1 to off-normal ground. If the called line is idle, the relay 13X will not be operated and ground connected to its armature by the relay 13N2 will be connected over a back contact of relay 13J3 through the winding of the relay 13R. The remainder of the operation of testing the subscriber line and connecting it to the calling trunk is in accordance with that portion of the description under the heading "Testing subscriber line" given in connection with the two digit director beginning at the point where the relay 13R operates.

The operation of those other relays of the director circuit which have to do with the timing of the miscellaneous alarm circuit, and are identified as in Figs. 13 and 14, will be understood by tracing the corresponding conductors which extend the miscellaneous alarm circuit into the director circuit to corresponding points, as stated in connection with the description of the two digit director, and will be understood by those skilled in the art without further elaboration.

In general, it will be seen that a third selecting digit is added to the selecting combination; that the relays 30L1 and 30M1 have been assigned to the second digit of the code combination and the relays 30L2 and 30M2 assigned to the third digit; the relays 13N and 14N function in connection with the last digit in a similar manner in both arrangements.

In the three digit arrangement the operation of the selected relay of the series 15H(0) selects a group of one hundred lines and the operation of a selected relay of the series 31T(0) selects a group of ten out of the one hundred and the final digit selects a single line of this group of ten. This is made possible by addition of the series of relays 31T(0), etc., and the coordinate switch arrangement of Fig. 28.

Supplementary Diagrams

Figs. 33 to 52, inclusive are highly schematic circuit drawings designed to aid in understanding the system. To this end each of these diagrams represents the condition of some group of relays, circuits and other equipment in a condition which they assume at a certain time during the operation. These diagrams are based upon the embodiment of the trunk circuit according to Figs. 23 and 24, and the embodiment of a director circuit according to Figs. 13, 14 and 15. The elements designated generally bear the same reference characters as in the principal figures and certain legends are added for purposes of making the diagrams largely self-explanatory. Therefore, but little description of these diagrams is necessary as each one may be considered in connection with the general description taken at the point where the special condition illustrated is reached, as indicated by the text. Emphasis is laid on the schematic nature of these diagrams; they may in some cases omit contacts or other elements through which conductors pass and they are to be read as supplementary to the principal drowings and not as principal disclosures in themselves.

Figure 33:
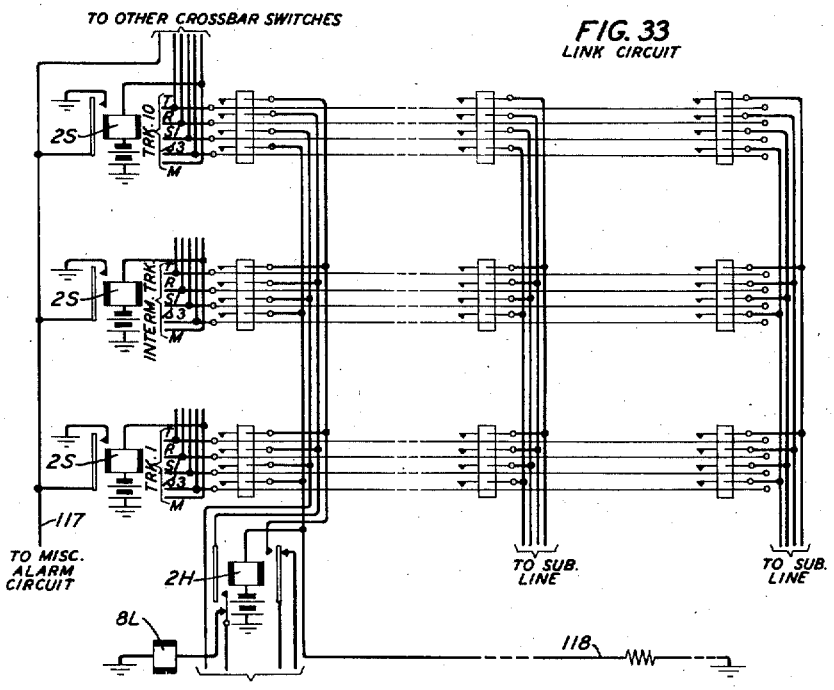

Fig. 33 is a schematic of the cross-bar switch link circuit before the magnets 2S and 2H have been operated. The manner of multipling to other cross-bar switches is indicated.

Figure 34:
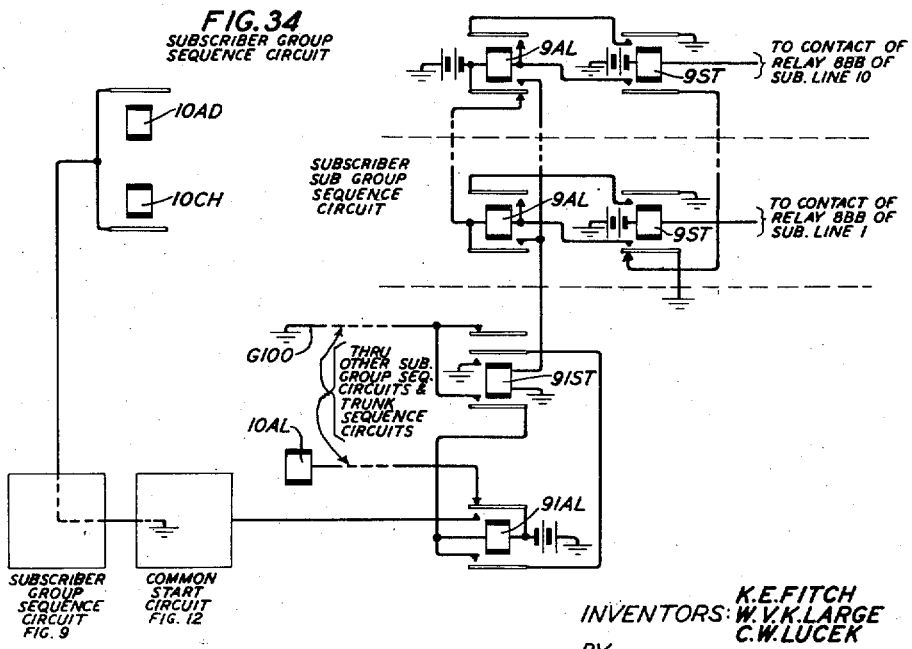

Fig. 34 is a schematic arrangement of that portion of the sequence circuit constituting a subscriber group sequence circuit with all the relays shown in the idle condition.

Figure 35:
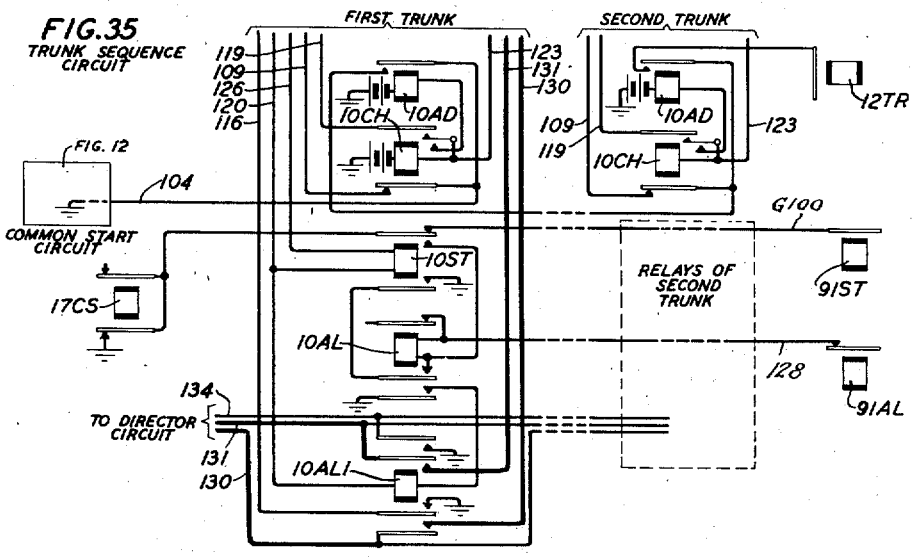

Fig. 35 is a corresponding schematic diagram of a portion of the trunk sequence circuit.

Figure 36:
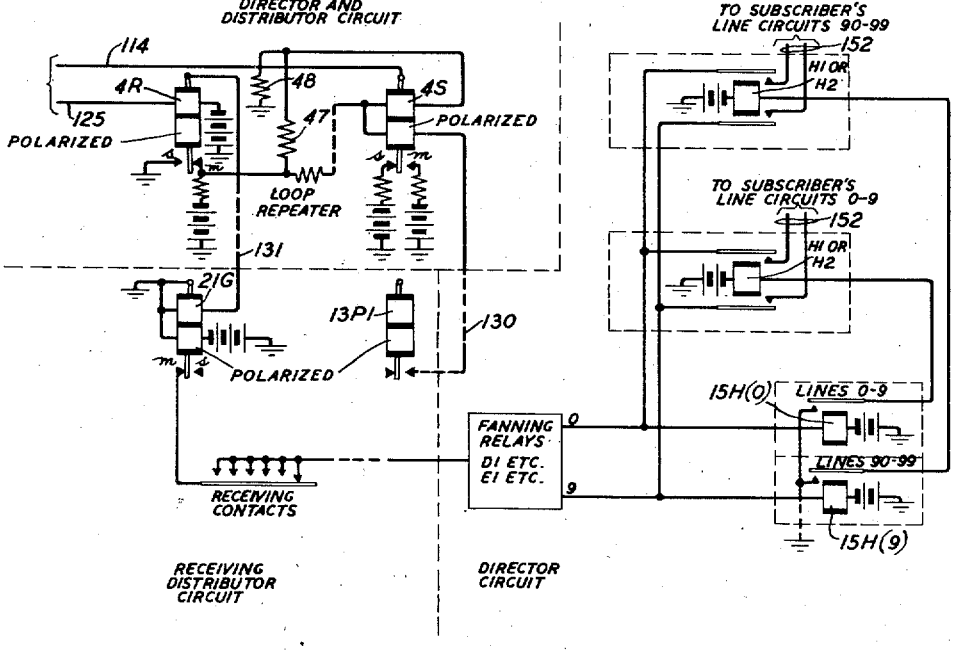

Fig. 36 is a schematic diagram of the director and distributor circuits. Although the receiving contacts of the receiving distributor are shown connected to the counting relays D1, E1, etc., it is to be understood that there is no such connection; the object is to show the manner in which the receiving contacts exercise control over the magnets of the series 15H(0) to 15H(9) and the relays H1, H2.

Figure 37:
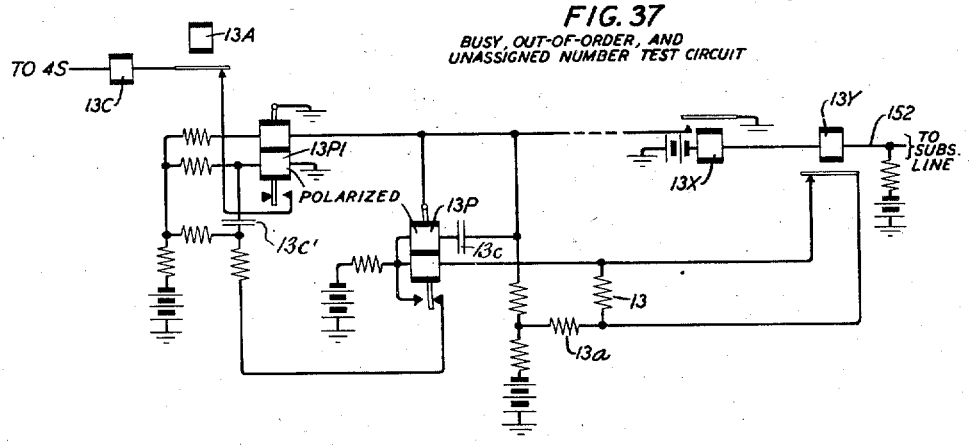

Fig. 37 discloses certain details of the circuit for testing the subscriber line and supplying busy signals in case the line is found to be busy.

Figure 38:
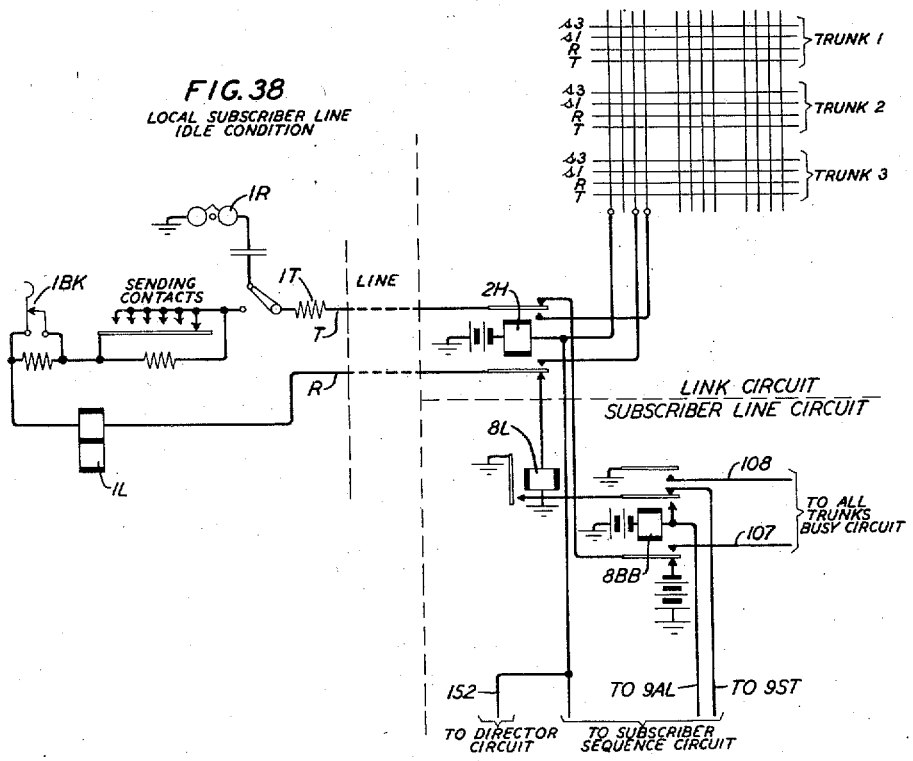

Fig. 38 shows a local subscriber line or loop in the idle condition together with the cross-bar link circuit, diagrammatically illustrated, and the group of relays most intimately connected with the subscriber line which are operated to establish a connection thereover.

Figure 39:
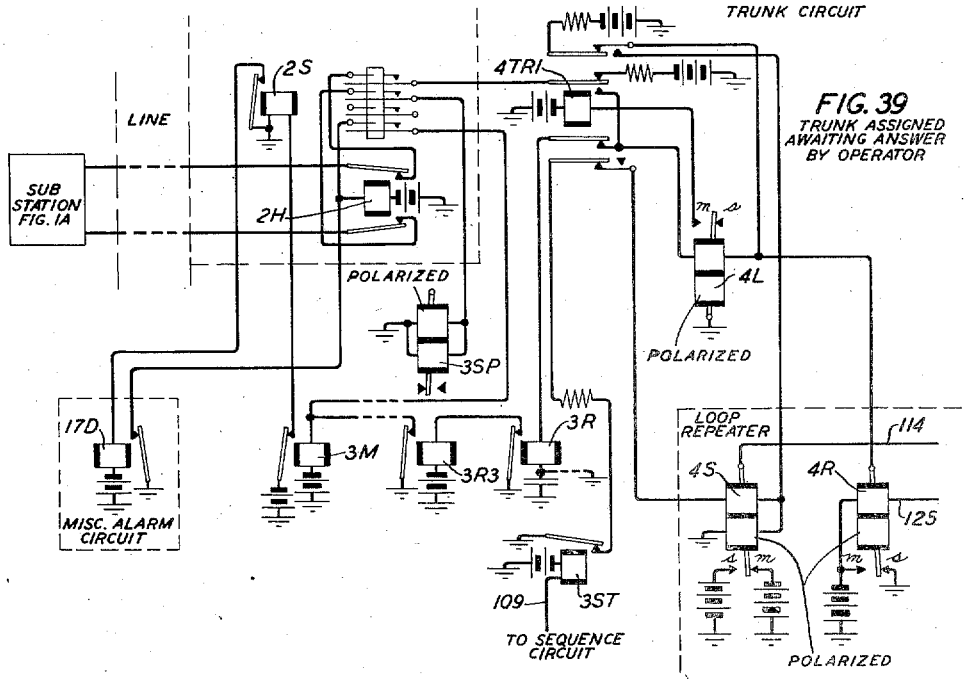

Fig. 39 is a schematic diagram designed to show the condition of a satellite office trunk after a subscriber has seized the trunk but before the operator has answered.

Figure 40:
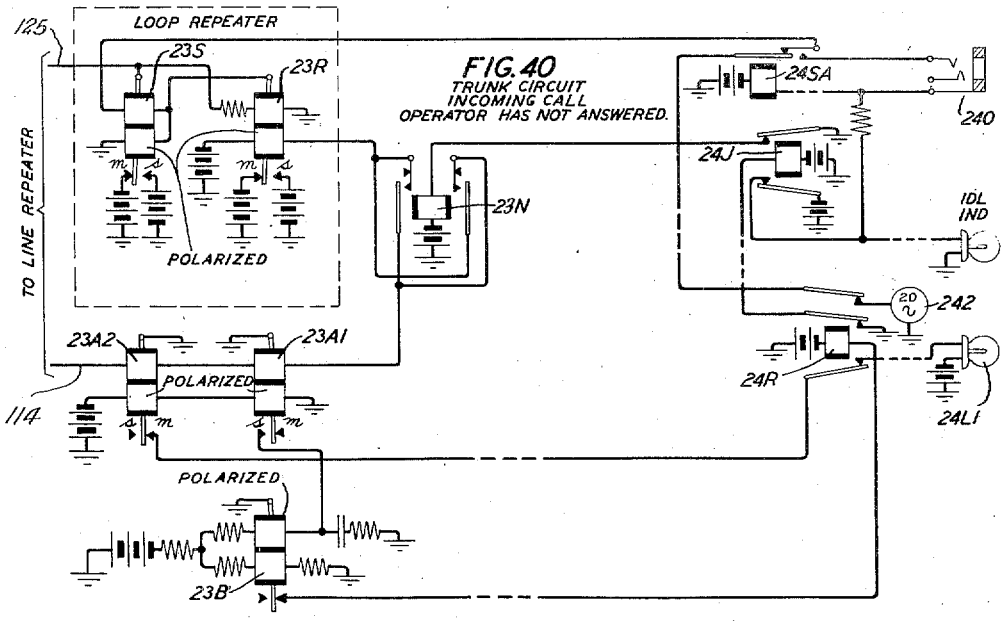

Fig. 40 is a schematic arrangement designed to show the central office trunk equipment according to Figs. 23 and 24, under the condition of Fig. 39.

Figure 41:
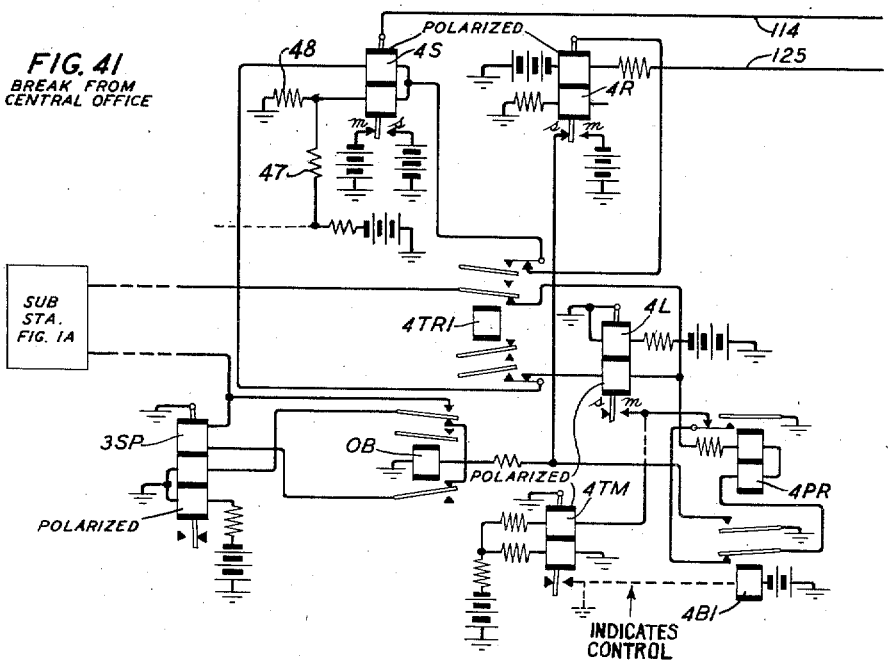

Fig. 41 shows the condition of certain relays in the satellite office trunk after a communication circuit has been established and a break signal is being received from the central office.

Figure 42:
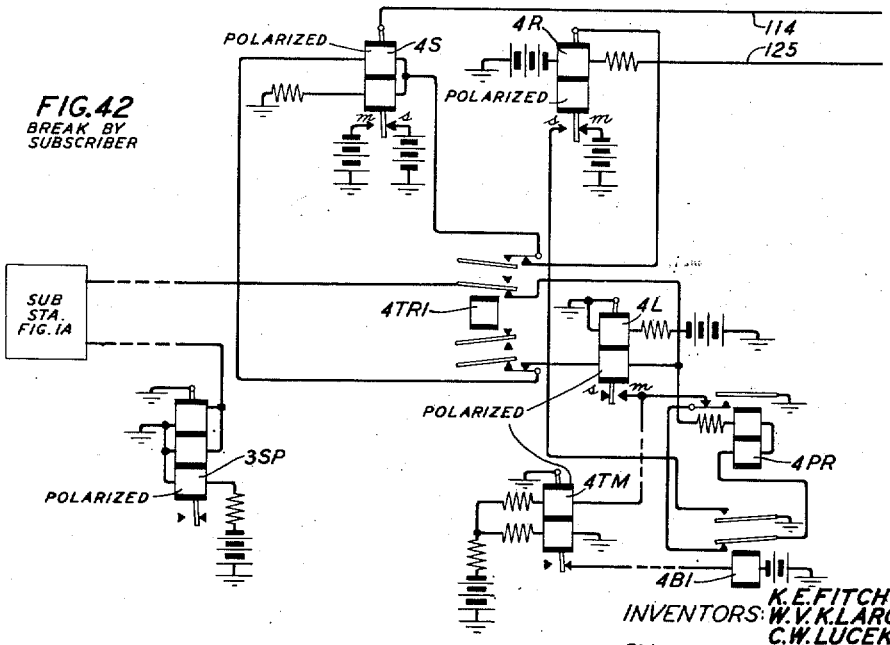

Fig. 42 shows a corresponding situation in which a break signal is being received by the subscriber's station.

Figure 43:
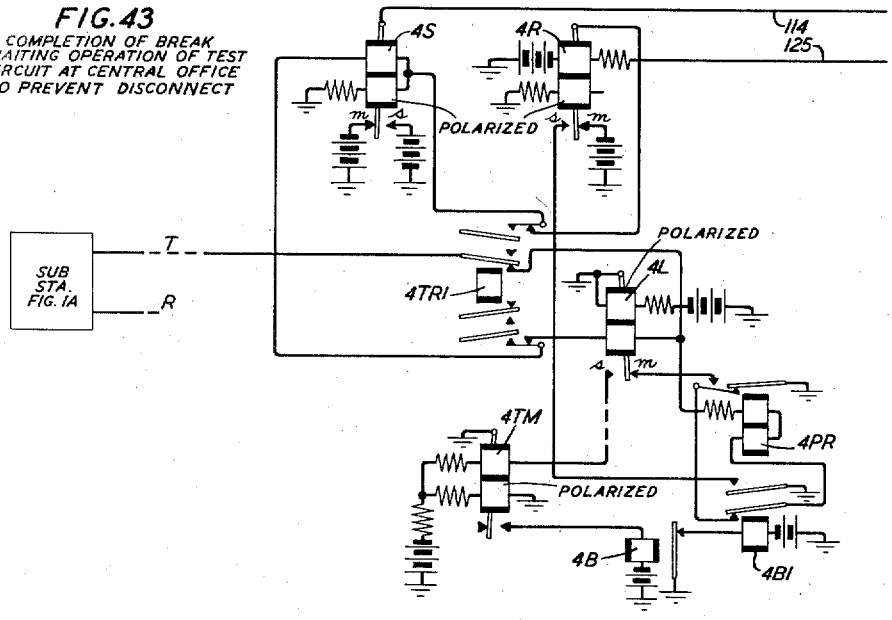

Fig. 43 shows a portion of the satellite office trunk relays after the completion of a break signal and the satellite office trunk is awaiting the operation of the circuit at the central office which tests for a disconnect signal and prevents release of the trunk in the absence of a disconnect signal.

Figure 44:
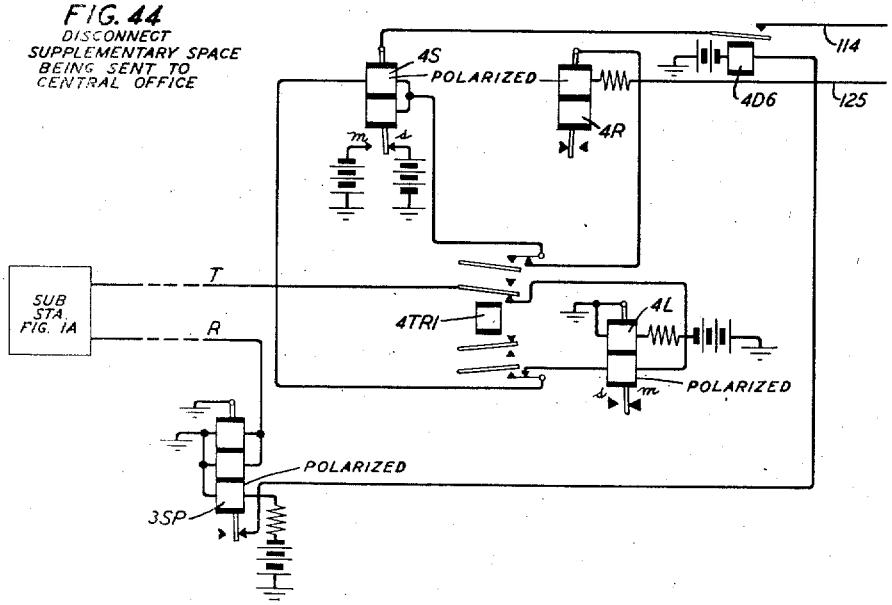

Fig. 44 shows schematically certain relays in the satellite office trunk under the condition of sending a supplementary spacing signal to the central office as an element of a disconnect indication to the central office.

Figure 45:
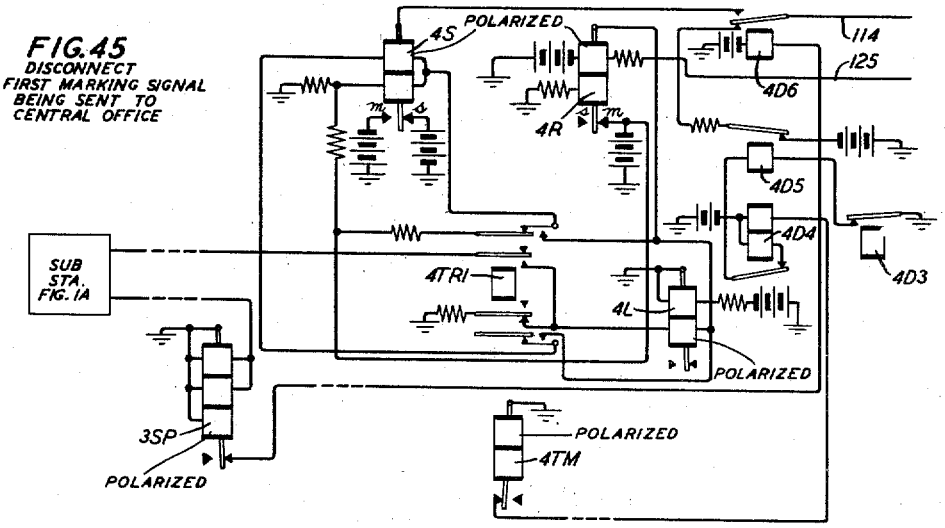

Fig. 45 shows a portion of the relays of the satellite office trunk under the condition of sending the first marking signal to the central office as a part of the series of operations which occur in disconnecting.

Figure 46:
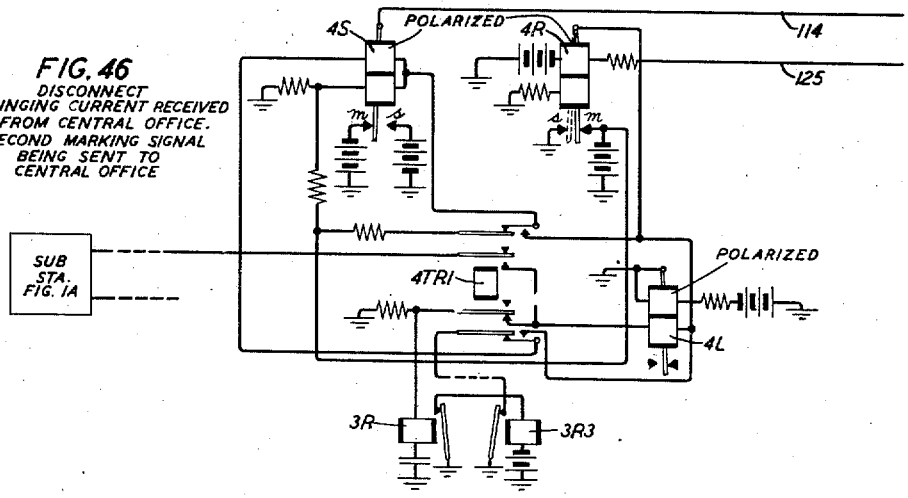

Fig. 46 shows a portion of the relays of the satellite office trunk in that stage of the disconnecting operation at which ringing current is being received from the central office to complete the disconnecting operation and a second marking signal is being sent to the central office.

Figure 47:
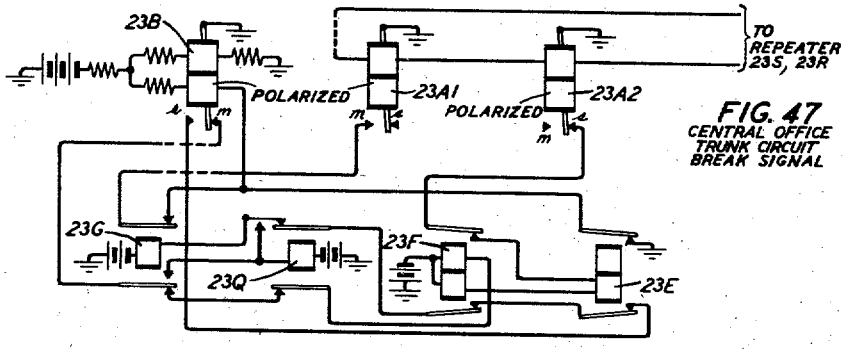

Fig. 47 discloses a portion of the relays of the trunk circuit at the central office in the condition of receiving a break signal.

Figure 48:
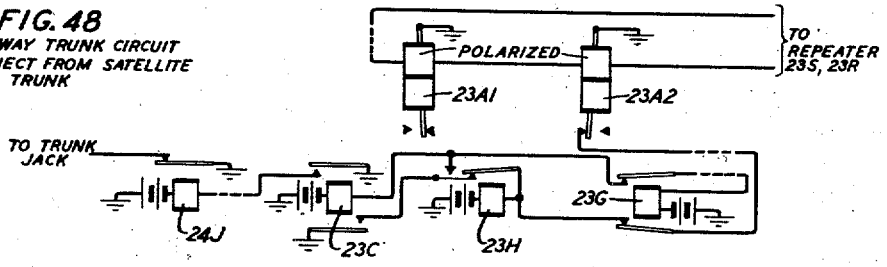

Fig. 48 discloses certain relays of the central office trunk in the condition of receiving a disconnect signal from the satellite office.

Figure 49:
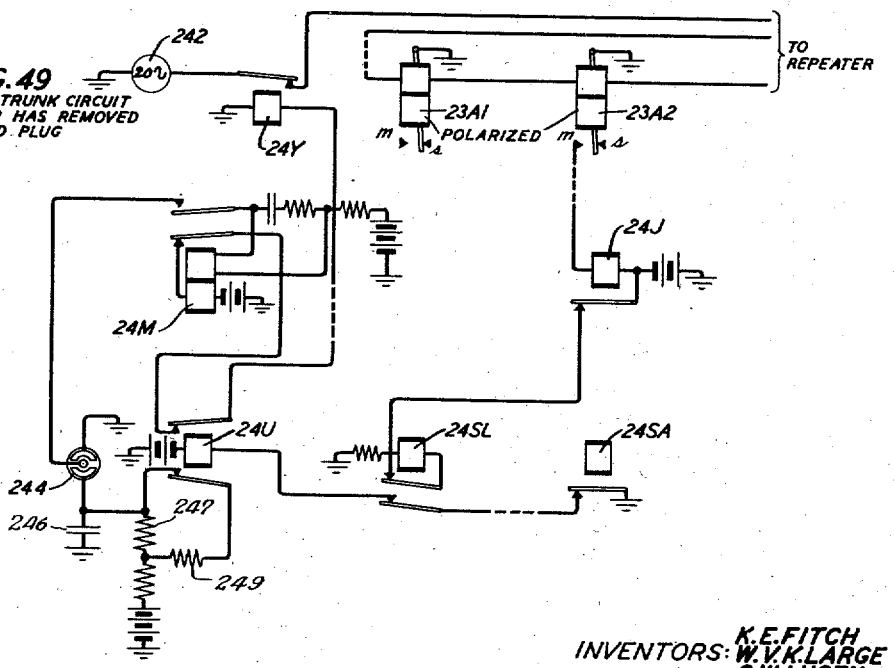

Fig. 49 shows a portion of the relays of the trunk circuit at the central office just after the operator has removed the cord plug from the jack.

Figure 50:
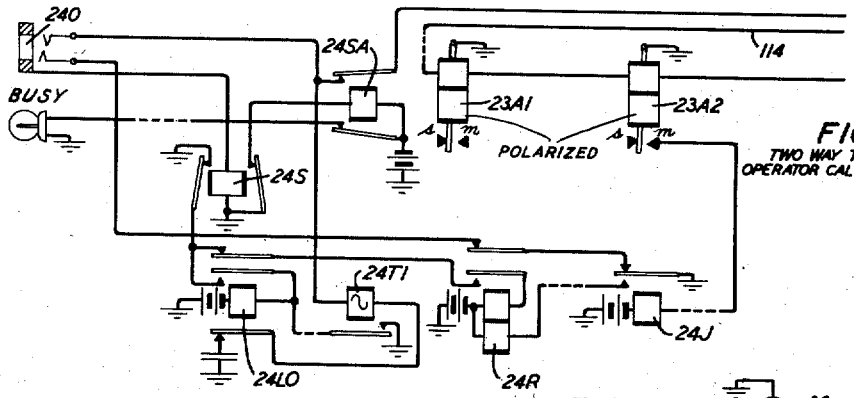

Fig. 50 discloses certain relays of the trunk circuit at the central office in the condition assumed when the operator has plugged into the trunk jack to call a subscriber.

Figure 51:
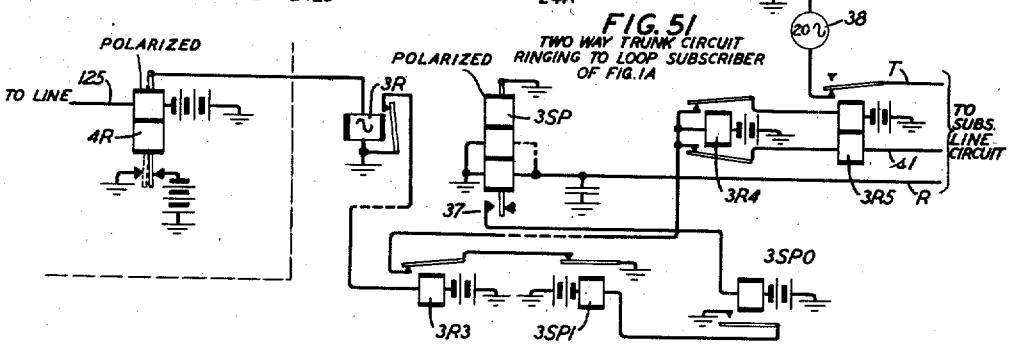

Fig. 51 shows the condition of certain relays in the satellite office trunk when ringing current is being sent to a called subscriber.

Figure 52:
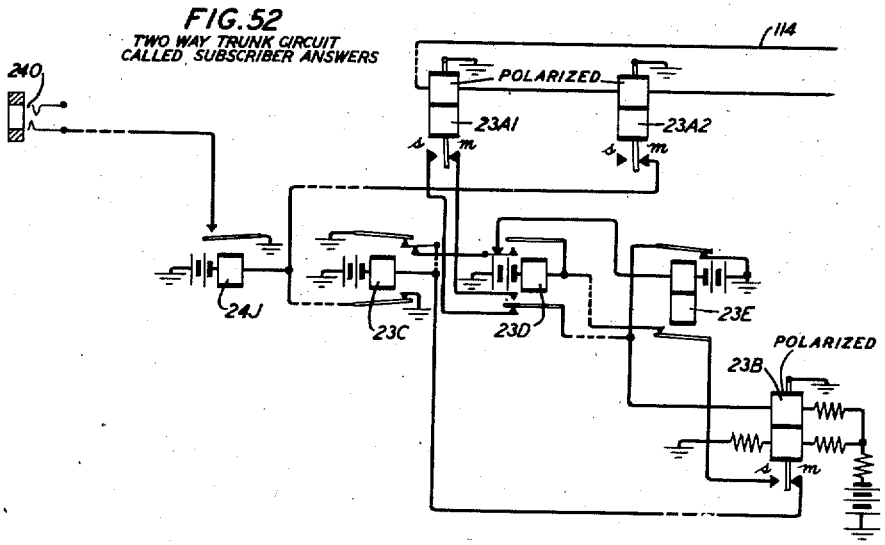

Fig. 52 shows the condition of certain relays in the trunk circuit at the central office under the condition assumed when the called subscriber has answered.

Numerous modifications embodying the novel principles of this system as disclosed herein, to secure the same or equivalent results, will occur to those skilled in the art. No attempt has been made to fully indicate a multiplicity of details which would be incorporated by a person skilled in the art in setting up a system as disclosed herein, among the details being such things as fuses, adjustability of numerous elements, testing keys, multipling of numerous conductors, etc.

What is claimed is:

1. A telegraph switching system comprising a switching office, a plurality of lines terminating thereat each provided at a remote point with a teletypewriter set, a plurality of trunks extending therefrom to a central exchange office, a circuit controlling connection in a predetermined order of the first idle one of said trunks to a calling line, and permutation code controlled instrumentalities controlling the connection of one of said lines to a calling trunk in a back and forth intercommunicative relation.

2. A switching circuit for communication systems comprising a plurality of lines available for channels of communication, a permutation code selector, means whereby said selector may be seized for use, means for controlling said selector to freely connect any selectable one of said lines into a channel of communication, means for releasing said selector from said channel of communication thereafter to render it available for other use, and means for carrying on electric transmission over said channel while said selector is free and available for other use.

3. A communication system comprising a plurality of lines to be selected, a plurality of lines available for use in selecting one of said first plurality of lines, line selecting apparatus comprising permutation code receiving and storing equipment common to said second plurality of lines, means whereby one of said lines to be selected is selected according to the permutation code received in said receiving equipment, means whereby seizure of one of said second plurality of lines seizes said permutation code receiving and storing equipment for use, and means controlled by said permutation code equipment to establish a two-way communication path between one of said first plurality and one of said second plurality of lines.

4. A communication system comprising a permutation code distributor, a plurality of communication trunks, means for starting said distributor, means controlled by seizure of one of said trunks for associating said distributor with said trunk to the exclusion of other trunks, and means for setting the driving motor of said distributor into operation upon said association.

5. A telegraph switching system comprising lines, trunks, means for establishing busy conditions on said trunks, a sequence circuit for allotting trunks to said lines in sequence, a director including permutation code controlled relays for selectively connecting a line to a trunk, said director having an off-normal condition, means whereby actuation of said relays locks said sequence circuit into a condition whereby no trunk can have its busy condition removed while said director circuit is in said off-normal condition after actuation of said relays.

6. A telegraph switching system including a line, a trunk terminating in a jack, director equipment and a distributor, means operatively actuated by an operator plugging into said trunk jack for starting said distributor and seizing said director equipment, means whereby said operator may cause said director equipment to select the line means whereby said operator may send ringing current toward said line over said trunk, and means at the terminal of said trunk for relaying said ringing current toward said line.

7. A telegraphic communication system comprising a subscriber toll line including telegraph repeaters extending from a subscriber's station to a satellite switching office, a trunk extending from said satellite office to a central office and relay equipment individual to such subscriber line at said unattended office for relaying ringing current originating at said central office over said subscriber line.

8. In a telegraph switching system, a subscriber station including a teletypewriter with a driving motor connected to a line extending to a remotely controlled office, a plurality of trunks extending from said office to a central office, a switch by operation of which said subscriber may start the motor of his station teletypewriter, and means operably controlled by operation of said switch to start said motor to select an idle trunk and extend the line of said subscriber to said central office over said trunk.

9. In a telegraphic communication system, a plurality of trunks extending from a central office to a satellite office, a subscriber line extending from said satellite office to a subscriber station, teletypewriter equipment including a power switch for applying power to the motor of said equipment at said subscriber office, and means whereby operation of said power switch starts said motor and seizes said trunk.

10. A system in accordance with claim 9 including test relay means in said trunk at each terminus thereof whereby said trunk tests busy after seizure.

11. A telegraph switching system comprising two switching points a two-way trunk circuit extending between said points, means for maintaining a busy test condition of said circuit at both points so long as a connection is established at either point to said trunk circuit.

12. In a teletypewriter switching system comprising a plurality of lines and a plurality of trunks, a sequence circuit for assigning one of said trunks in response to a call on one of said lines, a source for producing a series of impulses capable of reception on a teletypewriter as significan information, and means for applying impulses from said source to a calling one of said lines when no trunk is available for assignment.

13. A teletypewriter switching system comprising a central office, a satellite office and a subscriber station connected to said satellite office by a line, means whereby a call from said subscriber station is registered at said central office at the termination of a trunk extending from said central to said satellite office, means whereby such registration of the call applies a busy test to said trunk at each terminus thereof, and means operated by the abandonment of a call from said subscriber station prior to answer thereof for removing said busy tests from said trunk.

14. A telegraphic switching system comprising a plurality of trunks, a subscriber line associable with one of said trunks through a satellite office, a calling switch by which a calling subscriber causes his line to be associated with one of said trunks, and means whereby momentary release and reoperation of said switch for recalling purposes prevents the release of said trunk.

15. A telegraphic switching system comprising a plurality of trunks, a subscriber line associable with one of said trunks through a satellite office, a calling switch by which a calling subscriber causes his line to be associated with one of said trunks, means whereby continued release of said switch for a predetermined period of time greater than a definite time releases the associated trunk, and separate means whereby with said switch in calling position telegraphic marking and spacing signals of unlimited duration may be transmitted over said line and trunk.

16. In a telegraph transmission system, a switching office, a subscriber line therefrom to a subscriber station, means for telegraphing thereover by marking current of a certain value and spacing current of a lesser value, and means for sending a break signal thereover by means of current of an intermediate value nearer the lesser than the greater value.

17. In a telegraph transmission system, means for sending marking signals as a certain current value, and means for responding to said marking signals as marking signals; means for sending spacing signals as a smaller current value in the same direction, and means for responding thereto as spacing signals; and means for sending a break signal by a current in the same direction of value between said certain values, and means responding thereto as a break signal.

18. In a telegraph transmission system, a subscriber line, a telegraph impulse repeater connecting said line to a telegraph transmission circuit, means for transmitting a break signal from said subscriber over said line, means for transmitting a spacing signal to said subscriber through said repeater over said line with a residual current in said line, and relay means in addition to said repeater operable as a result of transmitting the last-named signal to increase the residual current to a greater value in the case of transmission of a spacing signal from said subscriber.

19. In a telegraph transmission system, a telegraph line, a telegraph impulse repeater connecting said line to a telegraph transmission circuit, means for transmitting spacing and marking conditions through said repeater from said circuit to said line, said spacing condition having an initial current value in said lines, and supplementary relay means effective shortly after the establishment of a long continued spacing condition to increase the spacing current value above the initial value.

20. In a telegraph transmission system, a subscriber line terminating at a switching point, a telegraph circuit connectable to said line at said switching point, a supervisory relay in said line having a holding position and a disconnecting position, means whereby spacing signals maintain said relay in holding position, and switching means operable upon the transmission of a break signal to vary the circuit of said relay to a more effective holding condition.

21. In a telegraph system, a line section, a second line section, switching means for holding said sections connected as a communication channel, means for placing marking, spacing, breaking and disconnect conditions on said channel, a polar relay in one of said line sections having a bias winding and a line winding, means whereby said relay in a holding position holds said sections connected, means for maintaining said relay in holding position for all conditions except disconnect conditions, and means whereby a disconnect condition moves said relay to a non-holding position.

22. In a telegraph system, a line, a trunk, means at a switching point at which said line and trunk terminate for interconnecting them, means whereby a disconnect condition and a break condition on said line both produce a break condition on said trunk, control means at said switching point whereby a signal is sent to said trunk to distinguish a disconnect from a break condition, said control means comprising instrumentalities at said switching point actuated by a disconnect condition to transmit over said trunk a timed short marking pulse followed by a spacing condition.

23. In a system according to claim 22, instrumentalities at the remote terminus of said trunk for accepting said short marking pulse as a disconnect signal.

24. In a telegraph system, a line, a trunk, means at a switching point at which said line and trunk terminate for interconnecting them, means whereby a disconnect condition and a break condition on said line both product a break condition on said trunk, control means at said switching point whereby a signal is sent to said trunk to distinguish a break condition from a disconnect condition, said control means comprising instrumentalities at said switching point actuated by a break condition on said line to maintain a predeterminedly long uninterrupted marking condition on said trunk at the termination of said break.

25. A communication system comprising a subscriber station, a line extending to a satellite office, a trunk extending from said satellite office to a central office, means for establishing a communication circuit including said line and said trunk, means whereby the operator may connect a link circuit to said trunk at said central office, means for releasing said trunk comprising first a switch having a disconnect position at said subscriber station and second relay means controlled by the separation of said link circuit from the trunk at the central office.

26. In a system according to claim 25, means including relay means whereby the separation of said link circuit from said trunk at said central office with said subscriber switch remaining in the calling position prevents the release of said trunk and gives an indication to the operator causing the separation.

27. In a system according to claim 25, means including relays whereby reconnection of said link circuit to said trunk restores a complete communication path between said subscriber station and said link circuit.

28. In a communication system, a switching station, a plurality of communication lines and trunks terminating thereat, apparatus for manually interconnecting said trunks and lines, a distinctive signal device individual to each trunk, and means for operating the distinctive signal individual to a trunk when said apparatus and one of said trunks are improperly disconnected from each other.

29. In a telegraph transmission system, a switching station, a plurality of communication trunks terminating thereat, apparatus for manually interconnecting said trunks, a distinctive signay device individual to each trunk, means cooperating with said trunks and said apparatus for operating the distinctive signal individual to said trunk when said apparatus and one of said trunks are improperly disconnected from each other, and means for sending current of approximately zero value as a disconnect indication.

30. In a teletypewriter switching system, a satellite office, a subscriber station connected thereto over a line and a central office connected thereto over a trunk, means remotely controlled from either the subscriber station or the central office to interconnect a subscriber line and a trunk to form a communication circuit, said means at said subscriber station being controlled by operation of a switch to calling position, and means effective upon actuation of said switch to non-calling position after establishment of a call to bring up a disconnect signal at the central office but maintain a busy test on said trunk at both ends thereof.

31. In a system according to claim 30, a link circuit, means effective, after the bringing up of said disconnect signal, by removal of said link circuit from said trunk to release said trunk and remove the busy test at both ends thereof.

32. In a teletypewriter switching system, a satellite office, a subscriber station connected thereto over a line and a central office connected thereto over a trunk, means remotely controlled from either the subscriber station or the central office to interconnect a subscriber line and a trunk to form a communication circuit, a link circuit at said central office for connection to said trunk, means under control of an operator for disconnecting said link circuit from said trunk, means for disconnecting said link circuit when said subscriber station is in communicative connection to said trunk, means for signaling said operator under such condition, and means controllable from the subscriber station for discontinuing said signaling and removing said station from communicative relation to said trunk.

33. A subscriber line, a trunk, a switching office including remotely controllable means to connect said subscriber line to said trunk, conductive elements for connection of a link circuit to said trunk at a central office, a source of ringing current at said central office, a signal thereat, means at said central office operable by said subscriber to produce a disconnect indication on said signal at said central office, timing means set into timing operation by removal of said link circuit from said trunk for sending a timed line condition followed by a ringing current from said source to effect the release of said subscriber line from said trunk.

34. In a telegraph switching system, a satellite office, a subscriber station connected thereto over a line and a central office connected thereto over a trunk, a sequence circuit for controlling the seizure of said trunk by said line to establish a telegraphic communication path including said line and said trunk, a relay means at said satellite office, means whereby an operator seizes said trunk at the terminal remote from said satellite office, and means whereby said operator's seizure causes said relay means to condition said trunk to prevent its being seized by said line under control of said sequence circuit.

35. In a telegraph switching system, a switching office, a line terminating thereat, a trunk terminating thereat, means whereby said line becomes associated with said trunk including means for conditioning a start relay to perform the association, and means operable from the remote terminus of said trunk by seizure thereof to restore the start relay to the unconditioned state.

36. A two-way telegraph trunk having a normally idle condition, means for initiating seizure of said trunk at either terminus thereof and preference means whereby initiation of seizure at one end is rendered ineffective in case of substantially simultaneous seizure.

37. In a teletypewriter switching system comprising means for remotely controlling connection of lines to a trunk, a source of signals comprising instrumentalities for generating a sequence of permutation code signals, means controlled by the condition of a line for varying the code of said signals, and means responsive to a condition of a line for applying said signals to said trunk.

38. In a teletypewriter communication system, a subscriber line termination, a trunk capable of operative interconnection therewith to form a teletypewriter communication circuit, means whereby an operator seizes said trunk, selective equipment under the control of said operator for remotely connecting said trunk to said line termination, means controlled to a busy condition when said line is busy, and instrumentalities responsive to the busy condition of said means for registering code combinations in the machine of an operator attempting to remotely cause said trunk to be connected to said line when it is in said busy condition.

39. In a system according to claim 38, means for applying an out-of-order busy condition to said line, and supplemental means controlled thereby in addition to said relay to cause said code combinations to be different in the case of an out-of-order busy condition than in the case of an ordinary busy condition.

40. In a system in accordance with claim 38, a sequence circuit, means whereby said operator, upon seizing said trunk, applies thereto a condition which renders said trunk busy to said sequence circuit, and means whereby, upon releasing said trunk in response to a busy line indication, there is removed from said trunk the condition which renders said trunk busy to said sequence circuit.

41. In a system according to claim 38, means effective when said line termination is unassigned to transmit a special signal indicative of this condition to the operator.

42. A teletypewriter switching system comprising a satellite office, lines connecting subscriber stations individually to said office, trunks connecting said office with a central office, a director at said satellite office comprising means responsive to permutation code signals for connecting a particular subscriber line to a particular trunk over which said signals are received, means including an operator's cord circuit for applying such signals to said trunk, and means responsive to connection of said line to said trunk to release said director for connecting another line to another trunk.

43. A teletypewriter communication system comprising a plurality of trunks, a power-driven distributor connectable to any one of said trunks for receiving permutation code signals sent over said trunk from a remote point, means at a remote point for seizing a trunk, and means responsive to seizure of said trunk at said remote point in preparation for sending such signals to apply driving power to said distributor.

44. In a system according to claim 43, means controlled by release of the seized trunk for stopping said distributor.

45. In a system according to claim 43, means controlled by release of the seized trunk associated with said distributor for stopping the driving motor of said distributor, and other means controlled by remote seizure of any other trunk for preventing the said means from stopping said driving motor.

46. A teletypewriter switching system comprising a subscriber line extending from a subscriber station to a satellite office, groups of trunks extending from said satellite office to central office operator positions, a sequence circuit controllable from said subscriber station and causing said line to be connected to said central office over one of said trunks, means whereby said line has a preference for one of said trunk groups, and means whereby a busy condition of all the trunks of said preferred group enables said connection to be made over a trunk of another group if an idle trunk of such group is available.

47. A teletypewriter switching system comprising an office, a plurality of lines terminating at said office, a plurality of trunks terminating at said office, means remotely controlled over any of said lines to seize and connect one of said trunks to said line, and an all-trunks-busy circuit for signaling by permutation code to any of said lines that no trunk is then available.

48. In a system according to claim 47, a registering device, and means for recording in said device every additional line connected to said all-trunks-busy circuit to receive an all-trunks-busy indication therefrom.

49. In a teletypewriter switching system, a cord circuit adapted for interconnecting subscribers' lines, means for impressing telegraphic code signals upon said cord circuit, a telegraphic trunk having an appearance adjacent said cord circuit, a satellite office at the remote terminus of said trunk, remotely controlled means whereby an operator may apply said cord circuit to said trunk and means controlled by impression of said code signals as aforesaid to cause the seizure of and connection to said trnuk at said distant terminus of a line normally disconnected from said trunk.

50. In a teletypewriter switching system, subscriber lines and trunk circuits of the code impulse transmission type all terminating at a switching point, a coordinate switch, means remotely controlled over any of said lines for connecting a trunk thereto through said coordinate switch, and means controlled over any of said trunks for connecting a line thereto through said coordinate switch, said means for connecting comprising a selecting magnet operated by a trunk and a holding magnet with means whereby either type of connection first causes the operation of said selecting magnet and thereafter the operation of said holding magnet.

51. In a remotely controlled switching system, means including a distributor responsive to code combinations received over one of a group of controlling lines for controlling the connection thereto of a selected one of a group of other lines, and means operated automatically upon failure of said means to connect some line of said group to said one controlling line to substitute another distributor for the first-named distributor and render it available for another of said group of controlling lines.

52. A communication system comprising a selector controlled by a sequence of a definite plurality of selecting conditions fixed in number but variable in sequence to select one out of various possible items to be selected, means operably controllable from a remote point to seize said selector to perform a selecting operation, means operably controllable from a remote point to supply a sequence of selecting conditions as aforesaid to said selector, means automatically operable under the combined control of seizure of said selector and a failure thereof to make a selection to substitute therefor another selector whereby the next operation of said means operably controllable from a remote point to seize said selector results in the seizure of said substituted selector.

53. In a switching system comprising a trunk, a plurality of lines, a distributor and elements responsive to code combinations received in said distributor for connecting one of said lines to said trunk, transfer means actuated automatically upon defective operation of said elements to substitute other elements in place thereof, and means operable also automatically upon said defective operation to signal over said trunk the failure to connect a line thereover.

54. In a communication system, permutation code receiving means and transfer means actuated automatically upon failure thereof, to render another permutation code receiving means available and send a signal indicating the failure over the circuit to which the first receiving means was connected to receive permutation code at the time of failure thereof.

55. In a teletypewriter communication system, lines terminating at a satellite office, trunks also terminating at said office, means at said office remotely controlled over one of said lines for connecting one of said trunks thereto, means remotely controlled over one of said trunks for connecting one of said lines thereto, a distributor functioning as a part of said last-named means, and means for starting said distributor only under the condition that one of said trunks is conditioned to be connected to one of said lines.

56. In a system comprising a trunk and a plurality of lines said trunk and said lines each having a terminus at a switching point, said trunk having a terminus remote from said switching point, means at said remote terminus for seizing said trunk, means at said switching point remotely controlled from said remote terminus of said trunk to connect a line to a trunk at said switching point, means at said switching point for generating particular permutation code combinations as busy signals, and means operative upon an attempt of said trunk to seize a busy line to transmit said signals to said trunk as a busy indication.

57. In a teletypewriter communication system, a set of oscillating relays, timing arrangements connected thereto to time the oscillation of said relays, a conductive path leading away from said relays for carrying signals therefrom in the form of pulses, and circuits interconnecting said relays causing the signals carried to comprise a particular character sequence in a particular permutation code.

58. In a system according to claim 57, other relays and means controlled by the operation thereof to change the timing of said signals to some other character sequence.

59. In a teletypewriter communication system, a satellite office, a duplex telegraph communication trunk extending between said satellite office and another office, a repeater terminating said trunk at said satellite office, means controlled remotely from said satellite office for establishing a communication circuit over said trunk and a transfer relay operated upon establishment of a communication path including said trunk for changing said repeater from a full duplex to a half duplex transmitting condition on the side of said repeater adjacent said trunk.

60. A system of communication by electrical impulses relayed from one circuit to another by relays controlled by conditions in one circuit to create resultant variations of condition in another circuit, relays constituting an impulse repeater in said system, said repeater having a full duplex condition in which it is capable of receiving from and transmitting toward another point simultaneously without interference, and a half duplex condition in which it is able to transmit or receive but not to do both simultaneously without interference, one of said circuits for supplying impulses to said repeater to be repeated including means controllable over said circuit from a remote point to change said repeater from one of said conditions to the other.

61. In a teletypewriter switching system, a line and a trunk, a satellite office at which said line and trunk terminate, means for interconnecting said line and said trunk to form a communication circuit, a supervisory relay having a winding in said communication circuit when established, and means whereby said relay distinguishes between a reduced line current characteristic of spacing and break conditions on said line and a no-current line condition characteristic of a disconnect signal indication.

62. In a teletypewriter communication system, a satellite office, a central office, a trunk interconnecting said satellite office and said central office, said trunk comprising a full duplex transmission system having a spacing and a marking condition for each direction of transmission, means whereby said trunk is normally spacing in both directions when idle, and means whereby seizure of said trunk at either terminus thereof establishes a marking condition on the outgoing conductor.

63. A teletypewriter communication system comprising a satellite office, a central office and interconnecting telegraph trunks extending therebetween, outgoing telegraph lines in addition to said trunks extending from said satellite office, a sequence circuit in said satellite office permitting the routing of only one call from or to a line at a time therethrough, and means permitting the routing of another call when said one call is routed.

64. In a system according to claim 63, permutation code call directing equipment at said satellite office, means responsive to the seizure of a trunk at said central office for seizing said permutation code equipment, an indicator device at said central office, and means responsive to the seizure of said permutation code equipment for causing said indicator device to give an indication.

65. A teletypewriter switching system comprising permutation code controlled line selecting devices, means for energizing said permutation code line selecting devices, and means responsive to the energization thereof for transmitting a preliminary signal indicating such energization.

66. In a system according to claim 65, a trunk circuit over which said signal is transmitted, a cord circuit connectable to said trunk circuit to receive said signal and an indicator automatically operated by said signal.

67. A teletypewriter switching system comprising a teletypewriter trunk interconnecting an operator position and a satellite office, permutation code equipment at said satellite office, means controllable from said operator position for seizing said permutation code equipment and associating it with said trunk, said trunk having a path inward to said operator's position and a path outward therefrom, means responsive to the seizure of said permutation code equipment for transmitting a signal indicative thereof over said inward path.

68. In a teletypewriter switching system, a two-way telegraphic communication trunk adapted for full duplex communication, means for sending line selecting impulses over said trunk in one direction, and means for simultaneously holding said trunk in spacing condition in the other direction.

69. In a teletypewriter communication system, a satellite switching point, a central office, a trunk connecting said switching point to said central office, a line terminating at said satellite office, means for sending line selecting pulses from said central office for selecting said line, means responsive to a busy condition of said line for sending a busy signal over said trunk, means responsive to a predetermined delay after receipt of said busy signal to change the nature of said busy signal.

70. A teletypewriter switching system comprising a satellite office, a full duplex trunk circuit extending from said satellite office to the central office, a subscriber line terminating at said satellite office, means remotely controllable over said trunk to connect said subscriber line to said trunk, a circuit changing device at the terminus of said line remote from said satellite office whereby said subscriber may answer and relays in said trunk effective to convert said repeater from full duplex to half duplex in response to the operation of said device.

71. A telegraph line adapted for connection to a link circuit, a repeater normally conditioned to a full duplex polar condition whereby reception and transmission on said line are independently connected to said line at a central office, terminals associated with said line and repeater for establishing a communication path into said central office, means at said office for indicating an incoming call over said line, and circuit changing devices to change said repeater from full duplex to half duplex condition and extend its circuit over said terminals into said office on a half-duplex basis, said devices being actuated by connecting conductors to said terminals to answer a call.

72. An exchange system including a line, a trunk, a satellite office with remotely controlled switching means for interconnecting said line and trunk, a central office at the remote terminus of said trunk, a repeater in said trunk at said central office, means for conditioning said repeater to half-duplex condition upon interconnection of said line and trunk and connection of a link circuit to said trunk at said central office, means for switching said repeater to a full duplex condition upon disconnection of said link circuit, and means for preventing said switching means from acting until a special signal has been sent to said satellite office to disconnect said line and trunk and a return signal indicating said disconnection has been received.

73. In a teletypewriter communication system, a telegraphic trunk circuit interconnecting the satellite office and the central office, a cord circuit adapted for connection to a jack of said trunk, trunk terminating equipment in said trunk in said central office, said trunk terminating equipment including means for sending to said satellite office a trunk releasing signal comprising a spacing signal and alternating current ringing reversals, and means in said trunk at said satellite office responsive to said signal for releasing said trunk.

74. In a teletypewriter communication system, a subscriber station, a satellite office and a central office, a line connecting the subscriber station and the satellite office, a trunk connecting the satellite office and the central office, a calling device at said subscriber's station by which said subscriber closes said line, and means operative in response thereto whereby said central office sends ringing current to said satellite office over said trunk.

75. In a system according to claim 74, means controlled by placing said device in non-calling position at said subscriber's station for removing said ringing current from said trunk.

76. In a system according to claim 74, a cord circuit adapted for association with said trunk by said operator for answering, means operated by association of said cord circuit with said trunk whereby said ringing current is removed from said trunk and a marking condition is sent to said satellite office over said trunk.

77. A teletypewriter switching system comprising subscriber lines and trunks, means whereby one subscriber line may be associated with one trunk, said means including a sequence circuit, a relay associated with said subscriber's line, means whereby said relay is operated under a calling condition when all trunks are busy to connect said line to a source of all-trunks-busy signals, and means for energizing said source when all trunks are busy.

78. A line, a plurality of trunks, means remotely controllable over said line to connect said line to the first idle one of said trunks, means for rendering said trunks busy, means operable upon an attempt to connect said line to one of said trunks when all said trunks are busy to connect a source of continuous series of code signals to said line, means operable over one of said trunks for connecting said line to said trunk and relay means whereby said last-named means may effect said connection while said line is connected to said source.

79. A teletypewriter communication system comprising a satellite office, a central office, a two-way trunk extending therebetween adapted for full duplex transmission, a subscriber line, means remotely controllable over said line for interconnecting said line to said trunk, a relay in said trunk, means whereby said relay tests the continuity of said trunk in both directions before connecting said line thereto, and means effective to prevent said connection in case said trunk is not continuous.

80. A teletypewriter communication system comprising a satellite office, a central office, a two-way trunk for telegraphic communication extending therebetween, a subscriber line, means remotely controllable over said line for connecting said line to said trunk to form a telegraphic communication path, relay means, means whereby said relay means tests the effectiveness of said trunk as a signal conductor before connecting said line thereto, and means to prevent said connection if said trunk is not effective as a signal conductor.

81. In a satellite exchange system, a subscriber line extending from a subscriber station to the satellite exchange, a trunk extending from the satellite exchange to a central office, means at the satellite exchange operable under remote control from the subscriber station for connecting the subscriber station to the central office over the subscriber line and a trunk to form a telegraphic communication path, and means responsive to the connection of said trunk to said line to send a marking signal over said trunk from the satellite office to the central office and periodically varying current from the central office to the satellite office.

82. In a satellite exchange system, a subscriber line extending from a subscriber station to the satellite exchange, a trunk extending from the satellite exchange to a central office, means at the satellite exchange operable under remote control from the subscriber station for connecting the subscriber station to the central office over the subscriber line and a trunk to form a telegraphic communication path, means operative upon recalling by the subscriber, after controlling the connection of the subscriber line to said trunk and before the operator has answered, for sending alternate marking and spacing signals over said trunk from the satellite office to the central office, and means for sending current of definite periodicity over said trunk from the central office to the satellite office.

83. In a satellite exchange system, a subscriber line extending from a subscriber station to the satellite exchange, a trunk extending from the satellite exchange to a central office, means at the satellite exchange operable under remote control from the subscriber station for connecting the subscriber station to the central office over the subscriber line and a trunk to form a telegraphic communication path, means whereby the subscriber may remotely control the satellite office to interconnect said line and said trunk, means for sending, in response to said interconnection, a marking signal over said trunk from the satellite office to the central office, means whereby the subscriber may disconnect before the operator has answered, and means operable in response to said disconnection to change said marking signal to a spacing signal, and means also operable in response to said disconnection to send variable current of the kind used for ringing from said central office to said satellite office for a limited time after said change.

84. A teletypewriter switching system comprising subscriber lines terminating at a switching point, a trunk extending from said point to a distant central office, a subscriber station upon said line, an instrument at said station having a calling and a non-calling position, means controlled by the operation of said device to the calling position to busy said trunk preliminarily to seizure by said line at said switching point, and means controlled by operation of said device back to non-calling position to release said busy condition.

85. In a satellite exchange system, a subscriber line extending from a subscriber station to the satellite exchange, a trunk extending from the satellite exchange to a central office, means at the satellite exchange operable under remote control from the subscriber station for connecting the subscriber station to the central office over the subscriber line and a trunk to form a telegraphic communication path, means also responsive thereto to send ringing current from said central office to said satellite office, means whereby an operator may connect a link circuit to said trunk at the central office, and means also operable in response thereto for discontinuing the sending of ringing current over said trunk from said central office to said satellite office.

86. In a telegraph exchange system, a telegraph line adapted to transmit direct current telegraphic signal impulses, a central office at which said line terminates, a source of ringing current at said central office, a link circuit at said central office, means for extending a calling condition to said office over said line, means responsive to said calling condition to cause said source to send ringing current away from said central office over said line, and means operated by the operative connection to said line of said link circuit to discontinue sending ringing current.

87. In a satellite exchange system, a subscriber line extending from a subscriber station to a satellite exchange, a trunk extending from the satellite exchange to a central office, a repeater in said trunk means at the satellite exchange operable under remote control from the subscriber station for connecting the subscriber station to the central office over the subscriber line and a trunk to form a telegraphic communication path, means operable by remote control for interconnecting said line and said trunk, means whereby said subscriber may send a disconnect signal over said line to said satellite office, means operative in response thereto to change said repeater from half duplex to full duplex operation, and means operative thereafter also in response thereto to send a supplementary break signal over said trunk from said satellite office to said central office.

88. A system in accordance with claim 87, including means operable in response to the disconnection of a link circuit from said trunk at said central office for sending alternating ringing current from said central office to said satellite office preceded by a telegraphic spacing signal.

89. In a telegraph communication system, a line section for telegraphic communication, means for sending supervisory signals over said line section, there being two line conditions available for signaling over said line section, means for sending a line condition effective as a break signal, means for causing said line condition to be modified to indicate a disconnect signal comprising means for interrupting the line condition momentarily, and means for distinguishing said interrupted line condition from said uninterrupted line condition.

90. In a satellite exchange system, a subscriber line extending from a subscriber station to the satellite exchange, a trunk extending from the satellite exchange to a central office, means at the satellite exchange operable under remote control from at least one of said station or central office for connecting the subscriber station to the central office over the subscriber line and a trunk to form a telegraphic communication path, means whereby the subscriber may establish a disconnect condition at the central office, means for sending from the central office to the satellite exchange a marking signal followed by ringing current, and means at the satellite exchange controlled by said marking signal and ringing current in sequence to rering the subscriber station.

91. In a satellite switching system, a subscriber line extending from a subscriber station to a satellite switching point, a trunk extending from said switching point to a central office, means at the switching point operable under remote control from at least one of said station or office for connecting the subscriber station to the central office over the subscriber line and the trunk to form a telegraphic communication path, means whereby a subscriber by remote control may establish a disconnect condition at said central office, means for sending a spacing signal followed by ringing current from said central office to said switching point after establishment of said disconnect condition, and means at said switching point controlled by said spacing signal and ringing current in sequence to disconnect said line from said trunk.

92. In a satellite exchange system, a subscriber line extending from a subscriber station to a switching point, a trunk extending from the switching point to a central office, means at the switching point operable under remote control from at least one of said subscriber station or central office for connecting the subscriber station to the central office over the subscriber line and the trunk to form a telegraphic communication path, means whereby the subscriber by remote control may establish at the central office a disconnect condition, means for transmitting after the establishment of said disconnect condition two varieties of line condition from said central office toward said switching point, and test means at said switching point selectively actuated dependent upon the variety of line condition transmitted for determining whether to rering said subscriber or disconnect said line from said trunk.

93. In a satellite exchange system, a subscriber line extending from a subscriber station to a switching point, a trunk extending from the switching point to a central office, means at the switching point operable under remote control from at least one of said subscriber station or central office for connecting said subscriber station to said central office over the subscriber line and a trunk to form a telegraphic communication path, means whereby telegraphic break signals may be transmitted from said subscriber station over said channel of communication, a repeater in said channel of communication for repeating telegraphic signals from said switching point toward said central office, and means operative upon the termination of a break signal for preventing said repeater from repeating signals for a predetermined time after the termination of the application of the break signal condition to the subscriber line.

94. In a satellite exchange system, a subscriber line extending from a subscriber station to a switching point, a trunk extending from the switching point to a central office, means at the switching point operable under remote control from at least one of said subscriber station or central office for connecting said subscriber station to said central office over the subscriber line and a trunk to form a telegraphic communication path, means for impressing upon said subscriber line a break signal condition and a disconnect condition, means for causing the initial portion of said conditions to appear as break signals at said central office, means at said satellite office for interrupting said break signal condition on said trunk as an indication to said central office that a disconnect condition is being impressed on said subscriber line, and means at said central office selectively differentiating between said break signal condition and said interrupted break signal condition arriving over said trunk and interpreting said interrupted break signal condition as a disconnect signal.

95. In a satellite exchange system, a subscriber line extending from a subscriber station to a switching point, a trunk extending from the switching point to a central office, means at the switching point operable under remote control from at least one of said subscriber station or central office for connecting said subscriber station to said central office over the subscriber line and a trunk to form a telegraphic communication path, means whereby there may be applied by remote control from said subscriber station a disconnect signal at said central office, circuit changing means whereby an operator at said central office may respond to said disconnect signal, means for sending an indication of said response to said switching point to cause the release of said subscriber line from said trunk, means controlled by the releasing operation to send a special signal to said central office conveying the information that said release has been effected, and means at said central office responsive to said special indication for rendering said trunk available for use on other communication paths.

96. In a telegraphic exchange system, a coordinate switch having sets of coordinate contacts controlled by and individual to trunk circuits, other sets of coordinate contacts controlled by and individual to line circuits, a permutation code receiver, and elements connected to be set up in one of two positions by said permutation code receiver, in combination with interconnections whereby said trunks condition their respective sets of contacts and interconnections whereby said elements control the sets of contacts individual to said lines to establish a line-trunk interconnection at the intersection of said contacts.

97. A remotely controlled telegraphic exchange system comprising lines terminating at said exchange, a trunk terminating at said exchange, and means controllable over said trunk for establishing a test connection to one of said lines, said test connection comprising two relays in series, and circuit arrangements operative to control the operation of said relays in different manners dependent upon the busy or idle condition of said line.

98. In a telegraphic exchange system, a remotely controlled switching office comprising a coordinate switch, a plurality of lines extending from said office to distant points, said lines being associated with individual contacts on said switch, a sequence circuit common to said lines, a director circuit controllable by permutation code combinations, and means controllable separately by said director circuit and said sequence circuit to change one of said lines which is normally disconnected from its set of contacts to a condition of connection to said contacts.

99. In a remotely controlled telegraphic switching office, a coordinate switch, a line, a trunk, means for interconnecting said line and trunk over said coordinate switch, a relay, and supplementary contacts on said switch preventing control of said relay by telegraphic communication signals traversing said line.

100. In a telegraphic exchange system, a satellite office, a line extending from subscriber station to said satellite office, means at said subscriber station whereby said subscriber may initiate or respond to calls, a trunk extending from said satellite office to a central office, and means remotely controllable over said trunk from the direction of said central office for establishing calls to or responding to calls from said subscriber, a telegraphic repeater in said trunk, means for maintaining said repeater in full duplex condition for supervisory purposes, and means for maintaining said repeater in half-duplex condition for telegraphic communication purposes.

101. A system according to claim 100 wherein said means for maintaining said repeater in half-duplex condition is caused to become effective only upon response to a call initiated either over said trunk or said line.

102. A telegraphic exchange system comprising a remotely controlled switching office at which lines and trunks terminate, means at said office remotely controlled over a line or over a trunk for interconnecting a line and a trunk, said system comprising means for transmitting telegraphic code signals between said line and trunk in either direction when interconnected, means for sending telegraphic break signals in either direction between said line and trunk, means preventing the disconnection of said line and trunk in response to said break signals although of extended duration, and separate means on said line controllable at a point remote from said switching office for controlling the disconnection of said line from an interconnected trunk.

103. A telegraphic communication system comprising an outlying station, a switching point and a central office, a line from the outlying station to the switching point and a trunk from the switching point to the central office, a teletypewriter including a motor at the outlying station, means at the central office for seizing said line and connecting it to said trunk, and other means controlled from the central office for starting said motor by remote control.

104. A system according to claim 103, in which the means for starting said motor by remote control comprises elements for creating a calling condition at said outlying station and elements to start the motor operated by timed establishment of the calling condition.

105. A telegraphic trunk extending from a remotely controlled office to a central office, said trunk comprising two paths of communication of which a path outgoing from said remotely controlled office normally terminates at sending contacts of a repeater relay, and an incoming path which normally terminates at a winding of a receiving relay, said sending path comprising a circuit opening device separate from said repeater for switching said sending path to a point of sending potential over a path other than the contacts of said repeating relay for sending a disconnect indication to said central office.

106. In a telegraphic switching system, a satellite office, a line extending from said office to a subscriber station, a trunk extending from a satellite office to a central office, means for establishing a path of communication over said line and said trunk through said satellite office, said means including a relay at said central office for applying a ringing condition to said trunk toward said satellite office, a relay holding said trunk connected to said line through said satellite office, and means for causing the disconnection of said line from said trunk, said means including as an essential element thereof a relay for applying an identical ringing condition to said trunk from said central office toward said satellite office.

107. In a telegraphic switching system, a satellite office, a trunk, a subscriber line, means for remotely controlling said office over one of said trunks or lines to interconnect said trunk and line in a telegraphic communication path, said trunk terminating at a central office, terminals thereat for connection to a link circuit, means remotely controlled over said line for energizing at said central office a disconnect indicating device, and means operable in response to a separation of said link circuit from said terminals for transmitting a ringing condition over said trunk toward said satellite office.

108. In a remotely controlled switching office, means including an alternating current relay responsive to a received ringing condition for sending out from said office an outgoing ringing condition, said relay being connected to operate a second relay, said second relay being connected to operate a third relay, and said third relay being connected to operate a fourth relay, said third relay being connected to cause the release of said second relay, means whereby said first relay holds said fourth relay operated upon release of said second relay, and means whereby said fourth relay establishes said outgoing ringing condition.

109. A system according to claim 108 wherein said second relay is slow releasing.

110. A telegraph system including a source of periodic current adapted for transmission over a line as a ringing current, relay means remotely controllable over a conductor subject to possible line hits or disturbances for connecting said source to said line in transmitting relation, said relay means including an alternating current relay and a slow-acting relay operable in sequence, and means whereby said alternating current relay must remain operated until said slow-acting relay has functioned to determine said connection of said source to minimize possibility of said connection as a result of line hits.

111. In a telegraphic exchange system, a line consisting of a simple telegraph loop terminating at a satellite office, a coordinate switch including contacts remotely controllable over said line for connecting said loop to a trunk, another telegraph line terminating at said office in a repeater, said repeater on the side thereof toward said coordinate switch being provided with conductors simulating said loop and a supplemental conductor controllable from said trunk over a supplemental contact of said coordinate switch for maintaining said repeater in communicative telegraphic association with said trunk.

112. A telegraph line terminating in a repeater, a switch for connecting said repeater to a trunk for communication between said line and said trunk over said repeater, a supplemental contact on said switch for extending a supplemental conductor from said repeater to a point of given potential controlled by said trunk, means for placing break and disconnect indications upon said line, relay means whereby said indications are effective to modify said connection, and means controlled by said modification to cause the testing of said line to determine whether the condition thereupon is a disconnect condition.

113. In a telegraphic exchange system, a telegraph line terminating at a switching point, a switch for selectively connecting said line to a trunk, a second line terminating at said point in a repeater, means including said switch for connecting said repeater to said trunk, a supplementary connection over said switch to said trunk from said repeater, and means responsive to supervisory conditions on said second line to cause said repeater to present to said trunk when connected thereto the same electrical conditions as corresponding conditions upon said first line would present to said trunk if connected thereto.

114. In a telegraphic exchange system, a satellite office, a subscriber line terminating thereat and a trunk terminating thereat, a sequence circuit common to a plurality of such subscriber lines for connecting one of said lines to said trunk, means for releasing said sequence circuit upon association of said line with said trunk, and means determined by an inoperative condition of said trunk effective after a predetermined time to substitute another trunk and connect it to said line.

115. In a telegraphic exchange system, a plurality of subscriber lines arranged in groups, a trunk, a link circuit, a sequence circuit, means controllable by said sequence circuit for interconnecting one of said subscriber lines to a trunk over said link circuit, means determined by an inoperative condition of said link circuit upon an attempt to connect a subscriber line to said trunk to release said sequence circuit and to lock out of service only the group of subscriber lines including the line attempting to be connected to said trunk.

116. In a telegraphic exchange system, a subscriber line, a trunk, a satellite office at which trunk and line terminate, means controllable by telegraphic permutation code over said trunk for connecting said line to said trunk, means controllable by an inoperative condition of said apparatus to establish a special signal indicating said inoperative condition at the terminus of said trunk remote from said office.

117. In a telegraphic exchange system, a subscriber line, a trunk, a satellite office at which said trunk and line terminate, means operable by remote control over at least one of said trunk or line to connect said line to said trunk, means controllable by a failure of said means to accomplish said connection to establish a special signal indicating said failure at the terminus of said trunk remote from said office.

118. In a system for interconnecting telegraph lines, call directing equipment controllable from a remote point for selecting one of said lines, means controllable from said remote point for energizing said call directing equipment, means controllable by permutation code for causing said call directing equipment to select one of said lines, and means operable by failure to transmit said permutation code for a predetermined time after conditioning of said apparatus to transmit a signal indicative of the failure to said remote point.

119. A telegraphic switching system comprising a trunk, a group of lines, a remotely controlled satellite office at which said trunk and lines terminate, permutation code equipment controllable over said trunk to test one of said lines, means controllable to connect said trunk to said tested line, if available, means for establishing an unavailable condition of said line, and means effective after a predetermined time to render said means available for testing other lines.

120. A remotely controllable switching office for telegraphic lines, subscriber lines terminating thereat, trunks terminating thereat, each of said trunks including a repeater, testing equipment comprising circuits for simulating one of said lines, said testing equipment comprising circuits for simulating one of said trunks, means for interchangeably connecting said testing equipment to one of said lines or one of said trunks, means for switching said testing equipment for bringing into play alternatively said circuits for simulating one of said lines or said circuit for simulating one of said trunks, and common equipment for performing tests upon the equipment of the satellite office over the simulating circuits.

121. A system in accordance with claim 120 including signal means and means whereby initiation of or receipt of a call for a line during the time said line is being tested causes said signal means to indicate the necessity of making said line available for use.

122. In a switching system, a telegraph line, a trunk, means operable by remote control from at least one of said line or trunk for interconnecting said line and trunk to form a telegraphic communication path, said means including switching contacts the closure of which establishes a conductive path from said line to said trunk, a relay having a condition adapted to prevent the separation of said contacts, means whereby by remote control over another similar line said similar line may be connected to a similar trunk, a sequence circuit, and means therein to maintain said relay in said condition from the initiation of a control condition over said last-named line to the complete establishment of the connection thereof to said similar trunk.

123. In a telegraph switching system, a line, a trunk, means remotely controllable over at least one of said line or trunk to interconnect said line and trunk to form a telegraphic communication path, other lines, other trunks, a sequence circuit for controlling the assignment of said other trunks to said other lines in sequence, relay means operable upon assignment of any line to any trunk to advance said sequence circuit, and means operable by remote control over a line to cause it to seek a trunk to prevent said relay means from changing its position.

124. A telegraphic switching system comprising a subscriber line extending from a subscriber station to a satellite office, a trunk extending from said satellite office to a cetral office, means operable by remote control over at least one of said line or trunk to interconnect said line and trunk to form a telegraphic communication path and a circuit for permitting said subscriber to practice transmission in simulation of a connection between the said line and trunk, said circuit comprising means for terminating said subscriber line at said satellite office, and means whereby when so terminated said subscriber line may be freed from said circuit by remote control over said line and restored to a condition available for connection to a trunk.

125. In a telegraph switching system, a subscriber line extending to a satellite office, a trunk extending from said satellite office to a central office, means whereby by remote control from said central office said subscriber line may be connected to a trunk to form a telegraphic communication path, a practice circuit for especially terminating said subscriber line at said satellite office, means effective upon an attempt by remote control from said central office to connect said subscriber line to the trunk to send an indication of said attempt over said subscriber line.

126. A system according to claim 125, including means whereby upon noting said indication said subscriber line may be conditioned from the subscriber terminus thereof to allow said attempt to connect it to a trunk to succeed.

127. A teletypewriter exchange system comprising a switching center with link equipment for connecting subscriber lines to other lines, a practice circuit at said center for enabling a subscriber to practice over his line, means for connecting said practice circuit to said line in a manner suitable for practicing, means whereby a disconnect indication may be applied to said subscriber line, and means operated thereby to dismiss said practice circuit from connection to said line and render said line available for intercommunication over said link equipment.

128. In a telegraph communication system, a subscriber line extending to the satellite office, a trunk extending from said satellite office to a central office, a practice circuit connectable to terminate said subscriber line at said satellite office for practicing telegraphic communication, and means whereby by remote control from the subscriber terminus of said line an indication to remove said practice circuit may be established at said satellite office.

129. A telegraphic switching system comprising a subscriber line, trunks, a sequence circuit at a switching point for controlling the connection of a trunk to a calling subscriber line, timing means controlled by the placing of a call on said subscriber line to begin to measure time, and means for determining whether the sequence circuit has assigned a trunk to said line within a predetermined time from the beginning of the measuring.

130. In a telegraph switching system, a subscriber line terminating at a satellite office, trunks extending from said satellite office, a sequence circuit for assigning a trunk to a calling line, counting means for determining whether said sequence circuit utilizes more than a predetermined time to assign said trunk, means for testing an assigned trunk, and means operable after a predetermined time by a defect indicating condition of said testing means to busy said trunk and assign another trunk.

131. In a telegraphic switching system, a line extending to a satellite office, trunks extending from said satellite office, means operable by remote control over said line for causing the assignment of a trunk to said line and connecting it thereto, said means comprising a sequence circuit, timing means for counting the time of use of the sequence circuit in attempting to assign a trunk, means for rendering said sequence circuit available after assignment of the trunk, means operable under the control of said timing means to signal the failure of said sequence circuit to become available within a predetermined time.

132. A telegraphic switching system comprising subscriber lines terminating at a satellite office, a trunk also terminating at said office, means operable by remote control over said trunk for connecting said trunk to the satellite office termination of one of said lines, said means comprising a permutation code controlled line selector, means for seizing said selector by remote control over a trunk, means for testing said selector a predetermined time after seizure and giving an indication over said trunk if said selector tests defective.

133. A telegraphic switching system comprising subscriber lines terminating at a satellite office, a trunk also terminating at said office, means operable by remote control over said trunk for connecting said trunk to the satellite office termination of one of said lines, said means comprising a permutation code controlled line selector, means for seizing said selector by remote control over a trunk, means whereby after a predetermined time said selector tests the continuity of said trunk, and means controlled by an indication of the proper continuity to continue said selector in the seized condition for a further predetermined time.

134. In a telegraph switching system, subscriber lines terminating at a satellite office, a trunk from said satellite office to a central office, a device controlled by permutation code at said satellite office, a sequence circuit at said satellite office, means controllable by remote control over said trunk to cause said sequence circuit to connect said means controllable by permutation code to said trunk, means operable after failure for a predetermined time of said sequence circuit to so function to lock a busy condition on said trunk.

135. In a telegraph switching system, subscriber lines having terminations at a satellite office, a trunk extending from said satellite office to a central office, means operable by remote control over said trunk for connecting said trunk to one of said subscriber line terminations, said means comprising permutation code selector equipment, means for seizing said selector equipment over said trunk, and means operable a predetermined time after seizure by failure to connect a line termination to said trunk to send a signal indicative of such failure over said trunk to said central office.

136. In a telegraph switching system, permutation code line selecting equipment, lines to be selected, means for sending line selecting code combinations to said equipment, and means operable by failure of said equipment to select a line after a predetermined time to lock said equipment out of service and render available substitute equipment.

137. In a telegraph switching system, a line, a trunk, means for connecting said line to said trunk as a path of communication, a repeater in said trunk normally adapted, in the communication condition, for half duplex communication over said line, means associated with said repeater for rendering it full duplex on the line side in response to a break signal on the trunk side whereby said repeater may transmit either marking or spacing conditions to said trunk from said line against said break signal.

138. In a telegraph transmission circuit, a polar relay having a line winding and a bias winding, said bias winding being without current during marking and short spacing conditions, and means to supply bias current to said relay under a break condition impressed on one terminal of said circuit.

139. In a telegraph transmission circuit, a polarized relay having line windings and a bias winding, a transmission circuit, means for including said line windings in parallel during marking and short break conditions, and means for connecting said windings in said transmission circuit in series during a break condition impressed upon one terminal of said circuit.

140. In a telegraph transmission circuit, a polarized relay having line windings and a bias winding, means connecting said line windings in parallel in said circuit, means for transmitting a break condition over said circuit in one direction, and means operative in response thereto for regulating the current in said bias winding and placing said line windings in series whereby to render said relay more sensitive to detect the difference between a small line current characteristic of a break condition and a negligible line current characteristic of a disconnect condition applied to said system from the other direction.

141. In a system for selecting lines, lines to be selected arranged in groups, a plurality of said lines being arranged in a group, electrical devices to be selected in permutated groups to select a group of said lines and thereafter in permutated groups to select one out of a previously selected group, and means for setting up said electrical devices successively in permutated groups in combination with an incoming channel of transmission controlling the selection of said devices, and a switch for connecting the channel of transmission to the selected line for transfer of permutated intelligence-representing codes thereover.

142. In a system for selecting elements, elements to be selected arranged in groups, a plurality of said elements being arranged in a group, devices to be selected in permutated groups to select a group of said elements and thereafter in permutated groups to select one out of a previously selected group, means for setting up said devices successively in permutated groups, and means for setting up said devices in a preliminary permutated group to establish a selecting relation between said devices and said elements.

143. In a system for selecting elements, elements to be selected arranged in groups, a plurality of said elements being arranged in a group, devices to be selected in permutated groups to select a group of said elements and thereafter in permutated groups to select one out of a previously selected group, means for setting up said devices successively in permutated groups, means for setting up said devices in a preliminary permutated group, an element requiring conditioning to enable a group of said elements to be selected, and means controlled by the setting up of said devices in said preliminary permutated group to so condition said element.

144. In a system for selecting lines, lines to be selected arranged in groups, a plurality of said lines being arranged in a group, devices to be selected in permutated groups to select a group of lines and in permutated groups to select a smaller group, said selections in permutated groups being repeated until the last selection is of a line of a previously selected group, means for sending selecting impulses in the required permutated groups to said devices, counting-off means operating upon each selection, and means controlled by the operation of said counting-off means a sufficient number of times to select an individual line to lock said devices against being reset in further permutated groups.

145. A relay arrangement for testing the condition of a line and performing one or another operation dependent upon the condition of said line, a plurality of devices selectable in permutated groups, means for repeatedly selecting said devices in permutated groups, and means controlled by a selection thereof other than the first to apply said relay arrangement to said line.

146. A selector comprising a plurality of devices selectable in permutated groups, a plurality of elements from which one is to be selected, means for selecting one as a result of a given number of successive selections of said devices in permutated groups, means for seizing said selector, and means operable by failure to select one element thereafter to replace said selector by another selector in the same operative relationship to said elements.

147. Selecting apparatus responsive to a definite number of permutation code combinations to make a selection of one out of a number of devices, means associated with said selective apparatus for counting the code combinations to which it responds, indicating means and means operable by failure to count said definite number within a given time after response to the first to operate said indicating means.

148. Selecting apparatus comprising permutatable elements responsive to a definite number of permutation code combinations to make a selection of one out of a number of devices, means for associating said elements with a potential source of code combinations, means associated with said selective apparatus for counting the code combinations to which said elements respond, and means controlled by said counting means to reject selecting code combinations unless received within a timed period after said means for associating have performed their associative function.

149. A teletypewriter system comprising means for setting up a communication path for the transmission of marking and spacing conditions by connecting terminals to establish said path, and means for creating a distinctive signal effective as a disconnect signal, said means comprising instrumentalities for producing a spacing condition interrupted by a marking condition followed by a restored spacing condition.

150. The method of signaling over a line which transmits marking and spacing conditions which comprises transmitting a spacing condition for supervisory purposes, utilizing a brief period of time after the restoration of a marking condition as a test period, and testing the condition of the line during said period to determine whether disconnection is desired.

151. In a teletypewriter switching system, means for transmitting a spacing signal exceeding a given duration as a disconnect signal, and means preventing the disconnect signal becoming effective until after the termination of the spacing condition.

152. The method of supervisory signal establishment in a teletypewriter system which comprises establishing a given line condition as a calling condition and establishing the same given line condition twice repeated with a small interval between as a disconnect condition.

153. In a switching system, a station, a switching point and a central office, a line from the station to the switching point, a trunk from the switching point to the central office, means whereby by remote control over said line from said station a trunk is seized, means automatically controlled by said seizure for testing said trunk, and means operably set into operation by a defective condition thereof to energize a special signal indicative of said condition at said central office.

154. In a telegraph system in which intelligence is conveyed by direct current impulses on a telegraph line, means for transmitting ringing signals consisting of alternating current over said line, said line being susceptible of having direct current telegraphic impulses applied thereto, a relay system responsive to the sustained alternating current characteristic of said ringing signals, and means making said relay system slow to respond whereby it does not readily respond to unsustained alternating current.

155. A telegraph system having, in combination, a line selector mechanism having a series of elements each adapted to occupy one of two different positions, a signal responsive means responsive to a permutated sequence of conditions for controlling the setting of said elements in different permutations, means operable in accordance with a particular permutation in which said elements are set to select a group of lines, means for resetting said elements in another particular permutation, and means operable under the control thereof for selecting a line of said group in combination with means for signaling over said selected lines independently of said selector and other means for releasing said selector for other selections during such signaling.

156. In a selecting system, means for making selections by setting up elements in permutated groups, counting means for counting the number of said groups set up, means operable by a predetermined count of said counting means normally constituting the number of groups set up to effect a selection to temporarily prevent further setting up of said elements in permutated groups.

157. In a selecting system, means for setting up permutations of elements, means for counting the permutations set up, means operable normally to effectuate a result by a predetermined number of permutations set up, and means operable by a count of the predetermined number and absence of the effectuation of the result to produce an alarm.

158. In a telegraphic exchange system, a telegraphic two-way trunk circuit extending from a central office to a remote point, said trunk circuit being adapted to transmit two conditions, marking and spacing from said remote point to said central office, said trunk circuit normally transmitting a spacing condition, means to apply a marking condition, means at said central office responding to said marking condition to set up a calling signal, a telegraph line extending from said remote point to another point, and means for applying said marking condition by changing the current carrying condition of said telegraph line at said other point.

159. In a telegraph system, a subscriber station, a telegraph line from said station to a switching office, a telegraph line from said switching office to a central office, a calling instrument at said subscriber station having a non-calling condition and a calling condition for connecting said lines together and setting up a calling condition at said central office, means automatically to disconnect said lines upon assumption by said instrument of a non-calling condition, and means to delay said disconnection during a normal recalling interval of the order of a plurality of seconds and prevent said disconnection upon resumption by said instrument of a calling condition within said interval.

160. A telegraph system including a line, transmission and reception instruments for transmitting and receiving marking and spacing impulses thereover, means for transmitting a long spacing impulse thereover as a break signal, a repeater of marking and spacing impulses in said line, and means rendering said repeater incapable of repeating for a predetermined time after termination of said break signal.

161. A telegraph switching system comprising a subscriber station, a line therefrom to a switching point, a trunk from said switching point to a central office, means remotely controllable from said central office for connecting said line and trunk at said switching point for telegraphic intercommunication by permutated marking and spacing code groups, means for giving an indication at said central office to disconnect said line and trunk, and means whereby a station other than said subscriber station, when connected in telegraphic intercommunicating relation thereto, may cause said means for giving such indication to give said indication.

162. In a switching system for communication by permutation code, a telegraphic line, permutation code transmission and reception means in transmissive and receptive relation to said line, means actuated by permutation code sent over said line from said transmission means to select another line, and means automatically controlled by said selection to actuate said receptive means to record the condition of the selected line.

163. In a telegraph system, a line, transmission means to transmit over said line signal groups composed of an equal number of units each having either of two differentiating characteristics, said means being adapted to transmit the units of a group in succession each after the other, other lines individually connectable to said line, a selector instrumentality controlled by a signal group to select one of said other lines for connection to said first-named line, means for establishing a busy condition upon said selected line, and means controlled by said busy condition to prevent said connection.

164. In a system according to claim 163, instrumentalities for indicating said busy condition back to the location of said transmission means.

165. In a system according to claim 163, an instrumentality for indicating said busy condition back to the location of said transmission means in the form of at least one signal group composed of said equal number of units.

166. In a telegraph system, means for transmitting selecting signal groups composed of an equal number of units each having either of two differentiating characteristics, devices to be selected assigned to some of said groups and no devices being assigned to other groups, a selecting instrumentality remote from said means operable to make selections from said devices under control of said groups, and instrumentalities for transmitting back to said means the information that a selecting group or groups to which no devices have been assigned have been received at said selecting instrumentality.

167. In a telegraph system, means for transmitting signal groups composed of an equal number of units each having either of two differentiating characteristics, a selector to receive said groups, and conductors capable of selection thereby, one of said groups being assigned as a preparatory group, means prepared as a result of reception of said preparatory group to enable a subsequent group to make a selection, indicating means to indicate a failure to make a selection after reception of said preparatory group.

168. In a system according to claim 167, timing means to delay the operation of said indicating means beyond the time normally required for a subsequent group to cause a selection to be made.

169. In a telegraph exchange system, a central office, a line terminating at said office means for causing to arrive at said office a continuous series of marking and spacing impulses, an unrepeatered circuit and a circuit including telegraphic relays extending from said office, means for connecting said first line to either of said circuits, relay means individual to said line operable under control of said series of impulses to connect a ringing current to said unrepeatered circuit when it is connected to said line, and means for transferring the function of said relay means to a relay individual to said repeatered circuit when it is connected to said line.

170. In combination, a telegraph line terminating at a switching office in a repeater, a switch for connecting said repeater to another line for telegraphic intercommunication to and fro over said repeater, means for operating said switch by remote control over at least one of said lines to connect and disconnect said lines, a conductor extending from said repeater over contacts of said switch when said lines are connected for the transfer of telegraphic marking and spacing signals, another conductor so extending not normally affected by marking and spacing signals, and means whereby a disconnect signal affects the polarity condition of said other conductor.

171. In a telegraph system, in which a communication path is established over a line to a switching office, means for transmitting marking and spacing conditions thereover, means for transmitting a release signal in the form of a spacing signal of more than a predetermined duration interrupted by a marking signal and a second spacing signal, means responsive thereto as a release signal, and means preventing the response of said release signal in the absence of said interrupting marking signal.

172. In a multisection line telegraph communication path connected by repeaters, means in one line section for generating and transmitting a spacing condition, and means responsive thereto for transmitting over another line section an interrupted spacing condition.

173. In a multisection line telegraph communication path, testing means for testing one of said sections for a disconnect condition, and means controlled as a result of a prolonged spacing condition upon said section to cause said means to function to make said test.

174. In a telegraph switching system, a line extending to a switching office, means connecting to said line at said office for telegraphic intercommunication, a supervisory relay operably associated with said line at said switching office, means for placing telegraphic break signals upon said line, and means operated thereby to change a response condition of said supervisory relay during the continuance of said break signal condition to make said relay more sensitive.

175. In a communication system, a subscriber station having a line extending to a switching office, a line from said switching office to a position remote from said office and said station, means for connecting said lines at said switching office for intercommunication therebetween, means for disconnecting said lines requiring a change of circuit condition at said subscriber station and a change of circuit condition at said remote position, and means whereby an operator at said remote position may accomplish both of said changes of circuit condition to effect the disconnection.

176. In a system comprising a primary transmission path and a secondary transmission path connectable thereto for back and forth intercommunication by code signals, means for communicating thereover by signal sending and responsive means, each adapted to send and respond to codes consisting of an equal number of units each having either of two differentiating characteristics, means controllable by transmission of said codes over said primary transmission path from a remote point for testing the free or busy condition of said secondary path and means operable in response to a free test for connecting said paths together for back and forth intercommunication.

177. In a system comprising a primary transmission path and a plurality of secondary transmission paths connectable thereto for back and forth intercommunication by code signals, means for communicating thereover by signal sending and responsive means each adapted to send and respond to codes consisting of an equal number of units each having either of two differentiating characteristics, means controllable by transmission of said codes over said primary transmission path from a remote point for selecting one of said secondary transmission paths, means operable in response to said selection to test said selected path for a free or busy condition, and means operable in response to a free test for connecting said paths together for back and forth intercommunication.

178. In a system having the elements of claim 177, means including means for transmitting said codes over at least one of said connected transmission paths for disconnecting said paths upon termination of said communication.

179. In a communication system, a station circuit having means to transmit space, mark, break and disconnect signals, a line from said station to a switching point, a terminating circuit for said line at said switching point, said terminating circuit having means responsive to said signals, the immediate response to space, break, and disconnect signals being the same and opposed to the response to a mark signal, timing means for differentiating between space signals and both break and disconnect signals and a testing circuit for differentiating between break and disconnect signals.

180. The method of determining the type of signal being transmitted from a station circuit, which consists of differentiating between space signals and other signals having the same immediate effect such as break and disconnect signals by measuring the time duration of such signals and then differentiating between long signals such as break and disconnect signals by testing for the presence or absence of current flow.

181. The method of determining at a supervisory point the type of signal being transmitted from a station circuit over a channel to an intermediate point, which consists of differentiating between space signals and other signals having the same immediate effect such as break and disconnect signals from said station by measuring the time duration of such signals, thereafter transmitting a mark signal from said intermediate point to said supervisory point station circuit and during the transmission of said mark signal testing for the presence or absence of current flow from said station and effecting a determination in accordance therewith.

182. A printing telegraph system comprising a telegraph channel of transmission, a plurality of channels provided with terminal receivers selectively operable to record characters in accordance with permutated marking and spacing elements connectable thereto, selecting means for selectively connecting one of said other channels to said first-named channel, means for controlling said means selectively from a remote point, said means having a condition of readiness to effect a selective connection, and means for automatically sending a signal of which the significance consists of its mark-space characteristics over said first-named channel to said remote point to indicate the existence of said condition of readiness.

183. A transmission system having a channel of impulse transmission and other channels of impulse transmission capable of being selectively interconnected therewith to establish a channel of transmission for code combinations of impulses, a channel selector instrumentality having a series of elements each adapted to occupy one of two different positions, a signal responsive means controllable from a remote point for controlling the setting of said elements in different combinations, means controlled by said elements when set in different combinations to effect the selection of one or another of said other channels of transmission, said instrumentality being capable of assuming an effective condition and an ineffective condition, and means automatically controlled by the assumption of said instrumentality of an effective condition to send a signal indicative of such fact to said remote point.

184. A system having the features of claim 183 and further characterized in that said remote point is connected to said instrumentality over said channel of impulse transmission and that means for transmitting said signal comprises elements for changing the mark-space condition of said channel.

185. A transmission system having a channel of transmission and other channels of transmission capable of being selectively interconnected therewith to establish a channel of transmission, a channel selector instrumentality having a series of elements each adapted to occupy one of two different positions, a signal responsive means controllable from a remote point for controlling the setting of said elements in different combinations, means controlled by said elements when set in different combinations to effect the selection of one or another of said other channels of transmission, said instrumentality being capable of assuming an effective condition and an ineffective condition, and means automatically controlled by the assumption of said instrumentality of an effective condition to send a signal indicative of such fact to said remote point.

186. In a telegraph system, a telegraph circuit extending from an outlying point to a switching office, manually operable means whereby an attendant at said office may establish a telegraphic connection from said switching office over said circuit to said outlying point, a telegraph circuit extending from a remote point to said switching office, instrumentalities at the switching office controllable from the remote point over the telegraph circuit which extends thereto to attach said circuit to the telegraph circuit extending to the outlying point to establish a telegraphic communication path, in combination with busying devices whereby connection of said manually operable means to said circuit extending to the outlying point to form a telegraphic communication path causes the sending back over said telegraph sending circuit to the remote point of a busy indication in response to an attempt to control said instrumentalities to connect said circuits extending to said outlying point and said remote point.

187. A system in accordance with claim 186 wherein the instrumentalities controllable from the remote point to interconnect said lines are selective instrumentalities consisting of permutatable means determining by the permutations thereof which out of a plurality of telegraph circuits is to be connected.

188. A printing telegraph exchange system comprising selecting equipment, line switching means controlled thereby, means for sending selecting pulses from a remote point to operate said equipment, and means controlled by a condition of readiness of said line selecting equipment to receive line selecting pulses to send signals to said remote point indicating said condition of readiness, wherein said signals comprise a change in the mark-space condition of a telegraph channel.

189. A telegraph system comprising lines to be selected, a selector for selecting one of said lines comprising a plurality of elements each of which may assume any one of several conditions under the influence of a controlling permutation code combination, a remote point from which said selector is to be controlled connected to said selector over a channel of telegraph transmission, means whereby said selector causes the sending of signals indicating its readiness to receive controlling permutation code combinations, and means controlled by operation of said selector whereby it indicates to said remote point the utilization of a controlling permutation code combination to effect a selection.

190. A system comprising channels of telegraph transmission to be selected, a permutation code selector for selecting one of said channels, means controllable from a remote point for seizing said selector for utilization, means responsive to seizure for indicating back to said remote point the readiness of said seized selector, and further means for indicating back to said remote point the completion of a selecting function by said selector.

191. In a permutation code selection system, ultimate devices to be selected, a primary permutation code selector consisting of elements each of which may assume one of a plurality of conditions, permutatable members conditionable in permutations according to the permutations of said elements, one of said permutations being assigned as a conditioning code to establish a condition permitting the selection of said members in other permutations, and means enabling the selection of any ultimate device conditioned upon an immediately antecedent setting of said elements in accordance with the permutation assigned as said conditioning code.

192. In combination, a permutation code selector, elements permutatably arrangeable thereby, a path preliminarily establishable to one of said elements, means operable under the control of some one of a limited number of code combinations selected from the whole possible number of code combinations which said elements are capable of forming for establishing said path, and means operable by the receipt of any other code combinations prior to one of said limited number to prevent the preliminary establishment of said path, in combination with means effective after establishment of said path to continue said path according to the permutative arrangement of said elements.

193. Selective means consisting of a path fanned out through permutatable elements, means for permutating said path through said elements in accordance with permutated code combinations, means for producing a selecting effect over said path when permutated according to certain code combinations, and means for preventing the production of any selecting effect thereby until said path is conditioned by at least one of a limited number of the whole possible number of code combinations.

194. In a permutation code selection system, transmission channel selecting means operated by permutation code, answer-back means effective to operate under the combined influence of transmission of permutation code to said channel selecting means and failure of said channel selecting means to perform a channel selecting function.

195. A channel of telegraphic transmission, means to transmit selecting codes thereover, means selectively responsive to select and associate with said channel a channel of further transmission, and means automatically returning over said channel of transmission permutation codes signifying a failure of proper operation of said selectively responsive means.

196. A channel of telegraphic transmission, means for impressing thereupon at one point selecting codes each consisting of a fixed number of units having two different conditions, means at a remote point selectively responsive thereto to select and associate with said channel a channel of further transmission, and means associated with said selectively responsive means for automatically returning back to said one point signals indicating whether an association of a channel of further transmission has been accomplished.

197. In combination, a channel of telegraphic transmission, means for impressing thereupon at one point selecting codes consisting of a fixed number of units having two different characteristics, means at a remote point selectively responsive thereto to select a channel of telegraphic transmission and associate it with another channel of telegraphic transmission, and means associated with said selectively responsive means for transmitting away from said selectively responsive means current variations indicating whether the association of two channels of telegraphic transmission has been accomplished, and electrical elements conditioned by said signals.

198. A system comprising a teletypewriter, a telegraph channel operably associated therewith to transmit permutation codes thereover, said codes being assigned selecting functions, instrumentalities selectively operable by said codes to make a selection, and elements automatically controlled by failure of said instrumentalities to make a selection to transmit a code significant thereof to said teletypewriter.

199. A system comprising lines to be selected, a permutation code selector for selecting one of said lines, means for supplying codes to said selector, and means automatically operable by failure to select one of said lines in response to a supplied code to send out a permutation code signal indicative of said failure.

200. A selector operable by code combinations of a given number of units each of which may consist of any one of a fixed number of conditions, devices for supplying said codes to said selector, and associated apparatus controlled by failure of said device to make a selection to send other code combinations.

201. In a communication system, first sets of contacts individual to communication channels, each channel having a plurality of associated sets, other sets of contacts individual to communication paths, each said path having a plurality of said other sets, each of said first sets having one position of intersection with each of said other sets, means whereby one of said channels prepares all of its sets of contacts, selective means controlled by a plurality of elements each of which may assume a plurality of positions in permutated relation under the influence of controlling signals traversing said one channel to select one of said other sets of contacts individual to a particular communication path, and means establishing a communicative relation of said one channel and said one communication path over the intersecting contacts of said prepared and said selected contacts.

202. A system in accordance with claim 201 provided with lock-out means whereby during a prepared condition of said one prepared set all other similar sets of the system remain unprepared.

203. In a telegraph switching system, coacting contacts arranged in intersecting rows, a row associated with a channel being crossed by a row associated with another channel, means automatically controlled by seizure of a channel at a remote point to seize and condition its row, and means controlled by transmission of a permutated combination of code conditions over said seized channel to select a crossing row and to establish a communicative connection between the seized channel and the channel of the crossing row at the point of crossing.

204. A combination in accordance with claim 203 comprising means consisting in part of instrumentalities for transmitting impulses in selected permutated code combinations over at least one of said channels for disestablishing said communicative connection.

205. A telegraphic exchange system comprising a first telegraph channel and a second telegraph channel, switching means for interconnecting said channels, a relay in said switching means, means effective upon interconnection of said channels for communication to condition said relay to a holding condition, and circuit means effective upon the breakdown of the circuit of one of said channels for causing said relay to assume a position suitable to extend a disconnect signal to the other channel and to maintain said relay in a condition suitable for sending said disconnect signal until the completion of sending thereof.

206. A system comprising separated points A, B and C, a telegraph line extending from A to B, a plurality of telegraphic transmission systems for two-way telegraphic code impulse transmission extending from B to C, means set into operation by remote control from A to search for an idle one of said systems and to seize the same for connection to said line for two-way telegraphic code impulse transmission between A and C, means automatically operable after seizure of said idle one of said systems to test the same for two-way telegraphic code transmission, and means automatically operable upon determination of lack of present operativeness of said two-way transmission system to reject said system for connection to said line and initiate a search for another idle one of said systems.

207. A line selecting and connecting system comprising a selector consisting of permutatable elements, a distant source for causing the supply of a plurality of permutations of a fixed number of different conditions for selecting said elements, a receiving distributor for transferring said plurality of permutations in succession to corresponding of said permutatable elements, means conditioned selectively according to the first of said permutations to identify a group of lines, means conditioned selectively by the last of said permutations to select a line of said group, and cut-through means to associate said identified line for telegraphic transmission to another line, and means for maintaining said association thereafter independently of said elements.

208. A line selecting and connecting system comprising a selector consisting of permutatable elements, a distant source for causing the supply of a plurality of permutations of a fixed number of different conditions for selecting said elements, a distributing device for transferring said plurality of permutations in succession to corresponding of said permutatable elements, means conditioned selectively according to the first of said permutations to identify a group of lines, means conditioned selectively by the last of said permutations to select a line of said group, and a holding instrumentality for maintaining said association for subsequent telegraphic transmission independently of said distributing device.

209. The method of selecting and connecting to a calling channel one selectable channel of telegraphic transmission out of a plurality thereof by means including one set of permutatable elements which comprises sending from an originating source a plurality of permutation code combinations, distributing said code combinations in succession to set said permutatable elements successively in accordance therewith, causing the selection of a selectable channel in accordance therewith and connecting said selected channel to said calling channel over a communicative path therebetween independent of said elements.

210. The method of remotely indicating over a communication path the condition of a telegraph channel equipped with instrumentalities for communication thereover by permutatively coded impulses of a given timing and a given number of impulses per code group which comprises causing a given condition of said channel to automatically impress upon said communication path code groups of said given timing and given number of impulses per code group which are significant of said given condition.

211. In a telegraph system, a telegraph channel, means establishing a busy condition thereon, means for choosing said channel for test, another telegraph channel and means automatically controlled by a busy condition of said first channel to send a busy signal consisting of a permutated group of a plurality of line conditions over said other telegraph channel.

212. In a telegraph system, means for attempting to connect one telegraph channel with a second telegraph channel, means for sending code combinations representing a busy signal if said second channel is busy at the time of said attempt, and means for discontinuing sending said code combinations and completing said connection if said second line becomes idle during the continuance of said attempt.

213. A system comprising a call originating point with a channel extending therefrom and a called point with a channel extending thereto, a selector for controlling the connection of said channels into intercommunicative relationship comprising a plurality of elements each having a plurality of permutatively selectable conditions, means for permutatively selecting said elements into suitable of said conditions to perform said connection, a standby selector of means and function similar to said selector, means operable as a result of abnormal failure to perform said connection to substitute said standby selector into association with the elements of said system whereby said or similar connections may be controlled.

214. In a telegraph system in which telegraphic channels are connected together by switching instruments to constitute a through communication path over which marking and spacing impulses may be transmitted, means for sending marking pulses of two different durations following a spacing condition, means discriminating between the length of said marking pulses to determine whether a break or disconnect indication is signified, and means responsive to the discriminating means in different ways according to the signified indication.

215. A printing telegraph system comprising a central station, a plurality of branch stations, printing telegraph equipment of the current-impulse type at said stations, a plurality of signaling channels terminating at said central station, switching means remote from the central station and responsive to current impulses for connecting certain of said channels to any of said branch stations, means including the connected ones of said channels for controlling said switching means from the central station whereby said certain channels are employed for both selecting and signal transmission purposes, other switching means for connecting idle ones of said signalling channels to calling branch stations and means at the branch stations for controlling said other switching means to effect connections between calling branch stations and the central station.

216. A printing telegraph system comprising a central station, a plurality of branch stations, printing telegraph equipment at said stations, an intermediate switching station, signaling channels between said switching station and each of the other stations, switching means at the switching station for connecting central station channels to branch station channels, means for transmitting controlling impulses over a central station signaling channel to operate said switching means to connect a branch station channel to said central station channel, means for controlling said switching means from a calling branch station to connect the channel extending to said branch station to an idle central station signaling channel and means operative after such connections have been completed at the intermediate switching station for operating the printing telegraph equipment at the connected stations over the same channels employed for setting up the connection.

217. A printing telegraph system comprising a central station, a plurality of branch stations, printing telegraph equipment at said stations, a plurality of signaling channels terminating at said central station and common to each of said branch stations, means for impressing a potential of one polarity upon a signaling channel to seize the same switching means for extending said channels to the branch stations and means at the central station to control said switching means to select a wanted branch station, said last-mentioned means including means for impressing controlling impulses of opposite polarity upon the seized channel.

218. A printing telegraph system comprising a central station, a plurality of branch stations, printing telegraph equipment at said stations, a plurality of signaling channels terminating at said central station and common to each of said branch stations, switching means for extending said channels to the branch stations and means including said printing telegraph equipment at the branch stations to control said switching means to connect a calling branch station to an idle channel to the central station.

219. A printing telegraph system comprising a central station, a plurality of branch stations remote from said central station, printing telegraph equipment at said stations, a switching station common to said branch stations and remote from said central station and switching means at said switching station for connecting said central station and any of said branch stations, said switching means including a polarized impulse relay responsive to impulses transmitted from the central station.

220. A printing telegraph system comprising a central station, a plurality of branch stations remote from said central station, printing telegraph equipment at said stations, a switching station common to said branch stations and remote from said central station, switching means at said switching station for connecting said central station and any of said branch stations, and means for controlling said switching means from either said central station or said branch stations depending upon the origin of a call, said means for controlling the switching means from the central station including a polarized impulse relay arranged to respond to impulses of opposite polarity from the normal line polarity.

221. A printing telegraph system comprising a central station, a plurality of branch stations, a plurality of trunks or channels terminating at said central station, a source of signaling current of one polarity, means for connecting the same to said trunks or channels, switching means associated with said trunks or channels and remote from said central station and means for disconnecting said source of current from the line and for transmitting current impulses of opposite polarity for controlling said switching means to interconnect said central station with any of said branch stations through said trunks or channels.

222. A printing telegraph system comprising a plurality of stations, printing telegraph equipment at said stations, selective switching equipment for interconnecting said stations, means for controlling said selective switching equipment from a remote station, said means including a relay, and means for short-circuiting the winding of said relay after the operation of the selective switching means.

223. A printing telegraph system comprising a central station, a plurality of branch stations, a plurality of trunks or channels terminating at said central station, printing telegraph equipment at said stations, selective switching equipment associated with each of said channels remote from said central station, means for impressing a normal line condition upon any of said channels, means for impressing a second line condition upon said channels for communication purposes, and means for controlling said switching equipment, said last-named means including an impulse transmitter arranged to reverse said line conditions and periodically interrupt said normal line condition.

224. A printing telegraph system comprising a plurality of stations, selective switching equipment for interconnecting said stations, a plurality of trunks or channels terminating at one of said stations, means for controlling the operation of said switching equipment from said one station, said means including any of said channels, means for effecting printer communication over any of said signaling channels, means for releasing said switching equipment from said one station, said means including said signaling channel and means for utilizing said signaling channel to provide an indication at said one station of the busy condition at one of said branch stations to which connection has been attempted.

225. A printing telegraph system comprising a central station, a plurality of branch stations, a plurality of trunks or channels terminating at said central station, switching equipment associated with each of said channels remote from said central station, and means including printing telegraph equipment at each of said branch stations for controlling said switching equipment from any of said branch stations to connect a calling branch station to said central station.

226. A printing telegraph system comprising a central station, a plurality of branch stations, a plurality of trunks or channels terminating at said central station, selective switching equipment associated with each of said channels remote from said central station, said equipment including means responsive to a reversal of the normal trunk polarity for directively controlling and releasing said equipment, and printer means responsive to interruptions of the normal trunk polarity for communicating between the central station and the connected branch station.

227. A printing telegraph system comprising a central station, a plurality of branch stations, printing telegraph equipment at said stations, an intermediate switching station, signaling channels between said switching station and each of the other stations, switching means at the switching station for connecting central station channels to branch station channels, means for transmitting controlling impulses over a central station signaling channel to operate said switching means to connect a branch station channel to said central station channel, means for controlling said switching means from a calling branch station to connect the channel extending to said branch station to an idle central station signaling channel, means operative after such connections have been completed at the intermediate switching station for operating the printing telegraph equipment at the connected stations over the same channels employed for setting up the connection, said means for operating the printing telegraph equipment including devices for establishing marking and spacing telegraphic conditions upon the signaling channel extending from the branch to the intermediate switching station, and means for creating a third condition distinctive from said marking and spacing conditions thereupon as a supervisory control condition.

228. A printing telegraph system comprising a central station, a plurality of branch stations, printing telegraph equipment of the current-impulse type at said stations, a plurality of signaling channels terminating at said central station, switching means remote from the central station and responsive to current impulses for connecting certain of said channels to any of said branch stations, means including the connected ones of said channels for controlling said switching means from the central station whereby said certain channels are employed for both selecting and signal transmission purposes, other switching means for connecting idle ones of said signaling channels to calling branch stations, means at the branch stations for controlling said other switching means to effect connections between calling branch stations and the central station, and means controllable from a branch office over a connection established by said switching means to produce a disconnect condition at said central station.

229. A printing telegraph system comprising a central station, a plurality of branch stations, a plurality of trunks or channels terminating at said central station, switching equipment associated with each of said channels remote from said central station, means including printing telegraph equipment at each of said branch stations for controlling said switching equipment from any of said branch stations to connect a calling branch station to said central station, means for transmitting a telegraphic "break" signal from said branch station to said central station, means for transmitting a disconnect signal from said branch station to said central station, and means at said central station responding discriminatingly to said signals.

230. A printing telegraph system comprising a plurality of stations, selective switching equipment for interconnecting said stations, a plurality of trunks or channels terminating at one of said stations, means for controlling the operation of said switching equipment from said one station, said means including any of said channels, means for effecting printer communication over any of said signaling channels, means for releasing said switching equipment from said one station, said means including said signaling channel, means for utilizing said signaling channel to provide an indication at said one station of the busy condition at one of said branch stations to which connection has been attempted, and a device for impressing signals to give said indication upon said channel, said device being caused to so impress such signals automatically by an attempt to establish a connection to said busy line.

231. A printing telegraph system comprising a central station, a plurality of branch stations, a plurality of trunks or channels terminating at said central station, switching equipment associated with each of said channels remote from said central station, means including printing telegraph equipment at each of said branch stations for controlling said switching equipment from any of said branch stations to connect a calling branch station to said central station, and a device and circuit connections therefor for indicating automatically to said calling branch station a busy condition of all channels capable of being used for connecting said calling branch station to said central station.

232. In a multisection line telegraph communication path, a channel of communication extending over a branch channel section and over a trunk channel section, means for creating marking, spacing and disconnect conditions upon said branch station channel, testing means for testing one of said sections for a disconnect condition, means controlled as a result of a prolonged spacing condition upon said branch channel section to cause said means to function to make said test, and a disconnect instrumentality controlled by an affirmative response to said test.

233. In a telegraph system comprising a switching point, branch or subscriber channels leading from said point, trunk channels leading from said point, selective means whereby a trunk channel may by remote control over the channel seek and be connected to one of said subscriber channels, devices operable by remote control over one of said subscriber channels to seek and be connected to an idle one of said trunk channels to form a multisection line telegraph communication path, testing means for testing the one of said sections comprising a subscriber channel for a disconnect condition, and means controlled as a result of a prolonged spacing condition upon said section to cause said means to function to make said test.

234. A system for selectively connecting one out of a plurality of lines with a controlling line for transmission comprising a plurality of permutatable elements, means repeatedly controlling the permutation of said same elements over said controlling line, selecting one out of said plurality of lines in accordance with the repeated permutation of said elements, and means for causing the closing of a direct transmission channel between the controlling and selected line.

235. A system for selectively connecting one out of a plurality of lines with a controlling line for transmission comprising a plurality of permutatable elements, means repeatedly controlling the permutation of said same elements over said controlling line, selecting one out of said plurality of lines in accordance with the repeated permutation of said elements, means for causing the closing of a direct transmission channel between the controlling and selected line, and means for maintaining said direct transmission channel in transmitting condition independently of said elements.

236. In a telegraph switching system, instrumentalities including a permutation code selector for selectively interassociating signal transmission conductors under remote control from a distant point by codes initiated at said point, said instrumentalities having an idle condition and a condition of readiness to utilize such codes, signaling means caused to function incident to said instrumentalities assuming said condition of readiness to send a signal to signify said condition of readiness to said point, and means at said point controllable by arrival thereat of said signal.

237. In a telegraph switching system, instrumentalities including a permutation code selector for selectively interassociating signal transmission conductors under remote control from a distant point by codes initiated at said point, said instrumentalities having an idle condition and a condition of readiness to utilize such codes, means operated incident to seizure at said point of a transmission channel extending to said instrumentalities to cause said instrumentalities to assume said condition of readiness, signaling means caused to function incident to said instrumentalities assuming said condition of readiness to send a signal to signify said condition of readiness to said point, and means at said point controllable by arrival thereat of said signal.

238. A telegraph system including a channel of transmission, a repeater for transmitting two conditions from one section of said channel controlling said repeater to another section thereof controlled by said repeater when said conditions occur in the rapid succession incident to telegraphic intelligence transmission, timed paralyzing means for said repeater for paralyzing its repeating function for a timed period, means for initiating said paralyzing means into operation incident to a prolonged repeating of one of said conditions followed by a change to the other whereby said repeater remains fixed in said other condition during said timed period regardless of the condition of the controlling section, and means thereafter returning said repeater to the control of said controlling section.

239. In a telegraph system, a first class of lines and a second class of lines, a common line to which a line of either class may be connected to form a through channel, means for establishing a connection between a line of either of said classes and said common line by remote control over any line so connected, means in each of said lines of first and second class to establish a disconnect condition, disconnect means in said common line for directly testing said first class of line when so connected for a disconnect condition, instrumentalities in each of said second class of lines and individual thereto for testing its individual line for a disconnect condition, means whereby said common line when connected to a line of said second class initiates the testing function of the instrumentalities of said connected line to test for a possible disconnect condition, and means operable upon affirmative test to report a disconnect condition to said disconnect means.

240. In a multisection line telegraph communication path connected by repeaters, means in one line section for generating and transmitting a spacing condition, means responsive thereto for transmitting over another line section an interrupted spacing condition, and means measuring the time of the interruption and establishing or not establishing selectively in accordance with the duration thereof a disconnect condition.

241. In a multisection line telegraph communication path connected by repeaters, means in one line section for generating and transmitting a spacing condition, means responsive thereto for transmitting over another line section an interrupted spacing condition, means measuring the time of the interruption and establishing selectively for a certain range of duration of the interruption a disconnect condition, and means for maintaining the disconnect condition after the interruption.

242. In a telegraph system, a controlling or central office and a controlled or automatic switching office, a telegraph line connecting said offices, means for establishing a first condition whereby said central office is prepared to control selective means at said satellite office over said line to extend a connection beyond said switching office, means for sending an interrupted line condition toward said central office as an indication that said selective means is prepared for control, other means operable after establishment of a connection and under a second condition to send over said trunk toward said central office a similar interrupted line condition as a disconnect signal, and relay means effective under said first condition to prevent the registration of a disconnect signal under said first condition.

243. A multioffice telegraph system comprising a main office, a plurality of branch offices or stations, printing telegraph equipment in each of said offices or stations, a switching center remote from the main office for interconnecting said main office with any desired one of said branch offices or stations, a plurality of trunks from the main office to the switching center common to all of said branch offices, line circuits at the switching center to each of the branch offices, means including selective switching equipment at said switching center for extending calls in either direction between the main office and any of the branch offices and means for controlling said switching equipment to connect one of said trunks from the main office to a wanted branch office and at other times to connect the same trunk to any branch office which desires to transmit a message to the main office.

KARL E. FITCH.
WAYNE V. K. LARGE.
CHARLES W. LUCEK.